(12) United States Patent
Kaufman et al.

(10) Patent No.: US 7,471,291 B2
(45) Date of Patent: Dec. 30, 2008

(54) APPARATUS AND METHOD FOR REAL-TIME VOLUME PROCESSING AND UNIVERSAL THREE-DIMENSIONAL RENDERING

(75) Inventors: Arie E. Kaufman, Plainview, NY (US);
Ingmar Bitter, Lake Grove, NY (US);
Frank Dachille, Amityville, NY (US);
Kevin Kreeger, East Setauket, NY (US);
Baoquan Chen, Maple Grove, MN (US)

(73) Assignee: The Research Foundation of State University of New York, Albany, NY (US)

( * ) Notice: Subject to any disclaimer, the term of this patent is extended or adjusted under 35 U.S.C. 154(b) by 18 days.

(21) Appl. No.: 11/556,993

(22) Filed: Nov. 6, 2006

(65) Prior Publication Data

US 2007/0206008 A1 Sep. 6, 2007

Related U.S. Application Data

(62) Division of application No. 10/204,685, filed on Jan. 9, 2003, now Pat. No. 7,133,041.

(60) Provisional application No. 60/185,076, filed on Feb. 25, 2000.

(30) Foreign Application Priority Data

Feb. 26, 2001 (WO) ..................... PCT/US01/06345

(51) Int. Cl.
*G06T 17/00* (2006.01)
(52) U.S. Cl. .................................. 345/424

(58) Field of Classification Search ....................... None
See application file for complete search history.

(56) References Cited

U.S. PATENT DOCUMENTS 4,314,351 A 2/1982 Postel et al.

(Continued)

FOREIGN PATENT DOCUMENTS

EP 0 216 156 A2 4/1987

(Continued)

OTHER PUBLICATIONS

"A Generalized Object Display Processor Architecture," by S.M. Goldwasser in I.E.E.E. *Computer Graphics and Applications*, vol. 4, No. 10, at pp. 43-55, 1984.

(Continued)

*Primary Examiner*—Jin-Cheng Wang
*Assistant Examiner*—Said Broome
(74) *Attorney, Agent, or Firm*—Hoffman & Baron, LLP

(57) ABSTRACT

An apparatus and method for real-time volume processing and universal three-dimensional rendering. The apparatus includes a plurality of three-dimensional (3D) memory units; at least one pixel bus for providing global horizontal communication; a plurality of rendering pipelines; at least one geometry bus; and a control unit. The apparatus includes a block processor having a circular ray integration pipeline for processing voxel data and ray data. Rays are generally processed in image order thus permitting great flexibility (e.g., perspective projection, global illumination). The block processor includes a splatting unit and a scattering unit. A method for casting shadows and performing global illumination in relation to light sources includes sweeping a two dimensional array of rays through the volume can also be implemented with the apparatus. A method for approximating a perspective projection includes using parallel projection.

4 Claims, 70 Drawing Sheets

U.S. PATENT DOCUMENTS

| | | | |
|---|---|---|---|
| 4,371,933 A | 2/1983 | Bresenham et al. | |
| 4,593,372 A | 6/1986 | Bandai et al. | |
| 4,674,046 A | 6/1987 | Ozeki et al. | |
| 4,685,070 A | 8/1987 | Flinchbaugh | |
| 4,710,876 A | 12/1987 | Cline et al. | |
| 4,719,585 A | 1/1988 | Cline et al. | |
| 4,729,098 A | 3/1988 | Cline et al. | |
| 4,737,921 A | 4/1988 | Goldwasser et al. | |
| 4,791,567 A | 12/1988 | Cline et al. | |
| 4,791,582 A | 12/1988 | Ueda et al. | |
| 4,827,413 A | 5/1989 | Baldwin et al. | |
| 4,835,712 A | 5/1989 | Drebin et al. | |
| 4,879,668 A | 11/1989 | Cline et al. | |
| 4,882,683 A | 11/1989 | Rupp et al. | |
| 4,984,157 A | 1/1991 | Cline et al. | |
| 4,985,856 A | 1/1991 | Kaufman et al. | |
| 4,987,554 A | 1/1991 | Kaufman | |
| 5,038,302 A | 8/1991 | Kaufman | |
| 5,101,475 A | 3/1992 | Kaufman et al. | |
| 5,166,876 A | 11/1992 | Cline et al. | |
| 5,204,625 A | 4/1993 | Cline et al. | |
| 5,226,113 A * | 7/1993 | Cline et al. | 345/424 |
| 5,253,065 A | 10/1993 | Richards et al. | |
| 5,313,567 A | 5/1994 | Civanlar et al. | |
| 5,317,689 A | 5/1994 | Nack et al. | |
| 5,361,385 A | 11/1994 | Bakalash | |
| 5,381,518 A | 1/1995 | Drebin et al. | |
| 5,412,764 A | 5/1995 | Tanaka | |
| 5,442,733 A | 8/1995 | Kaufman et al. | |
| 5,544,283 A | 8/1996 | Kaufman et al. | |
| 5,557,711 A | 9/1996 | Malzbender | |
| 5,594,842 A | 1/1997 | Kaufman et al. | |
| 5,594,844 A | 1/1997 | Sakai et al. | |
| 5,630,034 A * | 5/1997 | Oikawa et al. | 345/424 |
| 5,724,493 A | 3/1998 | Hosoya et al. | |
| 5,760,781 A | 6/1998 | Kaufman et al. | |
| 5,847,711 A * | 12/1998 | Kaufman et al. | 345/424 |
| 5,850,226 A | 12/1998 | Nagasawa et al. | |
| 5,877,779 A | 3/1999 | Goldberg et al. | |
| 5,971,767 A | 10/1999 | Kaufman et al. | |
| 6,690,371 B1 * | 2/2004 | Okerlund et al. | 345/424 |

FOREIGN PATENT DOCUMENTS

| | | |
|---|---|---|
| EP | 0 612 025 A2 | 8/1994 |
| EP | 0 642 104 A1 | 3/1995 |
| FR | 2 597 227 A1 | 10/1987 |

OTHER PUBLICATIONS

"The Graphics PARCUM (Processing Architecture Based on Cubic Memory) System: A 3-D Memory Based Computer Architecture for Processing and Display of Solid Models," by D. Jackel, published in Computer Graphics Forum, North Holland, vol. 4, No. 4, at pp. 21-32, 1985.

"A Three-Dimensional Shaded Display Method for Voxel-Based Representations," by T Ohashi, et al., Proc. Eurographics '85, pp. 221-232, Sep. 1985.

"A 3-D Cellular Frame Buffer," by Arie Kaufman and R. Bakalash, in Proc. Eurographics '85, Nice, France, Sep. 1985, pp. 215-220.

"Memory Organization for a Cubic Frame Buffer," by Arie Kaufman in Proc. Eurographics '86, Lisbon, Portugal, Aug. 1986, pp. 93-100.

"Towards a 3-D Graphics Workstation," by Arie Kaufman, in Advances in Graphics Hardware I, W. Strasser (Ed.), Springer Verlag, 1987, pp. 17-26.

"Voxel-Based Architectures for Three-Dimensional Graphics," by Arie Kaufman, in Proc. IFIP '86, 10th World Computer Congress, Dublin, Ireland, Sep. 1986, pp. 361-366.

"Memory and Processing Architecture for 3-D Voxel-Based Imagery," by A. Kaufman and R. Bakalash, in IEEE Computer Graphics and Applications, 1988.

"The CUBE Three-Dimensional Workstation," by A. Kaufman, in Proc. NCGA '88: Ninth Annual Conference and Exposition, Anaheim, Calif., Mar. 1988.

"3-D Scan-Conversion Algorithms for Voxel-Based Graphics," by Arie Kaufman and Eyal Shimony, in Proc. 1986 ACM Workshop on Interactive 3-D Graphics held in Chapel Hill, N.C. on Oct. 1986, pp. 45-76.

"Back-to-Front Display of Voxel-Based Objects," IEEE CG&A, Jan. 1985, pp. 52-60 by Frieder et al.

"Real-Time Display and Manipulation of 3-D Medical Objects: The Voxel Processor Architecture," Computer Vision, Graphics and Image Processing, 1987, pp. 1-27, by Goldwasser et al.

"Generating Octree Models of 3-D Objects from Their Silhouettes in a Sequence of Images," Computer Vision, Graphic and Image Processing, 1987, pp. 1-29, by Potmesil.

"Surface Reconstruction of 3-D Object in Computerized Tomography," Computer Vision, Graphics, and Image Processing, 1988, pp. 270-278, by Xu et al.

"3-D Transformations of Images In Scanline Order," by Ed Catmull et al., in Computer Graphics, vol. 14, No. 3, at pp. 279-285 (1980).

"The Image Prism: A Device for Rotating and Mirroring Bitmap Images," by Cary Kornfeld in I.E.E.E. Computer Graphics and Applications, at pp. 21-30 (May 1987).

"Data Parallel Volume Rendering as Line Drawing," by Peter Schroder et al., Volume Visualization Workshop, at pp. 25-31 (Oct. 1992).

Kaufman et al. "A Survey for Architectures of Volume Rendering," IEEE Engineering in Medicine and Biology Magazine, pp. 18-23, Dec. 1990.

"CUBE—An Architecture Based on a 3-D Voxel Map," by Arie Kaufman and R. Bakalash, in *Theoretical Foundations of Computer Graphics and CAD*, R.A. Earnshaw (Ed.), Springer—Verlag, pp. 689-701, 1988.

Foley, *Computer Graphics: Principles and Practice*, 2nd Edition, pp. 738, 835-842, 914, 1034-1039, 1990.

J. Foley, et al., "Recursive Ray Tracing," *Computer Graphics, Principles and Practice*, 1990.

Renate Gembella and Rolf Lindner, "The Multiple-Write Bus Technique," *IEEE Computer Graphics and Applications*, Sep. 1982, at pp. 33-41.

"Survey of Texture Mapping," by P.S. Heckbert, *IEEE Computer Graphics and Applications*, 6(11):56-67, Nov. 1986.

"Texram: Smart Memory for Texturing," by A. Schilling et al., *IEEE Computer Graphics and Applications*, 16(3):32-41, May 1996.

"Creating Raster Omnimax Images from Multiple Perspective Views Using the Elliptica Weighted Average Filter," by N. Greene and P.S. Heckbert, *IEEE Computer Graphics and Applications*, 6(6):21-27, Jun. 1986.

"Volume Rendering," by R.A. Debin et al., *Computer Graphics (SIGGRAPH '88 Proceedings)*, vol. 22, pp. 65-74, Aug. 1988.

"Three-Pass Affine Transformations for Volume Rendering," by P. Hanrahan, *Computer Graphics (San Diego Workshop on Volume Visualization)*, vol. 24, pp. 71-78, Nov. 1990.

"Fast Rotation of Volume Data on Parallel Architectures," by P. Schroder and J.B. Salem, *Visualization '91*, pp. 50-57, 1991.

"Compositing Digital Images," by T. Porter and T. Duff, *Computer Graphics (SIGGRAPH 84)*, vol. 18, No. 3, pp. 253-259, Jul. 1984.

"The A-Buffer, an Antialiased Hidden Surface Method," by L. Carpenter, *Computer Graphics (SIGGRAPH 84)*, vol. 18, No. 3, pp. 103-108, Jul. 1984.

"Filtering Edges for Grayscale Displays," by S. Gupta and R.F. Sproull, *Computer Graphics (SIGGRAPH 81)*, vol. 15, No. 3, pp. 1-5, Aug. 1981.

"Object Voxelization by Filtering," by M. Srámek and A. Kaufman, *1998 Volume Visualization Symposium*, pp. 111-118, IEEE, Oct. 1998.

"Reality Engine Graphics," by K. Akeley, *Computer Graphics (SIGGRAPH 93)*, 27:109-116, Aug. 1993.

"Accelerated Volume Rendering and Tomographic Reconstruction Using Texture Mapping Hardware," by B. Cabral, N. Cam and J. Foran, *Symposium on Volume Visualization*, pp. 91-98, Oct. 1994.

"Trianglecaster: Extensions to 3D-Texturing Units for Accelerated Volume Rendering," by Gunter Knittel, *Eurographics*, pp. 25-34, 1999.

* cited by examiner

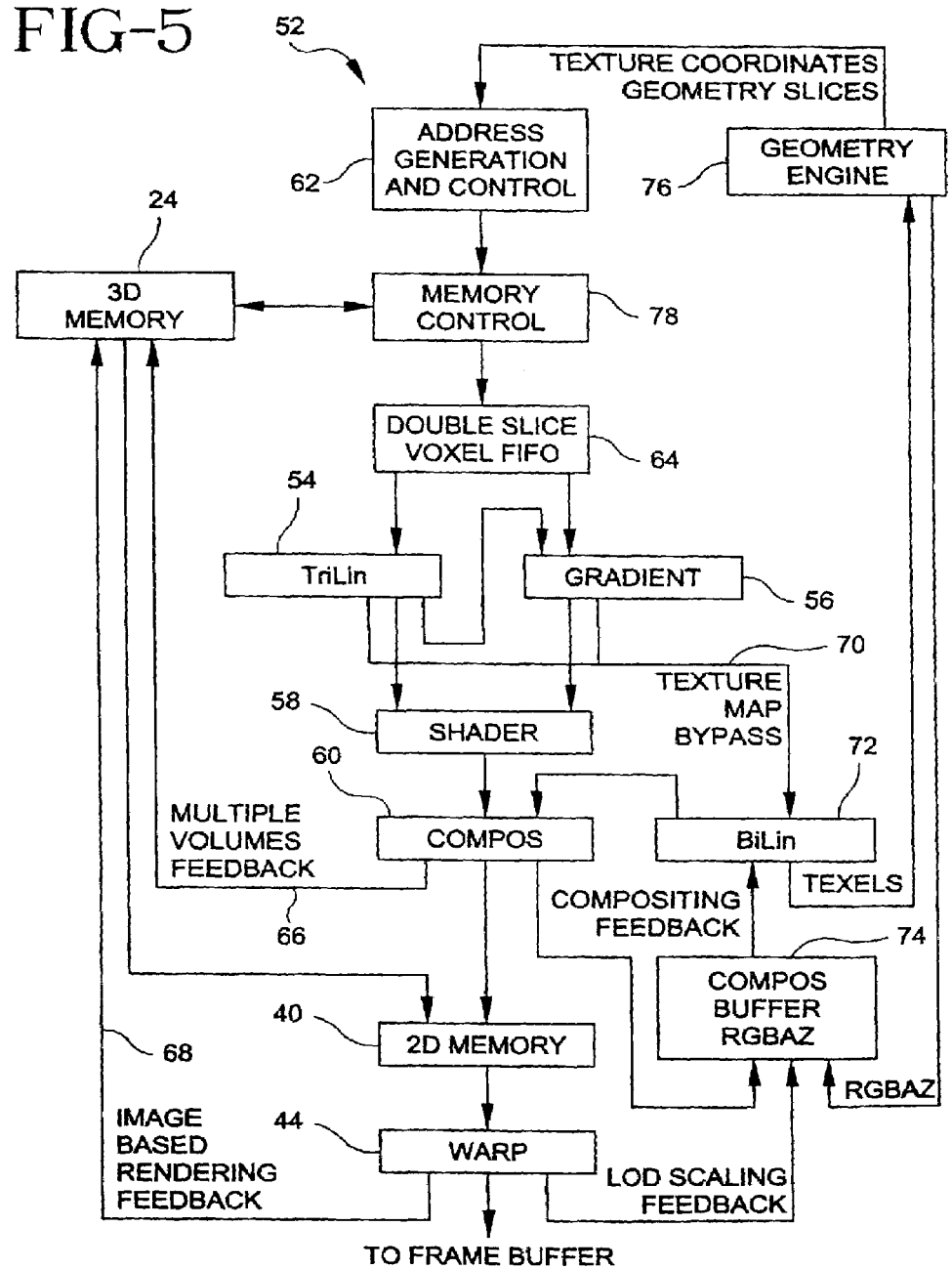

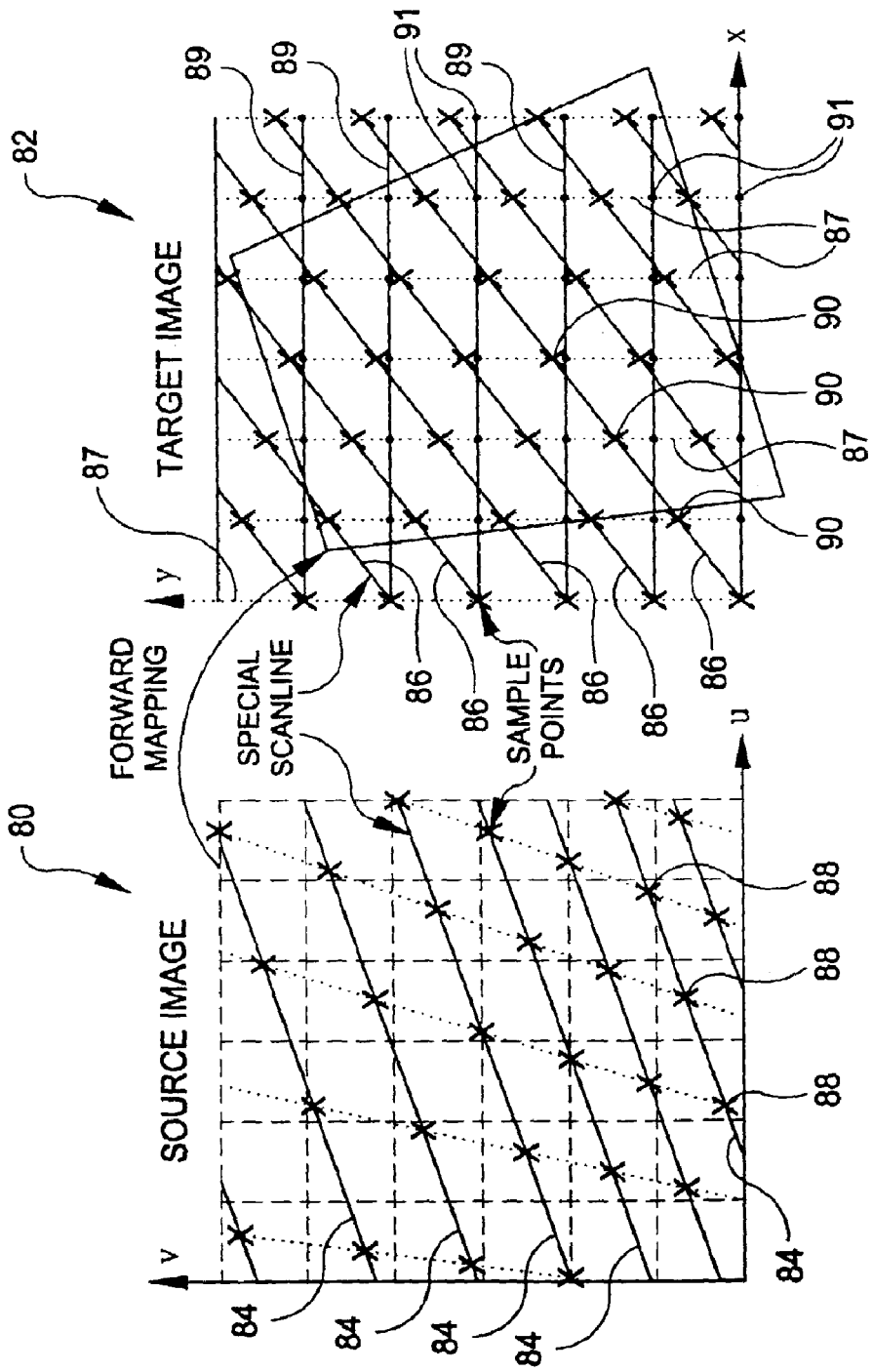

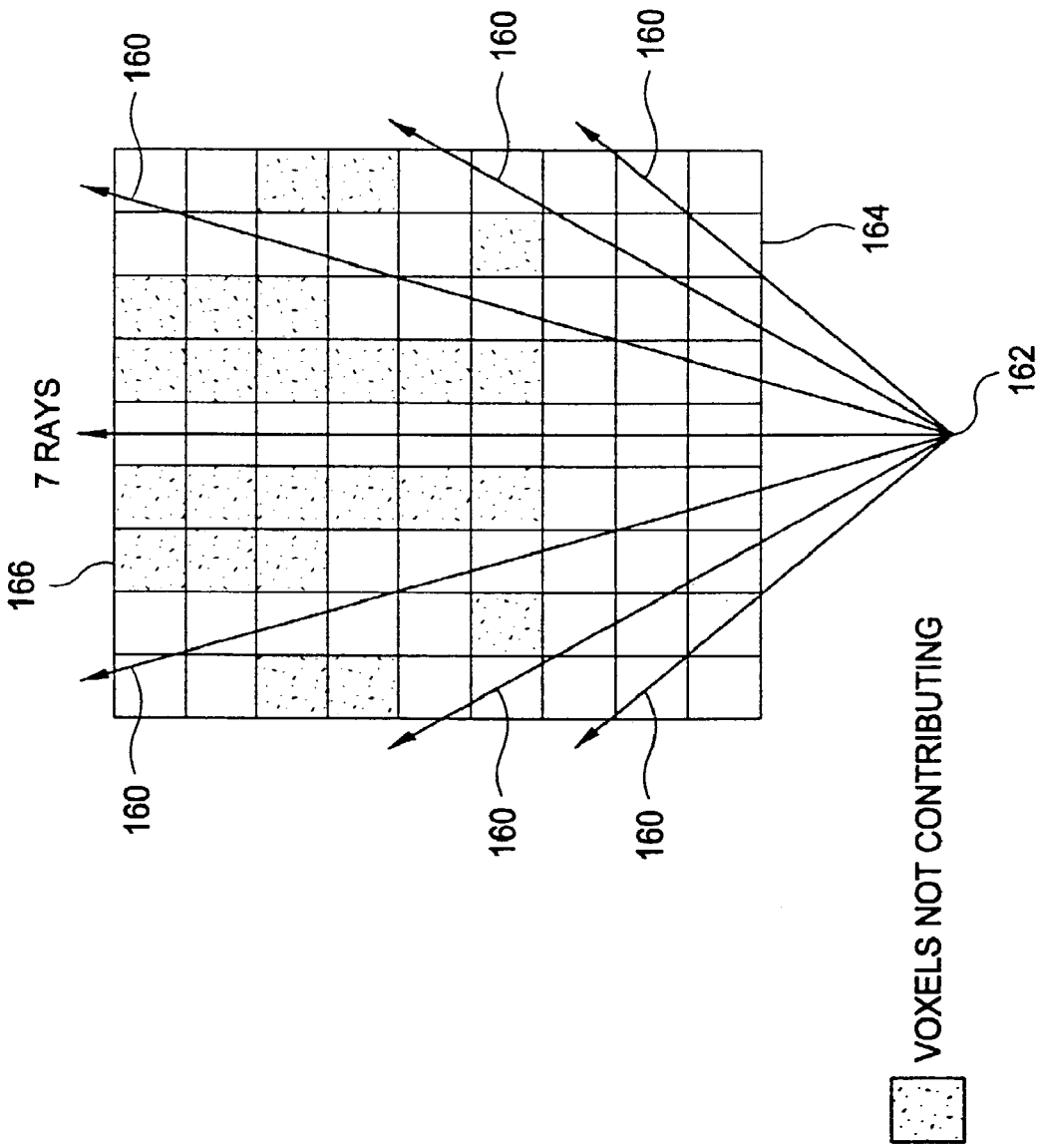

VOLUME
• VOXEL COORDINATES
▲ RESAMPLING FILTER WEIGHTS
X  RAY SAMPLE LOCATIONS

FIG-23

```
Compute Z-position of Eye in Voxel Units
Compute Exponential Region Boundaries
for REGION = MAXREGION to 0
    for SLICE = MAXSLICE[REGION] to MINSLICE[REGION]
        Interpolate Samples for this slice (Bilin)
        Shade and Classify Samples
        Composite Samples onto Rays in Buffer
    end for
    if not frontmost REGION
        Downsample Rays in Compositing Buffer with
            Bartlett Filter
    end if
end for
Warp Baseplane to Final Image plane
```

FIG-25

$x$-WEIGHTS: -1 0 1

$y$-WEIGHTS: 
1
w
1

$z$-WEIGHTS:
w
1

RESULTING EFFECTIVE 3X3X3 FILTER:

```
RLE_AddFragment (xPos, yPos, RGBA) {
    tmp = nextFreeScanline() ;
    RLE_AddPixelToScanline(data[yPos], xPos, RGBA, tmp) ;
    freeScanLine (data [yPos] ) ;
    data [yPos] = tmp ;
}

RLE_AddPixelTo Scanline(in, xPos, RGBA, out) {
    total = 0 ;
    inPtr = 0 ;
    outPtr = 0 ;
    while(total < lineWidth) {
        if (total == xPos) {
            out [outPtr: :outPtr+3] = BLEND (RGBA, in [inPtr: :inPtr+3]);
            outPtr +=4;
            total++;
            if(in[inPtr: :inPtr+3] == 0)
                in [inPtr+4] - - ;
            else
                inPtr +=4;
        } out [outPtr: :outPtr+3] = in [inPtr: :inPtr+3] ;
        if (in [inPtr: :inPtr+3] == 0) {
            if (total < xPos && total+in[inPtr+4] > xPos) {
                out [outPtr+4] = xPos - total -1 ;
                outPtr +=5 ;
                in [inPtr+4]  -= xPos-total ;
                total = xPos ;
            } else {
                out [outPtr+4] = in[inPtr+4] ;
                total += in [inPtr+4] ;
                outPtr +=5 ;
                inPtr  +=5 ;
            }
        } else {
            total ++ ;
            outPtr +=4 ;
            inPtr  +=4 ;
        } // endif run-of-zeroes
    } // endwhile still within scanline
}
```

FIG-41

```
Define Plane(A, B, C, D);
Find triangle bounding box(bb);
Dist = A x bb.min.x + B x bb.min.y + C x bb.min.z + D;
xStep = A;
yStep = B - A x bb.width;
zStep = C - B x bb.height - A x bb.width;
For z = bb.min.z to bb.max.z with unit steps
    For y = bb.min.y to bb.max.y
        For x = bb.min.x to bb.max.x
            store f(Dist) in [x,y,z] (voxelize)
            Dist = Dist + xStep;
        end For
        Dist = Dist + yStep;
    end For
    Dist = Dist + zStep;
end For
```

FIG. 50

1. Find near and far $Z$ for given volume and view frustum
2. $cutplanewidth = \dfrac{far\ Z - near\ Z}{cutplaneCount}$
3. Load *cutplanewidth* on VolumePro card
4. Compute cutplane equation $A$, $B$ & $C$
5. $D = far\ Z$
6. while $D < near\ Z$
7.     Load $A$, $B$ & $C$ on VolumePro card
8.     Call VolumePro render
9.     Fetch baseplane buffer
10.     Set Texture with baseplane buffer
11.     Transform baseplane by
12.     Render baseplane (performs warping) with blending
13.     $D = D - cutplanewidth$ FIG. 57
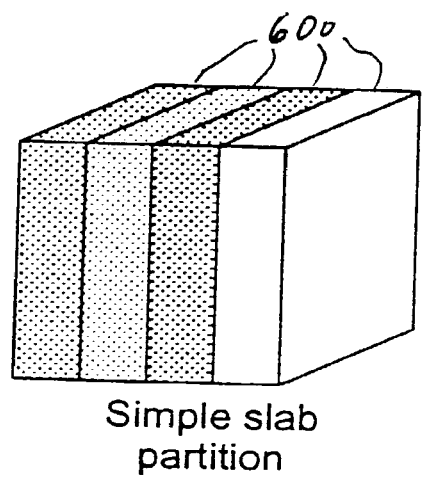
Simple slab partition
FIG. 58
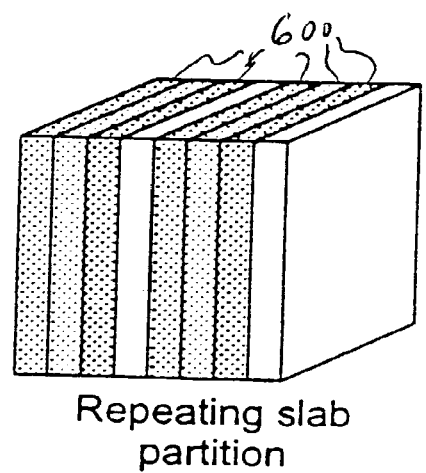
Repeating slab partition Block skewed partition

FIG. 67

```
Procedure Backproject(volume, direction)
  Initialize sheet buffer
  For each slice
    For each voxel in slice
      classify voxel color, opacity, and reflectivity
      determine corresponding ray buffer location
      wrap around using modulo operator
      clear energy of rays that just entered the volume
      If voxelOpacity > 0
        // exchange energy between ray and voxel
        compute dot product of ray direction and gradient
        If dot < 0
          // energy from ray transferred to voxel
          energyRayToVoxel = voxelOpacity × rayEnergy × φ(s,σ)
        Else If dot = 0
          // no surfaces, just isotropic
          // absorption and emission
          energyRayToVoxel = voxelOpacity × rayEnergy
          energyVoxelToRay = voxelUnshot × ζ
        Else If dot > 0
          // energy from voxel transferred to ray
          energyVoxelToRay = voxelUnshot × ζ × φ(s,σ)
        End If
        // store new voxel quantities
        voxelRadiosity += energyRayToVoxel
        voxelUnshot += voxelReflectivity × energyRayToVoxel
        voxelUnshot -= energyVoxelToRay
        // bilinear splat new ray quantities
        rayEnergy += energyVoxelToRay - energyRayToVoxel
      End If
    End Loop
  End Loop
End Procedure
```

FIG. 68

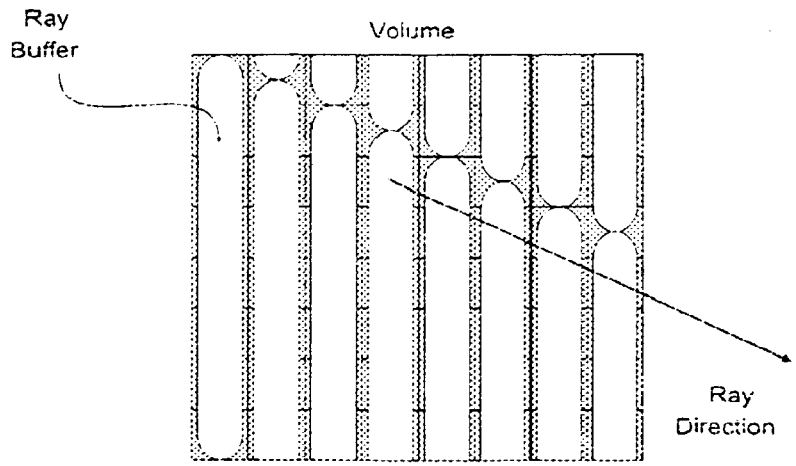

Slice 0

| 18 | 19 | 26 | 27 |
|----|----|----|----|
| 16 | 17 | 24 | 25 |
| 2  | 3  | 10 | 11 |
| 0  | 1  | 8  | 9  |

Slice 1

| 22 | 23 | 30 | 31 |
|----|----|----|----|
| 20 | 21 | 28 | 29 |
| 6  | 7  | 14 | 15 |
| 4  | 5  | 12 | 13 |

Slice 2

| 50 | 51 | 58 | 59 |
|----|----|----|----|
| 48 | 49 | 56 | 57 |
| 34 | 35 | 42 | 43 |
| 32 | 33 | 40 | 41 |

Slice 3

| 54 | 55 | 62 | 63 |
|----|----|----|----|
| 52 | 53 | 60 | 61 |
| 38 | 39 | 46 | 47 |
| 36 | 37 | 44 | 45 |

FIG. 77

Position to index lookup tables (entries in binary and decimal)

LUTx[0] = 000 000 = 0    LUTy[0] = 000 000 = 0    LUTz[0] = 000 000 = 0
LUTx[1] = 000 001 = 1    LUTy[1] = 000 010 = 2    LUTz[1] = 000 100 = 4
LUTx[2] = 001 000 = 8    LUTy[2] = 010 000 = 16   LUTz[2] = 100 000 = 32
LUTx[3] = 001 001 = 9    LUTy[3] = 010 010 = 18   LUTz[3] = 100 100 = 36

FIG. 78

Index to Position lookup tables

LUT5-3[0] = { 0 , 0 , 0 }    LUT2-0[0] = { 0 , 0 , 0 }
LUT5-3[1] = { 2 , 0 , 0 }    LUT2-0[1] = { 1 , 0 , 0 }
LUT5-3[2] = { 0 , 2 , 0 }    LUT2-0[2] = { 0 , 1 , 0 }
LUT5-3[3] = { 2 , 2 , 0 }    LUT2-0[3] = { 1 , 1 , 0 }
LUT5-3[4] = { 0 , 0 , 2 }    LUT2-0[4] = { 0 , 0 , 1 }
LUT5-3[5] = { 2 , 0 , 2 }    LUT2-0[5] = { 1 , 0 , 1 }
LUT5-3[6] = { 0 , 2 , 2 }    LUT2-0[6] = { 0 , 1 , 1 }
LUT5-3[7] = { 2 , 2 , 2 }    LUT2-0[7] = { 1 , 1 , 1 }

APPARATUS AND METHOD FOR REAL-TIME VOLUME PROCESSING AND UNIVERSAL THREE-DIMENSIONAL RENDERING

This application claims priority based on an International Application filed under the Patent Cooperation Treaty, PCT/US01/06345, filed on Feb. 26, 2001.

This application is a divisional application of, and claims priority to, co-pending U.S. Ser. No. 10/204,685, filed on Aug. 23, 2002.

This application claims priority to U.S. Provisional Patent Application Ser. No. 60/185,076, filed on Feb. 25, 2000, which is incorporated herein by reference.

STATEMENT OF GOVERNMENT RIGHTS

This invention was made with Government support under grant MP9527694 awarded by the National Science Foundation and under grant N000149710402 awarded by the Office of Naval Research.

BACKGROUND OF THE INVENTION

1. Field of the Invention

The present invention relates generally to three-dimensional (3D) graphics and volume visualization, and more particularly relates to an apparatus and method for real time volume processing and universal three-dimensional rendering.

2. Description of the Prior Art

Computer rendering is the process of transforming complex information into a format which is comprehensible to human thought, while maintaining the integrity and accuracy of the information. Volumetric data, which consists of information relating to three-dimensional phenomena, is one species of complex information that can benefit from improved image rendering techniques. The process of presenting volumetric data, from a given viewpoint, is commonly referred to as volume rendering.

Volume visualization is a vital technology in the interpretation of the great amounts of volumetric data generated by acquisition devices (e.g., biomedical scanners), by supercomputer simulations, or by synthesizing geometric models using volume graphics techniques. Of particular importance for manipulation and display of volumetric objects are the interactive change of projection and rendering parameters, real-time display rates, and in many cases, the possibility to view changes of a dynamic dataset over time, called four-dimensional (4D) visualization (i.e., spatial-temporal), as in the emerging integrated acquisition visualization systems.

A volumetric dataset is commonly represented as a 3D grid of volume elements (voxels), often stored as a full 3D raster (i.e., volume buffer) of voxels. Volume rendering is one of the most common techniques for visualizing the 3D scalar field of a continuous object or phenomenon represented by voxels at the grid points of the volume dataset, and can be accomplished using two primary methods: object-order methods and image-order methods. Using an object-order approach, the contribution of each voxel to the screen pixels is calculated, and the combined contribution yields the final image. Using an image-order approach, sight rays are cast from screen pixels through the volume dataset, and contributions of voxels along these sight rays are used to evaluate the corresponding pixel values.

Over the past three decades graphics systems have evolved duofold: from primarily two-dimensional (2D) to 3D and 4D (space and time), and from vector graphics to raster graphics, where the vector has been replaced by the polygon as the basic graphics primitive. This has led to the proliferation of polygon-based geometry engines, optimized to display millions of triangles per second. In such systems, however, triangle facets only approximate the shape of objects. Still, the 3D polygon-based graphics market continues to boom, and has become one of the hottest arenas of the personal computer (PC) industry.

In response to emerging demands placed on traditional graphics systems, various techniques have been devised to handle and display discrete imagery in order to enhance visual realism of the geometric model, as well as enhance or replace object shape and structure. Among these techniques include 2D texture and photo mapping, environment mapping, range images for image-based rendering, 2D mip-mapping, video streams, 3D volumes, 3D mip-mapping, 4D light fields and lumigraphs, and five-dimensional (5D) plenoptic functions. All these techniques require some sort of dimensionality-based interpolation (bilinear, trilinear, quadlilinear, etc.) between discrete pixels, texels, voxels, or n-oxels.

Special purpose computer architectures and methods for volume visualization are known in the art. Traditional methods of volume visualization typically operate by scanning through a volume dataset in a sequential manner in order to provide an accurate representation of an object. For example, Cube-4, an architecture developed by Dr. Arie Kaufman, Ingmar Bitter and Dr. Hanspeter Pfister, some of whom are also named inventors in the present application, is a special purpose scalable volume rendering architecture based on slice-parallel ray-casting. Cube-4 is capable of delivering true real-time ray-casting of high resolution datasets (e.g., $1024^3$ 16-bit voxels at 30 Hertz frame rate). However, Cube-4 cannot deliver such real-time performance for perspective projections. Presently, in known prior art rendering systems, the use of perspective projections either increases the rendering time or decreases the projected image quality. Additionally, prior architectures do not provide the ability to combine volumes and geometries into a single image.

Referring now to FIG. 1, a conventional volume visualization system 1 is shown. As illustrated in FIG. 1, the volume data is stored on a disk 2 and loaded into memory 4 before rendering. A Central Processing Unit (CPU) 6 then computes the volume rendered image from the data residing in memory 4. The final image is written to a frame buffer 8, which is typically embedded on a graphics card, for displaying on a monitor 9 or similar display device.

The present invention, therefore, is intended to provide a method and apparatus which significantly enhances the capabilities of known methods and apparatus to the extent that it can be considered a new generation of imaging data processing.

Other and further objects will be made known to the artisan as a result of the present disclosure, and it is intended to include all such objects which are realized as a result of the disclosed invention.

SUMMARY OF THE INVENTION

The present invention is tantamount to a departure from the prior art because of the all-encompassing new characteristics. An apparatus, in accordance with the present invention, for real-time volume processing and universal three-dimensional (3D) rendering includes one or more three-dimensional (3D) memory units; at least a first pixel bus; one or more rendering pipelines; one or more geometry busses; and a control unit. The apparatus is responsive to viewing and processing parameters which define a viewpoint, and the apparatus generates a 3D volume projection image from the viewpoint. The projected image includes a plurality of pixels.

The 3D memory units store a plurality of discrete voxels, each of the voxels having a location and voxel data associated therewith. The voxels together form a volume dataset, and the viewing and processing parameters define at least one face of the volume dataset as the base plane of the volume dataset as well as first and last processing slices of the volume dataset. The control unit initially designates the first processing slice as a current slice of sample points, and controls sweeping through subsequent slices of the volume dataset as current slices until the last processing slice is reached.

Each of the plurality of rendering pipelines is vertically coupled to both a corresponding one of the plurality of 3D memory units and the at least first pixel bus, and each of the rendering pipelines has global horizontal communication preferably with at most its two nearest neighbors. The rendering pipelines receive voxel data from the corresponding 3D memory units and generate a two-dimensional (2D) base plane image aligned with a face of the volume dataset. The geometry I/O bus provides global horizontal communication between the plurality of rendering pipelines and a geometry engine, and the geometry I/O bus enables the rendering of geometric and volumetric objects together in a single image.

The apparatus and methods of the present invention surpass existing 3D volume visualization architectures and methods, not only in terms of enhanced performance, image rendering quality, flexibility and simplicity, but in terms of the ability to combine both volumes and surfaces (particularly translucent) in a single image. The present invention provides flexible, high quality, true real-time volume rendering from arbitrary viewing directions, control of rendering and projection parameters, and mechanisms for visualizing internal and surface structures of high-resolution datasets. It further supports a variety of volume rendering enhancements, including accurate perspective projection, multi-resolution volumes, multiple overlapping volumes, clipping, improved gradient calculation, depth cuing, haze, super-sampling, anisotropic datasets and rendering of large volumes.

The present invention is more than a mere volume rendering machine; it is a high-performance interpolation engine, and as such, it provides hardware support for high-resolution volume rendering and acceleration of discrete imagery operations that are highly dependent on interpolation, including 2D and 3D texture mapping (with mip-mapping) and image-based rendering. Furthermore, the apparatus and methods of the present invention, coupled with a geometry engine, combine volumetric and geometric approaches, allowing users to efficiently model and render complex scenes containing traditional geometric primitives (e.g., polygonal facets), images and volumes together in a single image (defined as universal 3D rendering).

The apparatus of the present invention additionally provides enhanced system flexibility by including various global and local feedback connections, which adds the ability to reconfigure the pipeline stages to perform advanced imagery operations, such as imaging warping and multi-resolution volume processing. Furthermore, the present invention accomplishes these objectives in a cost-effective manner.

A preferred embodiment of the present invention is a method and apparatus for performing approximate perspective volumetric ray casting of a three-dimensional (3D) volume dataset. The apparatus of the invention is an approximating unit configured with the teachings of the method of the invention. The invention can also be practiced on a machine readable medium The method includes the steps of initially selecting viewing and processing parameters which define a viewpoint and a view direction. The length of the volume dataset is calculated between the location of the nearest voxel to the viewpoint and the farthest voxel from the viewpoint. The length is measured along either a line parallel to the view direction or an axis of the three-dimensional volume dataset that is most parallel to the view direction. The volume dataset is divided along the measured length into a plurality of slabs. Each of the plurality of slabs has an orientation that is perpendicular to the measured length and defines a plane having a position with respect to the viewpoint in three dimensional space. A perspective projection is generated. Each of the plurality of slabs is rendered by parallel projection onto a plurality of separate baseplane images. Each of the plurality of images is textured through the perspective projection onto their respective plane. The plurality of textured images are then blended together to form the final image.

The processing can be performed sequentially for each of the plurality of slabs. Alternatively, the processing can be performed starting with one of the plurality of slabs having the farthest voxel from the viewpoint and ending with one of the plurality of slabs having the nearest voxel, or vice versa. The can be diviced toslabs have an equal thickness. Preferably the slabs are divide so that the position of each respective plane of each of the plurality of slabs is situated at exponentially increasing distances from the viewpoint along measured length. Preferably each successive slab after the slab having the nearest voxel has a thickness along the measured length that is twice the thickness of a preceding adjacent slab.

In another preferred embodiment of the present invention is a method and apparatus for mapping a three dimensional volume dataset in a linear memory array. The volume dataset including a plurality of discrete voxels associated with a three dimensional grid point position $P_{xyz}=(x; y; z)$ and the linear memory array having a plurality of indices $O_{xyz}$. The apparatus of the invention is an addressing unit configured with the teachings of the method of the invention. The invention can also be practiced on a machine readable medium. The method includes converting integer coordinates (x; y; z) of the grid point position of one of the plurality of discrete voxels into a first bit pattern ($\ldots, x_3, x_2, x_1, x_0; \ldots, y_3, y_2, y_1, y_0; \ldots, z_3, z_2, z_1, z_0$). An integer offset for the discrete voxel is determined from a second bit pattern ($\ldots, z_3, y_3, x_3, z_2, y_2, x_2, z_1, y_1, x_1, z_0, y_0, x_0$). The discrete voxel is mapped onto the linear array at the integer offset. This process is repeated until each of the plurality of voxels are mapped. Preferably the voxels are processed in linear storage order.

Another preferred embodiment of the invention is a block processor for interfacing a ray bus and a plurality of three-dimensional (3D) memory units in a volume processing unit. The volume processing unit generates a plurality of rays for processing a volume dataset having a plurality of discrete voxels stored in a distributed fashion in the plurality of three-dimensional (3D) memory units. Each of the voxels have a location lying on a gridpoint in the volume dataset and have voxel data associated therewith. Each ray has a path and is a data structure having ray data associated therewith. Each ray also has a sample location in the volume dataset with respect to time associated with one or more voxels. The block processor having a circular ray integration pipeline for processing the voxel data and the ray data to represent an exchange of energy between the volume dataset and the ray data along the path of each ray. The plurality of rays are processed simultaneously in a round-robin fashion.

Preferably the block processor includes a queue sorter, at least one ray queue, a prefetch and memory controller, an interleaved volume cache, a resampling unit, a segmentation unit, a compositing unit, a shading unit, a scattering, and a splatting unit. The queue sorter interfaces the plurality of rays over the ray bus and separates rays into a plurality of ray queues. The queue sorter assigns a scalar importance to each of the plurality of rays queues for maintaining a sorted rank of importance for each ray queues. The at least one ray queue is connected to the queue sorter and receives the plurality of sorted rays, and controls the processing of each of the plurality of sorted rays. The prefetch and memory controller is connected to the at least one ray queue that has the highest scalar importance for receiving the plurality of sorted rays and prefetches voxels to hide latency. The prefetch and memory controller interfaces the memory units. The interleaved volume cache is connected to the prefetch and memory controller for receiving the plurality of sorted rays and prefetched voxels. The resampling unit is connected to the interleaved volume cache for receiving the plurality of sorted rays and accepting one sample location along a ray and a plurality of voxels that are nearest the sample location. The resampling unit trilinearly interpolates density, tag, gradient and irradiance for the sample location to generate sample data. The segmentation unit is connected to the resampling unit for receiving the plurality of sorted rays and the sample data and classifying the material type including color, opacity, and shading coefficients for the sample data. The compositing unit is connected to the segmentation unit for receiving the plurality of sorted rays and the sample data and updating the opacity and color of the ray based upon the sample data. The shading unit is connected to the compositing unit for receiving the plurality of sorted rays and the sample data. The scattering unit receives the plurality of sorted rays and the sample data and redirects the ray direction based upon the sample data and the material type of the data. The splatting unit is connected to the scattering unit and receives the plurality of sorted rays and the sample data for updating the voxel data and the ray data associated with the sample location. Either the scattering unit or the splatting unit is directly connected to the shading unit and the other is connected to the queue sorter.

Preferably the splatting unit receives the ray data and the voxel data associated with the sample location of the ray and copies the data. The voxel data is updated based upon the copy of the ray data and the ray data is updated based upon the copy of the voxel data. Preferably the shading unit has a reflectance map for performing shading.

A preferred embodiment of the invention is a method and apparatus for scattering at least one ray passing through a three-dimensional (3D) volume dataset. The apparatus of the invention is a scattering unit configured with the teachings of the method of the invention. The volume dataset having a plurality of discrete voxels and an estimated gradient. Each of the voxels having voxel data associated therewith. The at least one ray having a direction, ray data associated therewith, and a sample location in the volume dataset with respect to time associated with at least one voxel. The voxel data associated with the sample location including a reflectivity in a range between 0 and 1, a refractivity in a range between 0 and 1, a glossiness in a range between 0 and 90. The method including the receiving and copying the ray data and voxel data associated with the sample location. A first random number is selected in a range between 0 and 1. The ray direction is reflected about the estimated gradient in the volume dataset at the sample location when the first random number is less than the reflectivity at the sample location. A second random number is selected in a range between 0 and 1. The ray direction is refracted based upon the refractivity of the voxel data associated with the sample location and the estimated gradient in the volume dataset at the sample location when the second random number is less than the refractivity at the sample location. A random direction and a gaussian distributed random angle are selected with the random angle being defined by the glossiness of the voxel data multiplied by a third range between 0 and 1. The ray direction is rotated in the random direction by the random angle based on the glossiness at the sample location.

Another preferred embodiment of the invention is a queue sorter for determining a processing order of a plurality of ray queues for a volume processing system during processing. Each of the plurality of ray queues being assigned a dataset including a queue number and a scalar importance. The queue sorter including a pipelined insertion sorter having a comparison buffer and a selected buffer. The comparison buffer having a first linear storage arrangement for storing at least one dataset of one of said plurality of ray queues. The selected buffer having a second linear storage arrangement for storing the dataset for each of said plurality of ray queues. The pipelined insertion sorter receives a first dataset of one of said plurality of ray queues at a rank of the first storage arrangement of the comparison buffer. The scalar importance of the first dataset is compared with the scalar importance of a second dataset in the selected buffer having the same rank to determine the dataset having the higher scalar importance and the lower scalar importance. The dataset having the higher scalar importance is assigned to the second dataset. The dataset having the lower scalar importance is moved to the first dataset on the first linear storage arrangement at a position located one below the rank of the second dataset. The process is repeated during processing with the scalar importance of the active queue set higher than the scalar importance of the remaining plurality of ray queues and while removing an old dataset from the selected buffer when the first dataset has the same queue number as the old dataset. Preferably the pipelined insertion sorter sorts a plurality of datasets simultaneously.

Another preferred embodiment of the invention is a method for casting shadows of a volume dataset in relation to point light sources located both inside and outside, distant light sources located outside the volume dataset, and area light sources inside the volume dataset. The volume dataset having a plurality of discrete voxels stored in a distributed fashion in a plurality of three-dimensional (3D) memory units. Each of the voxels having a location lying on a gridpoint in the volume dataset and having voxel data associated therewith. The method includes computing sum of the optical path length to all the point light sources for all of the voxels in the volume data set. The sums of the optical path length values are stored in both a radiosity array and an unshot radiosity array. A projection direction and a face of the volume dataset is selected which is most perpendicular to the projection direction. The volume dataset is divided along the projection direction into a plurality of slices which are parallel to the face. The plurality of slices include a first slice having at least one voxel associated with the face. A two dimensional (2D) array of rays is initialized on the selected face with any distant light source energy. Each of the rays has a path parallel to the projection direction and ray data associated therewith. The first slice is assigned as a current slice. The light energy is intergrated and distributed to voxels along each path of each ray within the current slice. The process is repeated by sequentially sweeping along the projection direction through each subsequent slice until each of the plurality of slices is processed with each subsequent slice in turn becoming the current slice.

Preferably the two dimensional array of rays are initialized by making a copy of all the ray data and all voxel data on the current slice with the voxel data including the reflectivity, opacity, radiosity, and unshot radiosity, the ray data representing light energy. A current voxel is selected. An appropriate neighborhood of rays is determined for the current voxel. The ray data at the current voxel is resampled. The ray data is modulated by a factor zeta to distribute the energy. The current voxel data is updated based on the resampled ray data. The data of the neighboring rays is updated based on the current voxel data. The process is repeated for each voxel in the current slice. The ray data is stored back into the neighboring rays and the voxel data is stored back into the volume dataset.

Another preferred embodiment of the invention is a programmable processing element for controlling the storage location of volume data and polygon data. The data is distributed among blocks of a scheduling grid and is stored in a memory hierarchy having a first tier, a second tier, and a third tier. The scheduling grid has a plurality of rays casted there through and stored in ray queues. The programmable processing element includes a dispatcher, a scheduler, and a buffer. The dispatcher controls the volume data and the polygon data movement through the memory hierarchy. The dispatcher is operatively coupled to the first, second and third tiers. The scheduler determines the block processing order based upon the scheduling grid and the plurality of ray queues. The buffer is connected between the dispatcher and the scheduler for facilitating communication between the dispatcher and the scheduler. Preferably the scheduler has a heuristic metric for determining the block processing order.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 is a functional block diagram illustrating a unit rendering pipeline formed in accordance with one embodiment of the present invention.

FIG. 7 illustrates special parallel preserving scanlines in the source and target images in accordance with a preferred forward image warping method of the present invention.

FIG. 18A illustrates a conventional undersampling method for performing perspective projections.

FIG. 23 is a pseudo-code representation of a preferred method for performing Exponential-Regions Perspective back-to-front projection of a volume, in accordance with one form of the present invention.

FIG. 25 depicts an example of the preferred weights for performing a $3^3$ symmetric approximation of the x-component of a Sobel gradient filter, in accordance with one embodiment of the present invention.

FIG. 36 is a pseudo-code representation showing processing occurring in the RLE hardware of FIG. 35, in accordance with one form of the present invention.

FIG. 41 is a pseudo-code representation of a method for computing the distance from a plane, in accordance with one form of the present invention.

FIG. 50, illustrates an algorithm for the image aligned method using the VolumePro board.

FIG. 56A shows a plurality of rays casting through a scheduling grid having numbered cells.

FIG. 56B shows RAYS A and B casted through a scheduling grid interacting with an object forming reflected rays with dashed lines representing light rays cast towards light illuminating the scene.

FIG. 56D shows a ray forest with k=2 for the top nodes of each tree for considering which node will be processed.

FIG. 56E shows the ray forest shown in FIG. 56D after processing cell number 8.

FIG. 56F shows the ray forest shown in FIG. 56E after processing cell number 5.

FIG. 57 illustrates a simple slab partition that cuts the volume into p axis aligned slabs with one slab assigned to each processor for multiprocessing.

FIG. 58 illustrates a repeating slab partition that cuts the volume into slabs of n voxels thick and assigns slab i to processor i mod p for multiprocessing.

FIG. 67 illustrates an algorithm for volumetric backprojection;

FIG. 68 shows a ray buffer stepping through the volume one slice at a time, wrapping around at the edges;

FIG. 75 illustrates a recursive blocking volume layout for a 4 cube volume dataset with the index numbers shown on the face of the block.

FIG. 76 illustrates the index layout for each slice in the block shown in FIG. 18.

FIG. 77 illustrates a position to index lookup table.

FIG. 78 illustrates an index to position lookup table.

DETAILED DESCRIPTION OF THE PREFERRED EMBODIMENTS

The apparatus and methods of the present invention are capable of processing data and supporting real-time visualization of high resolution voxel-based data sets. The present invention is a universal three-dimensional (3D) rendering system delivering enhanced volume rendering in addition to the integration of imagery (e.g., volumes, textures and images) with geometry (e.g., polygons). The apparatus and methods are designed for use as a voxel-based system as described in the issued patents and pending applications of Dr. Arie Kaufman, a named inventor in this application, including "Method of Converting Continuous Three-Dimensional Geometrical Representations Into Discrete Three-Dimensional Voxel-Based Representations Within a Three-Dimensional Voxel-Based System", which issued on Aug. 6, 1991, as U.S. Pat. No. 5,038,302; "method of Converting Continuous Three-Dimensional Geometrical Representations of Polygonal Objects Into Discrete Three-Dimensional Voxel-Based Representations Thereof Within a Three-Dimensional Voxel-Based System", which issued on Jan. 22, 1991, as U.S. Pat. No. 4,987,554; "Method and Apparatus for Storing, Accessing, and Processing Voxel-Based Data", which issued on Jan. 15, 1991, as U.S. Pat. No. 4,985,856; "Method of Converting Continuous Three-Dimensional Geometrical Representations of Quadratic Objects Into Discrete Three-Dimensional Voxel-Based Representations Thereof Within a Three-Dimensional Voxel-Based System", which was filed on May 4, 1989, as U.S. Ser. No. 07/347,593, which was abandoned in favor of U.S. Ser. No. 08/031,599, filed on Mar. 15, 1993 as a continuation application of the '593 application; "Method and Apparatus for Generating Arbitrary Projections of Three-Dimensional Voxel-Based Data", which issued on Mar. 31, 1992 as U.S. Pat. No. 5,101,475; "Method and Apparatus for Real-Time Volume Rendering From An Arbitrary Viewing Direction", which was filed on Jul. 26, 1993 as U.S. Ser. No. 08/097,637; "Method and Apparatus For Generating Realistic Images Using a Discrete Representation", which was filed on Mar. 20, 1992 as U.S. Ser. No. 07/855,223; "Apparatus and Method for Parallel and Perspective Real-Time Volume Visualization", which issued on Dec. 8, 1998 as U.S. Pat. No. 5,847,711; and Apparatus and Method for Real-Time Volume Processing and Universal 3D Rendering which was filed on Jul. 16, 1999 as U.S. Ser. No. 09/354,876. The entire disclosure of each of these references is incorporated herein by reference.

Figure 1:
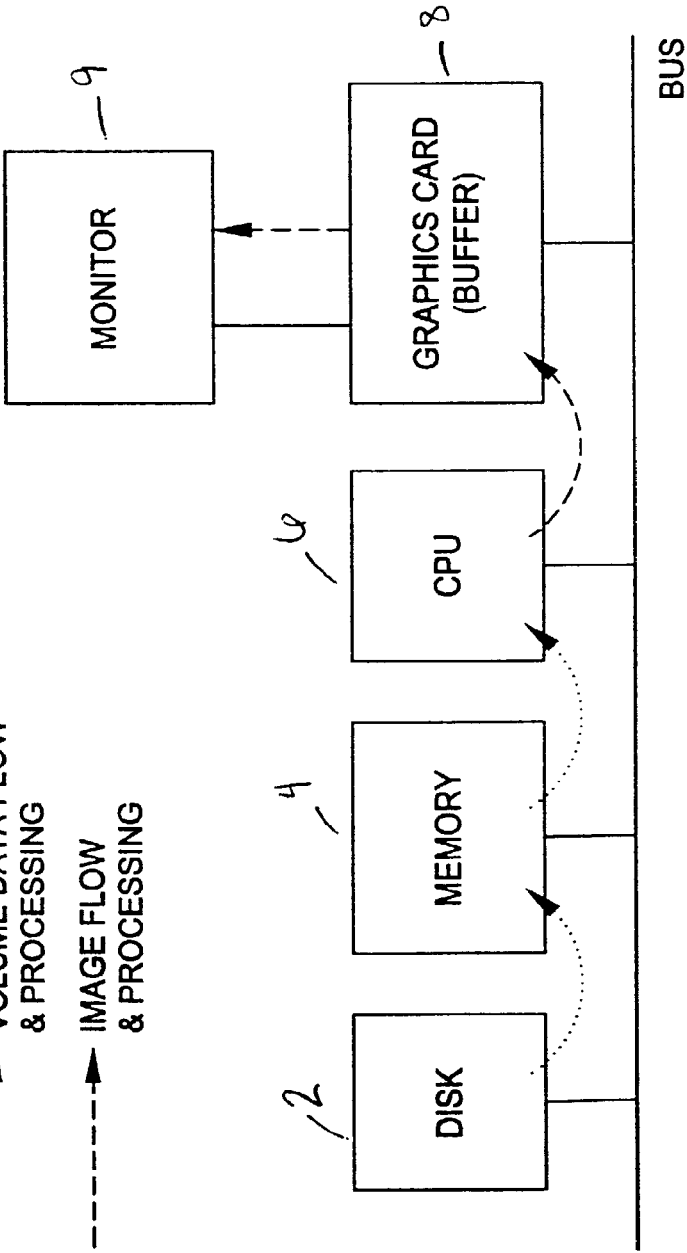
FIG. 1 is a block diagram of a conventional volume visualization system.
Figure 2:
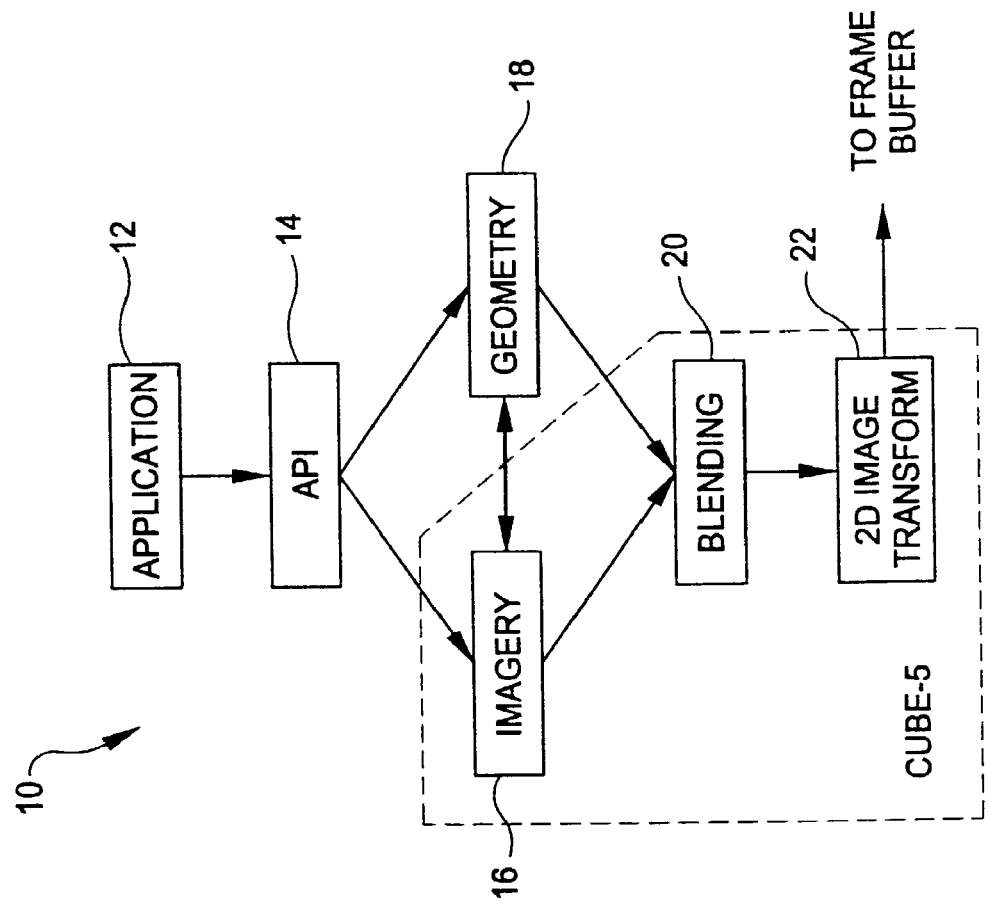
FIG. 2 is a conceptual block diagram illustrating a universal three-dimensional rendering system formed in accordance with one embodiment of the present invention.

FIG. 2 illustrates a conceptual view of a universal 3D rendering system 10 formed in accordance with one embodiment of the present invention. Applications 12 which display collections of renderable objects are preferably split by an Applications Program Interface (API) 14 into appropriate imagery and geometry representations. These representations are subsequently processed by an imagery unit 16 and a geometry unit 18, respectively, which are illustrated generally as functional blocks. The imagery unit 16 preferably includes a plurality of imagery pipelines and the geometry unit 18 preferably includes a plurality of geometry pipelines (not shown) for rendering the imagery and geometry representations, respectively. The rendered outputs of the imagery unit 16 and the geometry unit 18 are subsequently combined in a blending unit 20 to generate a single baseplane image. This baseplane image may preferably be transformed by a warp unit 22 to a final projection plane for display.

Figure 3:
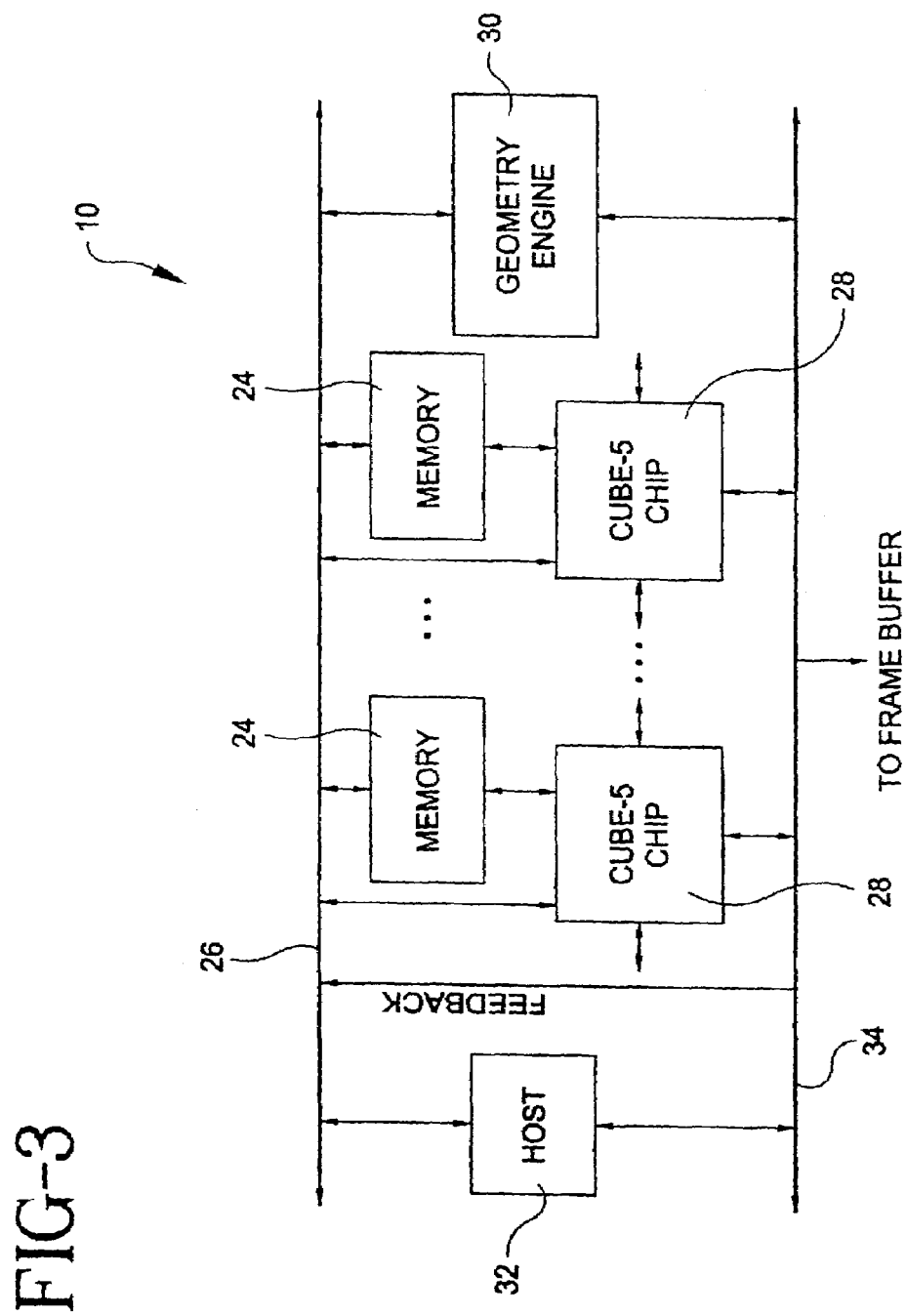
FIG. 3 is a simplified block diagram of the Cube-5 unit of FIG. 2 illustrating a preferred implementation of the present invention.

FIG. 3 illustrates one implementation of the Cube-5 volume visualization system of the present invention. As shown in FIG. 3, the system preferably includes one or more three-dimensional memory units 24, with each 3D memory unit 24 vertically coupled to an input bus 26 and a corresponding Cube-5 chip 28. A plurality of Cube-5 chips 28 are shown connected to a frame buffer pixel bus 34. Furthermore, the system 10 of the present invention preferably interfaces to at least one conventional geometry engine 30 and a host computer 32, both operatively coupled between the input bus 26 and the frame buffer pixel bus 34 for communicating with the Cube-5 apparatus of the present invention.

Figure 4:
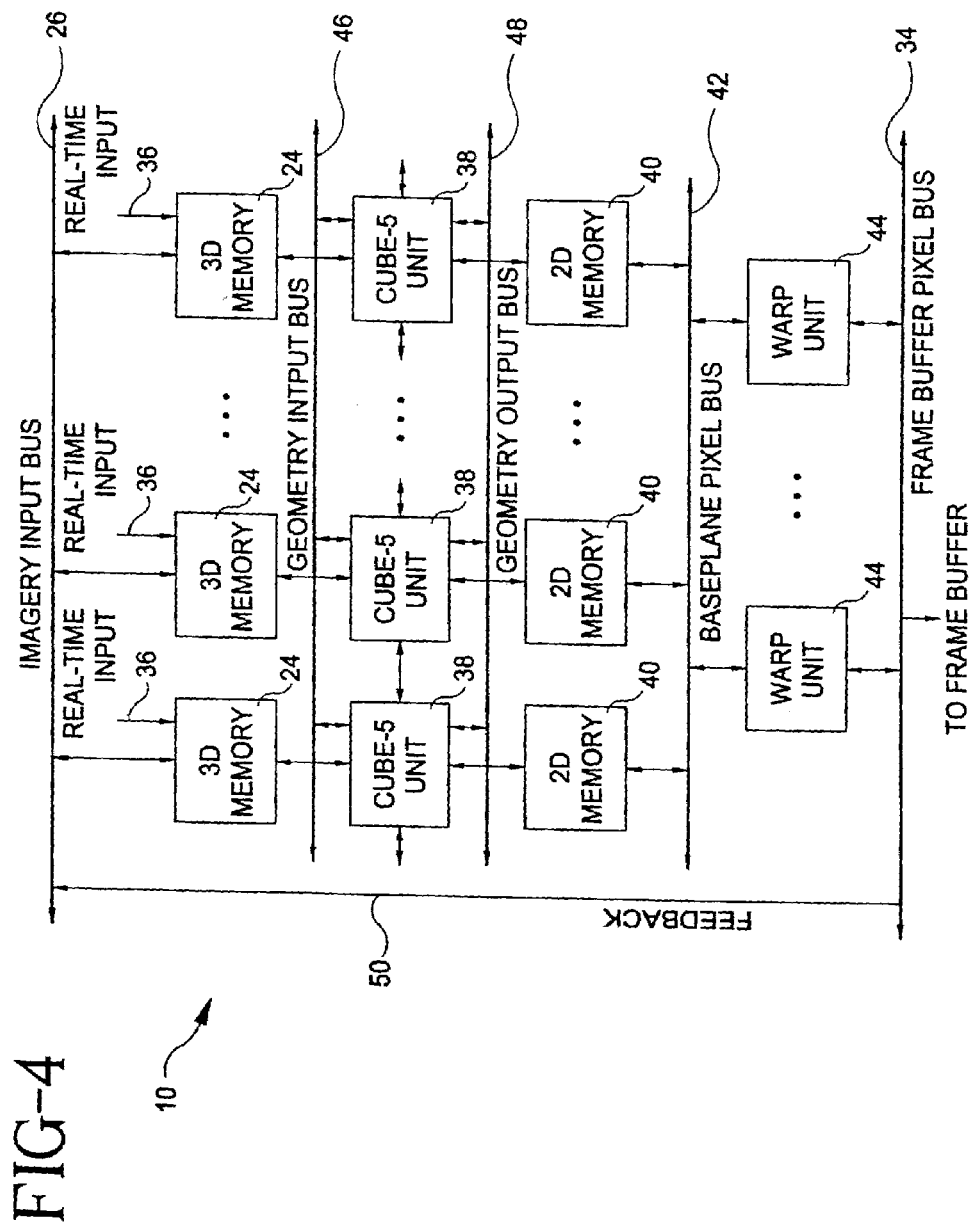
FIG. 4 is a functional block diagram depicting an overview of the universal three-dimensional rendering architecture formed in accordance with one embodiment of the present invention.

Referring now to FIG. 4, the apparatus of the present invention 10 includes a plurality of 3D memory units 24 which are preferably connected to an imagery input bus 26, providing global horizontal communication between the 3D memory units 24. The volume dataset is commonly represented as a regular grid of volume elements, or voxels, often stored as a full 3D raster (i.e., volume buffer). This volume dataset is preferably distributed across the 3D memory units 24. With a skewed distribution, the present invention allows conflict-free access to complete beams (i.e., rows) of voxels parallel to any of the major axes, thereby reducing the memory-processor bandwidth bottleneck. As illustrated in FIG. 4, for streaming video or four-dimensional (4D) volume data through the system 10, each 3D memory unit 24 is preferably connected to a dedicated real-time input 36. By providing a dedicated connection to a real-time input source, the memory-processor bandwidth bottleneck is further reduced.

The universal 3D rendering system 10 of the present invention further includes a plurality of rendering pipelines, shown as functional blocks of Cube-5 units 38 in FIG. 4. Each rendering pipeline 38 is connected to a corresponding 3D memory unit 24 and preferably has horizontal communication with at least preferably its two nearest neighbors. The Cube-5 units 38 read from their dedicated 3D memory units 24 and produce a two-dimensional (2D) baseplane image. This baseplane image, which contains a plurality of composited pixels generated by the Cube-5 units 38, is preferably distributed across a plurality of two-dimensional (2D)

memory units 40. Each of the plurality of 2D memory units 40 is preferably connected to both a corresponding Cube-5 pipeline unit 38 and a baseplane pixel bus 42 which provides global horizontal communication between 2D memory units 40.

Preferably, the present invention includes a plurality of warp units 44 connected to the baseplane pixel bus 42. The warp units 44 assemble and transform (i.e., warp) the baseplane image stored in the plurality of 2D memory units 40 onto a user-defined image plane. Although the present invention contemplates using a single warp unit 44 (e.g., in order to reduce the costs or overhead of the hardware), the use of a plurality of warp units 44 is desirable to accelerate image transformations.

The output of each of the warp units 44 is preferably connected to a frame buffer pixel bus 34 which provides global horizontal communication between warp units 44. Reading the source pixels over the baseplane pixel bus 42 and writing the final image pixels over the frame buffer pixel bus 34 preferably happens concurrently in order to allow greater system throughput. Although not a preferred architecture, the present invention also contemplates sequential reading and writing by the warp units 44. In this manner, only one pixel bus may be required, assuming the one pixel bus offers sufficient bandwidth for real-time image transfer for a full screen image.

With continued reference to FIG. 4, the present invention preferably includes a geometry input bus 46 and a geometry output bus 48, although it is contemplated to combine the two busses into a single geometry input/output bus of sufficient bandwidth for real-time imaging. The geometry input and output busses 46 and 48 are preferably connected to the inputs and outputs of the Cube-5 units 38 respectively and provide for the unique coupling of at least one geometry pipeline or engine (not shown) to the present system 10. The architecture of the present invention, coupled with a geometry engine via the geometry busses 46 and 48, supports the integration of imagery, such as volumes and textures, with geometries, such as polygons and surfaces. This mixing of geometric data with volumetric objects is a powerful feature which is unique to the present invention.

Referring now to FIG. 5, there is illustrated a block diagram depicting the functional stages of one of the plurality of Cube-5 rendering pipelines (reference number 38 in FIG. 4), formed in accordance with one embodiment of the present invention. As shown in FIG. 5, each rendering pipeline 52 preferably includes four types of processing units: a trilinear interpolation unit (TriLin) 54, a gradient estimation unit (Gradient) 56, a shading unit (Shader) 58 and a compositing unit (Compos) 60. Each of these rendering pipeline stages is described in detail in the prior issued patents and pending applications of Arie Kaufman relating to prior Cube volume visualization architectures (listed above) and are therefore only briefly discussed herein below.

As discussed above in reference to the 3D memory units 24, the volume dataset is stored as a regular grid of voxels distributed across the 3D memory units 24 in a skewed fashion, with each Cube-5 unit 38 connected to a corresponding 3D memory unit 24 (see FIG. 4). Voxels of the same skewed beam are preferably fetched and processed in parallel, distributed across all Cube-5 units 38. Consecutive slices of the volume dataset parallel to a predefined baseplane (i.e., parallel to a face of the volume dataset which is most perpendicular to a predefined view direction) are preferably traversed in scanline order. Referring again to FIG. 5, an address generation and control unit 62 preferably generates the addresses for access into the 3D memory unit 24. The address generation and control unit 62 additionally designates a first processing slice as the current processing slice and controls sweeping through subsequent slices of the volume dataset until the final slice has been processed.

The trilinear interpolation unit 54 computes a new slice of interpolated sample values between two processing slices. It is contemplated by the present invention that the trilinear interpolation function may alternatively be performed as a sequence of linear or bilinear interpolations.

The gradient estimation unit 56 preferably computes central difference gradients using volume data from multiple slices of the volume dataset. Utilizing the central difference gradients generated by the gradient estimation unit 56, sample points of the current processing slice are subsequently shaded by the shading unit 58. The shading unit 58 preferably uses the samples and gradients as indices into one or more look-up tables (LUTs), preferably residing in each shading unit 58, which store material color and intensity information. The material color table is dataset-type dependent, while the color intensity table is based on a local illumination model, as known by those skilled in the art. In simple terms, the multiplication of color and intensity yields a pixel color for each sample which is used in the compositing unit 60 to composite such color with the previously accumulated pixels along each sight ray.

With reference again to FIG. 4, data for computing the next sample along a continuous sight ray may reside on a neighboring Cube-5 unit 38. In this case, the nearest-neighbor connections between Cube-5 units 38 are preferably used to transfer the necessary data to the appropriate Cube-5 unit 38, which will continue to process that particular sight ray. When compositing has been completed, the composited pixels (i.e., baseplane pixels) are preferably stored in the corresponding 2D memory unit 40 connected to the Cube-5 unit pipeline 38. The baseplane pixels, which form the baseplane image, are subsequently read from the 2D memory units 40, via the baseplane pixel bus 42, and assembled by the warp units 44. The warp units 44 additionally transform the baseplane image to the final projection plane image.

Referring to FIG. 5, the delay of data required for the trilinear interpolation unit 54 and gradient estimation unit 56 is preferably achieved by inserting one or more first-in-first-out (FIFO) units 64 into the pipeline data path prior to being processed by the trilinear interpolation 54 and the gradient estimation 56 units. The FIFO unit(s) 64 may be implemented as, for example, random access memory (RAM), preferably embedded on the Cube-5 chip. The introduction of a predetermined delay may be particularly important when simultaneously processing beams of multiple slices of the volume dataset, thereby requiring more computation time between slices.

A compositing buffer (Compos Buffer) 74 operatively coupled to a bilinear interpolation unit (BiLin) 72 essentially provides a one slice FIFO. The bilinear interpolation unit 72 preferably interpolates to obtain values between voxels as needed for texture mapping. For volume rendering, BiLin 72 preferably uses only weights of 0.0 or 1.0 which selects one of the corner voxels of the volume dataset (determined by Select x and Select y). It just moves the ray data, if the ray crosses pipelines. Just a mux [?] for x and y would be enough for volume rendering, but bilinear interpolation is preferred because of texture mapping.

The Cube-5 architecture preferably supports re-ordering of the pipeline stages and a number of multipass rendering and processing operations, which require feedback connections between various stages of the Cube-5 rendering pipelines 52 and the 3D memory units 24. For example, correct rendering of overlapping volumetric objects preferably requires at least two passes through the Cube-5 pipeline 52, where the first pass re-samples the volumetric objects to align them with each other and the second pass renders the volumetric objects in interleaved order. As shown in FIG. 5, a multiple volumes feedback path 66 is preferably provided, operatively connecting the output of the compositing unit 60 to the corresponding 3D memory unit 24, which allows the re-sampled volumes to be written back into the 3D memory unit 24 after re-sampling, classification and shading. The final rendering pass works on RGBα volumes.

Similarly, each Cube-5 rendering pipeline 52 preferably includes an image-based rendering feedback path 68 connected between the warp unit 44 and the 3D memory unit 24. The image-based rendering feedback line 68 preferably provides a feedback path for writing the intermediate warped images to the 3D memory unit 24. This may be particularly useful for accelerating certain image-based rendering operations requiring multiple warp passes. The architecture of the present invention further contemplates feedback connections between the 3D memory unit 24 and various other Cube-5 rendering pipeline stages, or between the individual pipeline stages themselves. Image rendering speed may be substantially increased by including feedback paths which provide direct and immediate access to the computational results of individual pipeline stages, without having to wait for the results to traverse through the entire Cube-5 rendering pipeline 52.

In a preferred embodiment of the present invention, the Cube-5 system includes connections which bypass selective stages of the rendering pipeline, that, for example, may not be required for certain imaging operations. By passing these unused pipeline stages, such imaging operations can be accelerated. As illustrated in FIG. 5, a texture map bypass 70 is preferably included in each Cube-5 rendering pipeline 52. This texture map bypass connection 70 substantially speeds up mip-mapping, for instance, which consists of storing multiple levels-of-detail (LOD) of the image to be processed, by passing the shading unit 58 and compositing unit 60 and directly presenting the results from the trilinear interpolation unit 54 and gradient estimation unit 56 to the bilinear interpolation unit 72. In this way, the architecture of the present invention can preferably be considered not only as an array of pipelines for performing volume rendering, but as a collection of hardware resources which can be selectively configured to perform a variety of imaging operations. For example, when the Cube-5 system of the present invention is performing volume rendering, essentially all of the hardware resources are required, while texture mapping generally requires only memory, some buffering and the interpolation units.

Another unique and important aspect of the present invention which will now be discussed is the ability of the Cube-5 architecture to preferably interface with at least one conventional geometry engine 76 to support mixing of geometric data and volumetric objects in a single image. This is preferably accomplished by providing at least one geometry bus, as discussed above, to interface with the geometry engine 76.

Preferably, the Cube-5 architecture of the present invention is adapted to re-use pipeline components (e.g., interpolation unit, etc.), wherever possible, to accelerate a variety of rendering algorithms using multiple configurations, in particular, rendering scenes of multiple volumetric and polygonal objects, texture mapping, and image-based rendering. Among other important advantages, reusing pipeline components reduces hardware costs. The Cube-5 architecture also supports various unique methods and algorithms for enhancing volume rendering and acceleration of other imaging operations. Some of these methods and algorithms will be discussed individually in greater detail below.

In a preferred embodiment of the Cube-5 system, formed in accordance with the present invention, volume datasets are stored in blocks, thereby taking advantage of spatial locality. Instead of linear blocking (e.g., Voxelator API), hierarchical blocks are used which are preferably stored in a distributed arrangement, skewed across multiple 3D memory units. For example, using current Mitsubishi Electric 16-bit, 125 megahertz synchronous dynamic random access memory (SDRAM) to implement the 3D memory, each block can contain $8^3$ 16-bit voxels requiring 1024 bytes or two SDRAM pages.

Each block is preferably organized as a collection of $2^3$-voxel miniblocks residing in the same 3D memory unit. The banks inside the SDRAM can preferably be accessed in a pipelined fashion such that the current burst transfer essentially completely hides the setup of the subsequent burst transfer. If the view-dependent processing order of the voxels in a miniblock does not coincide with their storage order, then the eight miniblock voxels are preferably reordered on the Cube-5 chip. Hence, a single copy of the volume dataset on the SDRAM is sufficient. Therefore, hierarchical blocking allows random access to miniblocks at essentially full burst mode speed, essentially full (100%) bandwidth utilization, view-independent data storage and balanced workload.

Blocking not only optimizes the memory interface, but has an additional advantage of reducing the inter-chip communication bandwidth (i.e., between Cube-5 hardware units), since only the voxels on the block perimeters need to be exchanged between neighboring chips processing neighboring blocks. While processing a $b^3$-voxel block in $O(b^3)$ time, only the $O(b^2)$ voxels on the block boundary need to be communicated between chips processing neighboring blocks, where b is the size of a block edge and each block has b×b×b (i.e., $b^3$) voxels. Therefore, inter-chip communication needs O(1/b) less bandwidth than with a non-blocking solution. The size of the block edge b can be in the range of about $4 \leq b \leq 64$, although a block edge size of eight (8) is preferred.

Block look-up tables (LUT) are preferably utilized to store the pointers to all blocks comprising the current volume. This approach provides an easy method to restrict the active volume while zooming into a selected region of interest of a large volume. It also allows rendering of arbitrarily shaped subvolumes (at block-sized granularity). Additionally, scenes containing many small volumes can be rendered very efficiently, as all volumes can reside anywhere among the 3D memory units, and only the look-up tables must be reloaded for each volume, rather than the 3D memory units.

One method of performing perspective projection and/or Level-of-Detail (LOD) relies on two-fold super-sampling in the x and y directions. Accordingly, a four-times (4×) replication of the interpolation units for trilinear interpolation, as well as the gradient estimation units for gradient computation, is preferably employed. As a result, the datapath between the SDRAM and the Cube-5 pipelines is essentially unchanged. However, the bandwidth between Cube-5 pipelines is quadrupled, as is the on-chip throughput and buffers, primarily because each sample of the normal mode is replaced by up to four samples (i.e., 2× in the x direction and 2× in the y direction).

Handling anisotropic datasets and super-sampling preferably require a modification of opacity α. The combined function is $\alpha'=1-(1-\alpha)^{d/k}$, with super-sampling factor k representing the number of samples per voxel cell, and d representing the distance which a sight ray travels (i.e., the length of the path of the sight ray) through each voxel cell. Preferably, a look-up table (LUT) is employed, for fast look-up of α' during rendering.

With continued reference to FIG. 5, the perspective rendering of volumetric data with close to uniform sampling of the underlying volume dataset requires re-scaling of the compositing buffer 74 with filtering between levels. Level-of-detail (LOD) perspective rendering requires re-alignment of the compositing buffer 74 between levels. Both of these processes, which incorporate global communication not available in the pipelines 52, are preferably performed by the warp unit(s) 44. Although the compositing buffer 74 is already accessible to the warps units 44, it is preferred that a feedback line 43 be used to write the filtered values back into the compositing buffer 74.

A hardware warp unit is generally necessary to obtain final fall screen images in real time (i.e., a 30 Hertz frame rate). As shown in FIG. 5, the baseplane image, generated by the compositing units 60 of the Cube-5 rendering pipelines 52, is preferably buffered in the 2D memory units 40. To lower the memory bandwidth from the 2D memory units 40 to the warp unit 44, each pixel of the baseplane image is preferably accessed only once. To perform a linear interpolation between samples of the current and the previous scanline, another FIFO unit, sized to hold at least one scanline, is required to store the previous scanline samples. The interpolation weights for each grid pixel are preferably pre-calculated on a host machine.

In order to perform the accurate mixing of volumes and geometry, for opaque geometric objects, the Z-buffer image is preferably written to the compositing buffer 60. The compositing unit 60 must perform a z-comparison prior to blending each new sample. Additionally, for translucent geometric slices, the geometry engine 76 preferably utilizes the geometry input bus (reference number 46 in FIG. 4) of the present invention to insert each slab of RGBα values into the data stream so that each slab is interleaved with the volumetric data slices.

For texture mapping, FIG. 6 shows, by way of example, how 32 bits of texel data are preferably stored for a 2×2 neighborhood in a miniblock of 16-bit voxels in the 3D memory unit, in accordance with the present invention. Therefore, a four-texel neighborhood of 32-bit texels is preferably read during each memory burst read. Without data duplication, the Cube-5 system preferably performs, on average, 2.25 data burst reads to access the appropriate texel neighborhood, since some texture coordinates may lie between stored miniblocks.

With reference again to FIG. 5, in accordance with one form of the present invention, one way to implement image-based rendering in hardware is to utilize the memory control unit 78, preferably included in each Cube-5 pipeline 52, to read the appropriate source pixels based on the contributing region for each pipeline. The interpolation units (e.g., 54 and 72) in that pipeline 52 will then preferably perform the four-dimensional (4D) interpolations needed for light field rendering or lumigraph. As an alternative implementation, the warp unit 44 may be utilized to perform this function. The source pixels contributing to the current view are read and assembled into the 2D memory units 40, preferably through a connection line 41, followed by the warp transformation. Preferably, four assembled source images are processed in four consecutive warp passes. The final combination of the four intermediate warped images is performed in the Cube-5 pipeline 52. As described previously above, the image-based rendering feedback line 68 provides feedback for writing the intermediate warped images to the 3D memory 24. For either approach, the 3D memory units 24 provide local storage for a large database of images.

It is to be appreciated that the apparatus of the present invention described herein above (and referred to as Cube-5) may considerably accelerate conventional volume processing methods, beyond the universal rendering already described. Additionally, the Cube-5 apparatus of the present invention may be used in conjunction with a number of unique algorithms adapted for enhancing the performance of and/or providing enhanced features for real-time volume processing, therefore making the overall Cube-5 system superior to existing volume rendering architectures, such as Cube-4. Some of these unique algorithms, including those for performing image warping, three-dimensional transformations, perspective projections, handling large volumes, high quality rendering, clipping, depth cueing, super-sampling and anisotropic datasets, are discussed in detail below.

In accordance with one form of the present invention, a method for performing image warping is presented which, among other advantages, speeds perspective warping and provides improved image quality. Image warping is preferably the final stage of the Cube-5 volume rendering pipeline. In simple terms, image warping primarily relates to the geometric transformation between two images, namely, a source image and a target image. The geometric transformation defines the relationship between source pixels and target pixels. Efficiency and high quality are equally critical issues in such applications. In the apparatus of the present invention, the warp unit preferably performs the image transformation function. Consequently, applications employing a warp unit benefit from the image warping method of the present invention.

Distinguished by the data flow of the transformation, image warping methods are generally classified as either forward warping or backward warping. In forward warping, the source pixels are processed in scanline order and the results are projected onto the target image. In backward warping, the target pixels in raster order are inversely mapped to the source image and sampled accordingly. Most known prior art warping algorithms employ backward warping.

Compared with affine transformations (i.e., translation, rotation, scaling, shearing, etc.), a perspective transformation is considered to be more expensive and challenging. For perspective projection, an expensive division is needed when calculating the sample location in the baseplane image for a pixel in the projection plane. Conventional perspective warping is typically at least three-fold slower than parallel warping, when implemented by a CPU. Accordingly, some prior art approaches have decomposed the perspective transformation into several simpler transformations requiring multiple passes. One primary problem inherent in multi-pass transformation algorithms, however, is that the combination of two one-dimensional (1D) filtering operations is not as flexible as true two-dimensional (2D) filtering. Furthermore, conventional multi-pass approaches introduce additional filtering operations which degrade image quality.

The present invention preferably employs a unique single-pass forward warping method which can be implemented with substantially the same efficiency as affine transformations. Costly divisions, which were traditionally performed for every pixel, are reduced to only twice per scanline according to the present invention. Thus, by reducing the number of division operations, the present invention provides an alternative perspective warping method which is superior to known prior art methods, at least, for example, in terms of speed and the efficient hardware implementation. A preferred method for perspective warping, in accordance with the present invention, will now be discussed.

Figure 8:
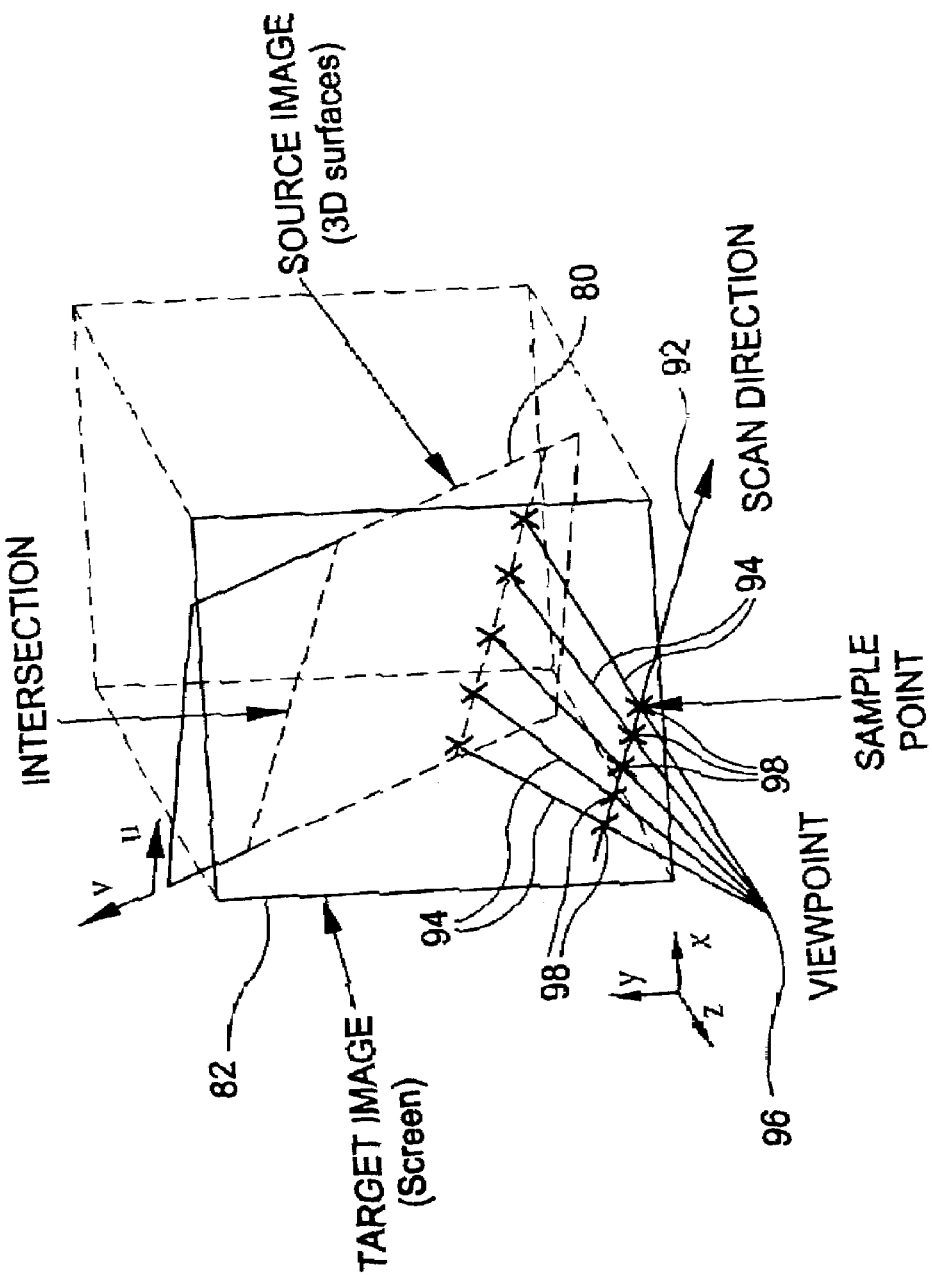
FIG. 8 is a graphical representation illustrating a method for determining the parallel preserving scanline direction in accordance with the preferred forward image warping method of the present invention.

Preferably, the present invention uses a scanline approach to perform perspective warping. Rather than scanning in normal raster scanline order, however, the algorithm of the present invention is processed in a special scanline direction in the source image. As illustrated in FIGS. 7 and 8, this special scanline direction 92 (FIG. 8) preferably has the property that parallel scanlines 84 in the source image 80 appear as parallel scanlines 86 in the target image 82, and that equi-distant sample points 88 along a source scanline 84 remain as equi-distant sample points 90 in the target scanline 86. Some advantages of this unique approach include a reduced complexity of perspective-correct image warping (i.e., by eliminating the division per pixel and replacing it with two divisions per scanline), accurate antialiasing by incorporating anisotropic filtering, correction of flaws in Gouraud shading caused by bilinear interpolation and optimization of the memory bandwidth by reading each source pixel exactly once.

The intuition of the special scanline direction is derived from projection geometry, as shown in FIG. 8. Referring to FIG. 8, the source image 80 is preferably placed on a three-dimensional (3D) surface and the target image 82 is placed on a screen. As in typical texture mapping, to obtain the pixel on screen, a sight ray (or rays) 94 is cast from a viewpoint (or eye point) 96 to 3D space and intersected with the screen 82 and 3D surface 80. The intersection points are the sample points 98. When the scan direction 92 in screen space is parallel to the 3D planar surface, the scanlines in both images are parallel to each other, and equi-distant sample points 98 along the scanline remain equi-distant in the 3D surface plane. This parallel-preserving (PP) scanline direction exists and is unique for a given perspective transformation. It is to be appreciated that for parallel projections, any scan direction preserves this parallelism on both images, and thus a raster scanline direction may be preferably used due to its simplicity.

Referring again to FIG. 7, parallel-preserving (PP) scanlines 84 and 86 are shown in both the source 80 and target 82 images respectively. Once the parallelism property is achieved, pixel access becomes regular, and spatial coherency can be utilized in both images. Additionally, the PP scanline enables the application of a pure incremental algorithm without division to each scanline for calculating the projection of source samples 88. One division is still needed, however, for the two endpoints of every scanline due to the non-linear projection.

With continued reference to FIG. 7, as the source image 80 is scanned in the PP scanline direction rather than the raster direction, sample points 90 on the target scanline 86 may not necessarily coincide with the target pixels 91. However, the sample points 90 can be aligned on the x grid lines 89 of the target image 82, thus the sample points 90 are only off the y grid lines 87 (they are equi-distant along the scanline). For a more efficient but lower quality implementation, placing the sample value in the nearest-neighbor target pixel is a reasonable approximation, as a half pixel is the maximum error. However, when higher quality is preferred, the present invention may perform pixel correction and effective antialiasing, to be described herein below.

In general, a reduction in the number of divisions from $O(n^2)$ to $O(n)$ is obtained by the algorithm of the present invention (where n is the linear resolution). For the present algorithm, preferably only two additions are needed to calculate each sample point, while conventional raster scanline algorithms generally require three additions, one division and two multiplications per pixel. A preferred method for performing forward image warping, in accordance with the present invention, is described in detail herein below.

The forward warping algorithm of the present invention is preferably performed in two stages: (1) calculating the special parallel-preserving (PP) scanline direction, and (2) forward mapping the source image to the target image along the special PP scanlines, incrementally within each scanline.

As discussed briefly above, the parallel-preserving (PP) scanline is the intersection line between the three-dimensional (3D) planar surface and the screen (i.e., target image). However, in a two-dimensional (2D) problem, the PP scanline must be calculated based on a 2D matrix. Generally, a perspective transformation can be presented as $$\begin{bmatrix} u \\ v \\ 1 \end{bmatrix} = M \begin{bmatrix} x \\ y \\ z \end{bmatrix} = \begin{bmatrix} a & d & g \\ b & e & h \\ c & f & 1 \end{bmatrix} \begin{bmatrix} x \\ y \\ 1 \end{bmatrix}$$

where (u, v) is the coordinate of the source pixel, (x, y) is the coordinate of the target pixel, and M is the perspective transformation matrix. The (u, v) coordinate can be expressed in terms of (x, y) as $$(u, v) = F(x, y) = C \begin{bmatrix} ax + dy + g \\ bx + ey + h \end{bmatrix}$$

where $$C = \frac{1}{(cx + fy + 1)}$$

A line in the target image can be expressed as y=kx+B, where slope k denotes a line direction and B denotes a line intercept. To calculate slope k for the PP scanline, two parallel lines are preferably defined having identical slope k and intercepts B of 0 and 1, represented by point pairs of (0,0), (1, k) and (0,1), (1, k+1), respectively. The coordinates of these points in the source image are then calculated. Since perspective transformation preserves straight lines, these two lines will remain as straight lines in the source image and their slopes can be calculated from two point pairs. Assuming that the slopes of the two mapped lines are essentially equal, an equation in k is preferably obtained. Solving this equation for k results in $$k = -\frac{c}{f}$$

The corresponding slope k' in the source image is then $$k' = \frac{bf - ec}{af - dc}$$

As can be noted from the above equation, when $$k' = -\frac{c}{f},$$

the denominator of the homogenous coordinates becomes a constant value of Bf+1, where B is the intercept in y=kx+B.

Figure 9:
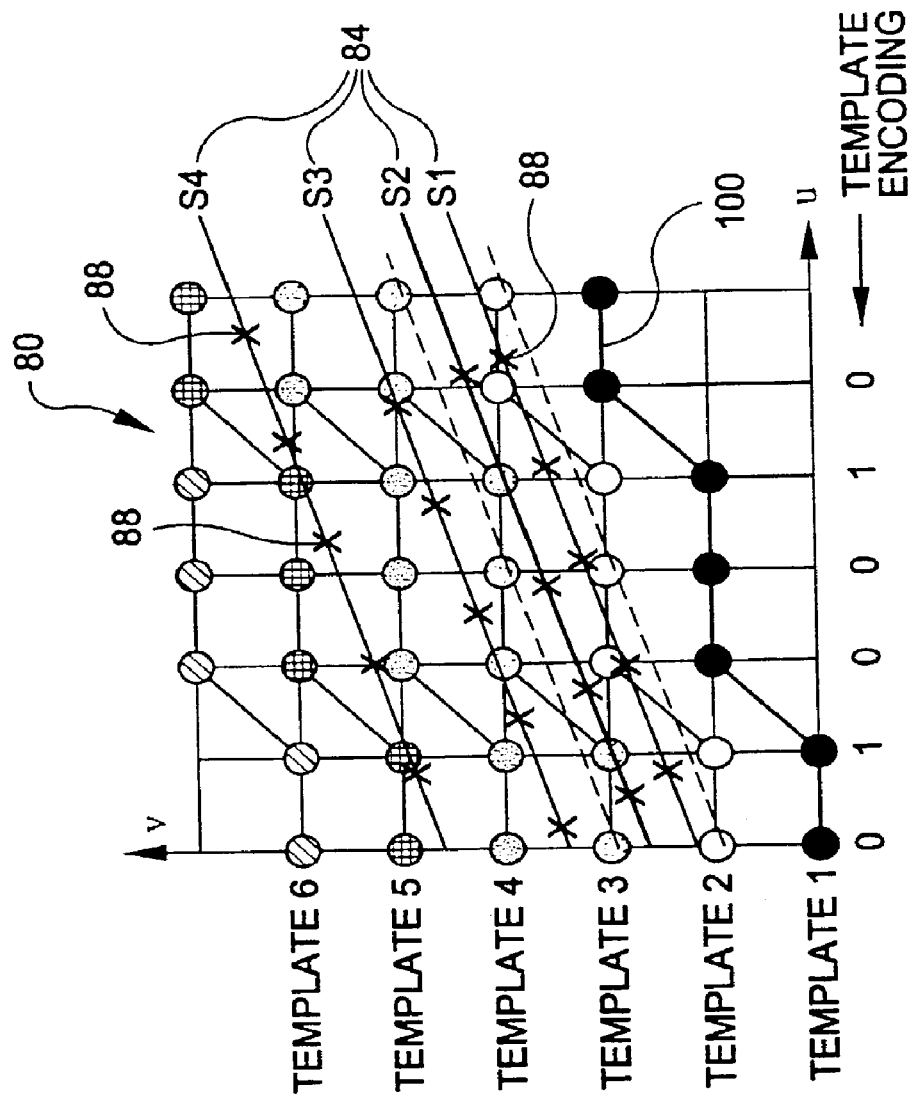
FIG. 9 is two-dimensional graphical representation of an example illustrating pixel read templates in the source image for performing scanline processing, in accordance with the preferred forward image warping method of the present invention.
Figure 10:
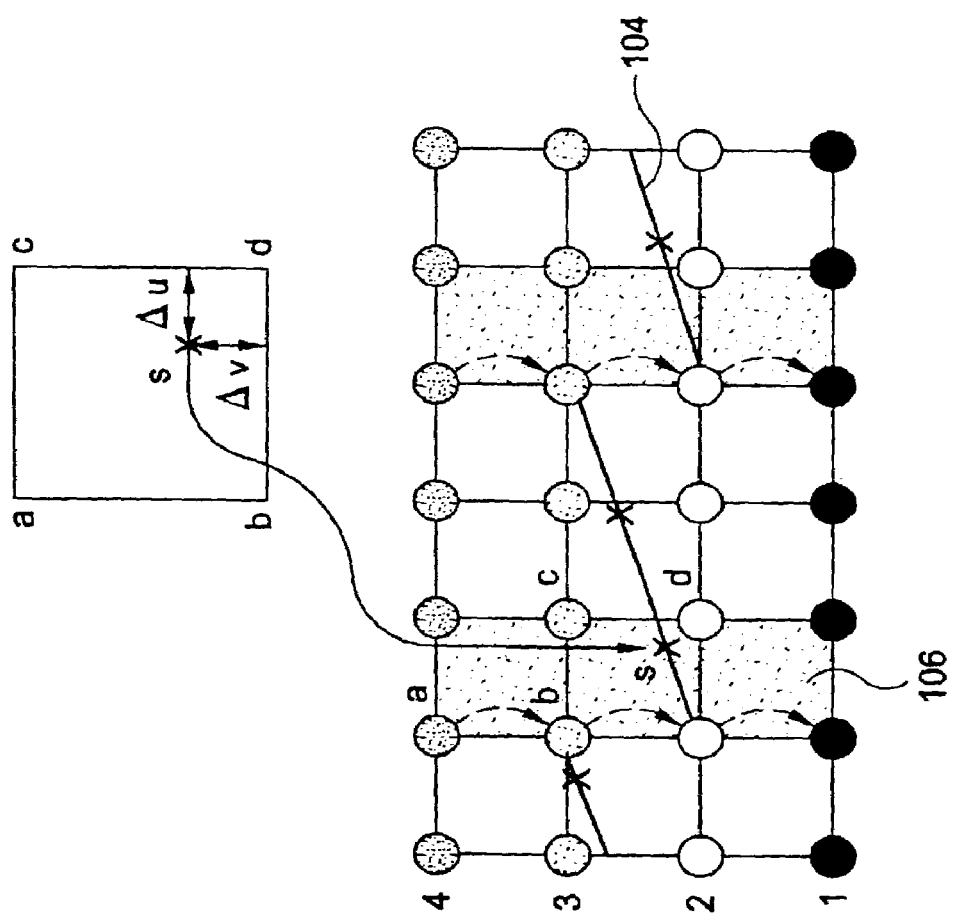
FIG. 10 is two-dimensional graphical representation of the example of FIG. 9 illustrating a bilinear interpolation of samples for performing scanline processing, in accordance with the preferred forward image warping method of the present invention.

The second stage of the preferred forward warping method of the present invention involves scanline processing and is illustrated in FIGS. 9 and 10 by way of example. Referring now to FIG. 9, the preferred algorithm sweeps the scanlines 84 (e.g., scanlines S1-S4) through the source image 80. As discussed above, the scanlines 84 have the slope k'. The samples 88 along each scanline 84 are preferably incrementally calculated. First, for each scanline 84, the projection of the endpoints from the target image onto the source image is calculated. Then, based on the number of sample points on the scanline, increments are calculated in both the x and the y directions.

Considering a traditional bilinear interpolation of samples in the source image, every sample essentially requires the contribution of four surrounding source pixels. If pixels are read every time for every sample, each pixel ought to be read four times. This leads to a memory bandwidth of four times the target image size. However, since all scanlines are in parallel, samples on neighboring scanlines usually share contributing source pixels. Consequently, in accordance with the method of the present invention, pixels that have been previously read are preferably buffered so that common pixels are read from the buffer rather than from the source image itself.

With reference to FIG. 7, pixels are preferably read in a fixed pattern, called the pixel read template 100, calculated based on the Bresenham line algorithm (as appreciated by those skilled in the art). The binary digits shown at the bottom of FIG. 7 represent one way of encoding the read template 100. The present invention, however, contemplates other encoding schemes, as appreciated by those skilled in the art. As illustrated in FIG. 7, this code indicates the increase in the positive v direction; a "0" represents no increase and a "1" denotes an increase by one unit, while u is always increased by one unit. For the example of FIG. 7, the u axis may preferably be referred to as the primary processing axis. It is preferred that the template 100 always start from the left-most pixel and moves in the vertical direction (i.e., increasing v direction) so that all pixels are read and placed into the buffer for subsequent use in the sampling. It can be seen from FIG. 7 that in order to provide pixels for sampling on any scanline between the two dotted lines, four pixel templates are preferably required, even though for a specific scanline, only three pixel templates might seem sufficient (e.g., only templates 2, 3 and 4 are necessary to process the current scanline 52). Therefore, the buffer size is preferably four scanlines.

Referring now to FIG. 10A, there is illustrated the addressing of samples in the buffer. Whenever the template code value is 1, the sample decreases by one unit in the v direction. The thick zigzag line 104 represents the output scanline in the buffer. When the sample falls within the shaded region 106, in which the pixels in the buffer are sheared, care should be taken to read the correct pixels for sampling. FIG. 10B illustrates a preferred procedure for bilinearly interpolating one of the samples, s, in this region.

The contents of the buffer are preferably updated based on the scanline position. For example, referring to FIG. 9, templates 1, 2, 3 and 4 are preferably in the buffer when processing scanline S1. For scanline S2, the buffer preferably remains the same. For scanline S3, template 5 is preferably read into the buffer and template 1 is discarded. For scanline S4, template 6 preferably replaces template 2, and so on.

As mentioned above, one of the features of the unique forward image warping method of the present invention is the correction of flaws in Gouraud shading. Gouraud shading is a popular intensity interpolation algorithm used to shade the surfaces of geometric objects. Given color only at the vertices, Gouraud shading bilinearly interpolates the intensities for the entire rasterization of a geometry in a raster scanline order. The flaws of the Gouraud shading approach are known in the art and have been the subject of such articles as, for example, *Digital Image Warping*, by G. Wolberg, *IEEE Computer Society Press*, 1990.

One of the problems associated with the Gouraud approach is that diagonal lines (as an example) are not linearly mapped for perspective projections. When a diagonal line is perspectively projected onto a screen in 3D screen space, Gouraud shading converts this diagonal line into a curve, which violates the property of preserving lines in perspective transformation.

The image warping method of the present invention corrects the perspective distortion in Gouraud shading. The perspective distortion is present because the linear interpolation along a raster in screen space is generally non-linear when transformed into geometrical coordinates. Using the special scan direction of the present invention, however, linearity is preserved by the mapping. Thus, interpolation is linear in both image and geometrical space, thereby fixing the distortion of Gouraud shading. It is to be appreciated that interpolation along the edges is still non-linear, and therefore the scanline endpoints must be transformed into geometrical space for correct interpolation.

The forward mapping algorithm of the present invention, with nearest-neighbor approximation, preferably generates a target image that is essentially indistinguishable from an image generated using traditional methods. However, when a higher image quality is desired, the method of the present invention can preferably calculate the pixel value at exact grid points. A simple target pixel correction scheme may preferably be introduced to perform this correction.

Figure 11:
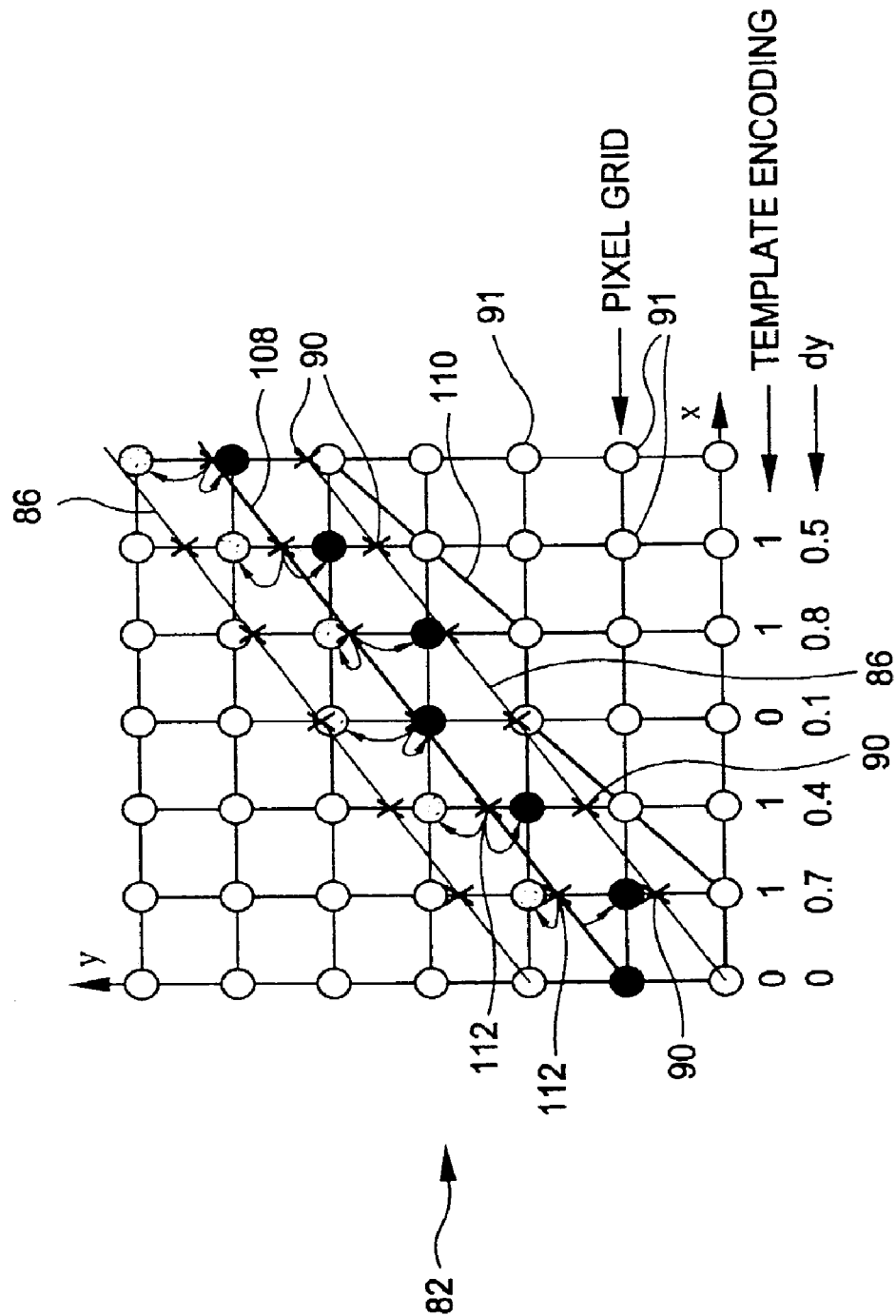
FIG. 11 is two-dimensional graphical representation of a linear interpolation on samples to obtain pixel values for performing target pixel correction, in accordance with a preferred method of the present invention.

With reference now to FIG. 11, assuming the sample points 90 in the target image 82 are aligned on integer x coordinates, in order to obtain the pixel value at the exact pixel grid locations 91, a linear interpolation of the two samples immediately above and below each pixel is preferably performed. Performing this linear interpolation simply as a second pass may increase the cost, since the samples must be read over again. Instead, as each sample is generated, a preferred method of the present invention spreads the contribution of each sample to the corresponding upper and lower pixels with no intermediate buffering.

As illustrated by the example of FIG. 11, samples 112 located on the thicker inclined scanline 108 contribute to the shaded pixels neighboring them (lighter shading above the scanline, darker shading below the scanline). The arrows indicate that each sample 112 preferably contributes to two pixels. It is preferred that a pixel not be written out until both contributions are collected. Thus, a one scanline buffer is preferably included for storing the intermediate pixel values.

To write out pixels correctly and efficiently, a pixel write pattern, called a pixel write template 110, is preferably pre-calculated. Unlike the pixel read template (e.g., reference number 100 in FIG. 9), the pixel write template 110 is preferably calculated by truncating the y coordinate value of samples along a scanline. The template 110 is preferably encoded as a series of integer y steps and fractional distances dy from the true scanline 86. The weights used for the final linear interpolation are dy and 1−dy for the upper and lower pixels, respectively. Since all scanlines are preferably one unit apart in the vertical direction (i.e., y direction), the template is calculated only once per projection.

The forward image warping method of the present invention can further improve on image quality by antialiasing. Using the parallel-preserving (PP) scanline, a higher quality, less expensive method of antialiasing may be achieved.

Referring again to FIG. 7, the sample points on the upper scanlines of the source image are sparser than on the lower scanlines, resulting in a transition from under-sampling to normal sampling. Thus, an appropriate resampling filter may preferably be used to avoid aliasing on the upper scanlines. Isotropic filtering results in clearly incorrect and blurry images. The need for anisotropic filters has been addressed in such articles as *Survey of Texture Mapping*, by P. S. Heckbert, *IEEE Computer Graphics and Applications*, 6(11):56-67, November 1986, and more recently in *Texram: Smart Memory for Texturing*, by A. Schilling, et al., *IEEE Computer Graphics and Applications*, 16(3):32-41, May 1996.

Figure 12:
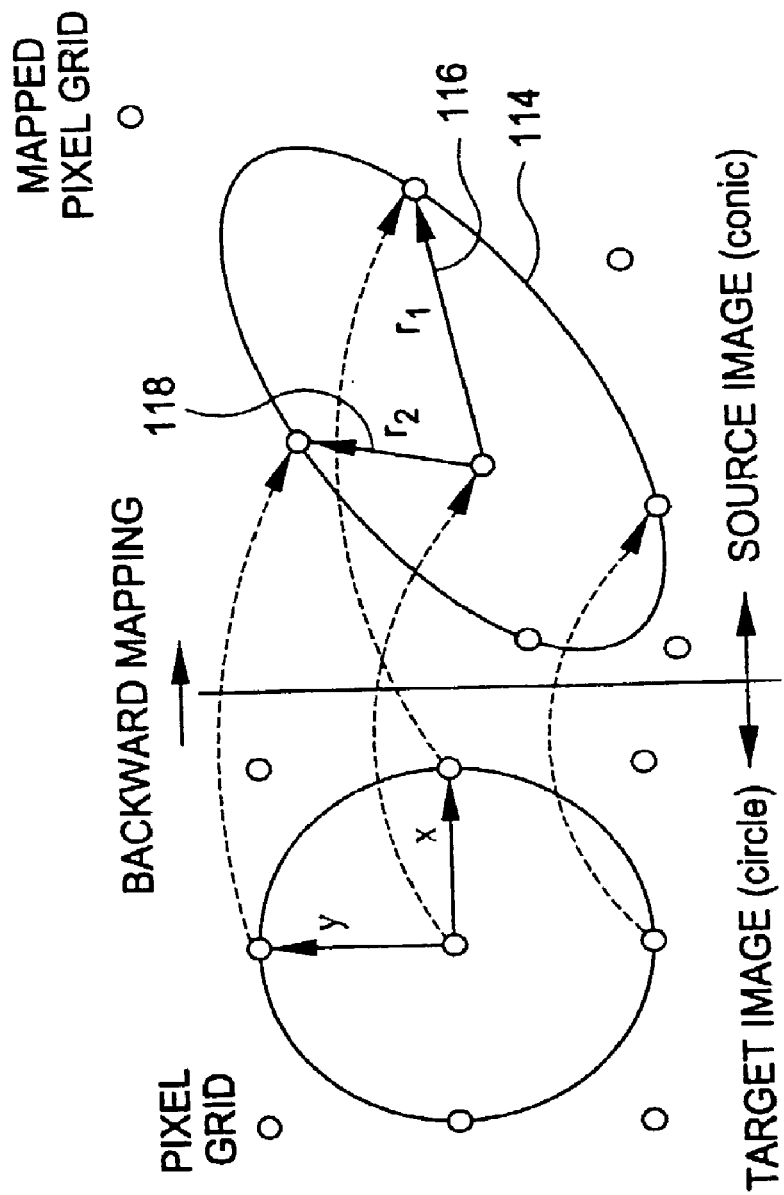
FIG. 12 is a graphical representation illustrating the calculation of an anisotropic filter footprint for performing antialiasing in accordance with a preferred forward image warping method of the present invention.

It is known by those skilled in the art that each filter is defined by its footprint and profile. Taking a target sample as a circle, its projection in the source image is its footprint. As illustrated in FIG. 12, this footprint 114 should generally be neither circular (i.e., isotropic) nor square-shaped (i.e., as in mip-mapping), but conic in shape. The profile of the filter decides the weights of the contributing pixels within the footprint. Although a sinc filter is optimal, a gaussian filter is easier to implement and is preferred because of its finite footprint and good low-pass characteristics. The perspective warping algorithm of the present invention offers more accuracy in calculating the anisotropic footprint, producing higher image quality at a lower cost.

Using conventional methods for calculating the anisotropic footprint, the main axes of the ellipse must be calculated for every pixel. Although approximations have been proposed, this remains an expensive computation, and no known incremental method is available. To obtain the major axes of the ellipse using these prior art methods, the Jacobian must be calculated. Using the image warping method of the present invention, however, calculation of the Jacobian may be eliminated.

In order to gain insight into a preferred method for calculating the anisotropic footprint in accordance with the present invention, the properties of the Jacobian will first be analyzed. The generalized backward mapping from an xy target image into a uv source image was previously defined above as $$\begin{bmatrix} u \\ v \end{bmatrix} = F(x, y) = C \begin{bmatrix} ax + dy + g \\ bx + ey + h \end{bmatrix}$$

where $$C = \frac{1}{(cx + fy + 1)}$$

The Jacobian J for the generalized transformation is a non-linear function of x and y, $$J = C^2 \begin{bmatrix} y(af - cd) + a - gc & x(af - cd) - d + gf \\ y(bf - ce) + b - hc & x(bf - ce) - e + hf \end{bmatrix}$$

In conventional antialiasing approaches, the Jacobian is used to determine the footprint of each pixel in the source image and is necessary for anisotropic filtering. The differences between screen pixels in xy raster space are projected into the source image by computing the directional derivatives in the [1,0] and [0,1] directions. These derivatives in source image space are called r1 and r2, and are defined as $$r_1 = J \begin{bmatrix} 1 \\ 0 \end{bmatrix} = C^2 \begin{bmatrix} y(af - cd) + a - gc \\ x(bf - ce) + b - hc \end{bmatrix}$$

and $$r_2 = J \begin{bmatrix} 0 \\ 1 \end{bmatrix} = C^2 \begin{bmatrix} x(af - cd) - d + gf \\ x(bf - ce) - e + hf \end{bmatrix}$$

These vectors, $r_1$ and $r_2$, define the bounding box of an ellipse that approximates the footprint 114. Typically, these vectors 116 and 118 are calculated for every pixel, when needed, for conventional methods of anisotropic filtering (e.g., elliptical weighted average (EWA), footprint assembly). This requires one more division per pixel for calculating C. In accordance with the present invention, a more accurate method for determining the footprint is presented, as described herein below.

Because the Jacobian is a linear approximation of the non-linear mapping, it is more accurate, and therefore preferable, to compute the footprint by taking the distances to neighboring samples in source image space. Since the projections of neighboring samples are already computed, this method of the present invention requires no additional division.

The parallel-preserving (PP) scan direction provides for greater coherency and no division to compute the Jacobian. For each pixel in the PP scanning order, the footprint is preferably defined by $r_1'$ and $r_2'$. The directional derivative $r_1'$ in direction [1, k] along the PP scanline is $$r_{1'} = \nabla_{[1,k]} F = J \begin{bmatrix} 1 \\ k \end{bmatrix} = C^2 \begin{bmatrix} af - cd \\ bf - ce \end{bmatrix}$$

and since y=kx+B, $$C = \frac{1}{(Bf + 1)}$$

is constant for every PP scanline, and thus $r_1'$ is constant for every PP scanline. The method of the present invention exploits this fact in order to preferably increment the source image coordinates along a scanline, with no divisions. The value of the directional derivative $r_2'$ in the y direction [0, 1] is $$r_2' = \nabla_{[0,1]} F = r_2$$

It is to be appreciated that $r_2'$ varies linearly along the scanline since it is a function of x, and thus it can be incremented along the scanline. The special scan direction makes it possible to compute the source image coordinates and pixel footprints simply and efficiently.

After efficiently computing all the footprint and source pixel coordinate information, correct anisotropic filtering can be performed using a standard method known by those skilled in the art, such as, for example, Greene and Heckbert's elliptical weighted average (EWA) or Shilling et al.'s footprint assembly. These conventional algorithms are described, for example, in the text *Creating Raster Omnimax Images from Multiple Perspective Views Using the Elliptical Weighted Average Filter*, by N. Greene and P. S. Heckbert, *IEEE Computer Graphics and Applications*, 6(6):21-27, June 1986. However, these conventional filtering approaches are not preferred since, as pointed out previously, even the elliptical footprint approximation is inaccurate. Furthermore, such prior art methods result in redundant sampling (i.e., accessing each source pixel multiple times). For instance, for a circular filter region with a footprint radius of 1.0 source pixel, each source pixel is sampled an average of $\pi$ times. By using the forward mapping technique of the present invention, redundant memory access can be essentially eliminated, thus lowering the memory bandwidth by a factor of $\pi$. Preferably, the present invention provides a forward mapping technique in which all source pixels are read once in pixel read template order and subsequently splatted onto the target image with a filter kernel.

Figure 13:
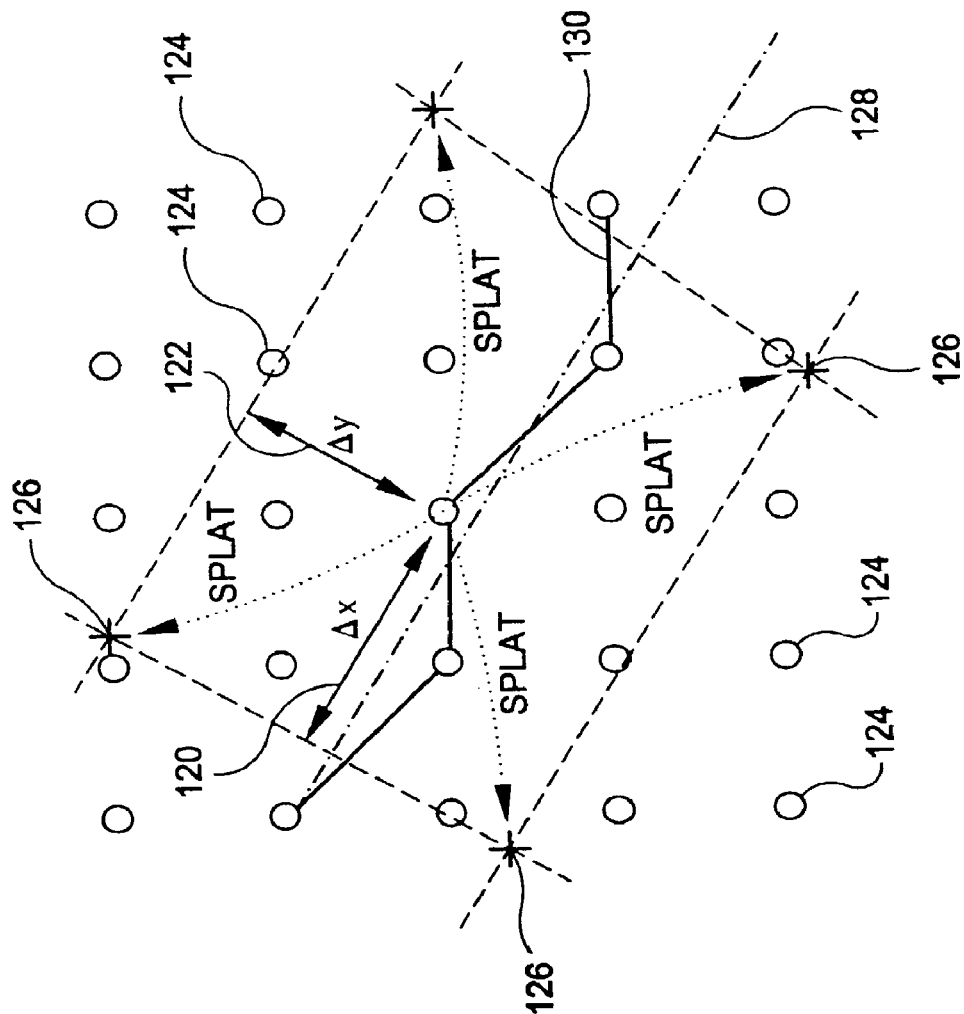
FIG. 13 is a graphical representation illustrating the splatting of source pixels onto the target samples, in accordance with the preferred forward image warping method of the present invention.

As illustrated in FIG. 13, each source pixel 124 has a $\Delta x$ 120 and a $\Delta y$ 122 relative to each of its nearest-neighbor target samples 126. The $\Delta x$ can be preferably computed incrementally since all samples along a scanline are equi-distant. The special scan direction essentially guarantees that the $\Delta y$ is constant along each scanline. Although the raster grid locations deviate from the true scanline 128, the actual distances can be estimated preferably by adding a small correction which may be stored in the pixel read template 130 and is preferably uniform among scanlines. The filter kernel is preferably pre-computed once and stored in a lookup table (LUT). Subsequently, the contribution of each source pixel 124 is preferably indexed by its $\Delta x$ and $\Delta y$ into the lookup table (LUT) for the four (or more) nearest-neighbor target samples 126. The number of target samples 126 depends upon the footprint of the filter used, and it may preferably vary from four to 16 samples. Using this method, each source pixel 124 is preferably read exactly once from memory, then four (or more) times modulated by a lookup table entry and accumulated in the target pixel. In this manner, the final pixel value is the weighted average of the nearby source pixels 124. This weighted average requires a division by the sum of the filter weights to normalize each final pixel intensity.

In addition to image warping, which can be broadly defined as a geometric transformation between two images (e.g., a source image and a target image), three-dimensional (3D) volume transformation plays a key role in volume rendering, volume modeling and registration of multiple volumes. Among all affine transformations, rotation generally consumes the most computation time and is considered the most complicated. Accordingly, in providing a universal 3D rendering architecture in accordance with the present invention, several unique methods for performing arbitrary 3D volume rotation are presented, as described in detail herein below. Although the universal 3D rendering hardware of the present invention may be used without the 3D volume rotation methods described herein, these methods, or algorithms, are preferably implemented in conjunction with the apparatus of the present invention to provide enhanced speed and features and are adapted to most efficiently utilize the apparatus of the present invention.

Prior to describing the unique methods for performing 3D volume rotation, it is important to first provide some basic definitions of the terms used. As appreciated by those skilled in the art, relative to the rows and columns of an image, a beam in a volume may be defined as a row of voxels along one major coordinate axis (e.g., an x-beam is a row of voxels in the x direction). A slice of a volume is a plane of voxels which is perpendicular to a major axis (e.g., an x-slice is defined as a plane perpendicular to the x axis).

Prior art methods for performing volume transformations typically utilize multiple-pass algorithms, which are usually direct extensions of the multiple-pass algorithms used for image transformations. Various methods for performing 3D rotation have been proposed, generally involving a decomposition of the 3D transformation into multiple two-dimensional (2D) or one-dimensional (1D) transformations. These prior art methods have been the subject of articles, including *Volume Rendering*, by R. A. Drebin et al., *Computer Graphics* (*SIGGRAPH '88 Proceedings*), Vol. 22, pp 65-74, August 1988, *Three-Pass Affine Transformations for Volume Rendering*, by P. Hanrahan, *Computer Graphics* (*San Diego Workshop on Volume Visualization*), Vol. 24, pp 71-78, November 1990 and *Fast Rotation of Volume Data on Parallel Architectures*, by P. Schroder and J. B. Salem, *Visualization '91*, pp. 50-57, 1991, all of which are incorporated herein by reference. However, these known 3D transformation methods typically result in a lower quality rotation and/or slower processing speed.

One of the properties which make three-dimensional (3D) rotation so difficult is that 3D rotations inherently require global communication and could cause memory contention while writing data back to the distributed memory modules. However, as shear transformation capitalizes on nearest neighbor connections, it lends itself to an extremely feasible multi-pipelined hardware implementation, as provided by the unique architecture of the present invention. The present invention further provides novel methods for performing arbitrary 3D rotation, essentially by decomposing the 3D rotations into sequences of different types of shear transformations.

Using a conventional decomposition approach, since a 2D rotation can be decomposed into three one-dimensional (1D) shears, a direct extension to 3D rotation would require nine 1D shears. However, in accordance with the present invention, four preferred methods of shear decomposition of an arbitrary 3D volume rotation are presented, as described in detail herein below. These methods include a four-pass 2D slice shear, a four-pass 2D beam shear, a three-pass beam-slice shear and a two-pass 3D beam shear decomposition. By not introducing a scale operation, the algorithms of the present invention avoid complications in sampling, filtering and the associated image degradations.

It is to be appreciated by one skilled in the art that a 3D rotation matrix can be expressed as the concatenation of three major axis rotations, $R_x(\phi)$, $R_y(\theta)$, $R_z(\alpha)$, where $$R_x = \begin{bmatrix} 1 & 0 & 0 \\ 0 & \cos\phi & \sin\phi \\ 0 & -\sin\phi & \cos\phi \end{bmatrix}$$

$$R_y = \begin{bmatrix} \cos\theta & 0 & -\sin\theta \\ 0 & 0 & 0 \\ \sin\theta & 0 & \cos\theta \end{bmatrix}$$

$$R_z = \begin{bmatrix} \cos\alpha & \sin\alpha & 0 \\ -\sin\alpha & \cos\alpha & 0 \\ 0 & 0 & 1 \end{bmatrix}$$

The order in which this concatenation is performed results in different 3D rotation matrices. There are six permutations of the 3D rotation matrix in total. By way of illustration, the underlying 3D rotation matrix was chosen as $R_{3D}=R_x(\phi)R_y(\theta)R_z(\alpha)$, where $$R_{3D} = \begin{bmatrix} \cos\theta\cos\alpha & \cos\theta\sin\alpha & -\sin\theta \\ \sin\phi\sin\theta\cos\alpha - \cos\phi\sin\alpha & \sin\phi\sin\theta\sin\alpha + \cos\phi\cos\alpha & \sin\phi\cos\theta \\ \cos\phi\sin\theta\cos\alpha + \sin\phi\sin\alpha & \cos\phi\sin\theta\sin\alpha - \sin\phi\cos\alpha & \cos\phi\cos\theta \end{bmatrix}$$

The above 3D rotation matrix ($R_{3D}$) is used for all the decompositions which follow. One of the primary differences between the unique methods of the present invention and other conventional approaches is that in the present invention, the decomposition is applied directly to a 3D rotation matrix, rather than to multiple 2D rotation sequences, to obtain shear sequences. It is to be appreciated that, for any of the shear operations performed in accordance with the present invention, barrel shifters may be used as a preferred hardware implementation, although other means, such as logarithmic shifters or the like, are similarly contemplated.

Figure 14:
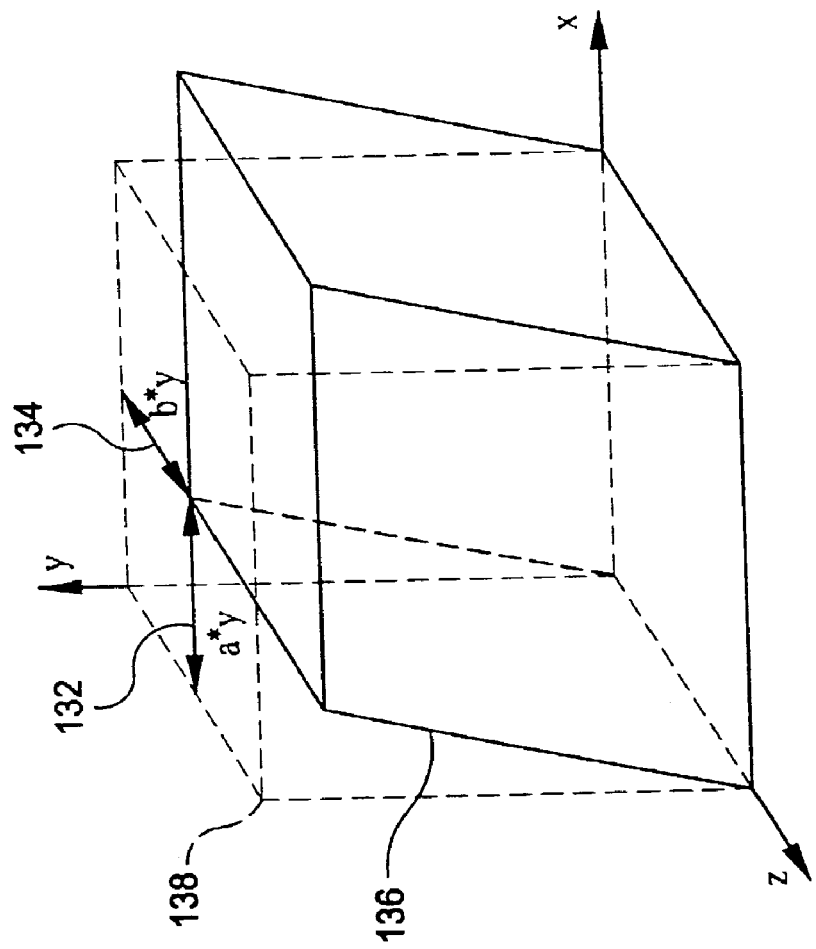
FIG. 14 depicts an example of a y-slice shear for performing three-dimensional rotation by two-dimensional slice shear decomposition, in accordance with one method of the present invention.

As shown in FIG. 14, a method for performing two-dimensional (2D) slice shear rotation, in accordance with one embodiment of the present invention, preferably involves a decomposition of the 3D rotation into a sequence of 2D slice shears. In a 2D slice shear, a volume slice (i.e., a plane of voxels along a major projection axis and parallel to any two axes) is merely shifted within its plane. A slice may be arbitrarily taken along any major projection axis. For example, FIG. 14 illustrates a y-slice shear. A 2D y-slice shear is preferably expressed as:

$x = x + a \cdot y$ $z = z + b \cdot y$

A 2D y-slice shear may preferably be written as S(xz, y, (a, b)), interpreted as a shear along the y axis by an amount a 132 in the x-direction and an amount b 134 in the z-direction. Although both a and b are preferably constants, it is further contemplated that a and b can represent functions as well. A 2D x-slice shear, S(yz, x, (c, d)), and a 2D z-slice shear, S(xy, z, (e, f)), are similarly defined. With reference to FIG. 14, the volume represented by the solid lines 136 is the shear result of the volume defined by the dotted lines 138.

Intuitively, consecutive shears along the same axis produce a conforming shear. For example:

$$S(xz, y, (a, b)) \cdot S(xz, y, (a', b')) = \begin{bmatrix} 1 & 0 & 0 \\ a & 1 & b \\ 0 & 0 & 1 \end{bmatrix} \cdot \begin{bmatrix} 1 & 0 & 0 \\ a' & 1 & b' \\ 0 & 0 & 1 \end{bmatrix}$$
$$= \begin{bmatrix} 1 & 0 & 0 \\ a+a' & 1 & b+b' \\ 0 & 0 & 1 \end{bmatrix}$$

In order to build the general 3D matrix from 2D shear matrices, shear products may be restricted to products of different shears: S(yz, x, (c, d)), S(xz, y, (a, b)) and S(y, z, (e, f)). However, the product matrix of these three shear matrices will still not be in the general form due to a constant 1 in the present matrix. Accordingly, another shear matrix is preferably concatenated, where this final shear is the same slice shear as the first one. This results in the following six permutations of shear sequences:

S(xz, y, (a, b))·S(xy, z, (e, f))·S(yz, x, (c, d))·S(xz, y, (g, h))

S(xz, y, (a, b))·S(yz, x, (c, d))·S(xy, z, (e, f))·S(xz, y, (g, h))

S(xy, z, (e, f))·S(xz, y, (a, b))·S(yz, x, (c, d))·S(xy, z, (i, j))

S(xy, z, (e, f))·S(yz, x, (c, d))·S(xz, y, (a, b))·S(xy, z, (i, j))

S(yz, x, (c, d))·S(xz, y, (a, b))·S(xy, z, (e, f))·S(yz, x, (m, n))

S(yz, x, (c, d))·S(xy, z, (e f))·S(xz, y, (a, b))·S(yz, x, (m, n))

For each of the shear sequences, the product matrix of the consecutive shear matrices is preferably computed and set equal to the underlying 3D rotation matrix. For example, for the first shear sequence given above (i.e., S(xz, y, (a, b)) S(xy, z, (e, f)) S(yz, x, (c, d)) S(xz, y, (g, h))):

$R_{3D}=R_x(\phi)R_y(\theta)R_z(\alpha)=S(xz, y,(a, b))\cdot S(xy, z,(e, f))\cdot S(yz, x,(c, d))\cdot S(xz, y,(g, h))$ The above matrix equation implies nine trigonometric equations with eight variables, namely, a, b, c, d, e, f, g and h. In solving these nine equations for the eight variables, a-h, the following results are obtained:

$$a = \frac{\sin\theta\sin\alpha(\cos\theta - \cos\phi) + \sin\phi(\cos\alpha - \cos\theta)}{(\cos\theta)^2\sin\alpha\sin\phi}$$

$$b = -\frac{\cos\phi\cos\theta - 1}{\sin\phi\cos\theta}$$

$$c = \cos\theta\sin\alpha$$

$$d = \frac{-\sin\phi\sin\theta\cos\alpha + \cos\phi\sin\alpha - \cos\theta\sin\alpha}{\sin\phi\cos\theta}$$

$$e = \frac{\sin\phi\cos\theta + \cos\phi\sin\theta\sin\alpha - \sin\phi\cos\alpha}{\cos\theta\sin\alpha}$$

$$f = -\sin\phi\cos\theta$$

$$g = \frac{\cos\theta\cos\alpha - 1}{\cos\theta\sin\alpha}$$

$$h = \frac{\cos\theta\cos\alpha - 1}{\cos\theta\sin\alpha}$$

In a similar manner, the shear matrices for the remaining five slice shear sequences given above may be obtained. In fact, the slice shear sequence with the solution given above has the simplest expression and is preferably termed the dominant sequence.

Figure 15:
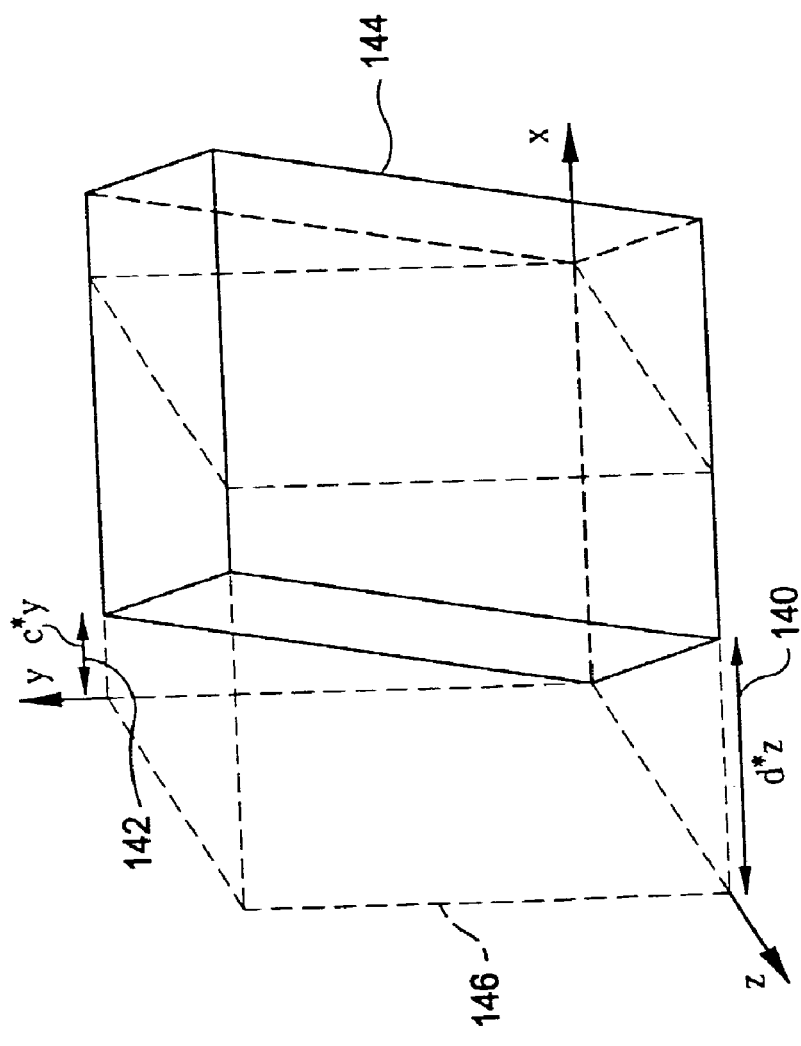
FIG. 15 depicts an example of an x-beam shear for performing three-dimensional rotation by two-dimensional beam shear decomposition, in accordance with another method of the present invention.

Referring now to FIG. 15, a method for performing three-dimensional (3D) rotation by a two-dimensional (2D) beam shear decomposition will now be described. First, a beam shear may be defined as a beam that is merely shifted in its major direction without any change of the other two coordinates. For example, a 2D x-beam shear is preferably expressed as:

$x = x + a \cdot y + b \cdot z$

A 2D x-beam shear may preferably be written as S(x, yz, (c, d)), interpreted as a shear along the x axis by an amount a in the x-direction and an amount b in the z-direction. A 2D y-beam shear, S(y, xz, (a, b)), and a 2D z-beam shear, S(z, xy, (e, f)), are similarly defined. FIG. 15 illustrates an x-beam shear, wherein the volume represented by the dotted lines 146 is sheared to the volume position represented by the solid lines 144.

A two-dimensional (2D) beam shear is advantageous over a 2D slice shear, and is therefore preferred, since a beam is shifted without changing the other two coordinates. Thus, the resampling for each pass of the 2D beam shear approach is simpler, as only a linear interpolation is required. In contrast, a 2D slice shear approach requires a bilinear interpolation which is more complex.

Similar to the 2D slice shear decomposition, in order to build the general 3D matrix from 2D beam shear matrix decompositions, shear products may be restricted to products of different shears: S(x, yz, (c, d)), S(y, xz, (a, b)), S(z, xy, (e,f)). However, the product matrix of these three shear matrices will still not be in the general form due to a constant 1 in the matrix. Accordingly, as in the slice shear method, another shear matrix is preferably concatenated, where this final shear is the same beam shear as the first one. This results in the following six permutations of shear sequences:

S(y, xz, (a, b))S(z, xy, (e, f))S(x, yz, (c, d))S(y, xz, (g, h))

S(y, xz, (a, b))S(x, yz, (c, d))S(z, xy, (e, f))S(y, xz, (g, h))

S(z, xy, (e, f))S(y, xz, (a, b))S(x, yz, (c, d))S(z, xy, (i, j))

S(z, xy, (e, f))S(x, yz, (c, d))S(y, xz, (a, b))S(z, xy, (i, j))

S(x, yz, (c, d))S(y, xz, (a, b))S(z, xy, (e, f))S(x, yz, (m, n))

S(x, yz, (c, d))S(z, xy, (e, f))S(y, xz, (a, b))S(x, yz, (m, n))

For each of the above shear sequences, the product matrix of the consecutive shear matrices is preferably computed and set equal to the underlying 3D rotation matrix. For example, for the first shear sequence given above (i.e., S(y, xz, (a, b)) S(z, xy, (e, f)) S(x, yz, (c, d)) S(y, xz, (g, h))):

$$R_{3D}=R_x(\phi)R_y(\theta)R_z(\alpha)=S(y, xz,(a, b))\cdot S(z, xy,(e, f))\cdot S(x, yz,(c, d))\cdot S(y, xz,(g, h))$$

The above matrix equation implies nine trigonometric equations with eight variables, namely, a, b, c, d, e, f, g and h. In solving these nine equations for the eight variables, a-h, the following results are obtained:

$$a = \frac{\sin\theta\sin\alpha(\cos\phi - \cos\theta) + \sin\phi(\cos\theta - \cos\alpha)}{\sin\phi\sin\alpha(\cos\theta)^2}$$

$$b = -\frac{\cos\phi\cos\theta - 1}{\sin\phi\cos\theta}$$

$$c = -\cos\theta\sin\alpha$$

$$d = \frac{\cos\theta\sin\alpha + \sin\phi\sin\theta\cos\alpha - \cos\phi\sin\alpha}{\sin\phi\cos\theta}$$

$$e = -\frac{\cos\phi\sin\theta\sin\alpha - \sin\phi\cos\alpha + \sin\phi\cos\theta}{\cos\theta\sin\alpha}$$

$$f = \sin\phi\cos\theta$$

$$g = -\frac{\cos\theta\cos\alpha - 1}{\cos\theta\sin\alpha}$$

$$h = \frac{\sin\phi\sin\theta(\cos\phi - \cos\alpha) + \sin\alpha(\cos\phi - \cos\theta)}{\sin\phi\sin\alpha(\cos\theta)^2}$$

In a similar manner, the shear matrices for the remaining five beam shear sequences given above may be obtained. The beam shear sequence with the solution given above is preferably termed the dominant sequence.

Figure 16:
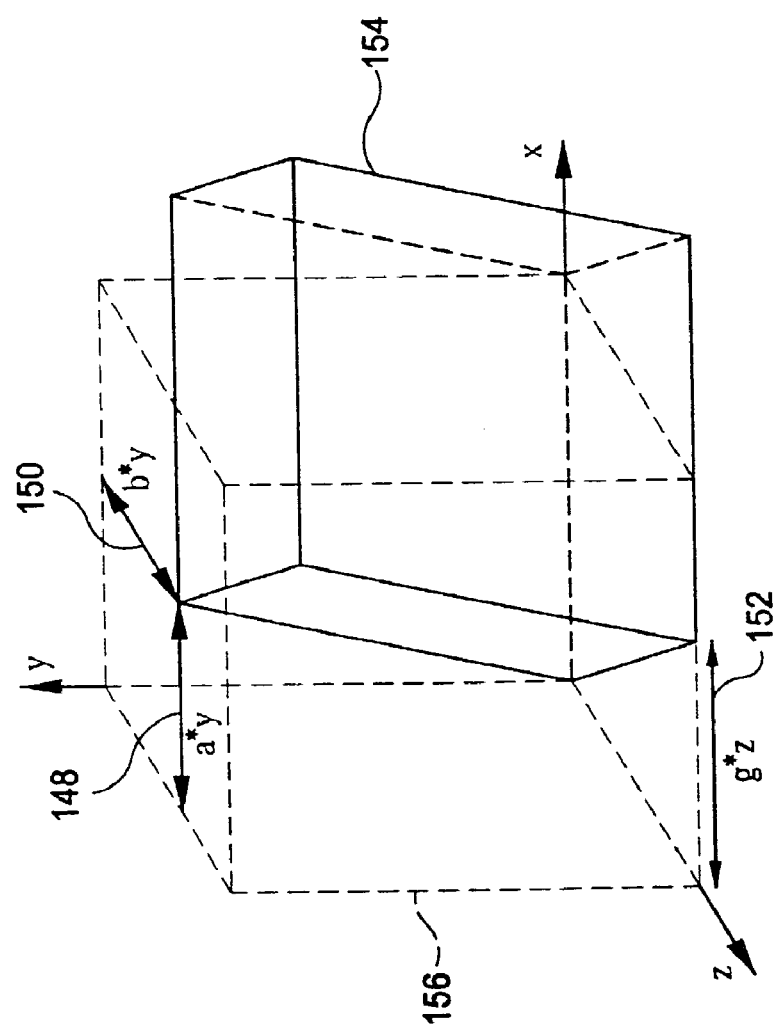
FIG. 16 depicts an example of an x-slice-y-beam shear for performing three-dimensional rotation by two-dimensional slice-beam shear decomposition, in accordance with still another method of the present invention.

With reference now to FIG. 16, a method for performing three-dimensional (3D) rotation by two-dimensional (2D) beam-slice shear decomposition in accordance with the present invention will be described. A 2D beam-slice shear may preferably be defined as a beam that is shifted within a plane. For example, a 2D x-beam-y-slice shear is preferably expressed as:

$$x = x + a\cdot y + g\cdot z$$

$$z = z + b\cdot y$$

A 2D x-beam-y-slice shear may preferably be written as S((x, yz, (a, g)), (z, y, b)), interpreted as a shear along the x axis by an amount a in the y-direction and an amount g in the z-direction, combined with a shear along the z axis by an amount b in the y-direction, where a, g and b are preferably constants. In essence, a beam-slice shear is a combination of a beam shear and a slice shear. FIG. 16 illustrates an x-beam-y-slice shear, S((x, yz, (a, g)), (z, y, b)), wherein the volume represented by the dotted lines 156 is sheared to the volume position represented by the solid lines 154.

To build the general 3D matrix from a 2D shear matrix decomposition, shear products may be restricted to products of different shears: y-beam-x-slice shear S((y, xz, (c, h)), (z, x, d)), x-beam-y-slice shear S((x, yz, (a, g)), (z, y, b)), and y-beam shear S(y, xz, (I, f)). As in the case of the slice shear and beam shear approaches, it is to be appreciated that there are also six permutations of beam-slice shear sequences.

For each of the shear sequences, the product matrix of the consecutive shear matrices is preferably computed and set equal to the underlying 3D rotation matrix. For example, for the first beam-slice shear sequence given above (i.e., S((y, xz, (c, h)), (z, x, d)) S((x, (a, g)), (z, y, b)) S(y, sz, (I, f))):

$$R_{3D}=R_x(\phi)R_y(\theta)R_z(\alpha)=S((y, xz,(c, h)),(z, x, d))\cdot S(x, yz,(a, g)),(z, y, b))\cdot S(y, xz,(i, f))$$

The above matrix equation implies nine trigonometric equations with eight variables, namely, a, b, c, d, f, g, h and I. In solving these nine equations for the eight variables, the following results are obtained:

$$a = \sin\phi\sin\theta\cos\alpha - \cos\phi\sin\alpha$$

$$b = \sin\phi\cos\theta$$

$$c = \frac{\sin\phi(\cos\theta - \cos\alpha) + \sin\theta\sin\alpha(\cos\phi - \cos\theta)}{\sin\phi(\cos\theta)^2\sin\alpha}$$

$$d = \frac{\sin\phi\cos\alpha - \cos\phi\sin\theta\sin\alpha - \sin\phi\cos\theta}{\cos\theta\sin\alpha}$$

$$f = \frac{\sin\phi\sin\theta(\cos\theta - \cos\alpha) + \sin\alpha(\cos\phi - \cos\theta)}{\sin\phi(\cos\theta)^2\sin\alpha}$$

$$g = \frac{\cos\theta\sin\alpha + \sin\phi\sin\theta\cos\alpha - \cos\phi\sin\alpha}{\sin\phi\cos\theta}$$

$$h = \frac{\cos\phi\cos\theta - 1}{\sin\phi\cos\theta}$$

$$i = -\frac{\cos\theta\cos\alpha - 1}{\cos\theta\sin\alpha}$$

It is to be appreciated that the shear matrices for the remaining five shear sequences may be obtained in a similar manner.

Figure 17:
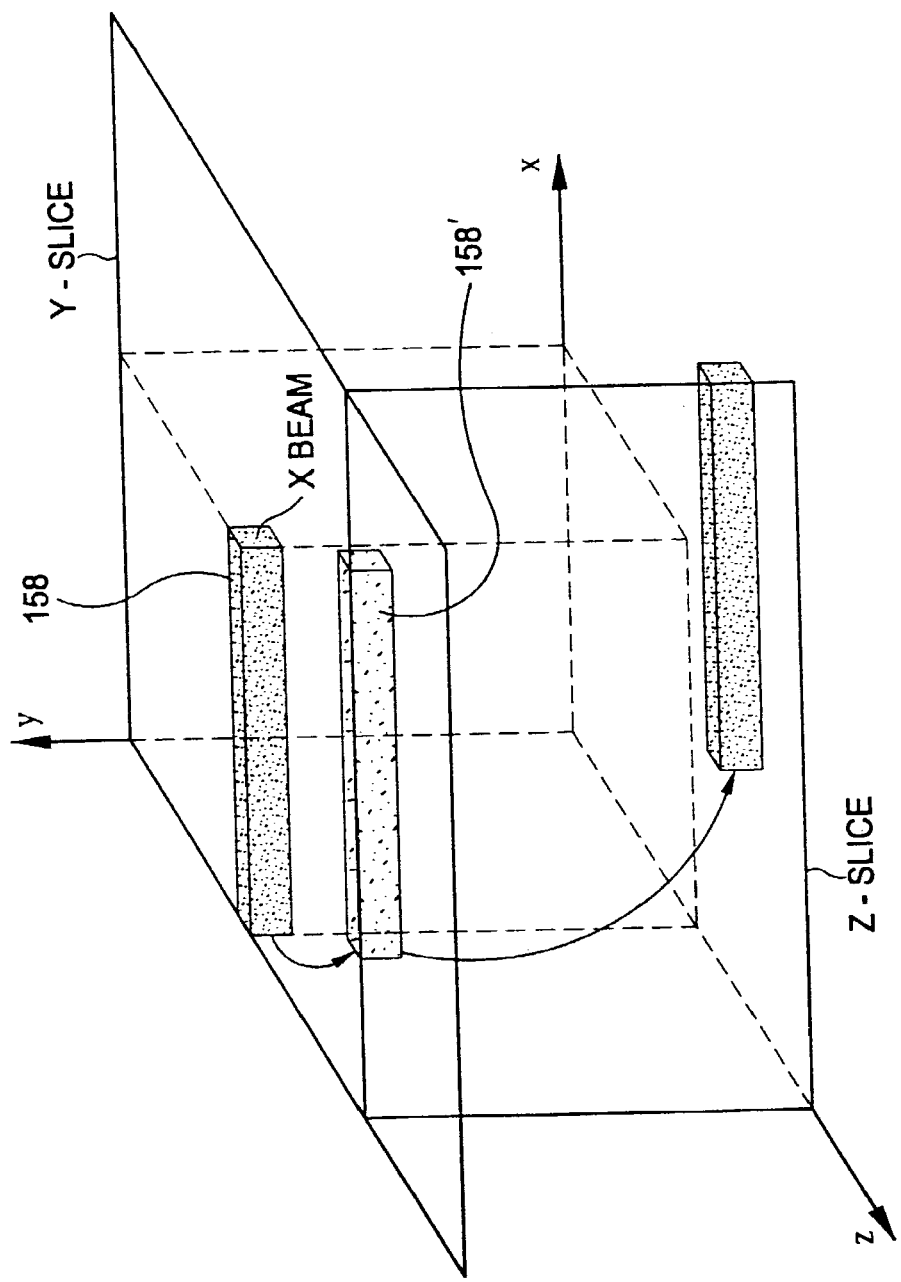
FIG. 17 depicts an example of a three-dimensional x-beam shear for performing three-dimensional rotation by three-dimensional beam shear decomposition, in accordance with yet another method of the present invention.

FIG. 17 illustrates a fourth method for performing an arbitrary three-dimensional (3D) rotation using 3D beam shear decompositions, according to the present invention. By further examination of the product matrix of the consecutive shear matrices used in the beam-slice shear decomposition method described above (i.e., S((y, xz, (c, h)), (z, x, d))·S((x, yz, (a, g)), (z, y, b))·S(y, xz, (I,f))), the first pair and the last pair of 2D shears can be merged since there is a common beam in each pair. For example, x beam is a common beam of the y-slice and z-slice shears of the first pair. Therefore, the number of shears can be reduced to two by introducing a new definition of a 3D beam shear.

FIG. 17 illustrates a 3D x-beam shear, which is equal to the concatenation of two consecutive 2D slice shears S(xz, y, (a, b)) S(xy, z, (e, f)). It is to be appreciated that there are two other 3D beam shears, namely, a 3D z-beam shear, represented as S(yz, x, (c, d)) S(xz, y, (a, b)), and a 3D y-beam shear, represented as S(yz, x, (c, d)) S(xy, z, (e, f)). Every 3D beam shear preferably involves only one major beam. With reference to FIG. 17, the marked x beam 158 (dark shaded beam) is preferably translated to a new 3D location following the arrows. The lighter shaded beam 158' indicates the intermediate position if the shear decomposition is interpreted as two consecutive 2D slice shears.

The three 3D beam shears may preferably be denoted as $SH_{3D_x}$, $SH_{3D_y}$ and $SH_{3D_z}$. Now, using the method of the present invention described herein, an arbitrary 3D rotation can be decomposed into only two consecutive 3D beam shears. The dominant decomposition sequence may be obtained directly from the 2D slice shear sequence as:

$$R_{3D} = SH_{3D_x} \cdot SH_{3D_z}$$

where $$SH_{3D_x} = S(xz, y, (a, b)) \cdot S(xy, z, (e, f))$$
$$= \begin{bmatrix} 1 & 0 & 0 \\ a+be & 1+bf & b \\ e & f & 1 \end{bmatrix}$$

$$SH_{3D_z} = S(yz, x, (c, d)) \cdot S(xz, y, (g, h))$$
$$= \begin{bmatrix} 1+cg & c & d+ch \\ g & 1 & h \\ 0 & 0 & 1 \end{bmatrix}$$

Using the 3D beam shear decomposition approach of the present invention described herein, an arbitrary 3D rotation preferably involves only two major beam transformations, whereas conventional decomposition approaches require three (e.g., Hanrahan's decomposition). In accordance with the 3D beam shear method of the present invention, the first pass involves only x beams and the second pass involves only z beams. By the end of the first shear pass, all voxels of a beam preferably have the same offsets. As there are $N^2$ beams for an $N^3$ volume, there are only $N^2$ different offset values. Accordingly, the offset values for $N^2$ beams can be stored at the end of the first pass, while storing the voxels to their nearest neighbor integral positions.

When multiple pass algorithms are used, the resampling techniques chosen are key to achieving high quality. Intuitively, resampling is necessary for each pass because a continuous shear transformation may move voxels off the grid points. One problem inherent with multiple resampling, however, is the quick degradation of the volume quality if consecutive rotations are applied to a volume. It is therefore desirable to sample the volume only once.

Accordingly, a preferred method of the present invention achieves one pass resampling of a volume. In essence, the method of the present invention involves precomputing a sampled volume and then using only zero-order (i.e., nearest neighbor) interpolation in each shear pass, thereby distinguishing from known prior art methods which require global communication (e.g., Wittenbrink and Somani's permutation warping).

Given an original volume (source volume) and the desired rotated volume (target volume), the method of the present invention preferably first builds up a one-to-one correspondence between a source voxel and a target voxel. This one-to-one mapping is guaranteed by the multi-pass shear decomposition of the present invention because each shear is a one-to-one transformation using zero-order interpolation. The concatenation of a sequence of one-to-one mapping remains one-to-one. Once this one-to-one correspondence is built up, the method of the present invention preferably calculates for each source voxel its corresponding target voxel and stores it in the source voxel position. During this procedure, no global communication is required; the resampling is performed by interpolation on the local voxels. The sampling position of each target voxel is preferably computed using a backward transformation of rotation.

After obtaining the values for all target voxels, the method of the present invention preferably shuffles them to their destinations in target volume. Intuitively, this would involve global communication. However, global communication is expensive to perform for parallel implementation. Therefore, the method according to present invention preferably uses multiple shears with a nearest neighbor placement scheme to achieve this voxel shuffling. Since shear is a regular, non-conflict transformation, each pass can be performed more efficiently than if global communication was utilized. Using the 3D beam shear decomposition method of the present invention described herein, only a minimum of two passes of regular local communication are necessary to achieve virtually the same effect as global communication.

It is to be appreciated that care should be taken to avoid the overlapping of beams in 3D beam shear. Consider, for example, the 3D x beam shear equation given above. While each x beam is preserved (i.e., an x beam remains rigid after a 3D x beam shear), several x beams may overlap with each other. To maintain the required one-to-one mapping, recall that a 3D beam shear is the concatenation of two 2D slice shears, as discussed above. A 2D slice shear maintains one-to-one mapping when using zero-order interpolation. Therefore, as a solution, the method of the present invention preferably calculates the destination coordinates using the same order as that of two consecutive 2D slice shears, but communication is preferably only performed once. For a 3D x beam shear, while the x coordinate is calculated directly using the 3D shear matrix (described above), the y and z coordinates of each beam are preferably calculated as $$z' = \text{round}(z + b \cdot y)$$

$$y' = \text{round}(y + f \cdot z')$$

where round(w) is a function of rounding w to the nearest integer. Coordinates (y', z') determine the integral coordinates of the whole beam for the nearest neighbor storage. In this manner, no overlap occurs.

In accordance with another form of the present invention, several unique methods for performing enhanced volume processing will be discussed in detail herein below.

Perspective projections present inherent challenges, particularly when performing ray casting. For parallel projections, sight rays that are cast through a volume dataset maintain a constant sampling rate on the underlying volume data. It is straightforward to set this sampling rate to create an output image of the required quality. For perspective projections, however, the rays do not maintain such a continuous and uniform sampling rate. Instead, the rays diverge as they traverse the volume from front to back. This creates an uneven sampling of the underlying volume, as shown in FIGS. 18A and 18B.

Figure 18B:
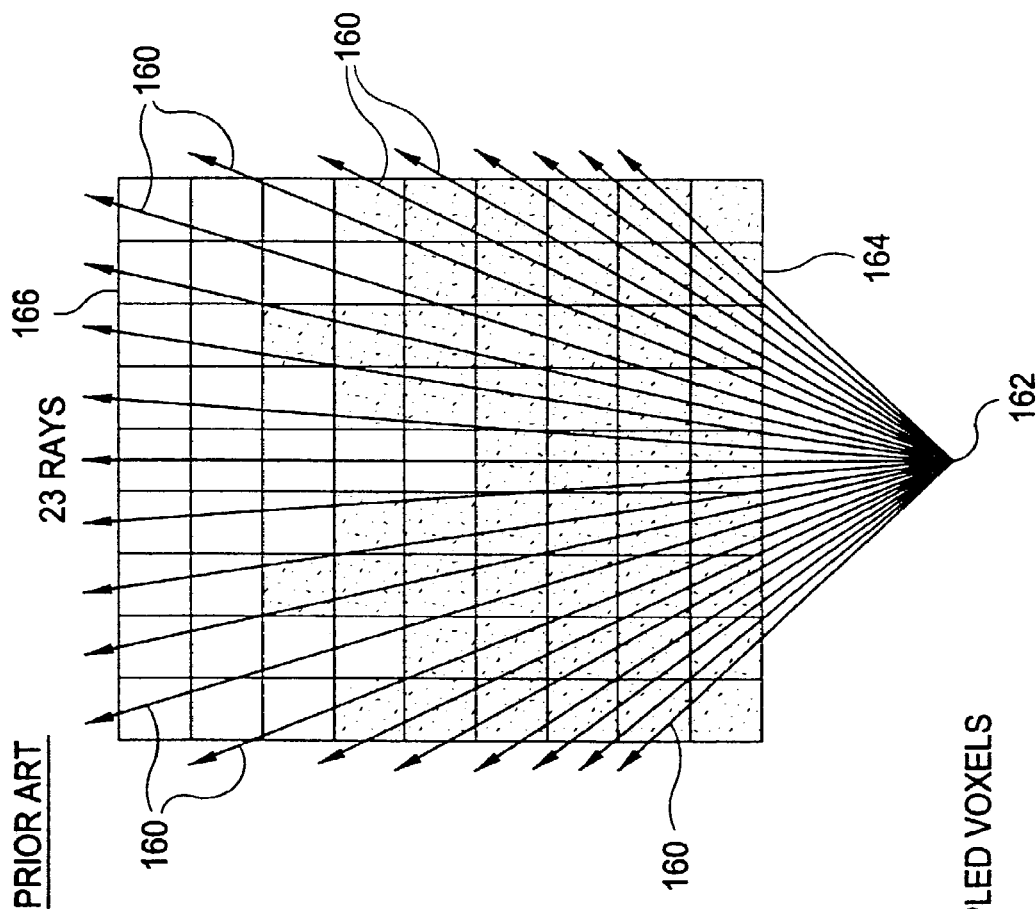
FIG. 18B illustrates a conventional oversampling method for performing perspective projections.

Referring now to FIGS. 18A and 18B, conventional ray casting algorithms generally handle ray divergence from perspective projections by one of two methods. The first method is undersampling (FIG. 18A), in which rays 160 are cast, from a predefined viewpoint 162, so that the sampling rate at the front of the volume 164 is appropriate for the desired image quality. However, because of the perspective ray divergence, the underlying volume dataset is undersampled. This may result in severe aliasing by creating "holes" in the rear of the volume 166 where regions of voxels remain unsampled. The second method is oversampling (FIG. 18B), in which rays 160 are cast from a predefined viewpoint 162 so that the sampling rate at the rear of the volume dataset 166 is appropriate for the desired image quality. This approach avoids the aliasing of the first method; however, the volume may be radically oversampled in the front 164. The inefficient oversampling in the front of the volume 164 dramatically increases the runtime of this method. The rays 160 can be cast with a sampling rate between undersampling and oversampling. This results in a tradeoff between the image quality of oversampling and the rendering speed of undersampling.

Many prior imaging architectures do not even attempt to perform perspective projections. Other architectures have dealt with perspective projections by casting diverging sight rays from a predefined viewpoint, which produce images with temporal aliasing and either do not achieve true real-time frame rates (i.e., 30 Hertz) or are much more complex than the slice-order method of the present invention.

A ray-splitting method applies the concept of adaptive super-sampling in order to maintain a uniform ray density. In this approach, a ray is split into two child rays when neighboring rays diverge beyond some predetermined threshold. Recently, a method was proposed which divides the viewing frustum into regions based on distance from the viewpoint, such that the ray density in each region is near the underlying volume resolution. Afterwards, such method projects each region onto sub-images and composites them into the frame buffer using texture mapping hardware. In effect, the technique casts continuous rays through a region, then at specified boundaries, splits them into a new set of continuous rays. This, however, creates a potential undesired discontinuity between regions.

A method for performing perspective projections of uniform regular datasets, termed ER-Perspective (exponential regions perspective), in accordance with one form of the present invention, preferably adaptively samples the underlying volume, whereby the above-described problems, inherent in conventional volume rendering systems and methods, are essentially eliminated. The ER-Perspective algorithm combines the desirable properties of both undersampling and oversampling, providing extremely good anti-aliasing properties associated with oversampling methods, while providing runtimes on the order of undersampling methods. Furthermore, this algorithm preferably creates at least one sample for every visible voxel in the volume dataset. ER-Perspective gains a runtime advantage over previous work by utilizing slice-order voxel access, while maintaining equal or better image quality in comparison to known perspective projection methods.

Figure 19:
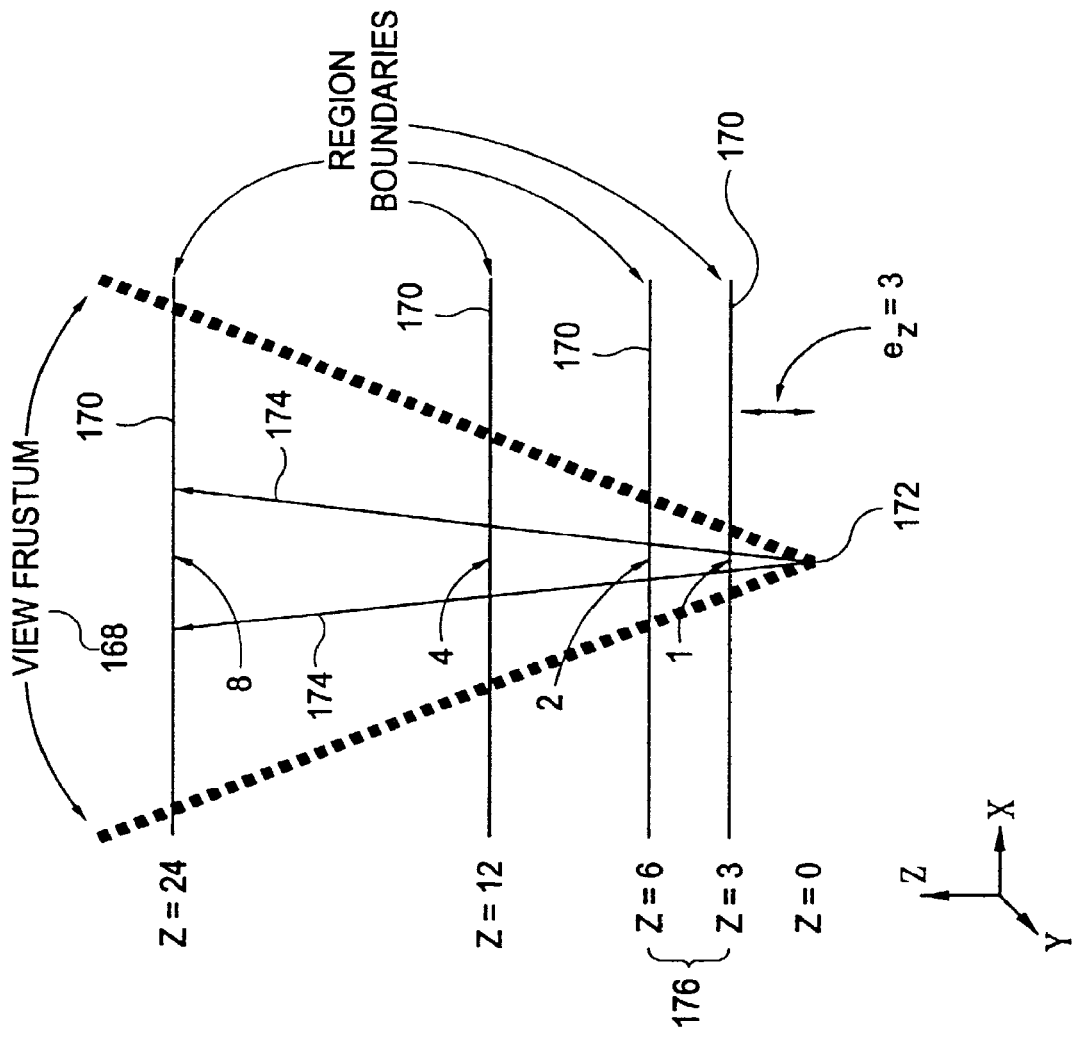
FIG. 19 illustrates an adaptive perspective ray-casting method for performing perspective volumetric projections, in accordance with a preferred form of the present invention, wherein a view frustum is divided into regions based on exponentially increasing distance from a viewpoint.

FIG. 19 is a 2D top view illustration of the ER-Perspective algorithm, in accordance with the present invention. As shown in FIG. 19, the ER-Perspective algorithm preferably works by dividing a view frustum 168 into a plurality of regions based on exponentially increasing distances along a major projection axis (e.g., z-axis) from a predefined viewpoint 172. Preferably, continuous sight rays 174 are cast from the viewpoint 172 from back-to-front (or front-to-back) through the volume dataset and the rays 174 are merged (or split) once they become too close (or too far) from each other. Since the operation of the ER-Perspective algorithm is similar for back-to-front compared with front-to-back ray casting, the remaining discussion of the ER-Perspective algorithm will be limited to the more intuitive case of back-to-front ray casting with merging. The differences are pointed out where they are significant.

Figure 20A:
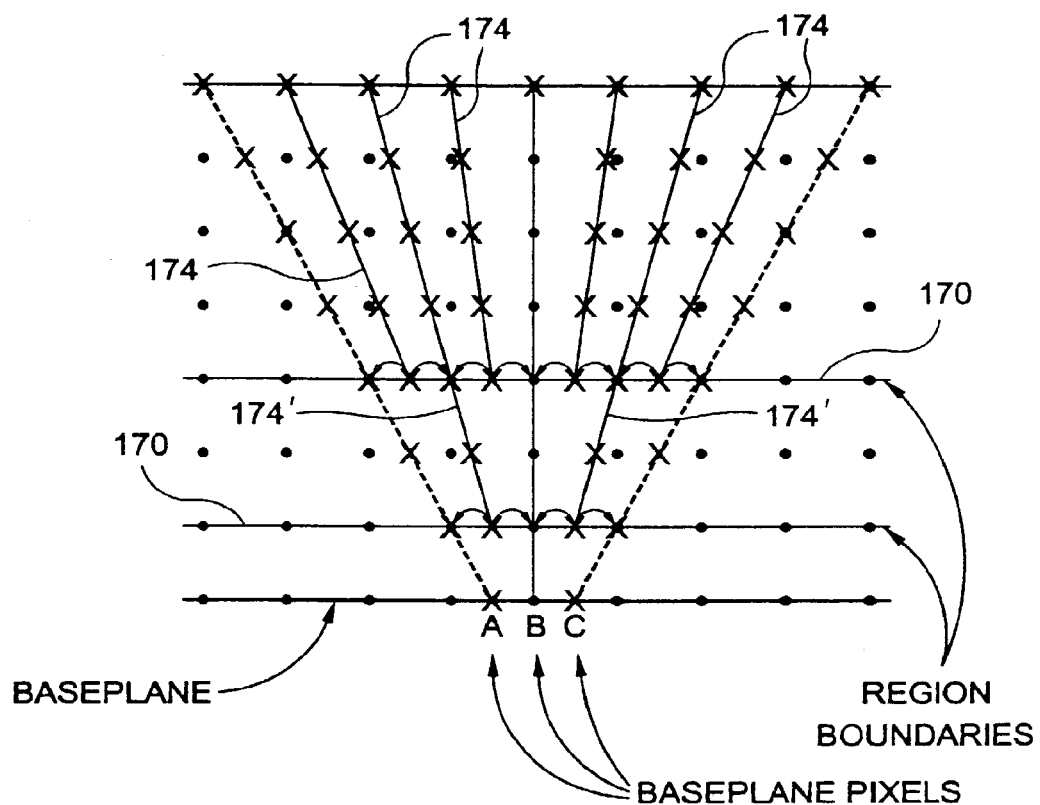
FIG. 20A is a graphical representation illustrating the splitting/merging of rays at exponential region boundaries, in accordance with the preferred adaptive perspective ray-casting method of the present invention.

The ER-Perspective algorithm preferably uses region boundaries 170, which define the exponential regions, to mark the locations where the sight rays 174 are preferably merged. By defining the regions and merging all rays 174 at the boundaries 170, the algorithm provides a regular pattern of ray merging that is dependent on the global geometry rather than local neighborhood conditions. FIG. 20A more clearly illustrates the merging of sight rays at region boundaries 170 for contribution to baseplane pixel B, in particular. With reference to FIG. 20A, an odd number of rays 174 are preferably merged such that the resulting ray 174' is essentially an exact continuation of the previous center ray, thus eliminating potential discontinuities present at the region boundaries 170. This is one important advantage of the method of the present invention over known prior approaches. Furthermore, this algorithm can be qualified by characterizing the filtering achieved when adaptively sampling the volume.

Figure 20B:
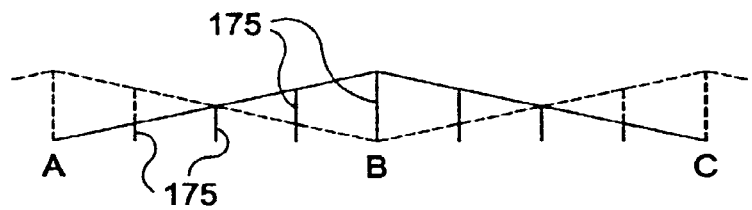
FIG. 20B is a graphical representation illustrating the effective filter weights for ray segments A, B and C of the adaptive perspective ray-casting method example of FIG. 20A.

An example of a preferred filtering scheme is shown in FIG. 20B. Referring to FIG. 20B, a Bartlett window (i.e., linear interpolation, triangle filter) is preferably employed. Cascading efficient local Bartlett windows at each region boundary 170 is essentially the equivalent of resampling the rays 174 with a single large Bartlett filter for each baseplane pixel (see FIG. 20A). A graphical representation of the preferred filter weights 175 is shown for contribution to the baseplane pixels (e.g., pixels A, B, C).

The base sampling rate of the algorithm can be set to a predefined value according to a desired image quality. The base sampling rate is the minimum ray density compared to the underlying volume resolution. Although the ER-Perspective method of the present invention supports virtually any sampling rate, a sampling rate of at least one ray per voxel is preferred. The algorithm has the advantage of keeping the ray density between one to two times the base sampling rate. This guarantees that no voxels are missed in the rear of the volume dataset and places an upper bound on the total amount of work performed at two times (2×) supersampling.

Since the present invention utilizes slice-order processing, the volume dataset is projected onto a baseplane of the volume which is most perpendicular to the view direction. The baseplane image is then warped onto the final image plane in a conventional manner (e.g., in the same manner as in shear-warp or the prior Cube-4 architecture).

The ER-Perspective method of the present invention is ideally suited for implementation on the Cube-5 architecture described above. Specifically, this algorithm preferably only requires nearest neighbor communication between processing elements. While processing a row of voxels on a one-dimensional array of processing elements, the algorithm only requires processing elements to communicate with their immediate left and right neighbors. The Cube-5 rendering pipelines similarly support nearest neighbor communication.

The ER-Perspective algorithm of the present invention preferably employs slice-order processing along one of the three major axes. Consequently, the regions in the ER-perspective algorithm are defined as slabs of slices along a major projection axis. In a preferred embodiment of the ER-perspective method according to the present invention, the volume dataset is projected along slices perpendicular to the z-axis. So as not to limit the methods of the present invention to projections along the z-axis only, it is to be appreciated that the coordinate system may be flipped and the geometry rotated. The algorithm proceeds, as illustrated in FIG. 7, by measuring the distance along the z-axis, from the viewpoint 86 to the front of the volume dataset 80, is determined ($e_z$). Subsequently, a first region 92 is created to consist of as many z-slices as this distance. Each successive region after the first region 92 is preferably twice as deep as the one before it.

When combined with high quality supersampling, the first region is exactly as large as needed to have one ray per voxel at the end of the region when shooting one ray per pixel of the final image. Thus, supersampling higher than 2× might be needed in the front of the volume to render high quality close up views.

As illustrated in the example of FIG. 19, if the viewpoint 172 is three voxel units from the front of the volume (i.e., the z=3 region boundary), for example, then the first region 176 is preferably three voxel units thick, the next region is six voxel units thick, and so on. In general, the I-th region is preferably $e_z \cdot 2^i$ slices thick, where $e_z$ is the distance from the viewpoint 172 to the front of the volume (see FIG. 19). Forcing the regions to be thus defined produces the desired effect that any two perspective rays 174 cast through any of the regions are twice as far apart at the rear boundary (i.e., the z=24 boundary) as they are at the front boundary (i.e., the z=3 boundary). This is shown in FIG. 19 as the distance between the two rays 174 grows from one unit to two units across the first region 176, then to four units, and finally to eight units at the rear of the last region. Additionally, since the region boundaries 170 are dependent on the global geometry, the efficiency of the ray casting algorithm is maximized by providing a mechanism for keeping the ray density between one and two times the underlying volume resolution in each dimension. It also creates a regular topology so that the filtering of the data can be controlled as perspective rays are cast.

Figure 21:
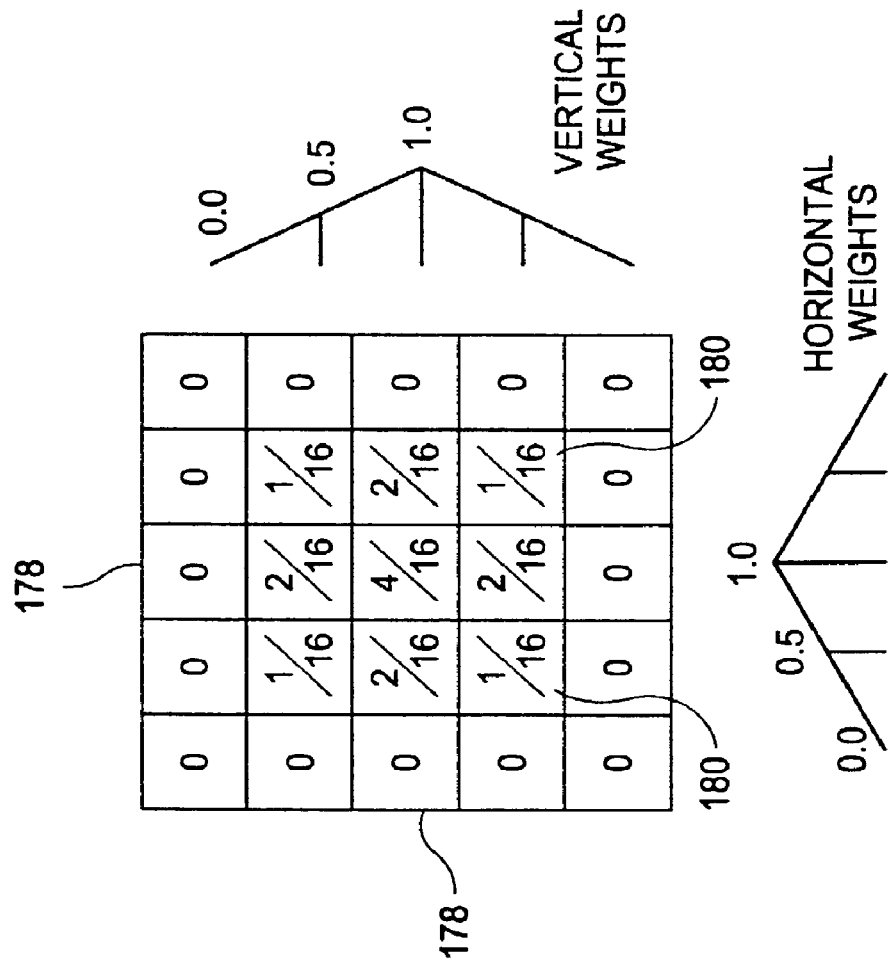
FIG. 21 illustrates an example of the weights for a two-dimensional filter of size ±2 samples, in accordance with a preferred form of the present invention.

Having regions with boundaries at exponential distances produces a ray density twice as high at the front as at the back of the region. Therefore, a mechanism must preferably be provided to adjust the ray density when crossing a region boundary. Since each ray preferably starts on a voxel coordinate at the rear of a region, at the front of the region every second ray in each dimension will preferably coincide directly with a voxel coordinate. The remaining rays preferably intersect the region boundary halfway between two voxel positions. To down-sample the ray density with this deterministic ray pattern, a two-dimensional (2D) Bartlett filter (also known as tent or triangle filter) is preferably employed, with an extent of ±1 voxel unit in each dimension. Because the ray density at the front of each region is twice the voxel density, this 3×3 voxel neighborhood is intersected by 5×5 rays. Referring now to FIG. 21, since the edges 178 each have a weight of zero, only the 3×3 neighboring rays 180 are used for applying the filter to down-sample the ray density. This effectively merges neighboring rays. A Bartlett filter is preferred over a simple box filter for the added quality it produces in the final image. For the case of front-to-back processing, rays are split instead of merged. Here a bilinear interpolation of the rays is performed to generate the new rays which begin between the other rays. It should be mentioned that a Bartlett filter of size ±1 is the inverse of a bilinear interpolation operation.

Figure 22:
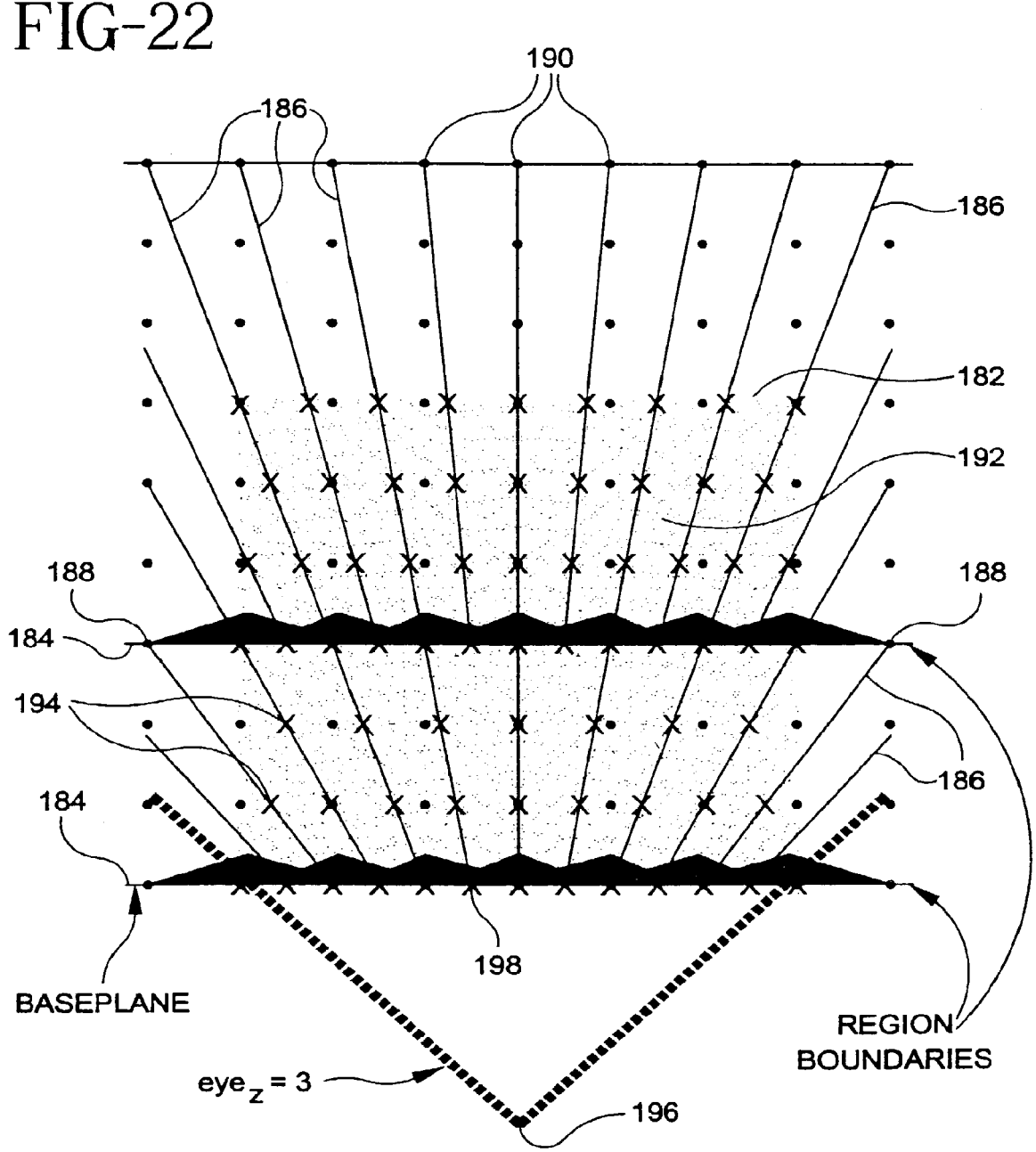
FIG. 22 is a graphical representation illustrating an example of a of the adaptive perspective ray-casting method of the present invention, wherein a $7^3$ volume is three voxel units from the viewpoint.

FIG. 22 shows a 2D example of how sight rays 186 travel through a $7^3$ volume 192 when the viewpoint 196 is three voxel units in front of the volume (i.e., from the baseplane 198). Notice that the sampling rate remains between 7 and 14 per slice, and that it increases as the rays 186 travel through the regions from back to front. The number of ray density resampling stages for an $N^3$ volume is limited by $\log_2 N$, since that is the maximum number of regions in an $N^3$ volume. The last re-sampling step shown on the baseplane 198 is preferably performed when the final image warp takes place.

As illustrated in FIG. 22, the rear of the volume dataset 182 does not necessarily always coincide with a region boundary 184. However, since it is preferred that the rays 186 be on exact voxel coordinates 188 at all of the region boundaries 184, the rays 186 preferably originate on the grid coordinates 190 at the rear of the last region enclosing the volume dataset 192 (shaded area). Therefore, the voxel coordinates and the ray sample locations 194 may not be congruent at the rear of the volume 182. This not only provides the mentioned boundary conditions, but aids with temporal anti-aliasing when the viewpoint 196 is moved in smaller than voxel unit distances, because the rays 186 will continue to originate from the same positions relative to the voxels.

FIG. 23 depicts a preferred method for performing ER-Perspective back-to-front projection of a volume, in accordance with one form of the present invention, although other embodiments of the ER-Perspective method are contemplated. As described above, first, the distance from the eye or viewpoint to the baseplane is preferably determined (in voxel units). Using this viewpoint position, exponential region boundaries are created. Next, enough regions are preferably established to completely encompass the volume dataset. To perform the volume rendering, the algorithm loops through each region from the back to the front, computing normal ray casting, but in a slice-order fashion, and stores the partially computed rays in a compositing buffer. Between regions (i.e., at the region boundaries), ray density re-sampling of the compositing buffer is preferably preformed, as described previously. The baseplane image is then warped onto the final image plane for display.

With adaptive ray density perspective methods known in the prior art, it is generally difficult to determine the filtering function achieved when rays are merged using irregular patterns. However, since the ER-Perspective method of the present invention preferably uses regular boundaries for the filtering operations and exact ray placement within the boundaries, it is easier to compute the effective filter achieved by the cascading of local Bartlett filters. This is an important advantage of the ER-Perspective algorithm of the present invention. Additionally, the boundaries and filter of the present invention have preferably been chosen to overcome the poor image quality usually associated with conventional successive filtering of discrete data.

Figure 24:
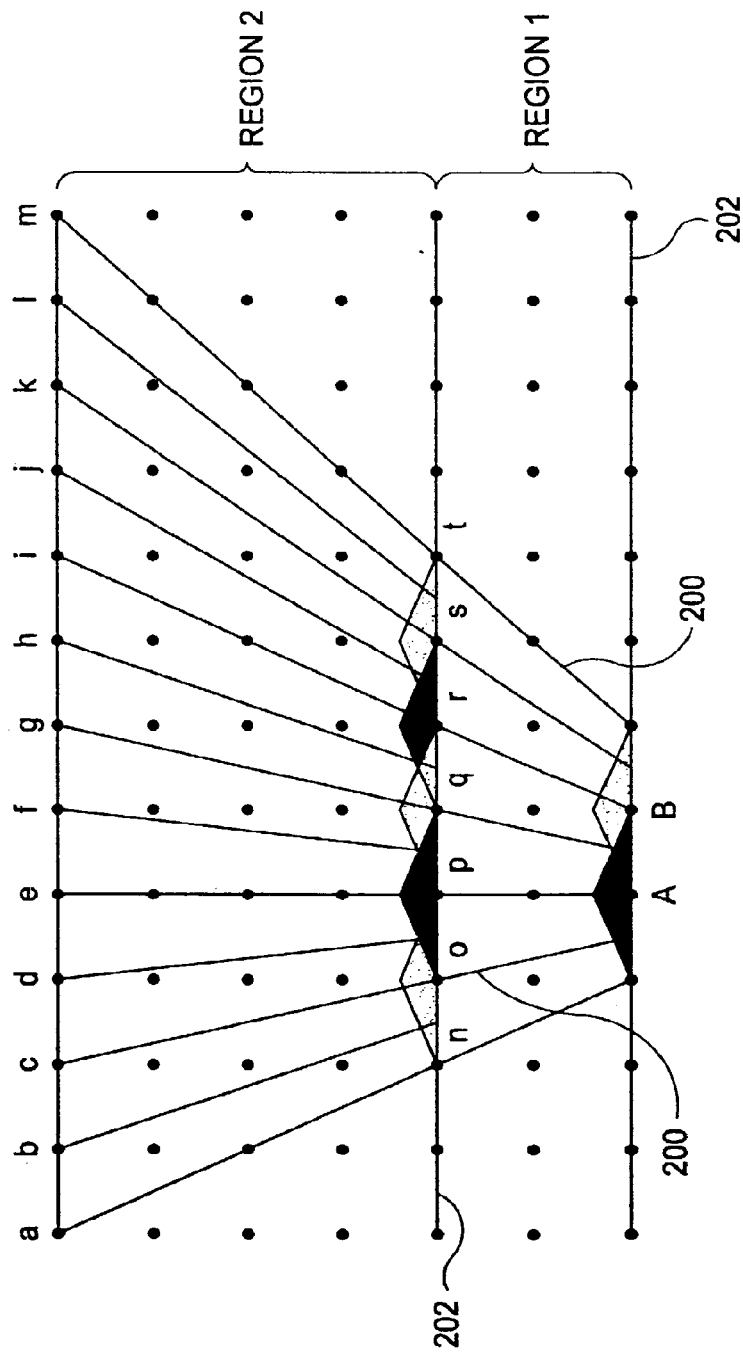
FIG. 24 illustrates an example of the Exponential-Regions Perspective ray casting method of the present invention across two regions.

Consider, for example, the case of a perspective projection of a volume seven slices deep with the viewpoint two voxel units in front of the volume, as depicted in FIG. 24. Using the ER-Perspective method of the present invention, the rays 200 that are cast through a region are one voxel unit apart at the rear of the region. However, when the rays reach a region boundary 202 they are preferably filtered using local Bartlett filters. The Bartlett filters (simplified to 1-dimension) contain the following weights for a kernel of size 2n+1, normalized so that the output has the same scalar range as the input:

$$0, \frac{1}{n^2}, \frac{2}{n^2}, \dots, \frac{n-1}{n^2}, \frac{n}{n^2}, \frac{n-1}{n^2}, \dots, \frac{2}{n^2}, \frac{1}{n^2}, 0$$

For two-dimensional images at region boundaries, the present invention preferably employs a two-dimensional Bartlett filter by convolving two one-dimensional Bartlett filters in the two principal directions. The ER-Perspective algorithm preferably always resamples the rays to have half of the original density. Using a filter of size ±2 rays (n=2) creates a filter kernel of 5×5, or just the following five weights for one dimension:

$$0, \frac{1}{4}, \frac{2}{4}, \frac{1}{4}, 0$$

By way of example, as illustrated in FIG. 24, consider the contribution of samples a, b, c, d and e to the partially composited ray which changes from region 2 to region 1 at location o, $$o = \frac{1}{4}b + \frac{2}{4}c + \frac{1}{4}d$$

Likewise, the partial rays at locations p and q are computed as:

$$p = \frac{1}{4}d + \frac{2}{4}e + \frac{1}{4}f$$
$$q = \frac{1}{4}f + \frac{2}{4}g + \frac{1}{4}h$$

The equations for partial rays n and r have been omitted since they have a weight of zero in the final filter for pixel A. Continuing the ER-Perspective algorithm, the resampled partial rays n, o, p, q and r are preferably cast through region 1 where they are again filtered by a local Bartlett filter. The normalized contribution of n, o, p, q and r to pixel A will be:

$$A = \frac{1}{4}o + \frac{2}{4}p + \frac{1}{4}q$$

Substituting in the values for o, p and q results in:

$$A = \frac{1}{16}b + \frac{2}{16}c + \frac{3}{16}d + \frac{4}{16}e + \frac{3}{16}f + \frac{2}{16}g + \frac{1}{16}h$$

It is to be appreciated that this formula contains the same weights (i.e., coefficients) as a Bartlett filter with a kernel size of nine values (n=4). This can be repeated for pixel B with the same filter weights. For front-to-back processing, a similar analysis can be used to demonstrate the performance of the algorithm and the result of successive applications of the bilinear interpolation.

Each sample of a slice preferably contributes the same amount to the final image as any other sample in the same region (assuming all other operations on samples, such as color mapping and compositing, are equal). For example, the value that sample e contributes to pixel A with an effective weight of ¼ after the cascading of the local Bartlett filters. Likewise, sample I contributes to pixel B with an effective weight of ¼. Sample f contributes to pixel A with a weight of 3/16 and to pixel B with a weight of 1/16 for a total of ¼. This can be repeated for samples g and h. The samples to the left of sample e and to the right of sample I partially contribute to pixels left of pixel A and right of pixel B, respectively, such that the sum of their contributions to the final image is also ¼. In fact, every sample that is in this region has the same weight. The weight is ¼ because this region is the second region in the volume. For the first region in the volume, every sample preferably has a weight of ½. This is qualifiable by realizing that there are two rays per final image pixel in this region. There are four rays per final image pixel in the second region, etc. Consequently, the weight which determines the contribution of each sample towards the final image is the ratio $$\frac{\text{image pixels}}{\text{samples in this slice}}.$$

Since the ER-Perspective method of the present invention performs a slice-order processing, the total amount of computation may be analyzed by calculating the amount of work performed on each slice. Assuming that the work done on each sample is the same, the count of the number of samples processed can be used as a comparison of the workloads. For example, in the oversampling method (see FIG. 18B), the number of samples on the rear slice of a volume which ends exactly on a region boundary is $N^2$. On the front slice, the sample count depends on the geometry of the viewpoint. In particular, using similar triangles and defining $e_z$ as the distance from the viewpoint to the front of the volume, the number of samples taken is $$\left(\frac{N^2 + N \cdot e_z}{e_z}\right)^2$$

This can he generalized for any slice s through the volume dataset to $$\left(\frac{N^2 + N \cdot e_z}{e_z + s}\right)^2$$

Thus, the total count of samples processed by the oversampling method is $$\sum_{s=0}^{N} \left(\frac{N^2 + N \cdot e_z}{e_z + s}\right)^2$$

Similarly, the undersampling method (see FIG. 18A) can be shown to perform the following amount of work:

$$\sum_{s=0}^{N}\left(\frac{N\_e_z}{e_z+s}\right)^2$$

For the ER-Perspective algorithm of the present invention, the analysis is more complicated. Depending on the viewing geometry, $$\log\left(\frac{N+e_z}{e_z}\right)-1$$

regions are created. It has been shown previously that each of these regions preferably contains $e_z \cdot 2^i$ slices. Again, using the geometric principle of similar triangles, the ER-Perspective algorithm of the present invention processes the following number of samples:

$$\sum_{reg=0}^{\log\left(\frac{N+e_z}{e_z}\right)-1}\sum_{s=0}^{e_z*2^{reg}}\left(\frac{N^*(e_z*2^{reg}-e_z+s)}{e_z*2^{reg}-e_z}\right)^2$$

This formula has an upper bound of $$\sum_{s=0}^{N}(2N)^2$$

and a lower bound of $$\sum_{s=0}^{N}N^2$$

Examining the equation for the total count of samples processed by the oversampling method (given herein above), it can be seen that the oversampling approach could perform $O(N^4)$ work on the front slice when the viewpoint is very close to the volume. The oversampling run times grow rapidly as the viewpoint is moved closer to the front of the volume. Examining the undersampling equation above, it can be seen that as the viewpoint approaches the front of the volume, the numerator approaches zero. The amount of work performed on the rear slice also approaches zero. The run times of the undersampling method decrease as the viewpoint becomes closer to the volume.

Regardless of the viewpoint geometry, the amount of work performed by the ER-Perspective algorithm of the present invention is bounded by $o(N^2)$ and $\omega(4N^2)$ per slice. Some advantages of this approach are that the upper bound on the run time of the algorithm is linear with the number of voxels and is independent of the view position, and a lower bound on the image quality achieved is also independent of the view position. Thus, a user can set the base sampling rate for the desired image quality and be sure that the sampling rate is sufficient throughout the volume for that desired image quality.

In contrast, a conventional oversampling approach provides a lower bound on the image quality yet the runtime of the algorithm may become much greater than that of the ER-Perspective method of the present invention. A conventional undersampling method provides an upper bound on the runtime for rendering, but the image quality may become much worse than the ER-Perspective approach.

Referring again to FIG. 23, a preferred back-to-front ER-Perspective ray-casting algorithm, in accordance with the present invention, is illustrated. The algorithm of FIG. 23 is shown as a pseudo-code representation and assumes a Z-major axis projection. The ER-Perspective algorithm of the present invention does not suffer from the traditional pitfalls when performing perspective projections on uniform regular grids. This unique approach runs faster than oversampling methods and produces better quality images than undersampling methods. Employing a Bartlett filter for ray merging provides an image quality improvement over a conventional box filter. The ER-Perspective algorithm is qualified by characterizing the effective filtering on the input data.

In accordance with another form of the present invention, a method is presented for rendering a large volume, wherein the volume dataset exceeds the physical single-pass capacity of the Cube-5 apparatus of the present invention. The preferred method subdivides the volume dataset into a plurality of cuboid bricks. Traversing the bricks in a predefined order preferably enables initialization of the compositing buffer of the Cube-5 apparatus with a baseplane image of a previous brick before rendering it, whereby ray path and compositing are logically extended throughout the entire volume. Information regarding the boundary between bricks is preferably re-read to insure correct sampling. Using this approach, the maximum volume size is limited only by the available intermediate baseplane storage.

In areas of the dataset where, during perspective projection, multiple voxels contribute to the same image pixel, images of equivalent quality may preferably be rendered using a level-of-detail (LOD) tree, which may be generated, for example, by combining voxels of increasing neighborhood size in a preprocessing step. While perspectively rendering a single large volume utilizing LOD, preferably only a small portion of the volume, substantially close to the viewpoint, must be read in its highest detail. The more distant portions of the volume, with respect to the viewpoint, may then be rendered from lower resolution versions of the data. Thus the frame rate and/or dataset size is preferably increased. Since each region in the perspective algorithm of the present invention (previously described) will now be at a different LOD, there is no longer need to filter the rays between regions, but merely to redistribute them. Preferably, only one region of each LOD tree level is processed; thus, only those regions must be paged into memory.

The level-of-detail (LOD) method of the present invention may also be used for rendering scenes comprised of multiple objects at differing distances from the viewpoint. For such cases, a starting LOD is preferably selected that delivers a baseplane image of about the same size as the screen space image, thereby relating rendering time to image resolution and not to object size (i.e., scale independence).

Although back-to-front rendering is similarly contemplated by and within the scope of the present invention, the unique LOD method will be described herein in a front-to-back rendering context. Rendering front-to-back, it is preferable to start with a slab of the most detailed representation of the volume to be rendered. In a preferred method of the present invention, the thickness of the volume slab is chosen so that projected voxel distances in front and back of the slab differ by a factor of two, similar to perspective projections according to the present invention, as previously described herein. After rendering a slab, the current compositing buffer image is preferably scaled by a factor of 0.5 in the warp unit. This initializes the compositing buffer for the rendering of the next slab of half the resolution. Preferably, only one slab of each LOD actually flows through the rendering pipelines; thus, for large volumes, only those slabs must be paged into the on-board 3D memory.

It is to be appreciated that the apparatus of the present invention can also be employed to speed up off-line computations, such as generation of level-of-detail (LOD) and filtering of datasets. To generate LODs, the trilinear interpolation unit (TriLin) of the present invention preferably sets all its weights to 0.5. Once new samples become available, they are preferably subsampled and compacted into a new volume, which is the next coarser LOD. To filter a dataset, the trilinear interpolation unit again uses only 0.5 weights; this time, however, data is fed back to the beginning of the rendering pipeline without compaction. Each additional pass creates a new filtered volume with a filter kernel having one more voxel extent in every major axis direction.

For higher quality image rendering, the apparatus and methods of the present invention preferably provide the flexibility to utilize a full hardware implementation, multi-pass algorithms, and/or a combination of the two, depending on the desired tradeoffs. The full hardware implementations and multi-pass methods preferably provide more accurate computations in two primary functional areas: filtering and interpolation.

The Cube-4 architecture, a predecessor of the present invention (Cube-5), utilizes a central difference gradient filter with only two sample points to estimate each of the x, y and z gradients at a particular location. A larger 3D filter can deliver a more accurate gradient estimate, such as a Sobel filter (which is a $3^3$ filter with weights derived from the inverse of the Manhattan distance from the center point). A straightforward hardware implementation of a $3^3$ filter, however, requires 27 multipliers and 26 adders.

The apparatus of the present invention presents an alternative to this expensive prior art approach by using symmetric convolution filters. The convolution filters can be efficiently implemented with only three multipliers and six adders, at a significant cost savings. Replication of hardware per gradient component can preferably be avoided by applying a three-pass algorithm instead. As an example, FIG. 25 illustrates a symmetric approximation of the x-component of the Sobel gradient filter. Within each stage, the weights are preferably applied to the nearest neighbors before summation. With reference to FIG. 25, if each stage operates on the output of a previous stage instead of on the raw data, the weights presented in FIG. 25 will effectively produce the $3^3$ symmetric approximation of the Sobel gradient filter (right side of FIG. 25). Changing the x-weights to {1 w 1} will produce an approximation of a Gaussian filter instead.

The present invention contemplates higher quality rendering modes in which no additional hardware is needed, but in which the frame rate is lowered. One such example is to achieve larger neighborhood contributions to the gradient estimation by utilizing level-of-detail (LOD) information. If the central difference gradient is computed on data of the next coarser LOD, it is effectively the equivalent of employing a 6×4×2 filter, with 6 being the extent in the direction of the current gradient component. Since the apparatus of the present invention (i.e., Cube-5 architecture) is able to hold mip-mapped LOD representations of the data, this filter is preferably achieved with essentially no increase in hardware, beyond the simple central difference solution.

Another higher quality multi-pass rendering mode provided by the present invention, for which no additional hardware is required, is an approximation of tri-cubic interpolation, which has beneficial applications in the medical field as well as other fields. This mode enables more accurate resampling and iso-position calculation. For this, the present invention preferably decomposes a piecewise $4^3$-voxel filter into a series of linear interpolations and extrapolations which is symmetric in every dimension, thereby allowing efficient reuse of intermediate results.

In performing higher quality rendering, it is to be appreciated that there are certain tradeoffs between using additional hardware for providing more accurate and flexible gradient estimation within the Cube-5 pipeline, as opposed to employing multiple pass algorithms. Generally, using a multiple pass algorithm requires changes in the Address Generation and Control unit (see FIG. 5) of the present invention to momentarily stall the pipeline for computational purposes, while the hardware approach requires additional application specific integrated circuit (ASIC) logic and additional connections to support larger neighborhoods.

With respect to enhanced volume rendering capabilities, a preferred embodiment of the present invention supports clipping by arbitrary planes. The distance from each plane may preferably be incrementally computed using only registers and one adder per plane. In addition to conventional clipping planes which define only the positive direction as visible, the apparatus of the present invention preferably supports extracting an arbitrarily thick slice from the dataset for oblique multi-planar reformatting (MPR) by invalidating all samples lying outside a predetermined offset.

Axis-aligned cutting planes are preferably implemented by restricting the volume traversal to the cuboid of interest. Alternatively, the present invention contemplates restricting this traversal to exclude a simple cuboid from the volume (e.g., visualizing all but one octant of a volume).

In addition to clipping, the present invention further contemplates depth cueing, which modulates the color of objects to simulate, for example, atmospheric attenuation of light through a translucent medium. This phenomenon, as appreciated by those skilled in the art, is termed fog or haze when the medium also contributes some color (e.g., white or gray). To implement this feature in accordance with the present invention, normally clear regions are preferably replaced with a semi-transparent color (e.g., black for depth cueing, white for fog) by modifying the transfer function. Each final pixel is preferably further attenuated to account for the distance from the viewpoint to the surface of the volume, preferably implemented as a part of warping.

The apparatus of the present invention additionally supports rendering of super-sampled images with a preferred default super-sampling rate of two in the x and y directions, although other sampling rates are contemplated. To improve image quality further, the sampling rate along each ray can also be increased. Neither approach requires re-reading voxels from the 3D memory. The apparatus of the present invention preferably changes the volume traversal order so that voxels already residing in the buffers will be read out repeatedly. Each time they are reused, new weights are preferably utilized in the trilinear interpolation units (TriLin) of the present invention to reflect the new resampling position.

In a preferred embodiment for supersampling in the present invention, central difference gradients are computed between neighbors one distance unit apart to ensure sufficient precision. These gradients are preferably computed by taking the difference first and interpolating afterwards or, alternatively, by interpolating first and then taking the difference between neighbors k positions apart (assuming k times oversampling), and preferably not immediate neighbors. A classification stage must consider the new inters ample distances when computing a new $\alpha'$ value. Therefore, during supersampling, the volume will preferably be traversed in an interleaved pattern within each slice. This essentially ensures that a translucent material (gel) keeps its accumulated opacity (RGB$\alpha$ value) independent of the sampling rate. Thus, for example, for an oversampling factor of k in the z-direction, modified $\alpha'$ values are preferably used, where: $\alpha'=1-(1-\alpha)^{1/k}$.

Anisotropic datasets have different distances between samples along different axes. Thus, the gradient computation and the final two-dimensional (2D) image warp preferably require axis-dependent scaling factors. In addition, the direction in which the sight rays are being cast through the volume dataset preferably require adjustment to account for the implicit volume scaling, which occurs when storing anisotropic data in an isotropic grid. The $\alpha'$ value is preferably adjusted according to the direction-dependent distance d which a sight ray travels through a voxel cell. The corrected $\alpha'$ is $\alpha'=1-(1-\alpha)^d$, with the direction-dependent distance d preferably being in the range $[1, \sqrt{3}]$.

In addition to the methods for enhancing volume rendering capabilities described herein above, the present invention further provides several unique methods for universal three-dimensional (3D) rendering, including mixing polygons and volumes, voxelization of polygons, rendering multiple overlapping volumes, performing texture mapping and accelerating image-based rendering. These methods are described in greater detail herein below.

An important aspect of the present invention is its unique ability to correctly mix geometric objects (i.e., polygons) and volumes in a single image. The apparatus of the present invention (i.e., Cube-5) preferably leverages conventional geometry hardware to render opaque and translucent polygons together with the Cube-5 volume rendering pipeline.

In a preferred method according to the present invention, to render a scene containing volumes and opaque polygons, all opaque polygons are first projected onto a Z-buffer coincident with a predefined baseplane and having sufficient resolution to match the volume sample distance. Using the Z-buffer, a determination is preferably made as to which slices of the volume are in front of the polygons for each pixel of the baseplane image. The compositing buffer is then preferably pre-loaded (i.e., initialized) with this projected RGB$\alpha$Z (i.e., Z-buffer) image, representing the color and depth image of the polygons. Subsequently, the volume is rendered with z-comparison enabled in the compositing buffer. The depth values of the opaque polygons are checked to keep volume samples which are hidden by opaque polygons from contributing to the final image. Ultimately, the opaque polygons occlude the volume behind, and the volume in front correctly composites over the polygons.

In other words, the compositing buffer is pre-loaded with the z-buffer image $\{C_Z, Z_Z\}$, in accordance with the preferred method of the present invention, where $C_Z$ represents the value of the geometry sample and $Z_Z$ represents the depth of the geometry sample from a predetermined viewpoint. During back-to-front compositing, the resulting output pixel in the compositing buffer, $C_{out}$, will preferably be equal to the geometry sample value, $C_Z$, when the volume sample is behind the geometry (i.e., when the depth of the sample, $Z_S$, is greater than the geometry depth, $Z_Z$). Similarly, during front-to-back compositing, the samples are preferably composited using the Porter-Duff over operator, as appreciated by those skilled in the art. A more detailed discussion of the Porter-Duff a compositing rules are described, for example, in the text *Compositing Digital Images*, by T. Porter and T. Duff, *Computer Graphics (SIGGRAPH* 84), vol. 18, no. 3, pp. 253-259, July 1984, which is incorporated herein by reference. Therefore, the resulting output pixel in the compositing buffer, $C_{out}$, will preferably be equal to the volume sample value, $C_S$, over the geometry sample value, $C_Z$, when the volume sample is in front of the geometry (i.e., when the depth of the volume sample, $Z_S$, is less than the geometry depth, $Z_Z$).

Translucent polygons pose a more complicated situation, since all fragments (both translucent polygon pixels and volume samples) must be drawn in topologically depth-sorted order. This is required because compositing translucent fragments with the over operator is not commutative. Therefore, polygons must be re-depth-sorted whenever the scene or viewing geometry changes. Additionally, the sorting must be topologically correct, including the handling of depth cycles.

Although there are proposed architectures which use an A-buffer to provide some hardware sorting support, implementing an A-buffer in hardware allows only limited depth complexity (i.e., number of overlapping polygons per pixel) in a single pass and is costly. A discussion of a conventional A-buffer algorithm may be found, for example, in the text *The A-Buffer, an Antialiased Hidden Surface Method*, by L. Carpenter, *Computer Graphics (SIGGRAPH* 84), vol. 18, no. 3, pages 103-108, July 1984.

In a preferred method, the present invention adapts polygon rendering to slice order ray casting, and synchronizes the overall rendering process on a volume slice-by-slice basis, rather than a polygon-by-polygon or pixel-by-pixel basis. The Cube-5 apparatus preferably utilizes the geometry pipeline and conventional graphics hardware to render geometric objects in thin slabs that are interleaved or dove-tailed between slices of volume samples 212, as illustrated in FIG. 26.

Figure 26:
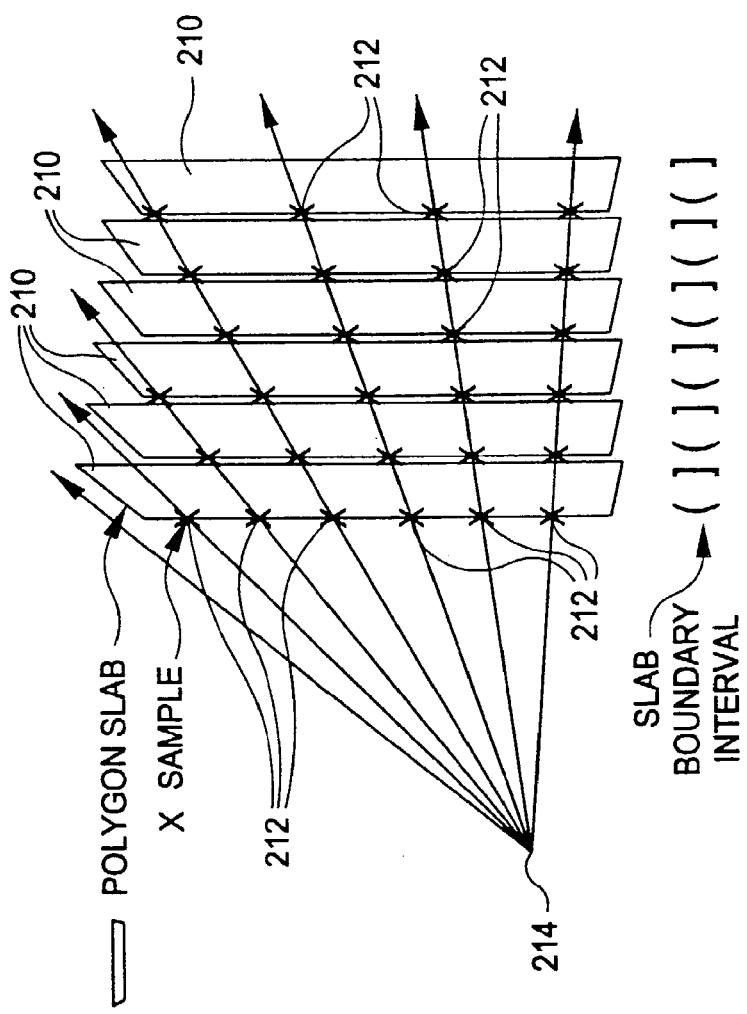
FIG. 26 is a graphical representation illustrating a method for mixing geometric objects and volumes in a single image in accordance with one form of the present invention.

With reference now to FIG. 26, each slice of the volume is preferably sampled in planes perpendicular to the volume storage axes. The planes are drawn in depth order (e.g., using near and far clipping planes) from farthest from the eye or viewpoint 214 to nearest to the eye. Therefore, to mix translucent polygons with volumetric data, thin slabs of the polygons 210 are preferably rendered and composited in between the slices of volume samples 212. It is to be appreciated that the slabs 210 represent all of the translucent objects which lay between two consecutive slices of the volume sample planes. The boundaries of the slabs are preferably defined such that the union of all rendered slabs 210 neither misses nor duplicates any region (e.g., (], (], . . . , (], as shown in FIG. 26). The data from the volume slices and the translucent polygonal slabs 210 are dove-tailed together in an alternating fashion. In this manner, the correct depth ordering of all contributing entities is preserved and use of the over operator to composite them creates correct colors in the final image pixels.

In accordance with a preferred method of the present invention, the opaque polygons are drawn first with Z-buffering. Before drawing any volume slices, the translucent polygons which lie behind the volume extent are preferably drawn over the opaque polygons using any conventional translucent polygon rendering algorithm (e.g., painters). Likewise, translucent polygons which lie in front of the volume are preferably drawn after the mixing portion of the algorithm. Polygons which lie depth-wise within the volume boundary, but to the top/bottom/side of the volume, are preferably drawn in slice order as if the volume slices were planes that extend to infinity cutting the translucent polygons.

OpenGL may be used to directly render the thin slabs of translucent polygonal objects. The polygons are preferably shaded using the Gouraud shading model included in OpenGL. A naive approach would be to render the complete set of translucent polygons for every slab and set the hither and yon clipping planes to cut the current thin slab of data. However, for an $n^3$ volume, there could be up to n thin slabs that must be rendered. Since a typical scene contains very few polygons which span all of the thin slabs, the present invention contemplates an alternative approach which would involve clipping the polygons to the slab boundaries and only rendering the portions of the polygons within each slab. This would substantially reduce the processing load on the polygon pipeline. However, it would require the application to clip every polygon against the two planes of each thin slab which contains that polygon.

Figure 27:
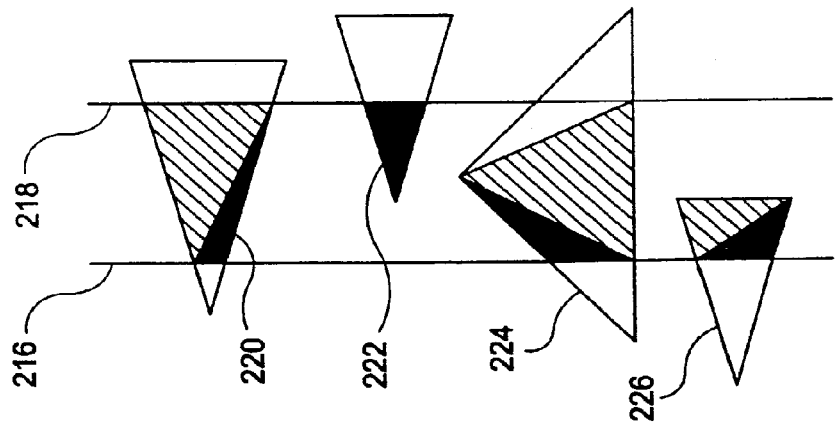
FIG. 27 is a graphical representation of a method for clipping triangles to thin slab boundaries in accordance with one form of the present invention.

As illustrated in FIG. 27, it is contemplated that the present invention may take advantage of the fact that the two clipping planes 216, 218 are parallel to keep only the portions of the polygons which lie between the planes. While this creates fewer polygons than clipping against each plane separately, it still can increase the triangle count dramatically. The first case occurs when a triangle 220 intersects the thin slab, but no vertices are within the slab boundaries 216, 218. When this occurs, one vertex must be on one side of the slab and the other two vertices on the other side of the slab, thus creating a trapezoid which is decomposed into two triangles. Next, consider when one vertex of a triangle is within the slab. In one situation, a triangle 222 intersects the slab such that the remaining two vertices lay on the same side of the current slab, creating only one triangle. In a second situation, a triangle 224 intersects the slab such that the remaining two vertices lay on opposite sides of the current slab. This is a worst case situation, since it produces a pentagon, or three triangles. The final case occurs when a triangle 226 intersects the slab such that two vertices lie within the same slab and once again, a trapezoid is created resulting in two triangles.

Figure 28:
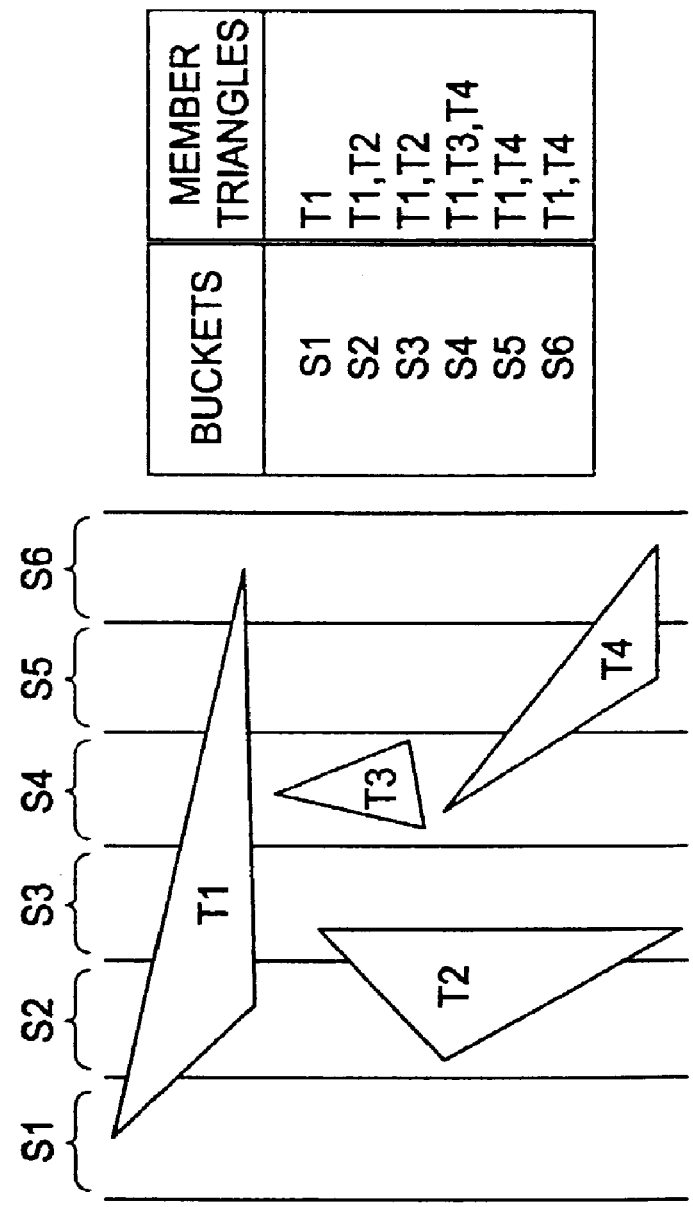
FIG. 28 is a graphical representation of a method for bucket sorting translucent polygons in accordance with a preferred form of the present invention.

In a preferred embodiment of the present invention, a bucket sorting method is applied to the translucent polygons. Whenever the viewing geometry changes, the placement of volume sample planes change their relative positions to the geometry. Therefore, the present invention preferably creates a bucket for each thin slab between two volume sample planes. All of the translucent polygons in a scene are preferably traversed and each of the polygons is placed in a bucket for each of the slabs it intersects. For example, as shown in FIG. 28, triangle T1 is placed in all six buckets since it spans all six slabs S1-S6. Triangle T2 is placed in buckets corresponding to slabs S2 and S3, and likewise for the remaining triangles. For the example shown in FIG. 28, bucketing the four triangles T1-T4 would result in twelve triangles being sent to the graphics pipeline. As a comparison, if the triangles were being clipped to the slab boundaries, twenty triangles would be sent to the graphics pipeline.

An alternative to bucketing is to create an active triangle list similar to the active edge list utilized in scan converting polygons. The triangles may be placed in the active list at the first slice they intersect and removed from the list when they no longer intersect any slices. A data structure is preferably pre-computed which indicates which slice each triangle first encountered. This preprocessing is essentially the same as for bucketing, with the exception that bucketing does not have to check for triangle removal for each slice.

One advantage of the method of the present invention is that for applications which choose to trade off image quality in order to maintain a predetermined frame rate, the number of polygons drawn decreases as the number of slices drawn for the volume decreases. This occurs because the interslice size increases as the number of volume slices decreases. The rendering rate achieved is substantially proportional to the number of polygons drawn and the number of volume samples drawn (which is proportional to the number of volume slices drawn). The image quality degradation resulting from this tradeoff affects only the volume data, similar to taking fewer samples in any volume rendering algorithm.

When mixing translucent geometries and volumes, there exist at least three options for handling two or more translucent polygons being drawn to the same pixel within one thin slab. In the first option, the polygons could be drawn in regular processing order with the over operator. While this method may produce the incorrect color, the amount of color error is limited because the polygons are still sorted by bucketing them into thin slabs.

Another method for handling two or more translucent polygons is to draw thin slabs of translucent polygons between two volume sample slices as on-the-fly voxelization. In conventional voxelization methods, when a surface is 3D scan converted into a 3D volume grid, the resolution of the grid is commonly chosen such that the size of a single voxel represents the smallest area that can be discerned by the human eye when it is rendered. In the X and Y dimensions, the polygons are drawn to screen resolution. In the Z dimension, it is assumed that the volume is being rendered with enough slices such that each volume sample also represents the smallest area that can be discerned by the human eye. Therefore, each pixel bounded by two volume slices in the Z dimension also represents this small area.

In view of the foregoing, a method, performed in accordance with one embodiment of the present invention, may be viewed as computing on-the-fly voxelization by utilizing 3D graphics hardware. Voxelization methods combine polygons into a single voxel by using one of two preferred methods. The first method is to take the max of each color channel. The second method is to take the weighted-max as $$C_v = \frac{(C_{p1}D_{p1} + C_{p2}D_{p2})}{(D_{p1} + D_{p2})}$$

where $C_{p1}$ is the color of a first polygon (polygon 1), $D_{p1}$ is the density of polygon 1, and $C_v$ is the color assigned to the voxel. Many OpenGL implementations, for example, allow max blending with glBlendEquationext(gl_max_ext). Assuming that the density is equal to the alpha value (e.g., linear ramp transfer function for volume rendering), then the colors may preferably be weighted by their alpha values before blending by using a glBlendFunc (gl_src_alpha, gl_one). However, OpenGL is not able to compute the complete previous equation since it cannot divide by the sum of the alpha values after accumulating them.

The third method of drawing two or more translucent polygons to the same pixel within one thin slab may also be considered the most accurate approach. By utilizing one of the previously described methods of the present invention to perform depth sorting, such as BSP tree, proper ordering of all translucent polygons within each slab is maintained. Depth cycles are preferably handled by the BSP algorithm by splitting polygons which span a plane used in the partitioning, and eventually one of the polygons in the cycle is used as the partitioning plane.

As previously discussed, an important feature of the present Cube-5 invention is the unique ability to couple at least one geometry pipeline or engine to the Cube-5 system. In accordance with the present invention, two preferred methods of connecting one or more geometry pipelines to the claimed Cube-5 system on PC-class machines is provided, as described herein below. Both methods allow the unique mixing of opaque and/or translucent polygons with volumetric data.

It is to be appreciated that the opaque polygons are preferably rendered such that, after projection through the volume dataset, warping creates the correct footprint on the final image. Furthermore, the Z-depth values are preferably aligned along the processing axis, so that a volume slice index may be used for the Z-depth check.

Figure 29:
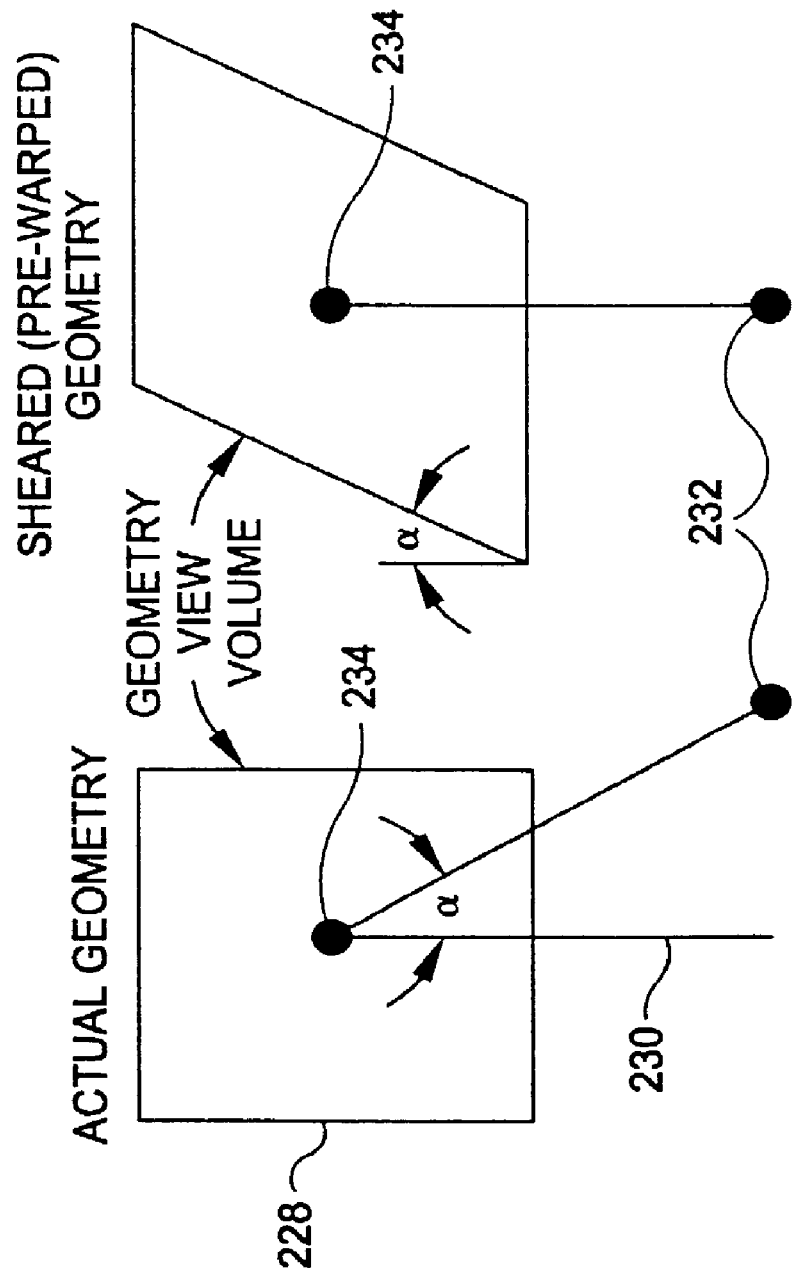
FIG. 29 is a graphical representation of a method, in accordance with one form of the present invention, for creating sheared viewing geometry by pre-warping the polygon footprints.

In accordance with one embodiment of the present invention, a preferred method begins by determining a major viewing axis for the current viewing direction. As illustrated in FIG. 29, a transformation is preferably applied to the geometry 228 so that the major viewing axis 230 is along, for example, the Z-axis. Next, the view or eye point 232 is moved to be along this direction, preferably by rotating the vector between the look-at point 234 and the eye point 232 by a predefined angle α around the X-axis and an angle β around the Y-axis. Preferably, α and β are always in a range between −45 and +45 degrees, otherwise a different baseplane would be chosen. A Z-slice shear transformation along X and Y (also known as a "X and Y according to Z" shear) is preferably subsequently applied to the viewing matrix as follows:

$$\begin{bmatrix} 1 & 0 & \tan\alpha & 0 \\ 0 & 1 & \tan\beta & 0 \\ 0 & 0 & 1 & 0 \\ 0 & 0 & 0 & 1 \end{bmatrix}$$

With this geometry, when the opaque polygons are drawn, the polygon footprints are "prewarped" so that the warping operation at the end of Cube-5 rendering creates correct polygons in the final image. Additionally, the Z-depths computed are preferably proportional to the distances along the processing axis. It is possible (e.g., if all opaque geometry fits within the volume extents) to set the hither and yon clipping planes to the edges of the volume and, if the precision of the depth buffer is the same, the depths computed are exactly the volume slice indexes for depth checking. Otherwise, a simple scaling must be applied when the computed depths are utilized by the volume rendering system. Light positions should be considered when using this method, however, as the shearing may not move the lights to the correct location.

The thin slices of translucent polygons preferably align geometrically with their 3D positions in space. Preferably, the eye point is first aligned as previously described. Next, in order to keep the objects from projecting all the way to the final image plane, the geometry is preferably translated such that the center of the current thin slab is at the Z=0 plane prior to shearing. Clipping planes allow only the current thin slab to be rendered and the projection plane is set to be within the two volume slices which border that region with, for example, glOrtho (glFrustum for Perspective).

Figure 30:
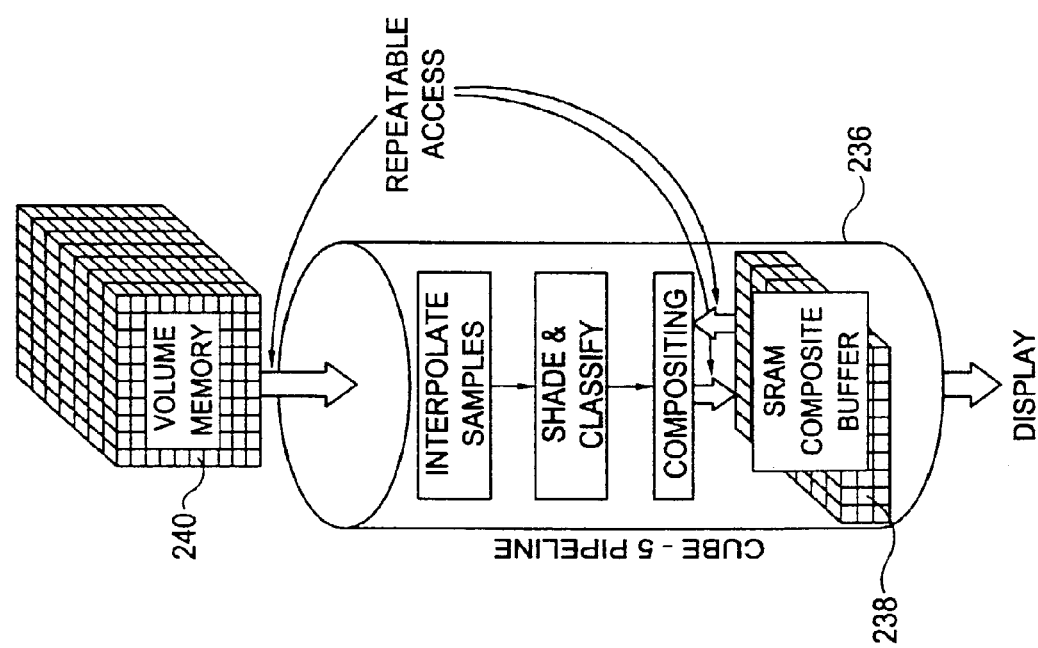
FIG. 30 is a graphical representation of a Cube-5 pipeline, formed in accordance with one form of the present invention, illustrating an SRAM composite buffer included therein.

Important to comprehending the present invention is to understand the organization of frame buffer design and compositing buffer design. As illustrated in FIG. 30, the Cube-5 volume rendering pipeline 236 of the present invention preferably utilizes a tightly coupled on-chip SRAM buffer 238, termed a compositing buffer, to hold the partially composited rays as a volume is processed in slice order. This architecture exploits the regular processing sequence inherent in slice order rendering. Specifically, each slice of the volume 240 is preferably processed in the same order as the previous, leftmost voxel to right-most voxel of each row, and bottom-most row to top-most row of each slice (possibly with some skewing). In this way, the SRAM compositing buffer 238 becomes a simple FIFO queue having a length equal to the size of a slice. The SRAM queue is preferably 32 bits wide to hold 8-bit fixed point RGBα values (called coxels). Each pipeline 236 preferably reads a coxel from the front of the queue and writes a coxel to the rear of the queue for each clock cycle.

Figure 31:
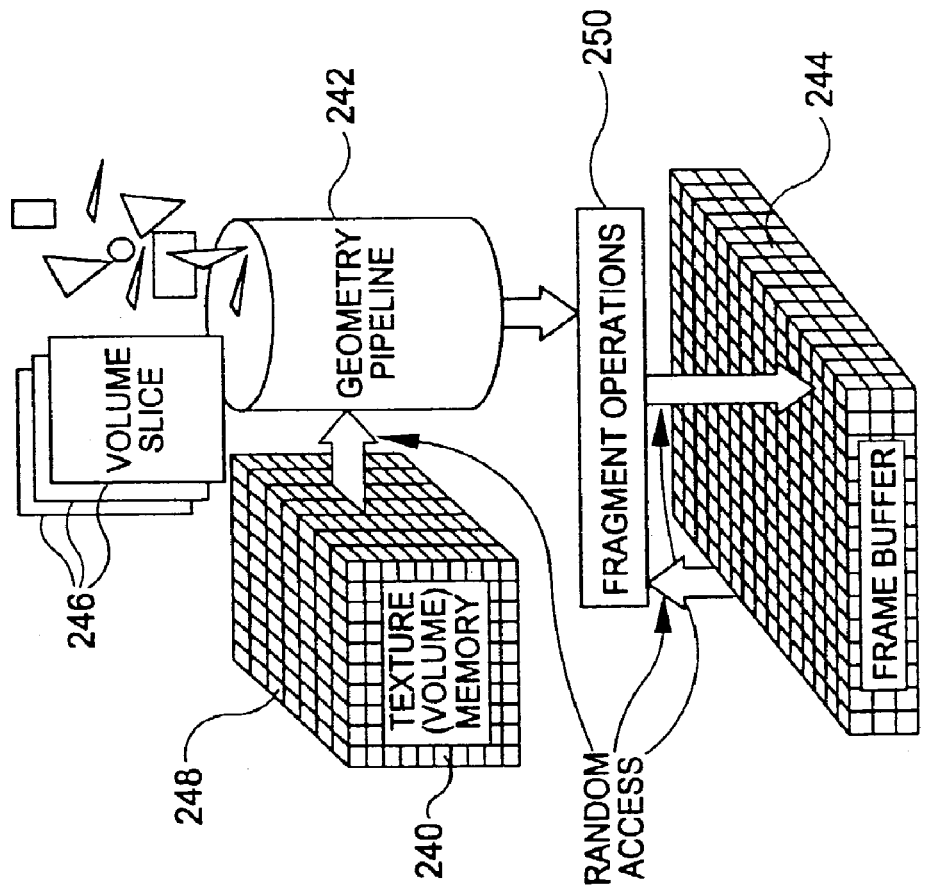
FIG. 31 is a graphical representation of a conventional graphics accelerator, conceptually illustrating the interfaces between the texture memory, frame buffer and geometry pipeline.

In contrast, with reference now to FIG. 31, conventional PC-class geometry pipelines 242 utilize an external DRAM frame buffer 244, which stores the RGBα color values and Z-depth values for each pixel. This frame buffer 244 must support random access, since polygon rendering does not enjoy the regular access ordering inherent in slice-order volume rendering. Normal polygon rendering produces triangles on a screen of average between 10 and 50 pixels. Therefore, the DRAM memory is organized to maximize access to areas of the screen of this size.

As shown in FIG. 31, when the 3D texture mapping method of the present invention is implemented on geometry pipelines 242, volume slices 246 perpendicular to the screen are texture mapped through the volume. The per-vertex geometry calculations for the volume slices 246 are easily achievable with any level graphics hardware. However, the requirement to support random access to both the texture memory 248 and frame buffer 244 limits the performance of this approach to the fill rate achievable with a DRAM frame buffer.

Very high end surface graphics systems typically utilize massive parallelism in the fragment processing section 250 of the polygon pipeline. This, coupled with a highly distributed frame buffer, allow increased fill rate performance.

Figure 32:
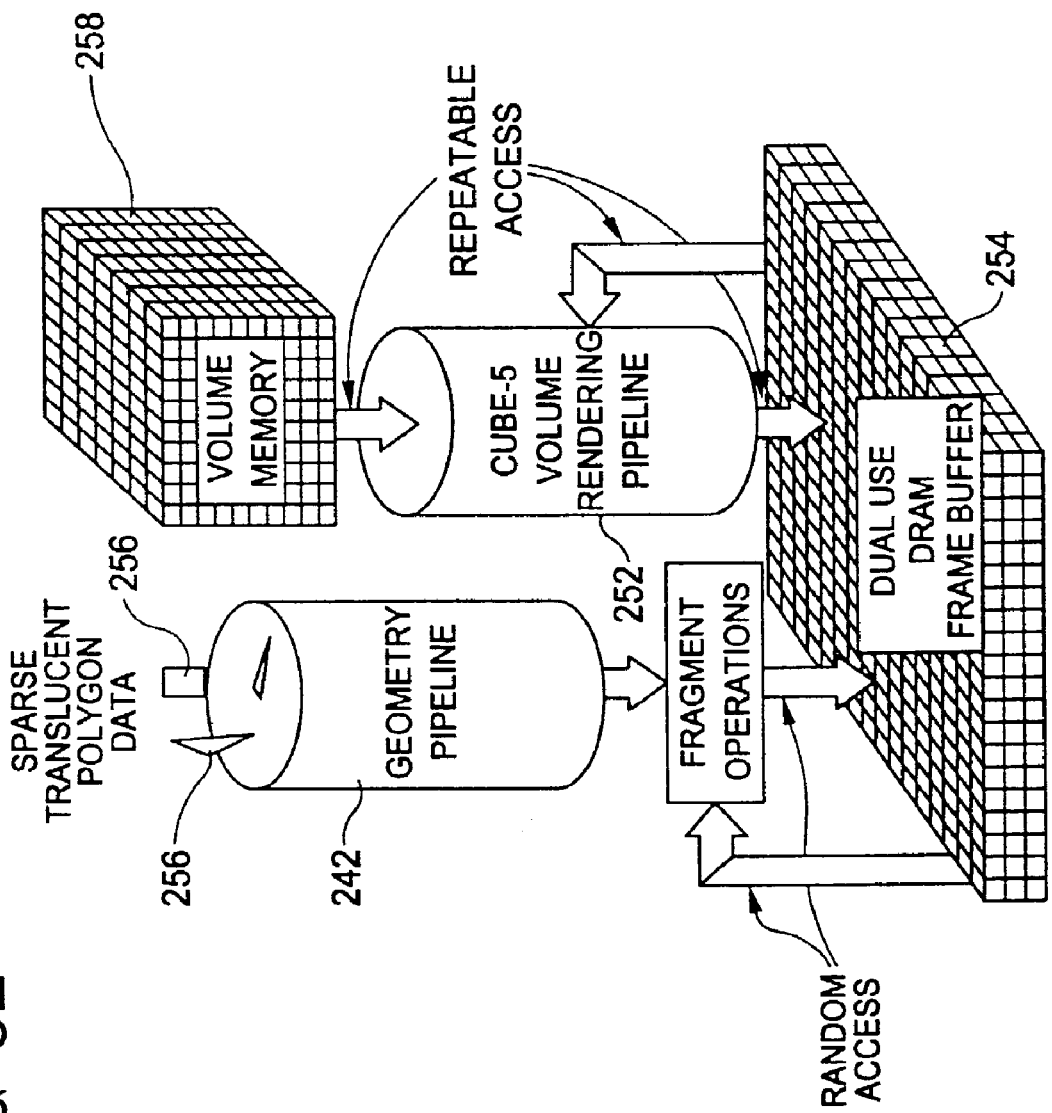
FIG. 32 is a graphical representation illustrating one embodiment of the present invention employing a dual-use DRAM frame buffer connecting a geometry pipeline with the Cube-5 volume rendering pipeline of the present invention.

In FIG. 32 there is shown one embodiment for connecting a geometry pipeline 242 to the Cube-5 volume rendering system 252, according to the present invention. As illustrated in FIG. 32, the SRAM compositing buffer is preferably removed from inside the Cube-5 pipeline 252 and replaced with an external DRAM frame buffer 254. Rather than organizing the DRAM frame buffer 254 as in conventional polygon engines, the memory in the frame buffer of the present invention is preferably organized so that it is specifically optimized for volume rendering. The frame buffer 254 is also preferably accessible from a 3D graphics pipeline 242 to allow mixing of polygonal data 256 with volumes.

With continued reference to FIG. 32, the dual use frame buffer 254 preferably connects the two pipelines 242, 252. In a preferred method, to render a scene with both opaque and translucent polygons and also volume data, the geometry pipeline 242 first renders all opaque polygons with Z-depth. The volume slices, stored in volume memory 258, and thin slabs of translucent polygons are then rendered in an alternating (e.g., dovetailing) fashion-volume slices by the Cube-5 pipeline 252 and translucent polygons by the graphics pipeline 242 (opaque polygons may also be rendered with the same dovetailing algorithm, but with increased demand on the graphics pipeline).

Z-depth checking is preferably utilized to insure correct hidden object removal and blending is set in both pipelines to correctly composite the samples and fragments. The geometry engine 242 preferably performs the final baseplane warp required by the Cube-5 system of the present invention.

The design of the DRAM buffer 254 is critical to achieve, for example, the 503 Million samples per second required for 30 Hz rendering of $256^3$ volume datasets. Therefore, it is helpful to first create a DRAM buffer for the Cube-5 rendering pipeline itself, before discussing connecting the rendering pipeline to a graphics pipeline. The volume rendering system of the present invention is preferably comprised of multiple Cube-5 pipelines. In each rendering pipeline, at every clock cycle, a coxel (compositing buffer element consisting of RGBα) is read from the SRAM composite buffer FIFO and blended with an appropriate compositing equation. The new coxel is then placed at the rear of the FIFO. In a preferred embodiment, the structure of a coxel is changed to contain 32 bits of color, 8 for each RGBα and 32 bits of Z-depth information, 24+8-bit stencil. This configuration is required to handle Z-depth checking in the compositing stage. Assuming that opaque polygon rendering is completed before any volume rendering begins, the 32 bits of Z-depth/stencil information is read, but not re-written. Therefore, for every clock cycle, each Cube-5 pipeline needs to read 8 bytes of coxel data and write back 4 bytes.

Preferably, the rendering pipeline of the present invention utilizes memory chips with a word size of 16 bits. Using this configuration, four words must be read by each pipeline every cycle and two words must be written. To do this would require six 16-bit memory interfaces per pipeline. An emerging technology in synchronous DRAM (SDRAM) chips, which the present invention may avail itself, is known as double data rate (DDR), which reads/writes data at both the rising and falling edges of the clock. Using DDR SDRAMs, the present invention can utilize two 16-bit memory interfaces for reading 64 bits of data per clock and one 16-bit memory interface for writing 32 bits per clock, for a total of three 16-bit memory interfaces per pipeline.

Figure 33:
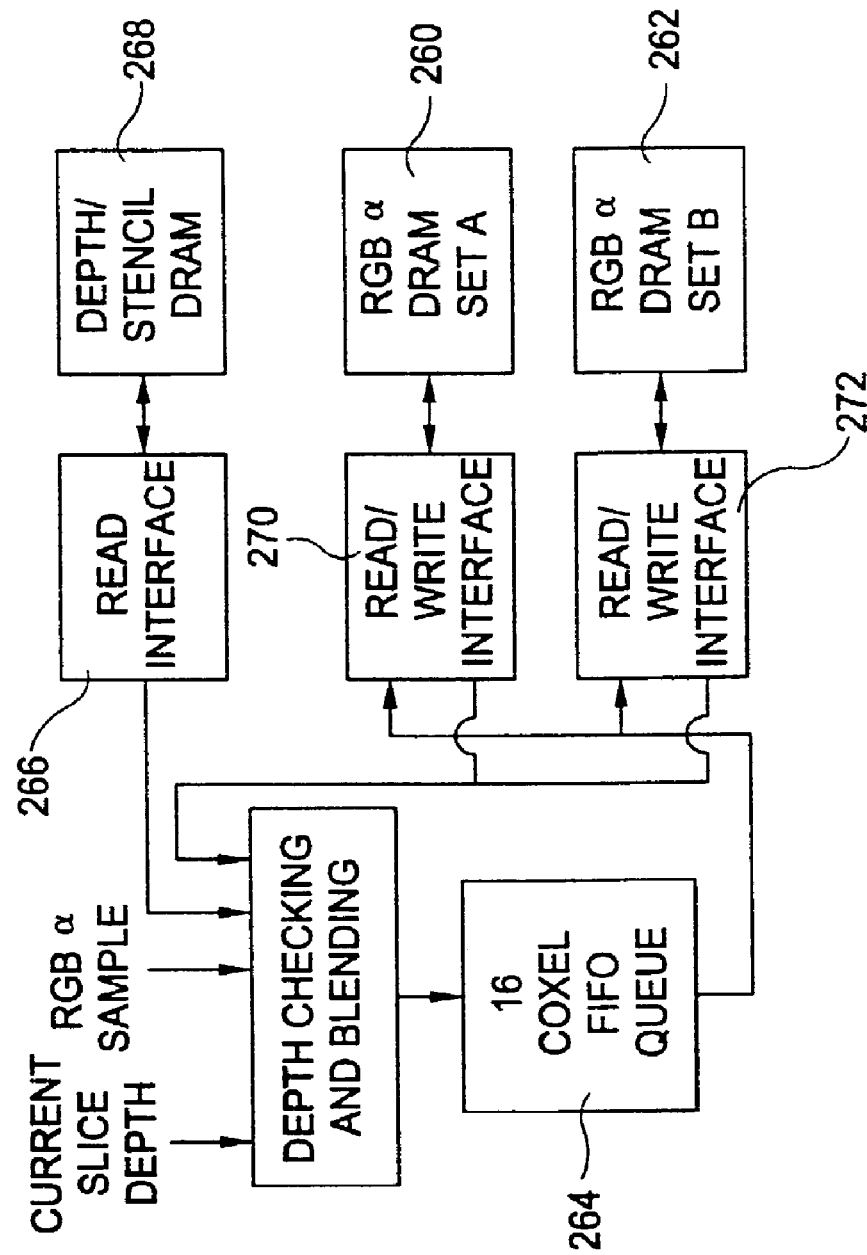
FIG. 33 is a block diagram illustrating memory interfaces for each Cube-5 pipeline including a coxel FIFO queue, in accordance with one form of the present invention.

With reference now to FIG. 33, since a read and write must be performed every clock cycle in order to keep the pipeline full, the present invention preferably reads from one set of fine buffer chips (e.g., set A) 260 and writes to another set (e.g., set B) 262. The Cube-5 system contemplates reading from set A 260 and writing to set B 262 for a complete slice of the volume, and then swapping for the next slice. With this approach, however, each frame buffer chip set would have to be large enough to hold the complete frame buffer. Furthermore, the polygon engine would have to be instructed as to which set is the current set. Therefore, in a preferred embodiment, the present invention alternates reading and writing between set A 260 and set B 262 within a frame and buffers the processed coxels from the read set until it becomes the write set. Since every memory access must be a burst, each burst actually lasts four clock cycles and reads/writes four coxels (i.e., eight words) with 16-bit DDR DRAM chips. The Cube-5 system preferably cycles through all 4 banks to keep the memory bandwidth saturated before writing the new RBGα values back. For this reason, there is preferably a 16-coxel FIFO queue 264 (four coxels for each of four banks) that the newly composited RBGα portions of the coxels are stored in.

There are many different possible configurations for the number of pipelines etc. in the Cube-5 volume rendering system of the present invention. An example for a case of four parallel pipelines creating 12 total memory interfaces will now be discussed with reference to FIG. 33. As shown in FIG. 33, each pipeline contains one read interface 266 to the Z-depth/stencil portion 268 of the frame buffer and two read/write interfaces 270 and 272 to set A 260 and set B 262, respectively, of the RGBα portion of the frame buffer. To render a $256^3$ volume at 30 Hz, each of the four pipelines process 125 million voxels per second. Therefore, a 133 MHZ clock is utilized for the chip and the SDRAM. The mapping of the frame buffer pixels onto the memory chips is critical to the performance. It must match exactly the processing order of the Cube-5 pipelines and the parallel access by four pipelines substantially simultaneously. It is assumed that the skewed memory access of the Cube-5 architecture is "un-skewed" so that the volume samples are in order from left to right across each scanline in groups of four, since it is easier to follow in the explanations. The design can be extended to skewed memory, although the geometry pipeline and screen refresh system must be aware of the additional skewing.

Figure 34:
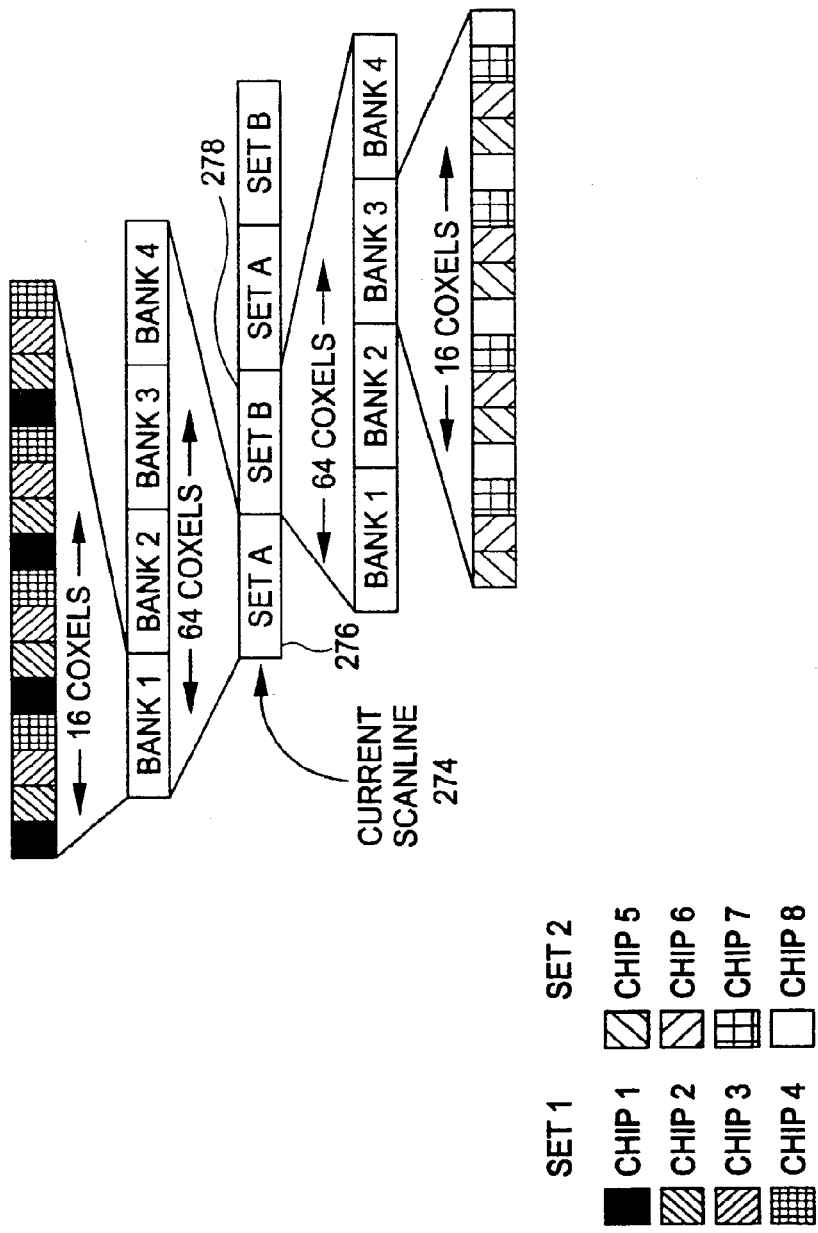
FIG. 34 is a graphical representation of a RGBα coxel layout onto eight DRAM chips, formed in accordance with a preferred embodiment of the present invention.

FIG. 34 shows a preferred layout of the RGBα portion of the coxels in the frame buffer. For a given scanline 274, there is a group of pixels which reside in set A 276 followed by a group of pixels which reside in set B 278, repeated across the entire scanline 274. The length of each set is 64 pixels due to the fact that each set must contain pixels which are read from four different banks inside each chip, and each bank consists of four RGBα values from four parallel chips/pipelines. Thus the pixel data in the frame buffer is interleaved across eight chips; In fine detail, it is really interleaved across only four chips. This provides an interface which reads $$4 \text{ pipelines} \times (1 \text{ } RGB\alpha \text{ chip} + 1 \text{ depth chip}) \times 16 \text{ bits} \times 133 \text{ MHz} \times 2 \text{ data rate} = 34 \text{ Gbits} = 4.15 \text{ Gbytes}$$

of data per second. This surpasses the required $$256^3 \times 30 \text{ Hz} \times 8 \text{ bytes} = 3.75 \text{ Gbytes per second}$$

where eight bytes are organized as four bytes RGBα+four bytes Z-depth/stencil. Additionally, the frame buffer sub-system is capable of writing $$4 \text{ pipelines} \times 1 \text{ } RGB\alpha \text{ chip} \times 16 \text{ bits} \times 133 \text{ MHz} \times 2 \text{ data rate} = 17 \text{ Gbits} = 2.1 \text{ Gbytes}$$

once again handling the $$256^3 \times 30 \text{ Hz} \times 4 \text{ bytes} = 1.8 \text{ Gbytes per second}$$

required for real time 30 Hz rendering of $256^3$ volumes.

This extra bandwidth is not siting idle. The screen must be refreshed from the data in the frame buffer. If we assume a 1280×1024 screen resolution with 60 Hz refresh rate and that all four RGBα bytes are read from the frame buffer (since our burst mode access retrieves them anyway), then $$1280 \times 1024 \times 60 \text{ Hz} \times 4 \text{ bytes} = 300 \text{ Mbytes}$$

are read from the frame buffer per second. Only the RGBα portion of the frame buffer is required for refresh. Therefore, the refresh data is read from eight chips. It is sufficient to perform ten data burst reads/writes (depending on set A or set B) to each chip followed by one read of data for refresh. This distribution of memory accesses provides the refresh hardware with a consistent (although bursty) stream of data. The Cube-5 pipelines also contain a small percentage of excess cycles, and thus will not lose the ability to achieve 30 Hz $256^3$ rendering when the memory sub-system is temporarily stalled for refresh.

An alternative approach to connecting a graphics pipeline to the Cube-5 volume rendering pipeline, in accordance with a preferred embodiment of the present invention, will now be described. This preferred connection approach keeps both the graphics pipeline and the volume rendering pipeline working at all times and merges the data in the SRAM compositing buffer inside the Cube-5 chip. At any given time, the volume rendering pipeline is compositing the current volume slice with the previous thin slab of polygon data over the compositing buffer and the graphics pipeline is rendering the next thin slab of translucent polygons.

The method described herein still utilizes the unique approach of dovetailing volume slices and thin slabs of translucent polygonal data, as previously described herein above. In a first step, all opaque polygons are projected onto a Z-buffer coincident with the baseplane (e.g., the volume face most parallel to the screen). Next, the projected RGBαZ image is loaded into the composting buffer of the volume rendering pipeline. Subsequently, the volume is rendered with a Z-comparison enabled in the composting stage. The thin slabs of translucent polygons are preferably rendered by the geometry pipeline, and their corresponding RGBα data is sent to the volume pipeline of the present invention to be blended into the SRAM composting buffer within the volume pipeline.

Preferably, the composting stage of the volume rendering accelerator is modified to composite two layers (one volume and one translucent polygon) per step, thus not delaying the volume rendering process. This requires the addition of some extra logic. The straightforward formula for performing a double composition of a volume sample v over a translucent pixel fragment p over the old coxel c would require four additions and four multiplies in five stages:

$$C_e = C_v \alpha_v + [C_p \alpha_p + C_c (1-\alpha_p)](1-\alpha_v)$$

However, employing simple math allows the double composition to be calculated with four additions and two multiples in six stages with the following formula (some of the calculations are re-used):

$$C_c = (C_c + (C_p - C_c)\alpha_p) + [C_v - (C_c - C_c)\alpha_p)]\alpha_v$$

As appreciated by one skilled in the art, the hardware designer would choose the option more desirable for a given implementation (i.e., less logic and more stages, or fewer stages and more logic).

Consider the amount of data transferred for a $256^3$ volume. There are preferably 255 slabs plus one buffer in front of the volume and one buffer behind the volume. Each of these 257 slabs contains 256 KB ($256^2$ pixels of RGBα) of data. This equates to 64 MB being read from the Same buffer and transferred between the two sub-systems each frame. To achieve a 30 Hz frame rate would require a bandwidth of 1.9 GB per second. While this much data could be transferred with sufficiently wide channels, it must also be read from the frame buffer. It would be virtually impossible to read this much data without changing the organization of the current DRAM frame buffers. Additionally, the frame buffer must be cleared 257 times per frame.

To solve this bandwidth challenge, the present invention preferably uses run-length encoding (RLE) of the blank pixels. With this method, each scanline is encoded separately and a "run-of-zeros" is encoded as four zeros (RGBα) followed by the length of the run. Since typically only a small percentage of the polygons in a scene are translucent, the translucent polygon slabs will be relatively sparse. Run-length-encoding just the blank pixels in these thin slabs results in over 99% reduction in the required bandwidth. Preferably, the method of the present invention utilizes RLE on 2D images of sparse translucent polygons to save on bandwidth.

Using this preferred method requires adding hardware to the Cube-5 system of the present invention. Specifically, additional hardware may be included in the volume rendering pipeline that can decode the RLE input stream and create RGBα fragments. However, since these fragments are utilized by the volume pipeline in a regular order, it is preferable to decode the input stream using a double buffer to synchronize the two pipelines. Every clock cycle, a value is output from the decoding hardware. If the volume rendering machine has multiple pipelines (as most current designs do) the decoding hardware is preferably replicated for each pipeline so that they can keep up with pixel demand.

Likewise, RLE hardware at the originating end connected to the geometry pipeline may encode the data in real-time before sending it to the volume pipeline. However, 1.9 GB per second access to the frame buffer would still be required to read all the thin slabs of translucent polygons and clear the frame buffer 257 times per frame. Therefore, a separate frame buffer is preferably employed which stores the data directly in RLE format. Since the thin slabs of translucent data are very sparse, more time is spent clearing and reading than is spent rasterizing. An RLE buffer, while generally not optimal for rasterization, is well suited for both clearing and reading the data. For example, to clear an RLE frame buffer requires merely storing a single run of zeros (in five bytes) for each scanline, instead of writing an entire $256^2$ frame buffer.

To minimize the impact on the current geometry pipelines, the RLE frame buffer is preferably implemented using the emerging technology of embedded DRAM and connecting it in parallel to the normal frame buffer. This differs from conventional encoding algorithms which typically assume that the data was given in physical order. Triangle rasterization, however, does not guarantee any ordering of the fragments. Therefore, the apparatus of the present invention must be able to randomly insert an RGBα value into an RLE scanline of data.

Figure 35:
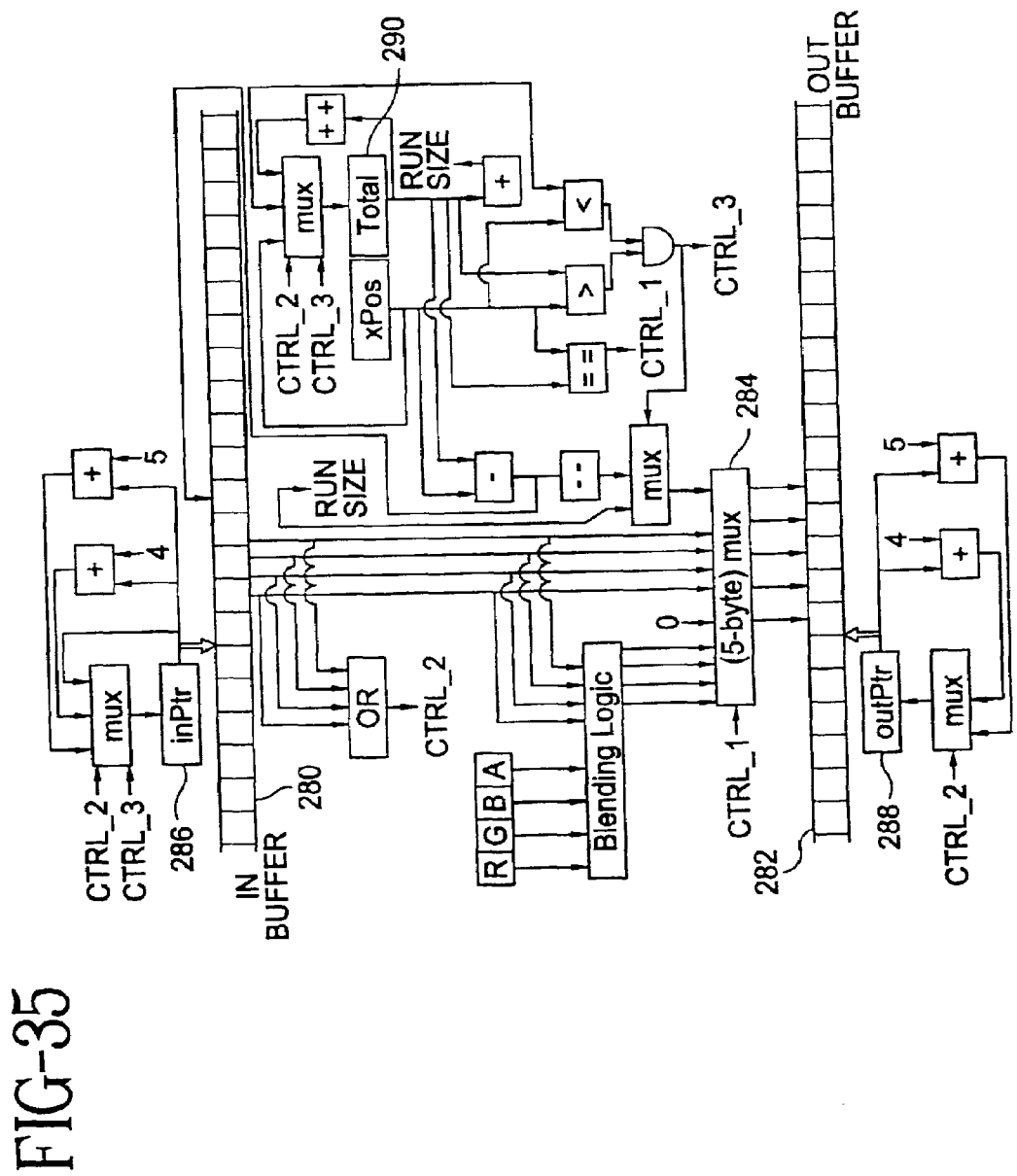
FIG. 35 is a partial block diagram representation of an embedded DRAM chip implementation of run-length encoding (RLE) frame buffer hardware, formed in accordance with one form of the present invention.

FIG. 35 illustrates a diagram of an RLE insert, formed in accordance with the present invention. For each fragment, the encoded scanline is copied from one buffer to another, inserting the new RGBα value. Every clock cycle, a single flit (i.e., either an RGBα pixel or run-of-zeros) is processed. The entire scanline is preferably processed flit by flit. With reference to FIG. 35, an input buffer ("in Buffer") 280 holds the current encoded scanline and an output buffer ("out Buffer") 282 holds the newly encoded scanline with the new RGBα fragment inserted. The choice of what to insert at each cycle is preferably performed by a 5-byte multiplexor 284. The apparatus of the present invention preferably includes pointers, namely "inPtr" 286 and "outPtr" 288, which point to the current flit of both the in buffer 280 and out buffer 282, respectively. The logic on the right side of FIG. 35 calculates how much has been processed ("Total") 290 and two of the control points ("ctrl_1" and "ctrl_3"). The other mux control point ("ctrl_2") is calculated by 'OR'-ing together all of the RGBα values (the flag for run-of-zeros). "xPos" is defined as the x position of the fragment. Preferably, a lookup table is implemented of where the current buffer is located in memory for each y value. Thus, the buffer can be moved while inserting new pixels and the table is simply updated. This preferred method is illustrated in the RLE_AddFragment pseudo-code routine of FIG. 36. With continued reference to FIG. 36, the RLE_AddPixelToScanline function demonstrates the processing that occurs in the hardware embodiment of the present invention shown in FIG. 35.

By utilizing an embedded DRAM the present invention takes advantage of the extremely high bandwidth available when processing occurs on the memory chip. The processing is simple enough to be implemented in the DRAM manufacturing process. For example, for a 1280×1024 frame buffer, the maximum amount of memory required is 50 Mbits. This fits onto eDRAM dies with room for over 3 million gates for the encoding hardware.

Figure 37:
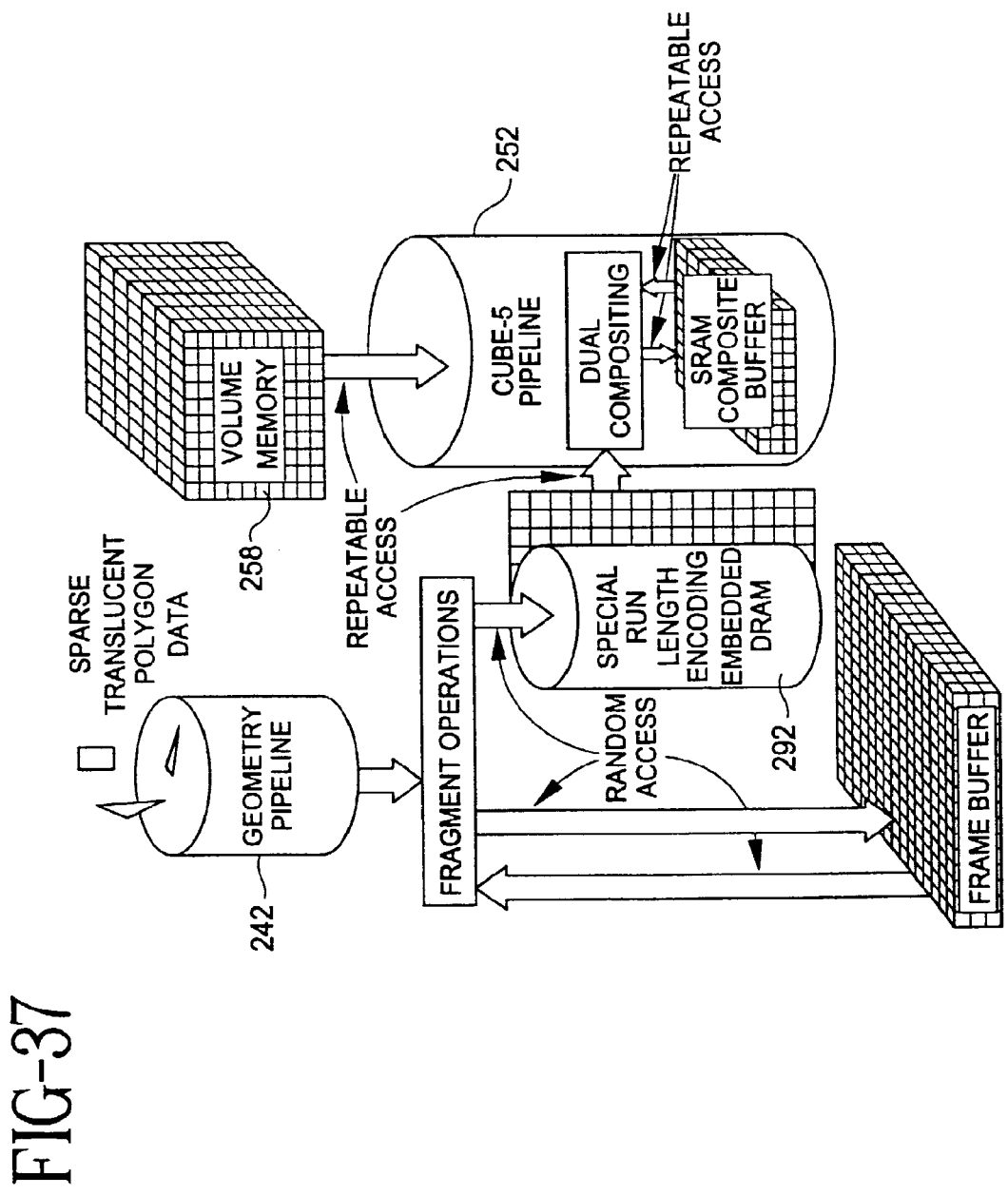
FIG. 37 is a graphical representation of a preferred embodiment of the present invention illustrating a RLE frame buffer connecting a geometry pipeline to an SRAM compositing buffer included in the Cube-5 pipeline.

FIG. 37 is a preferred block diagram illustrating how a polygon pipeline 242 and volume pipeline 252 are connected through the RLE frame buffer 292, which is preferably double-buffered to allow rendering during transmission of data. The auxiliary frame buffer is preferably connected at the same place as the existing one by simply duplicating the fragments, thus not affecting the remainder of the geometry pipeline 242. The volume pipeline 252 also preferably utilizes double buffering to allow receiving of data while blending the previous slab. It is to be appreciated that, using the system of the present invention, volume rendering does not conflict with polygon rendering. Since the volume pipeline 252 always accesses its memory in a repeatable ordered fashion, it achieves the sample fill rate into the frame buffer at a sufficient rate to achieve 30 Hz volume rendering. The system of the present invention utilizes the graphics pipeline 242 to render the opaque polygons before rendering the volume, stored in volume memory 258. This can normally be accomplished concurrently with the rendering of the volume for the previous frame. Even if the polygon engine must render translucent polygons mixed in with the volume, there is usually enough time to render the opaque polygons before the volume finishes due to the small number of translucent polygons in normal scenes.

In accordance with a preferred embodiment of the present invention, a method is provided to incrementally voxelize triangles into a volumetric dataset with pre-filtering, thereby generating an accurate multivalued voxelization. Multivalued voxelization allows direct volume rendering with intermixed geometry, accurate multiresolution representations, and efficient antialiasing. Prior voxelization methods either computed only a binary voxelization or inefficiently computed a multivalued voxelization. The method, in accordance with the present invention, preferably develops incremental equations to quickly determine which filter function to compute for each voxel value. This preferred method, which is described in greater detail herein below, requires eight additions per voxel of the triangle bounding box.

To avoid image aliasing the present invention preferably employs pre-filtering, in which scalar-valued voxels are used to represent the percentage of spatial occupancy of a voxel, an extension of the two-dimensional line anti-aliasing method conventionally known (*Filtering Edges for Grayscale Displays*, by S. Gupta and R F. Sproull, *Computer Graphics* (*SIGGRAPH* 81), vol. 15, no. 3, pp. 1-5, August 1981). It has also been shown that the optimal volume sampling filter for central difference gradient estimation is a one-dimensional oriented box filter perpendicular to the surface. The method of the present invention preferably utilizes this filter which is a simple linear function of the distance from the triangle.

Conventional graphics hardware only rasterizes points, lines, and triangles, with higher order primitives expressed as combinations of these basic primitives. Therefore, it is preferable to voxelize only triangles because all other primitives can be expressed in terms of triangles. Polygon meshes, spline surfaces, spheres, cylinders, and others can be subdivided into triangles for voxelization. Points and lines are special cases of triangles and can similarly be voxelized by the present algorithm. To voxelize solid objects, the boundary of the object is preferably voxelized as a set of triangles. The interior of the object is then filled using a volumetric filing procedure.

As appreciated by those skilled in the art, edge functions are linear expressions that maintain a distance from an edge by efficient incremental arithmetic. The methods of the present invention extend this concept into three dimensions and apply antialiasing during the scan conversion of volumetric triangles.

In essence, the general idea of the triangle voxelization method of the present invention is to voxelize a triangle by scanning a bounding box of the triangle in raster order. For each voxel in the bounding box, a filter equation is preferably evaluated and the result is stored in memory. The value of the equation is a linear function of the distance from the triangle. The result is preferably stored using a fuzzy algebraic union operator, namely, the max operator.

Figure 38:
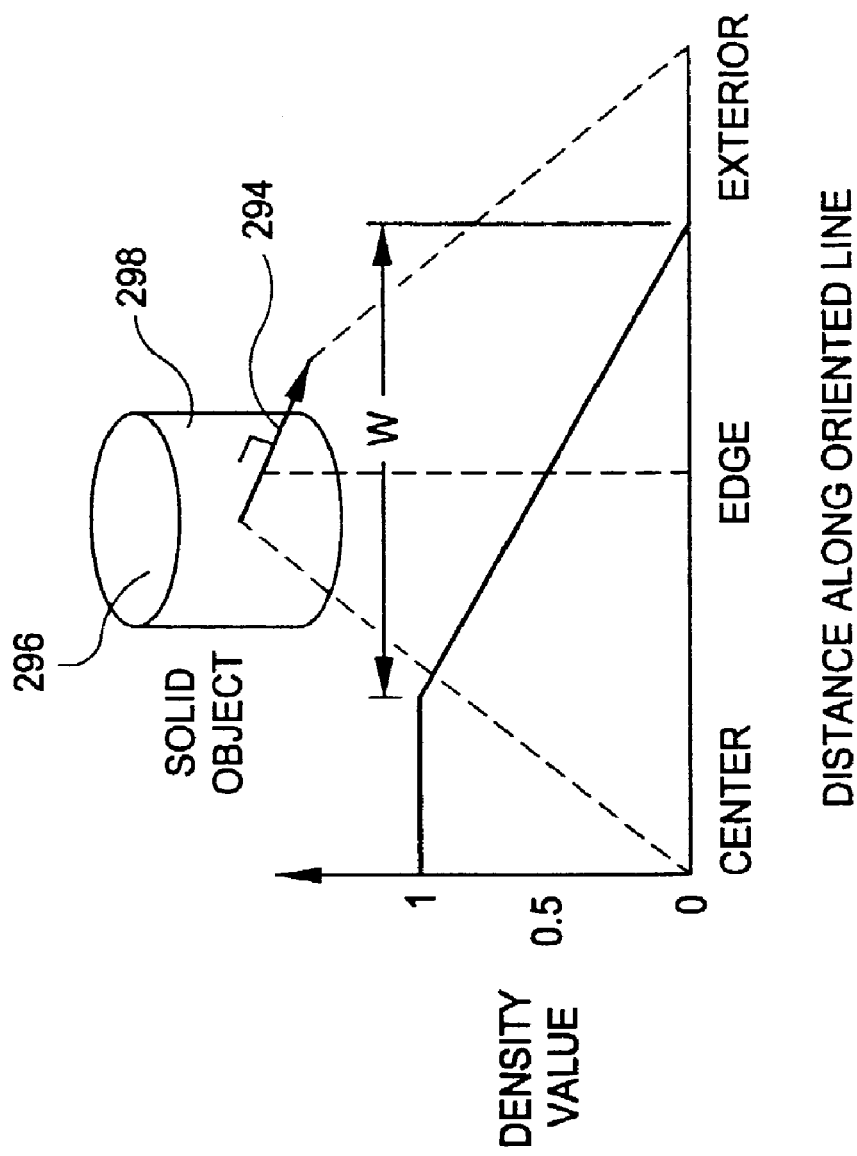
FIG. 38 illustrates a density profile of an oriented box filter taken along a line from the center of a solid primitive outward, perpendicular to the surface, in accordance with one form of the present invention.

With reference now to FIG. 38, there is shown a density profile of an oriented box filter along a line 294 from the center of a solid primitive 296 outward, perpendicular to the surface 298. The width of the filter is defined as W. The inclusion of a voxel in the fuzzy set varies between zero and one, inclusive, determined by the value of the oriented box filter. The surface 298 of the primitive 296 is assumed to lie on the 0.5 density isosurface. Therefore, when voxelizing a solid primitive 296, as in FIG. 38, the density profile varies from one inside the primitive to zero outside the primitive, and varies smoothly at the edge. For a surface primitive, such as the triangle 300 shown in FIG. 39, the density is preferably one on the surface and drops off linearly to zero at distance W from the surface. Although the present invention similarly contemplates the voxelization of solids, the voxelization of surfaces will be described herein.

Figure 39:
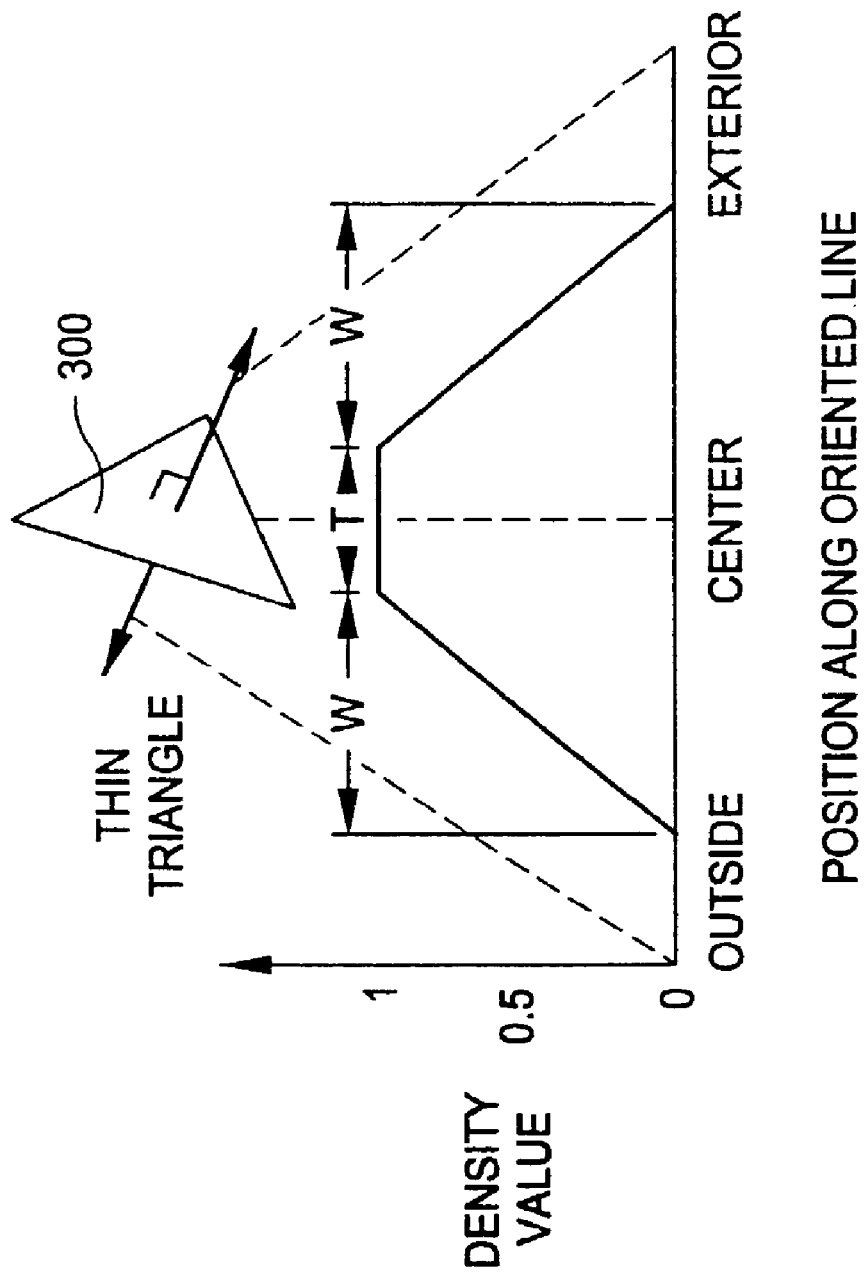
FIG. 39 illustrates a density profile of an oriented box filter taken along a line perpendicular to a triangle surface primitive, in accordance with another form of the present invention.

With continued reference to FIG. 39, it has been determined that the optimum value for filter width W is $2\sqrt{3}$ voxel units (see e.g., *Object Voxelization by Filtering*, by M. Srámek and A. Kaufman, 1998 *Volume Visualization Symposium*, pp. 111-118, IEEE, October 1998). For shading, the normal is preferably estimated by computing the central difference gradient at the 0.5 isosurface. Because the overall width of the central difference filter is at most $2\sqrt{3}$ units, a correct gradient is found on the 0.5 density isosurface. The thickness of the triangle 300 may be defined as T. Normally, T can be zero, unless thick surfaces are desired. By thresholding at 0.5 density, a 6-tunnel-free set of voxels is generated when $W \geq 1$. This property is useful for volumetric filling (e.g., in order to generate solid objects).

All voxels with non-zero values for a triangle are preferably within a bounding box which is $S=W+T/2$ voxel units larger in all directions than a tight bounding box. Therefore, the first step of the present method preferably determines a tight bound for the triangle 300, then inflates it in all directions by S voxel units and rounds outward to the nearest voxels.

Figure 40:
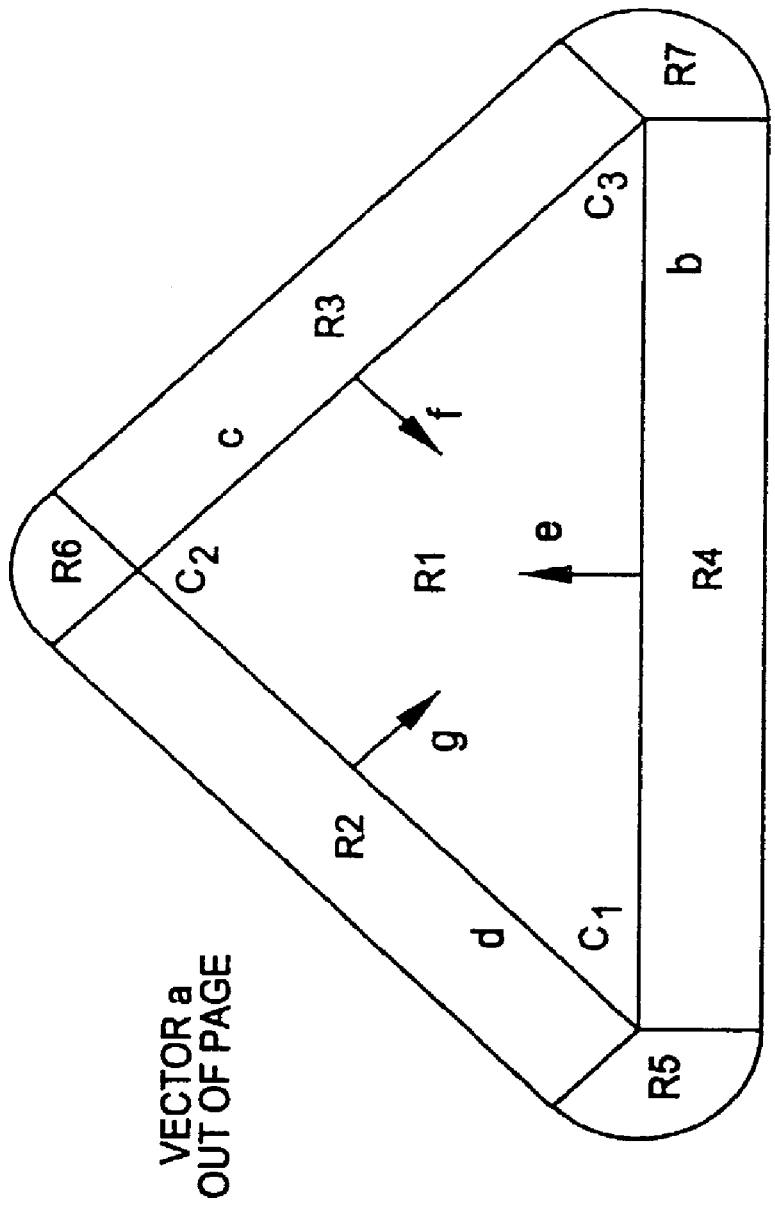
FIG. 40 depicts a two-dimensional illustration of seven voxelization regions for a triangle primitive, in accordance with a preferred embodiment of the present invention.

As illustrated in FIG. 40, the area surrounding a triangle defined by vertices $C_1$, $C_2$ and $C_3$ may be divided into seven regions (e.g., R1 through R7) which must be treated separately. In a preferred method of the present invention, each candidate voxel is tested for inclusion within the seven regions, then filtered with a different equation for each region. In the interior region R1 of the triangle, the value of the oriented box filter is simply proportional to the distance from the plane of the triangle. In regions along the edges of the triangle, R2, R3, R4, the value of the filter is preferably proportional to the distance from the edge of the triangle. In regions at the corners of the triangle, R5, R6, R7, the value of the filter is preferably proportional to the distance from the corner of the triangle.

With continued reference to FIG. 40, the regions R1-R7 are preferably distinguished by their distance from seven planes. The first plane a is preferably coplanar with the triangle and its normal vector a points outward from the page. The next three planes b, c, and d preferably have normal vectors b, c, and d respectively and pass through the corner vertices $C_1$, $C_2$, and $C_3$ of the triangle, respectively. The final three planes e, f, and g are preferably perpendicular to the triangle and parallel to the edges; their respective normal vectors, e, f, and g, lie in the plane of the triangle and point inward so that a positive distance from all three planes defines region R1. All of the plane coefficients are normalized so that the length of the normal is one, except for normal vectors b, c, and d which are normalized so that their length is equal to the inverse of their respective edge lengths. In that manner, the computed distance from the plane varies from zero to one along the valid length of the edge.

For any planar surface, the distance of any point from the surface can be computed using the plane equation coefficients:

$$Dist = \frac{Ax + By + Cz + D}{\sqrt{A^2 + B^2 + C^2}}$$

which simplifies to $$Dist = Ax + By + Cz + D$$

when the coefficients are ire-normalized. This computation can be made incremental so that when stepping along any vector, the distance only changes by a constant. For example, if the distance from a plane is Dist at position [x, y, z], then stepping one unit distance in the X direction chances the distance to $$D'ist = A(x - 1) + By + Cz + D$$
$$= Ax + By + Cz + D + A$$
$$= Dist + A$$

In general, stepping along any vector $r=[r_x, r_y, r_z]$, the distance from the plane changes by $$Dist' = Dist + r \odot [A, B, C]$$

where $\odot$ indicates the dot product. While scanning the bounding box of the triangle, the distance from the plane of the triangle can be computed incrementally with a single addition per voxel. This method, performed in accordance with the present invention, for computing the distance from plane is illustrated by the preferred pseudo-code routine shown in FIG. 41.

The Y-step is more complicated than the X-step because it not only steps one unit in the Y direction, but it also steps back multiple units in the X direction. Consider, as an analogy, the operation of a typewriter which glides back to the left margin of the paper and advances the line with one push of the return key. Similarly, the Z-step combines stepping back in both the X and Y directions and stepping forward one unit in the Z direction. This simple pre-processing step ensures efficient stepping throughout the entire volume. If numerical approximation issues arise, then it is possible to store the distance value at the start of each inner loop and restore it at the end, thereby minimizing numerical creep due to roundoff error in the inner loops.

For multivalued voxelization, seven plane distances are required. Therefore, seven additions are required per voxel to compute the plane distances. Other computations per voxel may include incrementing the loop index, comparisons to determine the appropriate region and, if necessary, computations to determine the density.

Referring again to FIG. 40, in region R1 the density value of a voxel is preferably computed with the box filter oriented perpendicular to plane a. Given a distance DistA from plane a, the density value V is computed using:

$$V = 1 - \frac{|DistA| - T/2}{W}$$

In region R2, the density is preferably computed using the distance from planes a and b $$V = 1 - \frac{\sqrt{DistA^2 + DistB^2} - T/2}{W}$$

Similarly, region R3 uses planes a and c, and region R4 uses planes a and d. Region R5 uses the Pythagorean distance from the corner point $C_1$:

$$V = 1 - \frac{\sqrt{(C_1^x - x)^2 + (C_1^y - y)^2 + (C_1^z - z)^2} - T/2}{W}$$

Similarly, regions R6 and R7 use corner points $C_2$ and $C_3$ respectively.

At the shared edge of adjacent triangles, it is preferable to avoid discontinuities or cracks. Fortunately, the oriented box filter guarantees accurate filtering of the edges for any polyhedra, provided the union of the voxelized surfaces is correctly computed. The union operator can be defined over multivalued density values V(x) with $V_{A \cup B} = \max(V_A(x), V_B(x))$. Other Boolean operators are available. However, the max operator preserves the correct oriented box filter value at shared edges, and is therefore preferred.

The implication of using max in the method of the present invention is that the current voxel value must be read from memory, then possibly modified and written back into memory. Therefore, a maximum of two memory cycles are required per voxel.

The efficiency of the algorithm of the present invention may be further increased by limiting the amount of unnecessary computation because the bounding box often contains a higher percentage of voxels unaffected by the triangle than affected by it. The bounding box can be made tighter by recursively subdividing the triangle when edge lengths exceed a predetermined constant.

To visualize intermixed polygons and volumes, the polygons are preferably voxelized into the target volume and rendered in a single pass. If the polygons move with respect to the volume, then voxelization should occur into a copy of the original volume so as not to corrupt the data. The multivalued voxelized polygon voxels may be tagged to distinguish them from volume data. In this manner, polygons can be colored and shaded separately from other data.

The preferred triangle voxelization algorithm described above is efficiently implemented in the distributed pipelines of the Cube-5 volume rendering system of the present invention. This algorithm adds just a small amount of hardware to the existing pipelines and performs accurate multivalued voxelization at interactive rates. One important advantage of the claimed Cube-5 volume rendering algorithm is that the volume data is accessed coherently in a deterministic order. This feature allows orderly scanning of a bounding box for this algorithm.

Figure 42:
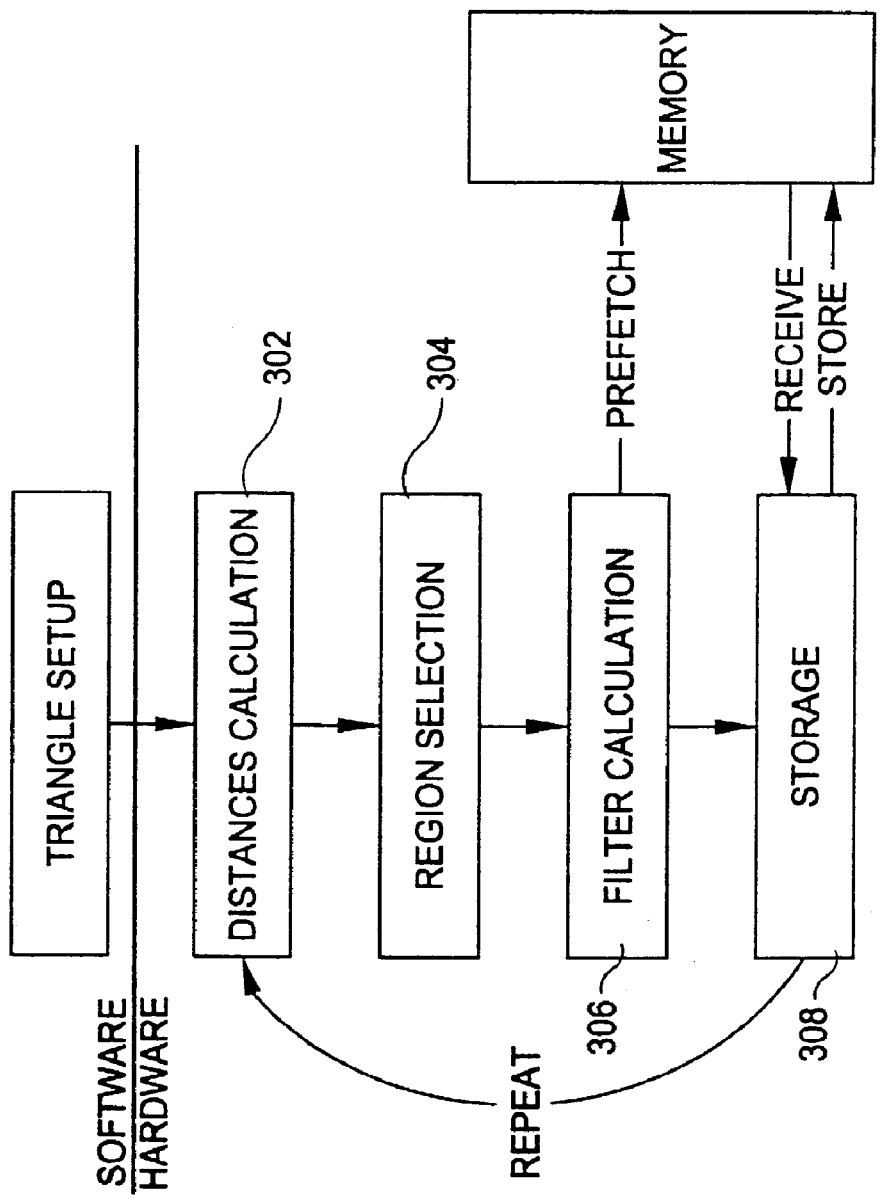
FIG. 42 is a block diagram representation illustrating an overview of a hardware voxelization pipeline, formed in accordance with one embodiment of the present invention.

In FIG. 42, a preferred embodiment of the overall voxelization pipeline is shown, in accordance with the present invention. If on-the-fly voxelization is important, the system of the present invention may preferably include separate pipelines for volume rendering and voxelization. If voxelization can occur in a separate pass, then these volume rendering and voxelization pipelines may be combined, with the voxelization pipeline re-using most of the hardware from the system, in a similar manner as setup is performed on the host system for 2D rasterization.

Figure 43:
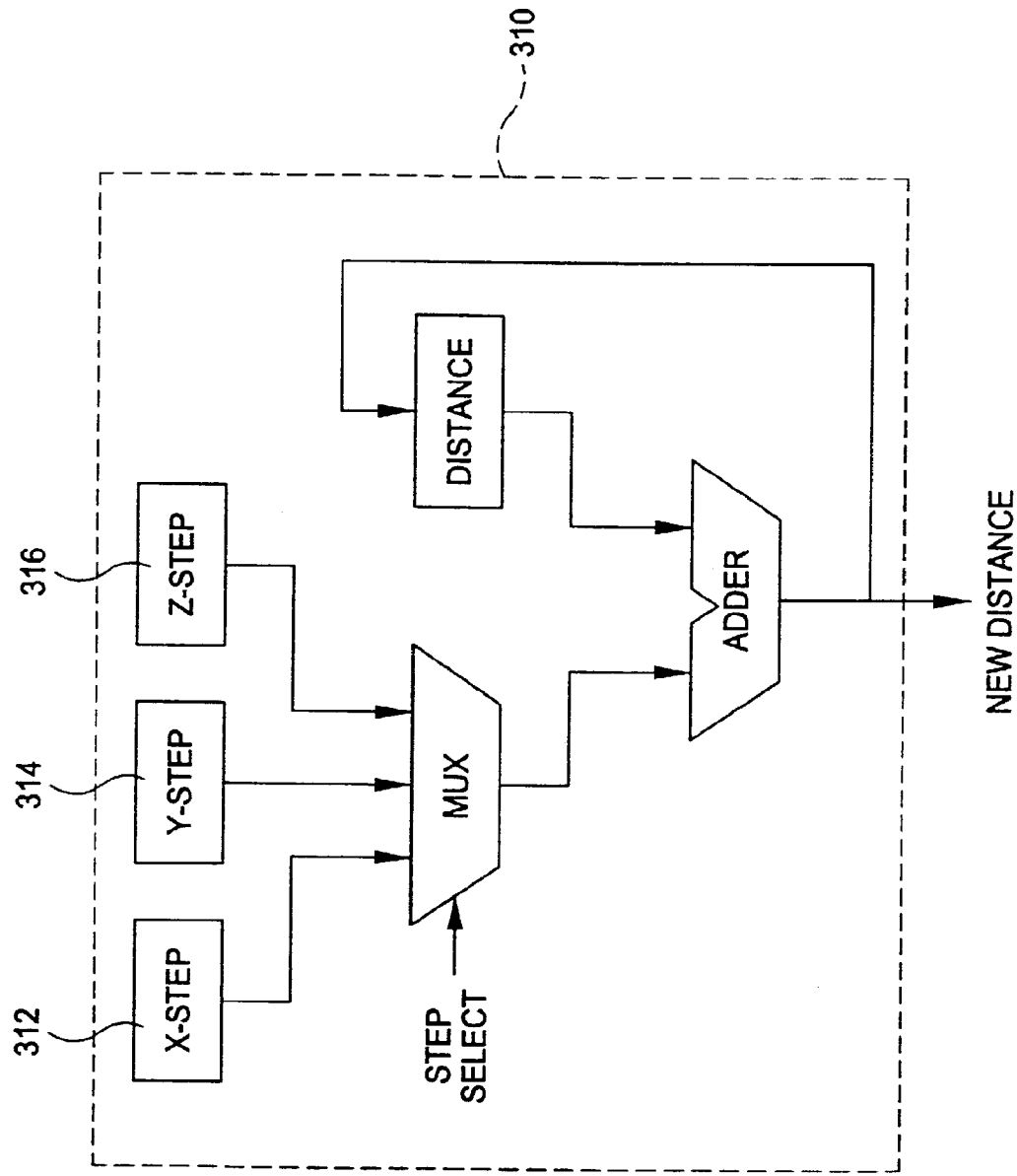
FIG. 43 is a block diagram depicting a distance unit which incrementally computes the distance of a current voxel from a desired plane, in accordance with one form of the present invention.

With reference to FIG. 42, in the first hardware stage 302 of the pipeline, the distances from the seven planes are preferably computed. Seven simple distance units are allocated with four registers for each of the seven planes. Preferably, one register holds the current distance from the plane and the other three registers hold the increments for the X-, Y-, and Z-steps. FIG. 43 shows the distance computation nit 310 for one of the seven planes, formed in accordance with a preferred embodiment of the present invention. This distance computation unit 310 may be included as part of the distance calculation stage 302 of the pipeline (see FIG. 42). The other six units can be essentially identical in design, but hold different values. During each clock cycle of voxelization, the pipeline preferably steps in either teh X, Y, or Z direction (i.e., preforms an X-Step 312, Y-Step 314, or Z-Step 316), thereby updating the current distance according to the direction of movement. The hardware of looping through the volume is already present in the volume rendering pipeline and is therefore re-used here to scan the bounding box of the triangle.

After the seven plane distances are calculated, the resulting values preferably flow down the pipeline. As shown in FIG. 2, the next pipeline stage 304 then preferably determines in which region the current voxel resides. In a preferred embodiment of the region selection stage 304, only seven comparators are needed to determine the outcome of the truth table, due to the mutual exclusion of some cases. For instance, in FIG. 40, from the negative (lower) side of plane b, it is not necessary to test the distances from plane f or g, depending on the value of the distance from plane e.

With continued reference to FIG. 42, after the region has been determined, the next pipeline stage 306 computes the filter function. The filter calculation stage 306 of the pipeline is preferably only activated if the current voxel is within S voxel units of the triangle. Otherwise, the current voxel is essentially unaffected by the triangle and different regions require different calculations, ranging from a simple linear expression to a complex Pythagorean distance evaluation. Since hardware ideally must handle all cases equally well, it is preferred that such hardware be able to perform a square root approximation by means of a limited resolution look up table (LUT). However, the range of inputs and outputs is small, and therefore the size of the required LUT will be small. Furthermore, the Cube-5 hardware of the present invention has several LUTs available for volume rendering which can be re-used for voxelization. Instead of providing three separate units to compute the expression $V=1-(\sqrt{Dist}-T/2)/W$, it is more efficient to roll all the calculations into one LUT. In this case, the input is $Dist^2$, defined over [0,12], and the output is the density value V in the range [0,1].

Due to the mutual exclusion of the seven regions, it is sufficient to provide hardware for only the most complex filter calculation. With reference to FIG. 40, the most complex calculation is the corner distance computation of regions R5, R6, and R7 which, in a preferred embodiment, requires five adders and three multipliers, in addition to the square root LUT previously mentioned. The line distance computations in regions R2, R3, and R4 are simpler, requiring only one adder, two multipliers and the square root LUT. Region R1 requires a single multiply to obtain the distance squared, which is the required input to the LUT.

Referring again to FIG. 42, the final stage 308 of the pipeline preferably computes the max operation using the current voxel value and the computed density estimate. In a preferred embodiment of the present invention, the max operator is simply a comparator attached to a multiplexor such that the greater of the two values is written back to memory. Since most voxels in the bounding box are not close enough to the triangle to be affected by it, memory bandwidth will be saved by only reading the necessary voxels. Further bandwidth savings may be achieved by only writing back to memory those voxels that change the current voxel value. Since there is some latency between requesting and receiving word from memory, the voxel is preferably fetched as soon as possible in the pipeline and the results queued until the memory is received. The final stage 308 is write-back to memory, which can be buffered without worry of dependencies.

The present invention thus far has been described outside the context of skewing, which complicates the traversal. However, the present invention contemplates building skewing into the Y- and Z-step distance update values-Skewing also adds more complexities to the Cube-5 hardware of the present invention. Specifically, when a left-most voxel moves one unit in the Y-direction, placing it outside of the bounding box, the pipeline actually takes p−1 steps in the X direction to keep the voxel within the bounding box. Similarly, when the left-most voxel moves one step in the Z direction, it also moves one step in the negative X direction, which is handled in the same way as before. Therefore, the apparatus of the present invention is preferably adapted to perform skewing by adding fourteen (14) more registers and corresponding logic to determine when the pipeline is currently processing the left-most voxel.

Pre-filtering, which may be performed in combination with the voxelization methods of the present invention, can be used to optimally generate a series of volumes of different resolutions. This technique is useful for rendering images of different sizes; the size of the volume is preferably chosen to correspond to the size of the final image. In this manner, aliasing is avoided at all image resolutions and no unnecessary work is performed rendering parts of a scene not visible at the image scale.

Pre-filtering can additionally be used to model motion blur. For example, as an object sweeps past a camera, it sweeps out a complex volume during the time the shutter is open, causing motion blur. To accurately render motion blur, conventional rendering techniques render multiple images and blend them into a single image. However, this approach is very slow. With pre-filtering, the present invention performs the sweeping operation once, during voxelization, so that motion blur can be rendered in the same time as regular volume rendering. This method works well, particularly for certain cases where the motion is constant (e.g., the same direction and/or rotation). For example, consider a helicopter blade which spins at a constant speed during flight. For example, to voxelize the blade spinning at the rate of 5 Hz for an animation frame rate of 30 Hz, the blade sweeps out an arc of $$\frac{5}{30}(2\pi)$$

each frame. Thus, at the outer edge of the blade, the density value is much lower and the blade appears more transparent than in the center, where it sweeps out a smaller volume and appears more solid. The volume rendering transfer function may be set so that the lower density values appear less opaque and higher density values appear more opaque.

When multiple volumetric objects overlap, the projected image of the volumes becomes quite complex. Consider, for example, a scene where smoke rises up through a cloud. Clearly, the two volumetric objects cannot be rendered separately with the images combined in the final frame. Therefore, in a preferred method, performed in accordance with one form of the present invention, multiple objects are combined into one object for a final rendering pass to create the resulting image.

When two or more objects occupy the same space, the colors from each object are preferably modulated together at each sample location along a projected sight ray. Therefore, it is preferred that each object be classified and shaded prior to being combined, followed by color modulation. If, alternatively, voxel data were combined first, a new transfer function would be required for each possible combination. This latter approach is therefore not preferred.

In accordance with one form of the present invention, a preferred method for mixing multiple overlapping volumes resamples all but the first object in the z-dimension of the first object so that slices of each object become interlaced. This includes a classification, a shading and a transformation which aligns all objects. Object transformations include translation and scaling, preferably performed by the apparatus of the present invention using nearest neighbor connections, and rotation, which is preferably performed using the rotation methods of the present invention previously described herein above.

For scenes containing objects which will not change position or orientation with respect to each other, the present invention contemplates optimizations such as high-level scene graph compilation that can preferably be employed. For instance, static objects are preferably combined once and stored for subsequent rendering, while non-static objects are re-combined each time they are moved with respect to the other objects.

Texture mapping is a widely used technique to simulate high-quality image effects, such as surface details, and even lighting and shadows. In general terms, texture mapping involves mapping a two-dimensional (2D) image onto a three-dimensional (3D) surface. Texture mapping occurs while geometric objects are rasterized onto the screen. The (x, y) pixel coordinates are preferably mapped into (u, v) texture coordinates and an RGBα value is returned as the color value to use for that pixel on the screen.

There are basically two processes involved in texture mapping: a mapping from (x, y) coordinates to (u, v) coordinates, and a look-up into the image of what RGBα value corresponds to a given (u, v) coordinate. The mapping from (x, y) to (u, v) coordinates preferably involves simple matrix multiplication, as appreciated by those skilled in the art. However, the look-up into the image of the (u, v) coordinate to return an RGBα value is complex. The very large scale integration (VLSI) hardware requirements for the texture lookup commonly consume large portions of today's graphics boards, at a significant cost. This is primarily due to the fact that (u, v) coordinates rarely map directly to a discrete image coordinate, called a texel. Therefore, the neighboring RGBα values are preferably linearly interpolated to produce the RGBα value at the exact (u, v) coordinate.

Two-dimensional (2D) interpolations are generally sufficient if the pixel does not cover more than one texel. However, if the mapping produces pixel coverages greater than one texel, artifacts are introduced into the image using the 2D interpolation method. To avoid costly texel combining operations, a technique termed Mip-Mapping may be utilized by conventional graphics pipelines. Mip-Mapping basically consists of storing multiple levels-of-detail (LOD) of an image. Then, when an (x, y) pixel is mapped to a (u, v) texel, the appropriate Mip-Map level texels are chosen so that the pixel is smaller than the texels. A more accurate method is to look-up the four neighborhood texels from both the higher level and lower level of detail texel images and then perform a trilinear interpolation on all eight texels to compute the appropriate RGBα value for the pixel.

Texture mapping hardware from conventional graphics pipelines has been used to accelerate volume rendering and has been the subject of such texts as *RealityEngine Graphics*, by K Akeley, *Computer Graphics (SIGGRAPH 93)*, 27:109-116, August 1993, and *Accelerated Volume Rendering and Tomographic Reconstruction Using Texture Mapping Hardware*, by B. Cabral, N. Cam and J. Foran, *Symposium on Volume Visualization*, pp. 91-98, October 1994. This conventional approach, however, neither achieves the cost-performance nor supports the various functionalities (e.g., shading) of the present invention. Furthermore, using known prior art methods, texture mapping is unscalable without data replication, often employs two-dimensional (2D) rather than three-dimensional (3D) interpolation, downloads datasets slowly, and/or does not support real-time four-dimensional (4D) input.

Figure 6A:
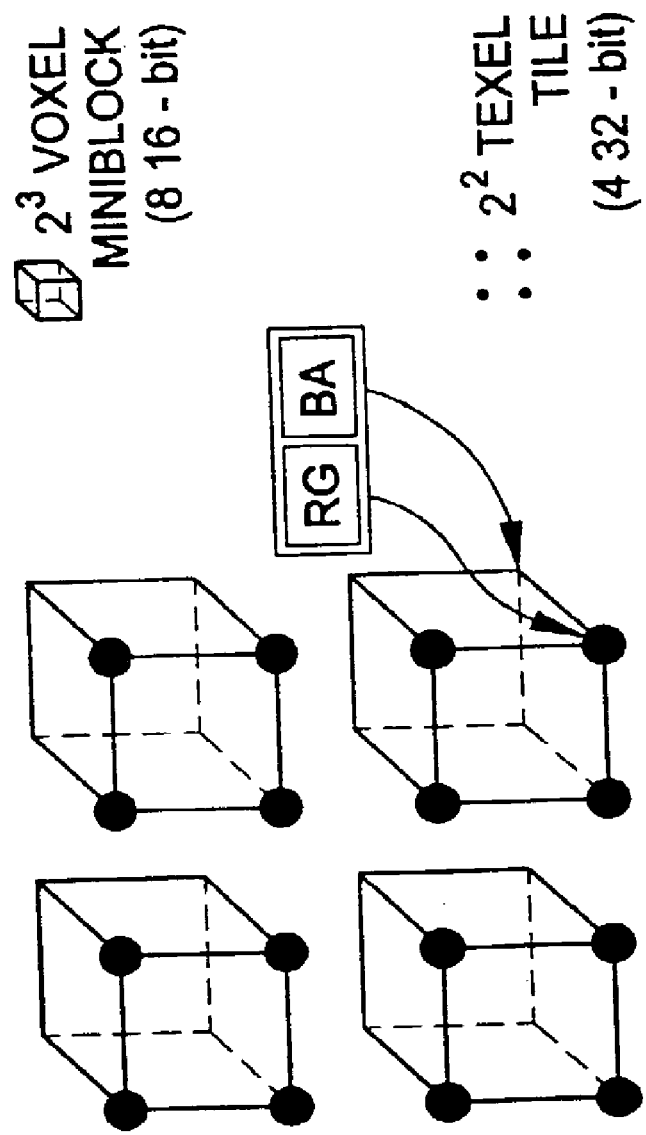
FIG. 6A is a graphical representation showing how 32 bits of texel data is stored for 2×2 neighborhood in a miniblock of 16-bit voxels, in accordance with a preferred method of the present invention.
Figure 6B:
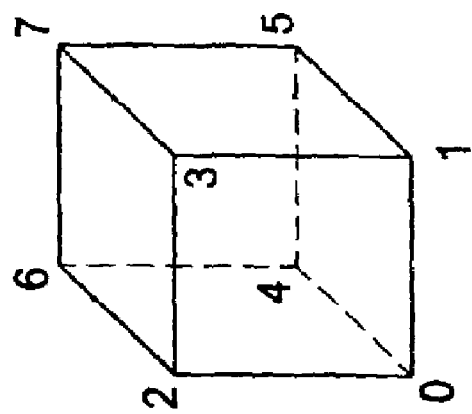
FIG. 6B depicts a tabular comparison of voxel storage and texel storage for the example of FIG. 6A.

In accordance with a preferred form of the present invention, described previously herein above, the Cube-5 apparatus is combined with a conventional geometry engine via the geometry input/output bus 46, 48 (see FIG. 4). Preferably, the rendering pipeline(s) of the present invention are utilized to perform the texture look-up function, while the geometry engine is used for mapping (x, y) pixel coordinates to (u, v) texture coordinates. In simple terms, once combined with the Cube-5 apparatus, the responsibility of the geometry engine is essentially to rasterize triangles, while the apparatus of the present invention preferably provides the high performance interpolation engine for texture mapping. To perform texture look-ups on the apparatus of the present invention, texel data is preferably loaded into 3D memory included within the Cube-5 unit(s). FIGS. 6A and 6B illustrate an example of how 32 bits of texel data for a 2×2 neighborhood are preferably arranged in a $2^3$ subcube of 16-bit voxels.

Another important advantage of the present invention is the ability to enhance image-based rendering. In general, image-based rendering methods render complex scenes from arbitrary viewpoints based on a finite set of images of that scene. Two similar image-based rendering methods, known by those skilled in the art, which use four-dimensional (4D) interpolation without requiring the depth information of the source images are light field rendering and Lumigraph. The high-performance interpolation engine of the present invention may be used to accelerate these two techniques.

Figure 44:
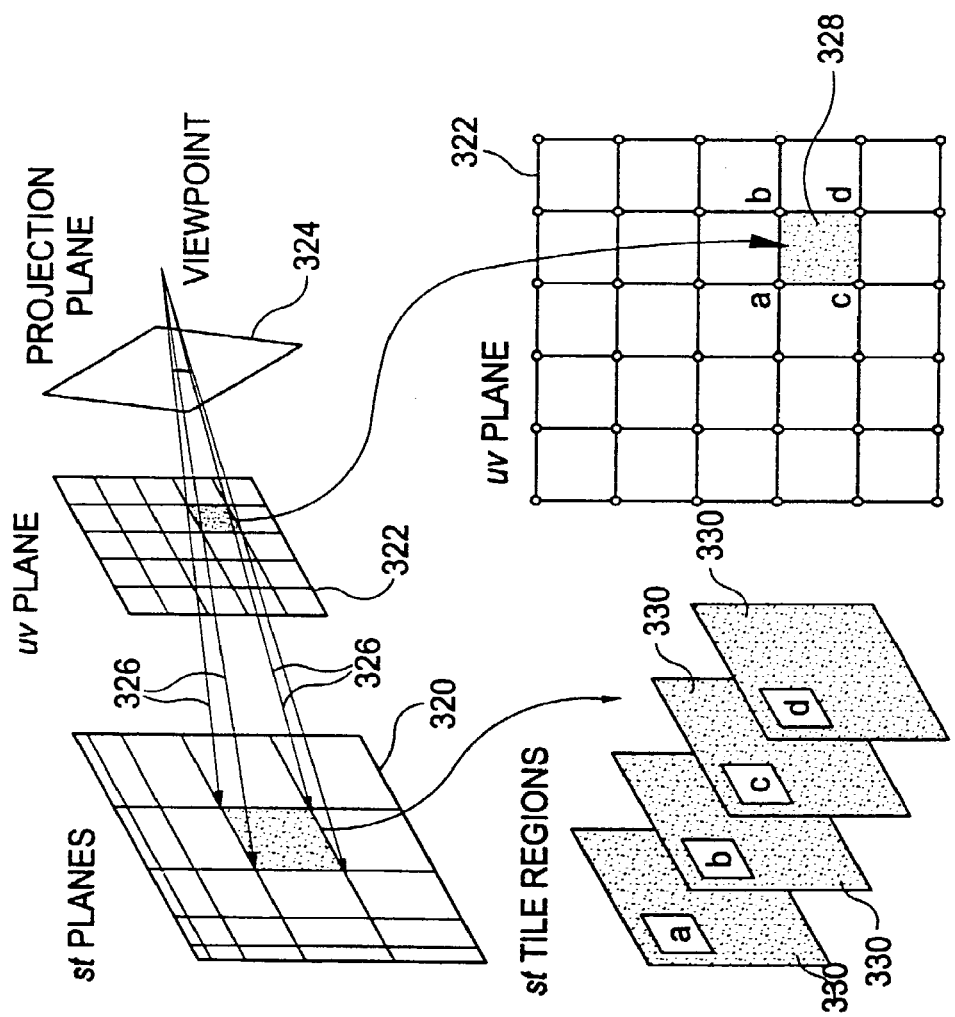
FIG. 44 is a top view graphical representation illustrating a preferred method for performing image-based rendering in accordance with one form of the present invention.

FIG. 44 shows that in light field rendering, the scene is modeled by uv 322 and st 320 planes. Every uv grid point preferably defines a viewpoint and has an associated st image. For every pixel of the projection plane 324, a sight ray 326 is preferably cast into the uv plane 322. The four st images corresponding to the uv grid points surrounding the intersection of the sight ray with the uv plane contribute to that ray. The contributions are preferably calculated by casting a sight ray into each st image through its uv grid point. These rays hit between st image pixels and, therefore, a bi-linear interpolation must be performed for each st image. One final bi-linear interpolation between the four rays yields the final projection plane pixel color. Obtaining every pixel of the projection plane 324, therefore, requires four bi-linear interpolations in st planes 320 and one bilinear interpolation in the uv plane 322, resulting in a total of five bi-linear interpolations. These five bi-linear interpolations are substantially equivalent to one 4D interpolation, or 15 linear interpolations.

Performing lookups for each projection plane ray usually causes random access into the st images. Therefore, in accordance with a preferred method of the present invention, st images are accessed in object order, which is more appropriately adapted for use with the apparatus of the present invention since the Cube-5 apparatus allows reading of each st image pixel only once. With continued reference to FIG. 44, for each quadrilateral 328 in the uv plane (e.g., abcd), its projections on the four st planes (e.g., corresponding to abcd) preferably determine which four tile regions 330 contribute to the final image. All st tile regions 330 are then preferably assembled into four images and are perspectively projected onto the projection plane 324. The final image is subsequently formed by bilinear interpolation among the four projected images. Interpolation weights are preferably determined by the intersection between the original ray and the uv plane 322.

A method and apparatus for generating an approximate perspective projection using a parallel projection will now be described. Many applications for volume rendering require perspective projections to generate usable images. Generally a perspective projection is required when the viewpoint is located close to or inside the object being rendered. For example, in the colonscopy application, the user navigates through a virtual colon. The rendering of an interior view of a pipe-like structure requires perspective projection.

Currently the Cube 5 and Cube-4 architectures discussed above can generate true perspective projections. However, Cube-4 cannot deliver the perspective projections in real-time. The "Cube-4" architecture is described in U.S. Pat. No. 5,847,711 to Kaufman et al. and has already been incorporated herein by reference. Some of the teachings of the Cube-4 architecture have been incorporated into a volume rendering PC board developed by Mitsubishi Electric known as VolumePro. A complete description of the VolumePro board is found in *The VolumePro Real-Time Ray Casting System*, by H. Pfister et al., *Computer Graphics (SIGGRAPH 99)*, pages 251-260, August 1999, which is incorporated herein by reference. A limitation of the VolumePro board is that perspective projections can not be generated. Since the method and apparatus for generating an approximate perspective projection using a parallel projection can be supported by VolumePro a brief description of VolumePro is provided below.

Figure 45:
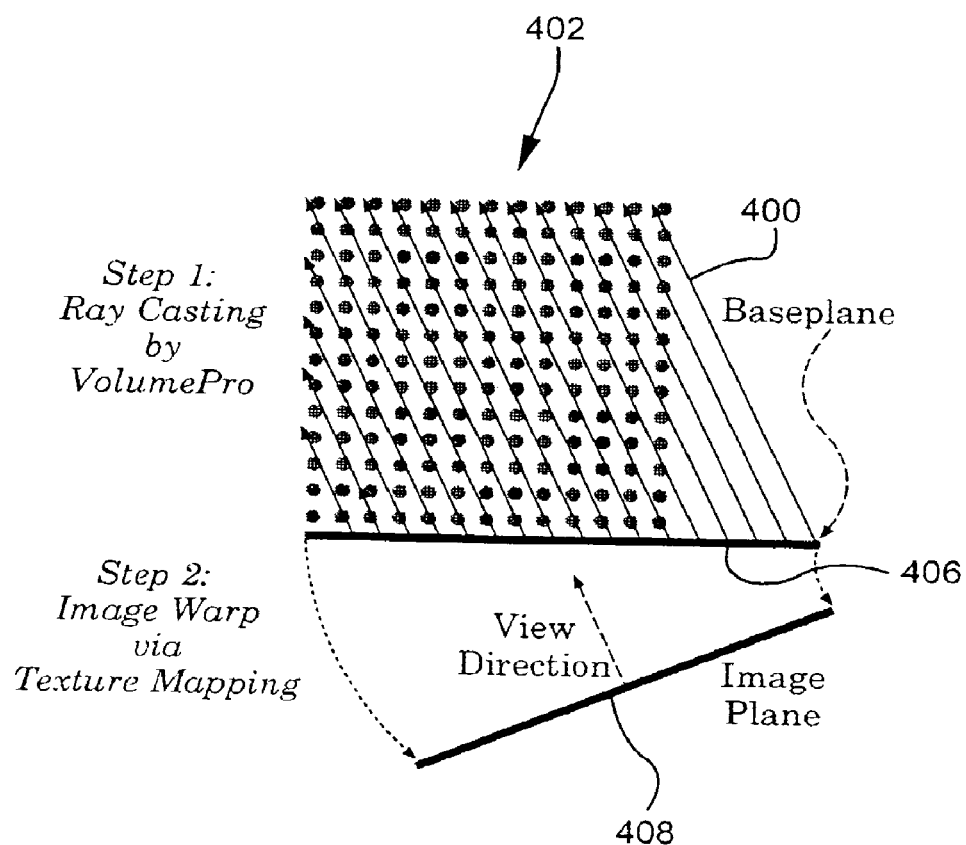
FIG. 45 shows a two step volume rendering using the VolumePro board for ray casting and a 3D graphics card for image warping.

VolumePro is the first real-time volume rendering accelerator for consumer PCs. The ray casting algorithm is implemented in a slice-order method in accordance with the teachings of the Cube-4 technology. Since, trilinear interpolation, gradient estimation, classification, and per-sample Phong illumination are computed in hardware, high quality images are guaranteed. The VolumePro ray casting algorithm provides predictable memory access patterns to maximize memory bandwidth efficiency to standard SDRAM devices. In this design, the parallel rays 400 are cast through the volume 402 along the view direction 404 onto a baseplane 406 which is subsequently warped onto the final image. Referring now to FIG. 45, the process takes advantage of the texture mapping on conventional 3D graphics cards to perform the final warp into the image 408.

Performing volume rendering on a PC with the VolumePro hardware has advantages over existing methods even beyond the cost of a PC versus a high end workstation. First, since hardware acceleration is used, it is much faster than software methods. Secondly, because the board computes per sample illumination, the images are higher quality than 3D texture map based solutions. Unfortunately as noted above, the VolumePro board does not quite meet the stringent requirements for some applications. Since the board is only capable of parallel projections and not perspective projections, projections of "tubes" result in "donuts" being displayed in the final image. In addition, medical datasets—typically 512×512× (100-400)—are too large for the board to render in real time. Fortunately, in endoscopic views of tubular structures large portions of the dataset are obscured. This feature can be used to cull the dataset down to a size which the VolumePro board can handle.

Figure 46:
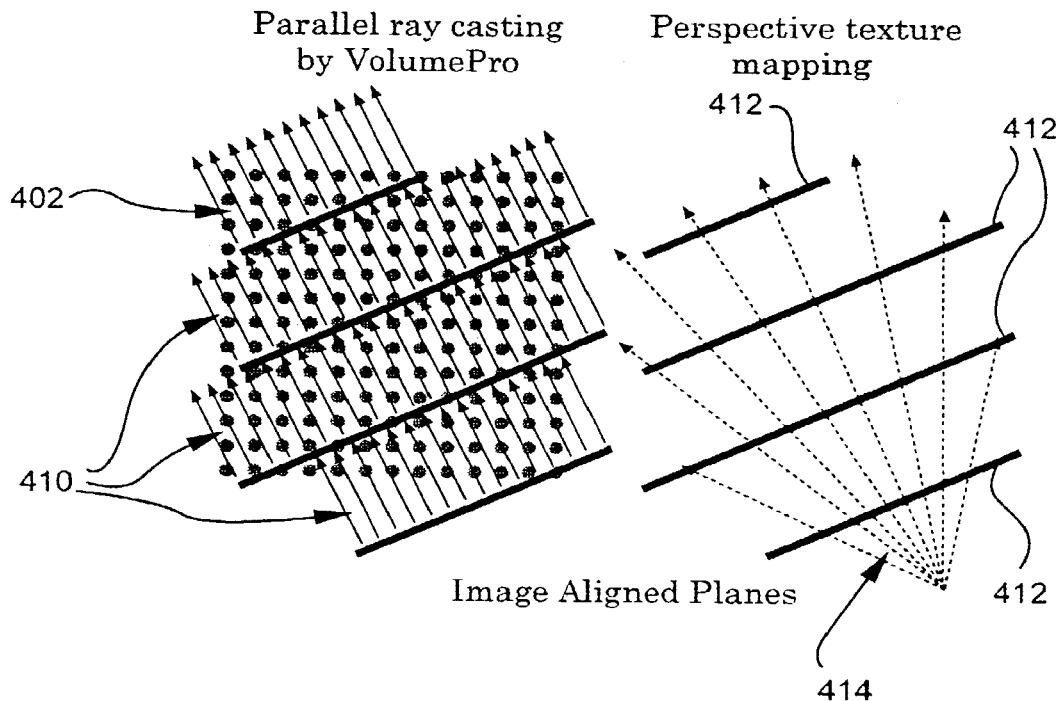
FIG. 46 shows a multipass perspective approximation using slabs aligned in parallel to the image plane.
Figure 47:
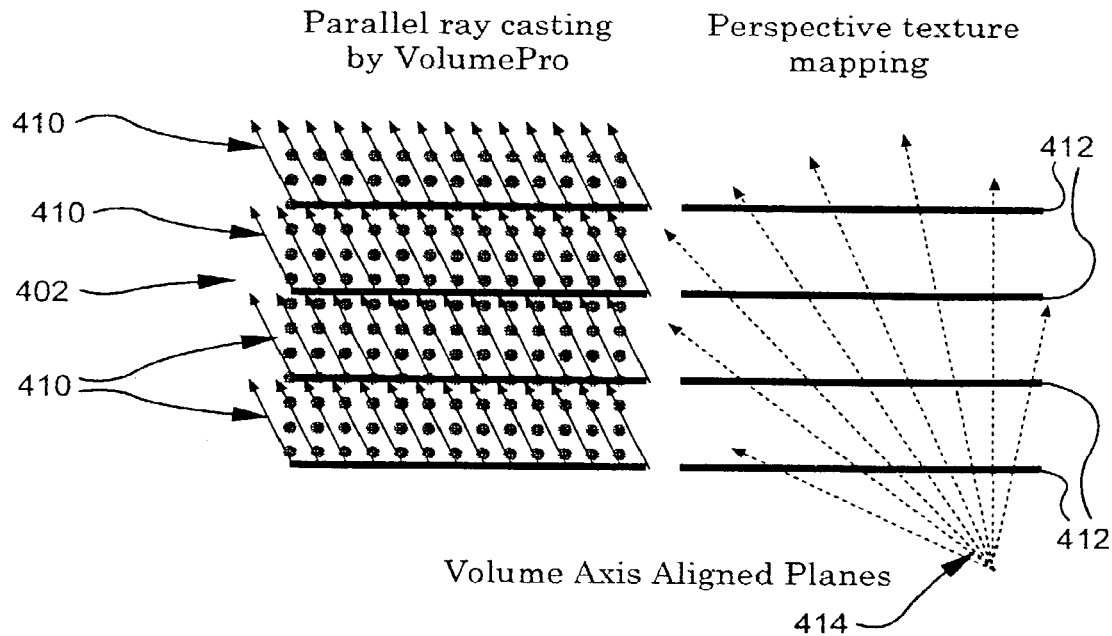
FIG. 47 shows a multipass perspective approximation using slabs aligned orthogonal to a volume axis.

Referring now to FIGS. 46 and 47, the method of generating an approximate perspective projection using a parallel projection generally includes dividing the volume 402 into a plurality of slabs 410. Each slab 410 is a connected set of volume slices along the major viewing direction and is ray cast separately using a parallel projection. The slab images are then texture mapped onto the screen with perspective projection thus providing a perspective impression to the viewer. The rendering and texturing of each slab can be done either sequentially or nonsequentially. In sequential processing, an initial slab is rendered and then textured onto the screen. The remaining slabs are then also rendered and textured onto the screen. In nonsequential processing, all of the slabs are initially rendered prior to the texturing. After all of the slabs are rendered, texturing is performed for each slab. In both sequentially or nonsequentially processing, the order of the processing is not critical. However, preferably the slabs are processed either back to front or front to back to maintain a logical order. The preferred embodiments of the invention will now be described in connection with the commercially available VolumePro board.

In using VolumePro to implement the method of the invention, as noted above initially multiple "thin slabs" 410 of the dataset are rendered into separate baseplane images. Each slab 410 represents a portion of the volume data and is created with parallel projections along the view direction. These images are then composited together by texturing them onto planes 412 placed in 3D space at their respective slab positions and utilize a perspective projection 414 on the 3D graphics card. The slabs 410 can be aligned either parallel to the final image plane as shown in FIG. 46, or orthogonal to one of the three volume axes as shown in FIG. 47.

Figure 48:
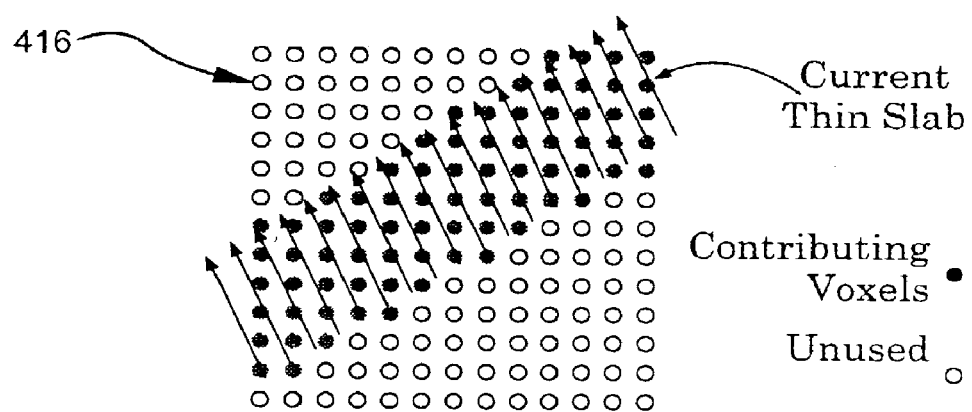
FIG. 48 shows the VolumePro board processing a large axis aligned bounding box with cut planes.
Figure 49:
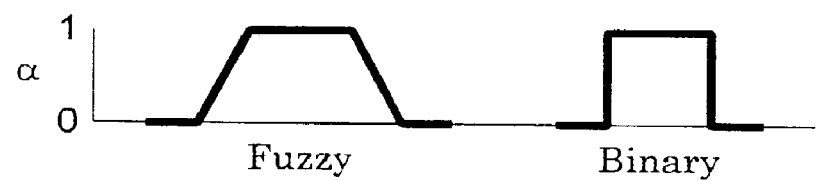
FIG. 49 illustrates that a thick cut plane falloff creates a fuzzy cut plane transition versus a binary inside/outside decision which causes aliasing.

The portion of the subvolume which contributes to the current baseplane image is preferably limited by one of two methods with the VolumePro board. The first method involves utilizing the thick cut plane feature and the second utilizes active subvolumes. The thick cut planes can be positioned and oriented at arbitrary places, while active subvolumes are generally required to be axis aligned and aligned at multiple-32 boundaries (integer positions which are perfectly divisible by 32). Cutplane rendering is implemented on the VolumePro board by simply adjusting the "alpha" value of a sample just before the compositing stage in the pipeline. Referring now to FIG. 48, all the voxels 416 in the entire volume are processed including a portion located outside the thick cut plane. Cutplane rendering is preferred for image-aligned slabs 410 as shown in FIG. 46. Utilizing the thick cut plane feature of VolumePro is preferred because aliasing can be reduced by setting a falloff on the edges of the cutplane. This feature specifies a width to the transition between full and zero opacity creating a fuzzy cutplane instead of binary as shown in FIG. 49. When the slabs 410 are aligned orthogonal to one of the three volume axes, the active subvolume method can provide faster rendering due to the fact that it actually limits the voxels that are processed by the board. Since the slabs 410 must also be a multiple of 32 voxels thick to use the active subvolume method, thick cutplanes are also normally used to further limit the contributing portion of the dataset to the desired thickness.

Referring now to FIG. 50, an algorithm for the image aligned method is shown for use with the VolumePro board. Steps 1 through 5 initialize the cutplane parameters. Steps 7 through 8 start the VolumePro card for the current slab. Step 9 waits for the first render call to finish and step 10 transfers the baseplane image to the 3D graphics card. Steps 11 through 12 place the baseplane image at its position in 3D space and projects/texture-warps it to the screen (blending occurs on the hardware). Step 13 adjusts the cutplane position. The loop in steps 6 through 14 repeats through the entire view space which is the volume dataset intersected with the view frustum. If axis aligned cutting planes are utilized, the computation of the cutplane equation in step 4 changes to determining the baseplane most parallel to the image plane and the transformation of the baseplane in 3D space in step 11 changes to transform by both the cutplane position and orientation instead of just depth.

The individual slabs can be defined by simply spacing them out evenly over the volume so that each slab has substantially the same slab thickness as illustrated in Step 2 of FIG. 50. As discussed above with respect to the ER-Perspective method, it was shown that rays diverge as an exponential function of the distance from the camera. This finding can be used to adapt the number of rays to remain close to the underlying voxel density, defining regions that were twice as thick as the previous region towards the camera. Preferably the slab thicknesses are similarly defined to minimize the artifacts in the image, without creating too many passes for the algorithm.

Since the method of generating an approximate perspective projection is a multi-pass algorithm the rendering is slowed down. Therefore, it is often worth the extra effort to perform tight bounding box culling on the portion of the dataset which contributes to the image. In all culling algorithms (including polygon and other volume methods) there is a computation price paid to calculate the portion of the data which must be processed. The tradeoff between the amount of time spent each frame performing culling operations and the rendering speed increase that the culling produces is used to determine if culling is worthwhile. Since the multipass perspective method incurs a high rendering cost per volume sample, culling algorithms generally payoff to a higher degree. Culling algorithms are mostly application specific, and therefore should be analyzed in a per solution basis. A representative example of a culling algorithm for endoscopic views of medical CT scans is presented below.

Virtual colonoscopy is a non-invasive procedure for mass-screening of patients for small polyps which are the precursors of colo-rectal cancer. In general, this procedure consists of three steps. First, the patient's colon is cleansed (either physically, or electronically) and inflated with air in a way similar to that of optical colonoscopy. Second, while the patient is holding his or her breath, a helical CT scan of the patient's abdomen is taken, capturing a sequence of 2D slices which covers the entire range of the colon. The colon is then viewed either by automatic planned navigation or interactive navigation. While the discussion below focusses on virtual colonoscopy, various other endoscopic procedures are possible using the method to view tubular organs in the human body. For example, Bronchial tubes, the esophagus, arteries, stomach, and the like can all be examined endoscopically on a low cost PC.

Figure 51:
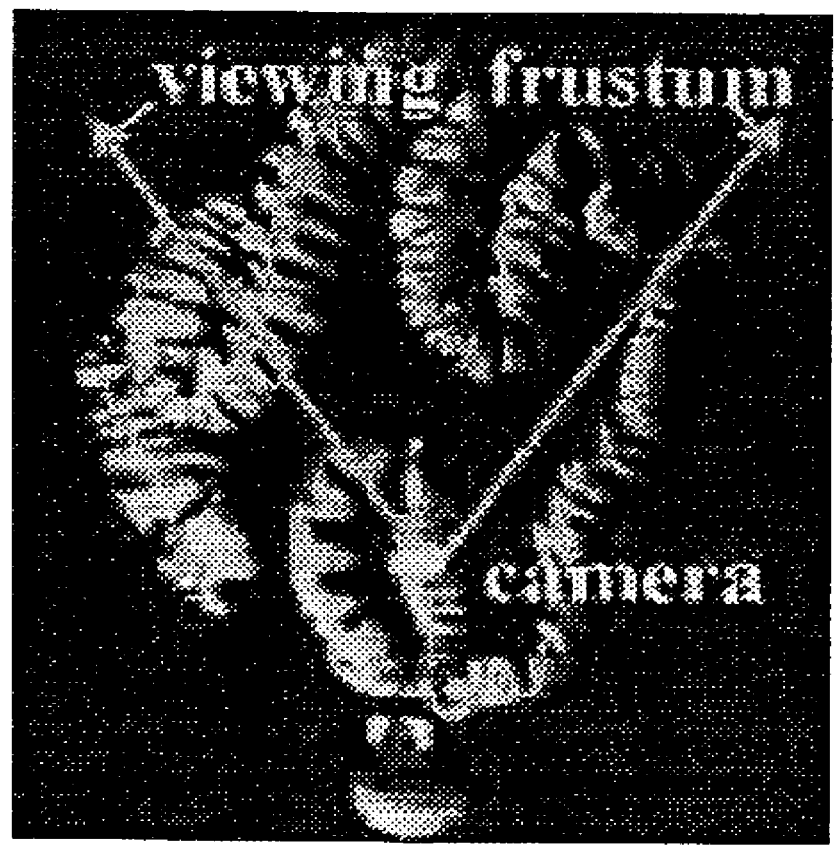
FIG. 51 shows an external overview of a colon used in experimentation.

Typical virtual colonoscopy datasets are 512×512×400. A normal VolumePro parallel projection rendering of this dataset would result in only 5 frames per second. While this is close to interactive frame rates, the multipass perspective algorithm lowers this below 1 frame per second and would result in an unusable system. As noted above, culling portions of the dataset which do not contribute to the final image should be considered for each application. Referring now to FIG. 51, since virtual colonoscopy creates images of twisted tubular structures, only a small portion of the dataset is required for the given camera position because the colon quickly turns outside the view frustum. The portions of the colon that are deeper within the view frustum (higher in the picture) are invisible since the colon wall is rendered as opaque. This feature is used to cull off these portions and render only a small subset of the volume to contain all the visible data from the current viewpoint.

Figure 52:
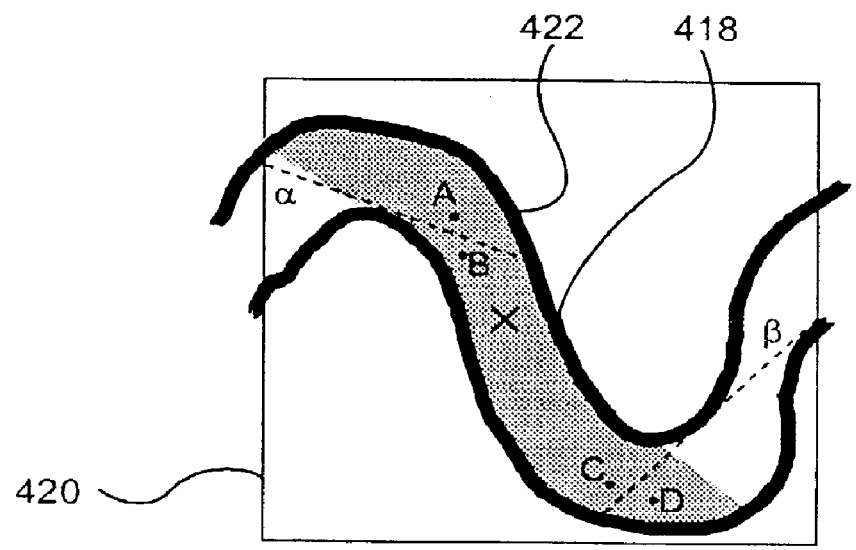
FIG. 52 shows a multiple-32 aligned bounding box for point X also works for points B and C.

Since the caching and queuing on the VolumePro board requires cuboid shaped volumes of multiple-32 boundaries, a cuboid like this is created of all visible voxels for each viewpoint. An apparent method for this would be to prepocess the volume and store, for each possible camera position the visible subvolume. Then when rendering, just lookup and utilize the correct subvolume. For colonoscopy, the camera can move anywhere within the colon dataset. If subvolumes for all voxels within the colon were stored, the subvolume could be used by looking up the "nearest" voxel determined from the current camera location. Unfortunately, there are 2-3 million voxels within a typical colon. This would create a large table to lookup the correct subvolume. Additionally, due to the topology of the colon, many voxels (especially those close to each other) utilize the exact same subvolume. Consider the case shown in FIG. 52. Due to the twisted nature of the colon 422, only the shaded portion 418 is visible from point X. However, when the multiple-32 bounding box 420 is placed around this region, it extends past the boundaries of the shaded region 418. For this reason, other portions of the colon 422 would utilize the same multiple-32 bounding box 420. For example, both points B and C have visible regions completely enclosed by the same bounding box 420. The lines shown in FIG. 52, alpha and beta, are the lines where the visibility changes. This occurs because, for points past these lines (e.g., A or D), the visible region extends past the current bounding box. All viewpoints within the large area between the two dashed lines utilize the same multiple-32 subvolume.

Figure 53:
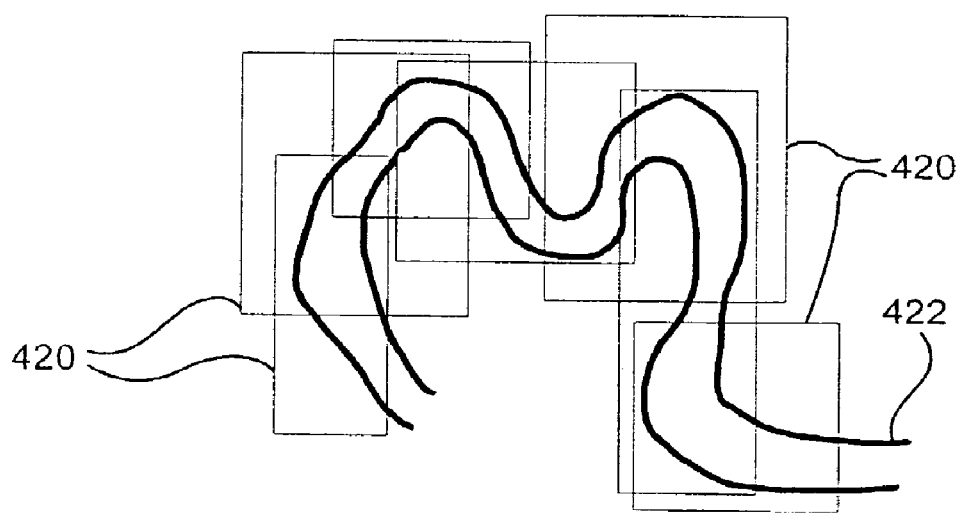
FIG. 53 shows a portion of a colon with overlapping subvolume boxes created with a greedy algorithm.

Referring now to FIG. 53, the subvolumes and regions are created in a pre-processing step by walking through the colon 422 from one end to the other and using a greedy algorithm. The first subvolume which includes all visible voxels from the end of the colon 422 is initially created. The colon 422 is then walked through searching for the first point where we can "see" outside the current multiple-32 subvolume. At this point, a new one is created which encompasses all voxels visible from the new viewpoint. The colon is then walked again. This is repeated the entire way through the colon. When switching from one subvolume to the next, this algorithm always results in overlap as shown in the example bounding boxes in FIG. 53. While this does not create the minimum number of subvolumes, the number created is easily manageable. For example, for the colon in FIG. 51, 49 subvolumes were created with this method. The size of the subvolume rendered is drastically reduced, with the average being two mega-voxels, or the same order of magnitude as $128^3$. Of course the subvolumes are not all exactly cubic (example subvolumes include 160×192×96 or 160×128×128 or 128×96×96). The rendering speed depends on the total count of voxels.

This algorithm provides a good tradeoff between computational effort per frame and resulting rendering speedup. To compute which subvolume to use, a search of an array with 49 distances is performed. A binary search on this array completes essentially instantly. The resulting cull operation reduces the number of voxels to consider from 94 Meg to approx 2 Meg. The pre-processing step using the greedy algorithm to create the subvolumes does not effect the rendering rates. Therefore, a 97.8% reduction in the amount of data needed to be accessed is achieved during rendering with a preprocessing step combined with an essentially unmeasurable computation step during rendering. Since the multipass algorithm accesses each voxel multiple times, the rendering performance increase produced by this culling operation is even more magnified.

The apparatus of the invention is an approximating unit configured with the teachings of the method of the invention. The addressing unit can be, for example, any suitable computer, processor (e.g., digital signal processor, microprocessor, etc.), microcontroller, or circuit designed to be incorporated into a volume rendering system.

Figure 54:
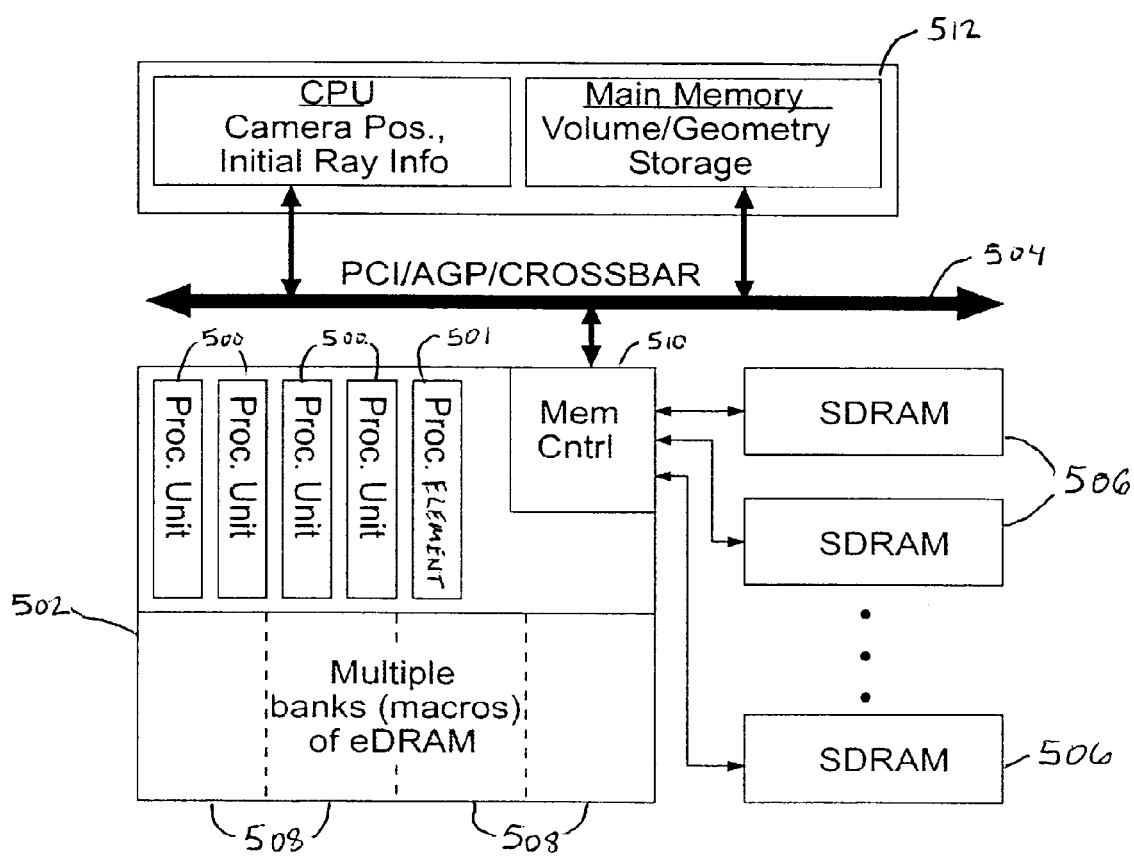
FIG. 54 shows a block hardware design of a hierarchical memory architecture with programmable processing elements.

Referring now to FIG. 54, a ray tracing architecture in accordance with the present invention is now described. This is a modified embodiment of the Cube 5 architecture designed to work within the structure of a hierarchical memory with programmable processing units 500 attached to the lowest level of the memory. The processing paradigm has been used before and is described in *Rendering Complex Scenes with Memory-Coherent Ray Tracing*, by M. Pharr et al., *Computer Graphics SIGGRAPH 97*, pages 101-108, August 1997. In the ray tracing architecture in accordance with the present invention, the scheduling of the processing is refined and applied in a different manner to graphics problems.

A memory hierarchy is used to support flexible volume rendering and large volumes. The memory hierarchy is a cascade of memories with increasing bandwidth and decreasing size toward the Cube 5 units. The data is organized in hierarchical blocks (cuboid subvolumes) as described in *EM-Cube: An Architecture for Low-Cost Real-Time Volume Rendering*, by R. Oborne et al., *Proceedings of SIGGRAPH/Eurographics Workshop on Graphics hardware*, pages 131-138, August 1997. The hierarchical blocks allow transfers between levels appropriate for the bandwidth and latency for those levels. Normal volume data is read-only and thus can be discarded upon replacement in the lower levels of the memory. However, some blocks including: ray data, reconstruction volume data, and global illumination voxel data are read-write and thus need to be written back up the hierarchy.

Referring again to FIG. 54, a block diagram of a preferred embodiment of the implementation of the memory hierarchy with programmable processing element is shown interfacing the system. A single board 502 is connected to the system bus 504. The board 502 preferably contains one or more chips having at least one processing unit 500 and DRAM memory 508, at least one programmable processing element 501, and a set of standard memory devices 506. The chips are preferably embedded-DRAM (eDRAM) chips and the standard memory devices 506 are preferably SDRAM. The eDRAM chips contain one or more processing units 500 as well as DRAM 508 memory organized in one or more banks. The programmable processing element 501 can also be an eDRAM chip. Preferably a memory controller 510 is provided to interface the level of memory which is external to the DRAM memory 508. Preferably the processing units 500 have a very high bandwidth to the local memory inside the chip.

The ray tracing architecture takes advantage of the high bandwidth to quickly process the data currently loaded in the eDRAM device. Normal datasets will not fit within the memory 508 within the eDRAM chips. The SDRAM memories 506 are utilized to store the data until the processing units 500 within the eDRAM are ready to utilize it. Large datasets will not fit within a plurality of SDRAM devices that can fit onto one card. The main memory 512 of the system is utilized to store the data until the board is ready to work on it. This is a three tiered memory hierarchy that optimizes the locality of reference.

The memory hierarchy enables sufficient rendering of large datasets which are much larger then Level 1 of the Cube 5 memory hierarchy—the double slice voxel FIFO 64 shown in FIG. 5. Space leaping and early ray termination can be employed to take advantage of the condition that the entire dataset generally does not contribute to the final image due to empty or opaque data regions These and interframe coherence allow the working set of blocks to remain resident in the lower hierarchy levels, providing higher bandwidth while accessing the data. Local connections between spatially coherent cells allow high-bandwidth communication of ray information instead of the usual up-over-down communication that occurs within the memory hierarchy.

The processing in the ray tracing architecture does not follow a strict sequence as found in prior art volume rendering accelerators. Instead, the work to be performed is grouped into 3D blocks. The 3D blocks are then processed (e.g. rays cast or traced, or segmentation performed) according to an order where the block which will provide the most results while being the closest to the eDRAM memory 508 is processed next.

Figure 55:
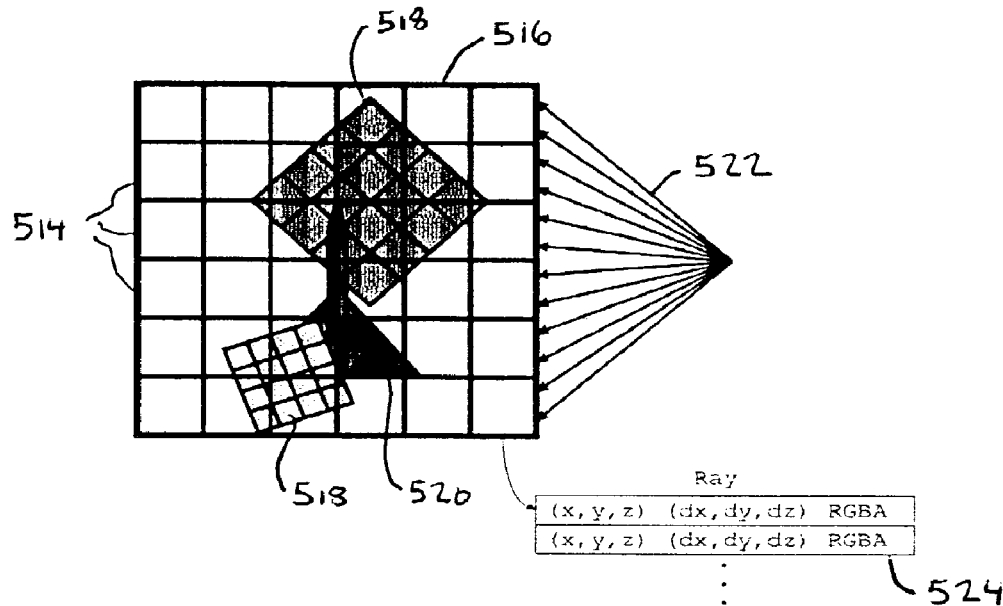
FIG. 55 shows a hybrid volume and polygon scene with a superimposed scheduling grid.

Referring now to FIG. 55, a 2D top-down view of a typical 3D scene to be rendered is shown divided into cells 514 by a scheduling grid 516. All volume 518 and polygonal 520 data are distributed among the scheduling grid cells 514 which they intersect. Rays 522 are cast into the scheduling grid 516 and stored in queues 524.

Figure 56:
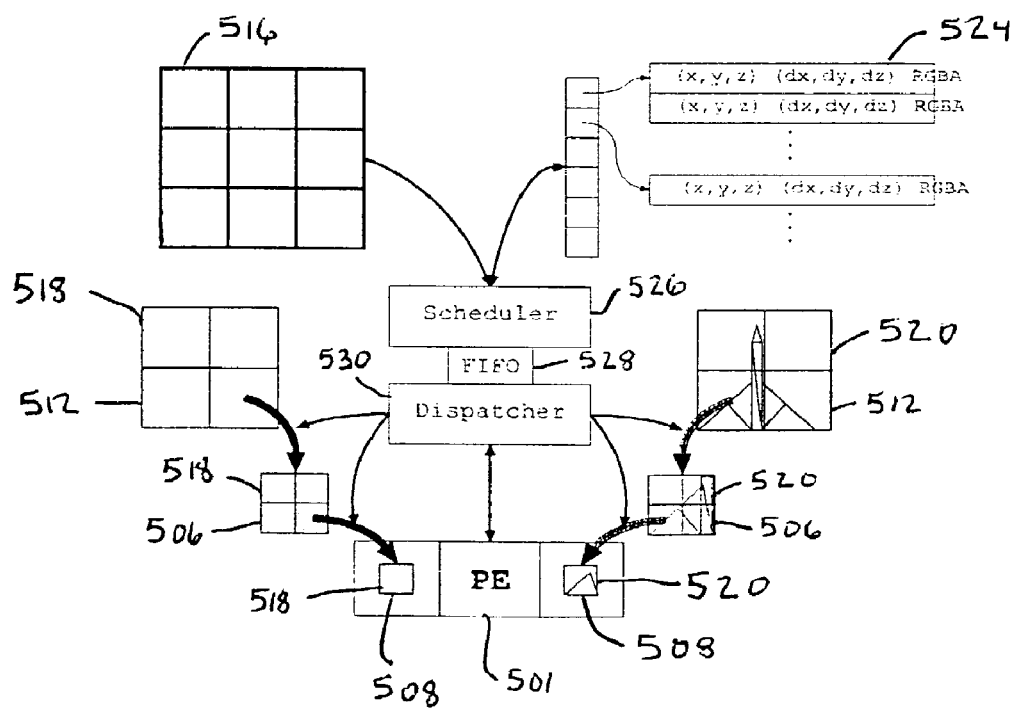
FIG. 56 shows the data flow through the Cube 5 system with a scheduler and dispatcher communicating through a buffer.
Figure 56:
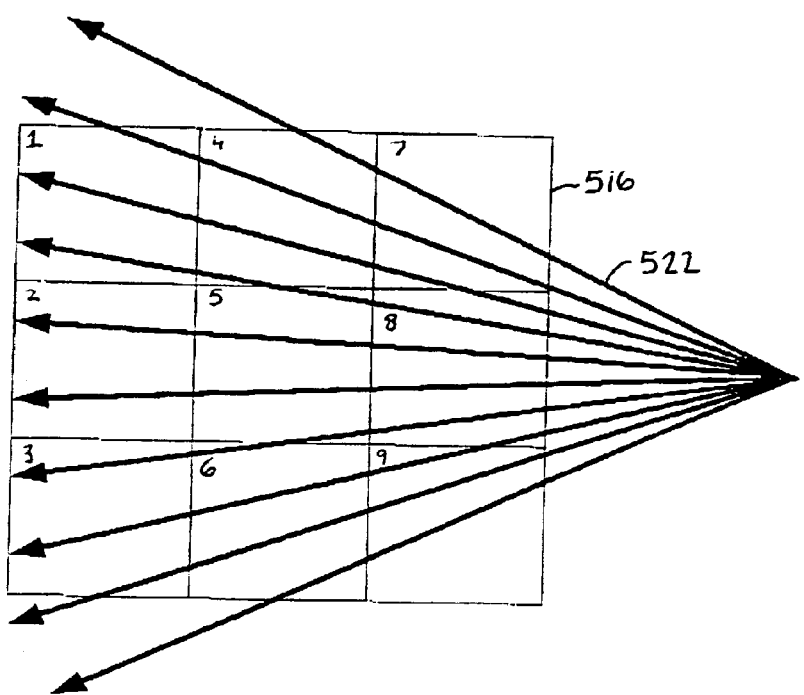
Figure 56:
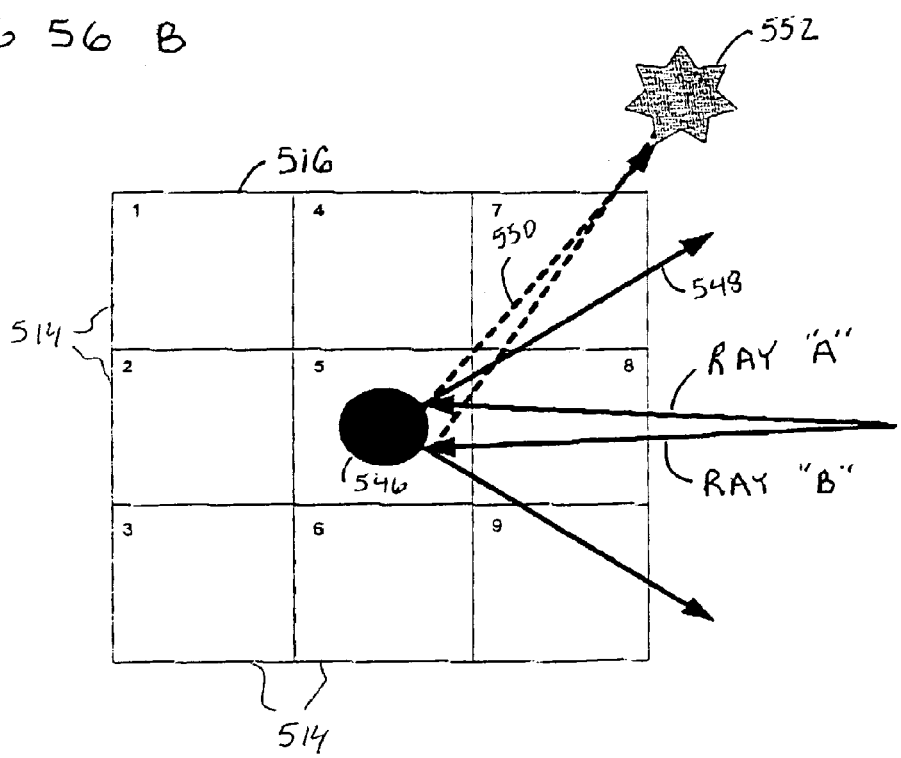

Referring now to FIG. 56, the processing element 501 of the ray tracing architecture includes a scheduler 526 and dispatcher 528 that communicates between a buffer (FIFO) 530. The scheduler 526 and dispatcher 528 have knowledge of the scheduling grid 516 and the associated list of ray queues 524. The scheduler 526 determines which blocks to process and in which order. The scheduler 526 selects the best block based on the current state of ray queues 524 and the current state of the memories according to a heuristic metric. The scheduler 526 stores a list of blocks to process in the FIFO buffer 530. The dispatcher 528 transfers blocks to individual processing units 500 and controls the movement of sampled and geometry data among the three levels of the memory hierarchy—Level 1 (eDRAM) 512, Level 2 (SDRAM) 506, and Level 3 (main) 508. In this way, it is assured that the correct data are available when a processing unit 500 begins to process a block.

The cells 514 are scheduled for processing in an order the minimize the total processing timebased on the status of the rays 522 and ray queues 524. Further, the scheduler 526 considers that data distribution throughout the memory hierarchy as well as the contribution of each cell 514 toward completion of the processing.

Traditionally, scheduling can be performed in one of two ways, either geometrically, for deterministic processing such as raycasting, or heuristically for non-deterministic algorithms such as ray tracing. Examples, of heuristic methods are greedy algorithms such as scheduling the next cell with the most work, or statistical probability methods such as ratios of ray-queue length to count of non-transparent objects as described in *Rendering Complex Scenes with Memory-Coherent Ray Tracing*, by M. Pharr et al., *Computer Graphics SIGGRAPH* 97, pages 101-108, August 1997.

Prior attempts have been made to design an algorithm which utilizes inter-frame coherence to schedule more efficiently. A dependent graph for each frame showing which cells send rays to which other cells was built. For the next frame, the graph built from the previous frame to guide the new cell processing order was utilized. Unfortunately, for ray tracing the dependency graph becomes "locally complete". This means that any cell depends on every single one of its neighbors, and is thus connected to every neighbor. Since rays cannot jump over cells, each cell is connected only to its neighbors, but is connected to all of its neighbors. This is what "locally complete" means. The graph is not "complete" because that means every node is connected to every other node. In addition, the "locally complete" graph is not much use for aiding in the scheduling of cells since a selection cannot be made as to which cell should be scheduled before it's neighbors. The dependency graph does not contain the information needed to schedule cells because there is no order to the dependency relations.

Referring now to FIGS. 56A through 56F, a method known as ray forest for scheduling cells based on inter-frame ordered dependency relations is now described. A ray forest 540 is a group of trees, one tree 542 for each ray 522, which represents ordered information about how rays propagate through the scheduling grid 516. Since rays 522 in a ray tracing application span multiple child rays, the data structure associated with each ray 522 is a tree 542 where each node 544 represents a ray 522 traversing from one cell 514 to another, and leaves represent cells where rays terminate and place their contribution into the resulting image. There are three different actions that could occur when a ray 522 is processed in a cell 514:

1. The ray passes through the cell touching no objects. In this case, the node has one input and one output (i.e. the node is locally a "swig").
2. The ray hits an object an spawns a child shadow ray 550, a plurality of reflected rays 548 (if the surface is reflective) and a plurality of child transmitted rays (if the surface is not totally opaque). In this case the node has one input and multiple outputs, one for each child ray.
3. The ray terminates either by hitting an object or exiting the world at this cell. In this case, the node is a leaf of the tree.

Figure 56C:
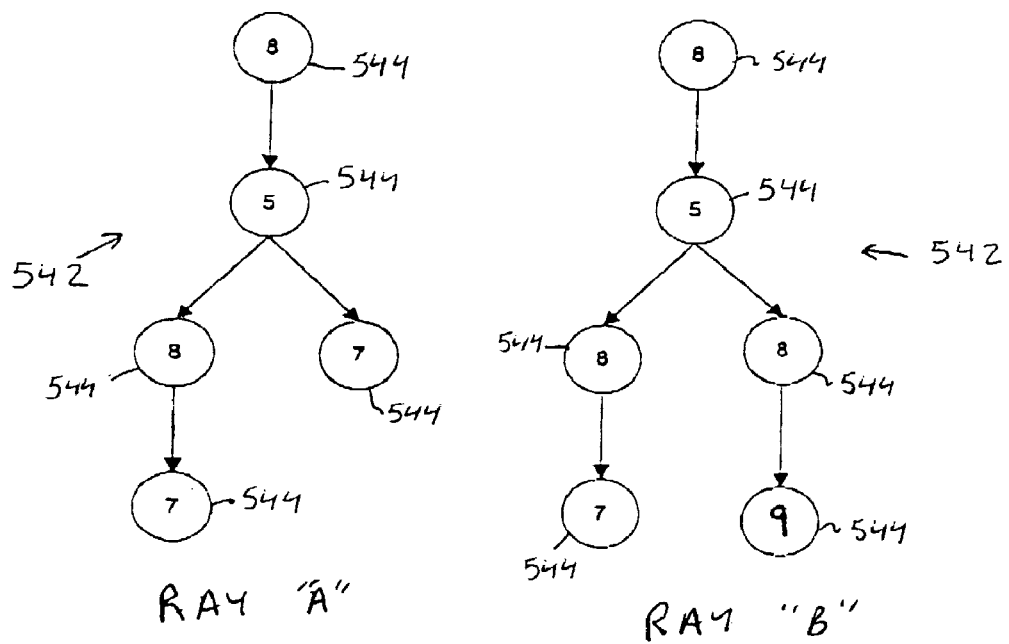
FIG. 56C shows the trees for RAYS A and B of FIG. 56B.
Figure 56:
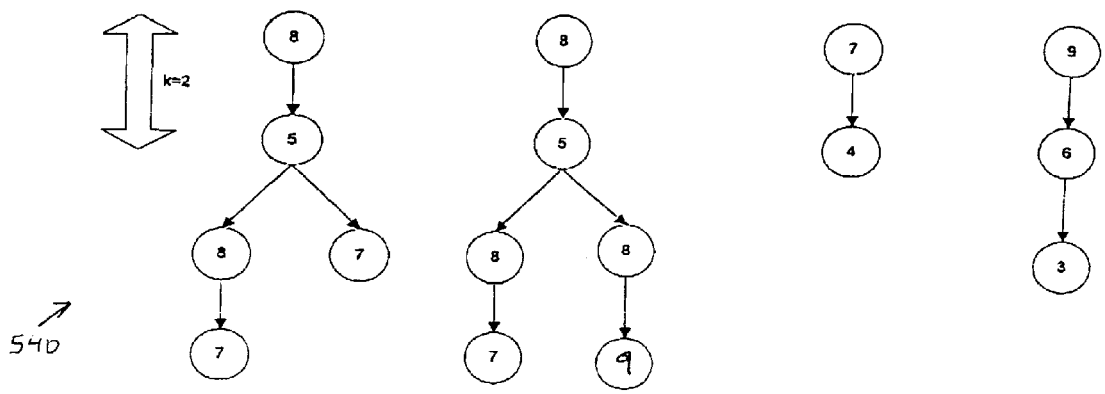
Figure 56:
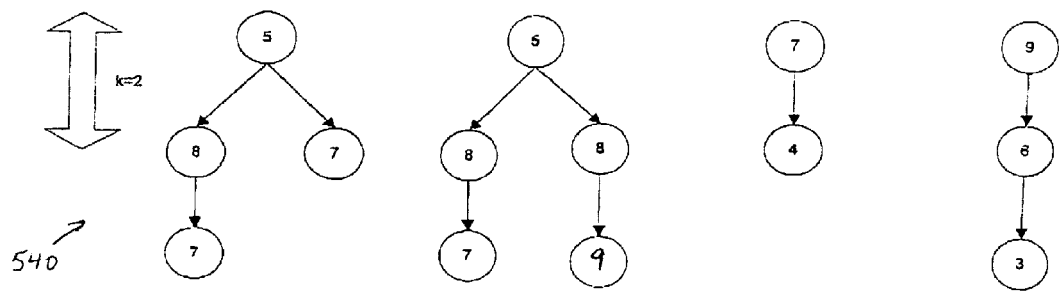
Figure 56:
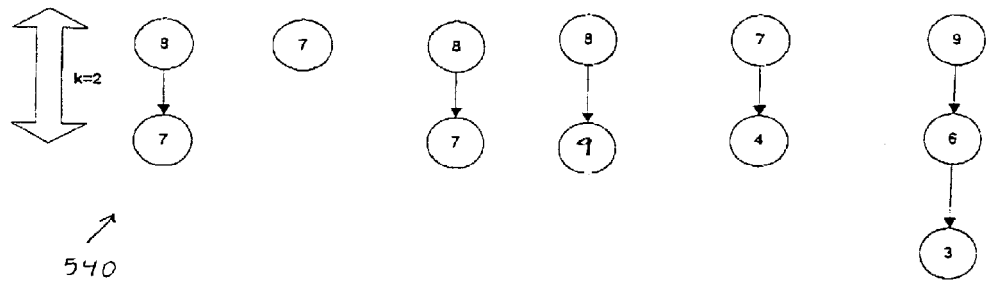

In the ray forest method, each scheduling grid cell appears in multiple nodes, and a single cell can occur in the same tree multiple times. For example, consider the case where a ray bounces back and forth between two reflective objects in alternating cells. Referring now to FIGS. 56B and 56C, RAY "A" enters cell number 8 and traverses through cell number 5 to interact with an object 546. A first reflected ray 548 bounces back through cell number 5 into cell number 8 and out through cell number 7. A second reflected ray 550 bounces back through cell number 5 and out through cell number 7 towards a light 552 illuminating the scene. The tree 542 labeled RAY "A" in FIG. C has a data structure representing the path of RAY "A." RAY "B" also illustrates these concepts in FIGS. 56B and 56C.

Referring now to FIGS. 56D through 56F, to utilize the ray forest method to schedule calls, the top k nodes of all ray trees are considered. Heuristic algorithms such as the greedy or statistical methods mentioned above determine the next cell to process. When a cell is processed, all the rays waiting to enter that cell are processed. The trees which represent these rays are "popped". This means that the top node is taken off these trees. If the node is a "twig", the tree remains the same, if the node has multiple children, each child "branch" becomes a new tree in the forest representing all the new rays which were spawned.

Since k nodes at the top of each tree are looked at, "future" information is acquired about what cells will soon be processed and an attempt to not remove them from the lower levels of the memory hierarchy right before they are about to be processed is made. The number of levels k that are considered, is a tradeoff on accuracy of the scheduling and runtime of the scheduling portion of the algorithm.

The forest of trees will only represent what actually happens to rays in the new frame if no rendering parameters (viewpoint, transfer function, lights, etc,) change since ray forest information from the previous frame is used. Although this is not the normal case, the change from one frame to the next is generally considered to be minimal. Inter frame coherence takes advantage of these minimal changes to estimate the best scheduling for the next frame. However, since there is some change, the ray forest must be able to deal with the rays not acting exactly like they did the previous frame.

Texture mapping is widely used technique to stimulate high-quality image effects, such as surface details, lighting and shadows. The memory requirements for texturing consume large portions of today's graphics boards and their cost.

The cost-performance of polygon engines is improved by supplying the texture mapping functionality within the hierarchical memory architecture. In this combined architecture, the polygon engine's only responsibility is to rasterize triangles, while Cube 5 will perform the texture lookups. Rays are initialized with the data from the rasterized polygonal image. This would include the $(u_1,v)$ texture coordinates and a texture index. In this way deferred texturing can be accomplished so that only visible pixels are texture mapped reducing the texture image accesses.

Another advantage of the programmable processing units 500 to perform the texturing operations are that higher-quality anti-aliased texture methods (such as EWA) can be performed when such quality is desired. Deferred texturing lowers the cost of utilizing such higher quality methods. Additionally, the system coherently accesses texture images through the memory hierarchy. Further, programmable deferred shading (such as Renderman shaders or procedural textures) is possible by storing the required parameters during rasterization.

The system also supports ray tracing mixture of polygons and multiple volumes using the scheduling grid cells to reorder the processing to memory coherent chunks. Applications which do not require the image quality produced by ray tracing polygons, can utilize polygon rasterization hardware. External polygon rasterization is used to allow much larger polygon datasets to be rendered at much faster frame rates. The projected RGBαZ image is used to initialize the ray endpoints. Subsequently, the volume is rendered terminating the rays at the proper depth. This leverages existing geometry hardware to correctly render, in real-time, opaque polygons in harmony with volume rendering.

An architecture known as GI-Cube and methods for accelerating volumetric global illumination and standard direct volume rendering will now be described. The GI-Cube architecture shown in FIG. 64 can accelerate a variety of algorithms including:

basic volume rendering with Phong shading and local illumination, volume rendering with global illumination including shadow casting, reflections, glossy scattering, and radiosity, and generalized volumetric ray tracing acceleration support for various algorithms including hyper-texture, photon maps, polygonal global illumination, tomographic reconstruction, bidirectional path tracing, volumetric textures, and BSDF evaluation.

A complete description of the GI-Cube architecture and methods is found in *GI-Cube: An Architecture for Volumetric Global Illumination and Rendering*, by F. Dachille and A. Kaufman, *Proceedings of the SIGGRAPH/Eurographics Workshop on Graphics Hardware*, pages 119-128, August 2000, which is incorporated herein by reference. The implementation of the above algorithms will be described next followed by a description of the architecture.

In its most basic form GI-Cube is a standard volume rendering accelerator that produces images of comparable quality to Cube-4 and VolumePro. The GI-Cube architecture is part of Cube-5 architecture discussed above. The basic pipeline of GI-Cube takes volume samples along a ray using trilinear sampling of the density and gradient, performs some per-sample shading operation, and composites the shaded sample onto the ray. GI-Cube radically departs from the aforementioned architectures by generally processing rays in image order thus permitting great flexibility (e.g., perspective projection, global illumination). Preferably the processing order is not strictly an image order, but a hybrid order. That is, groups of rays are spatially partitioned into blocks, then blocks are processed one or several in parallel at a time. Rays are passed between blocks (and sometimes processors) at boundaries. At a coarse level, the processing is image order. That is, individual rays can be submitted at any time during the computation. At a medium level, the processing is object order and all the rays within a block are processed together. At a fine level the processing is image order and samples are taken along each ray in round robin fashion using a cache to exploit coherence among rays.

Figure 59:
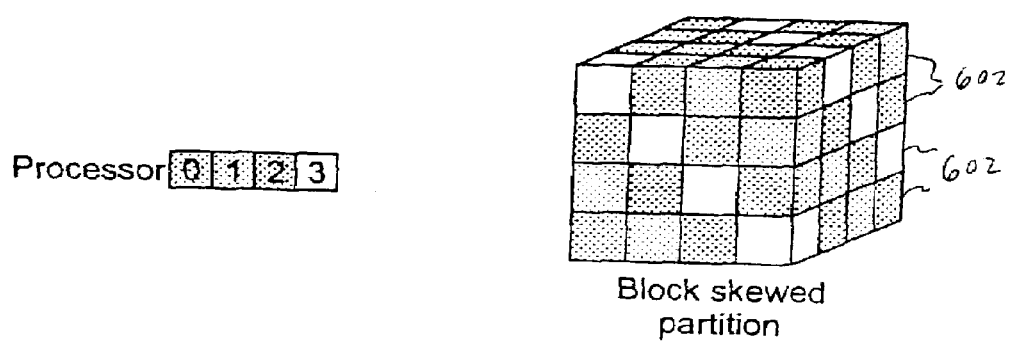
FIG. 59 illustrates a skewed block slab partition that cuts the volume into cubic blocks and assigns cubic block (i, j, k) to processor (i+j+k) mod p for multiprocessing.

A $N^3$ volume dataset is organized into cubic blocks of size $n^3$ prior to rendering. The data may be stored on disk blocked or else assembled into blocks on the fly. In the examples discussed herein N=256 and n=32. The blocks are distributed among p multiple processors according to a function. For the best load balance, N is related to pn by some integer. Three possible distributions are illustrated in FIGS. 57, 58, and 59. Referring now to FIG. 57, the first option uses a simple slab partition to cut the volume into p axis aligned slabs 600 with one slab assigned to each processor for multiprocessing which minimizes inter-processor communication at the expense of load balancing. Referring now to FIG. 58, the second option uses a repeating slab partition to cut the volume into slabs 600 of n voxels thick and assigns slab i to processor i mod p for multiprocessing which increases inter-processor communication but improves load balance. However, certain viewing directions such as the image plane oriented parallel to the slabs do not balance well. Referring now to FIG. 59, the third option uses a skewed block slab partition that cuts the volume into cubic blocks 602 and assigns cubic block (i, j, k) to processor (i+j+k) mod p for multiprocessing has the best load balance but the most inter-processor communication. Rays may pass between blocks three processors away, while the first two options always communicate locally. None of these schemes is necessary in the uniprocessor case.

Figure 60:
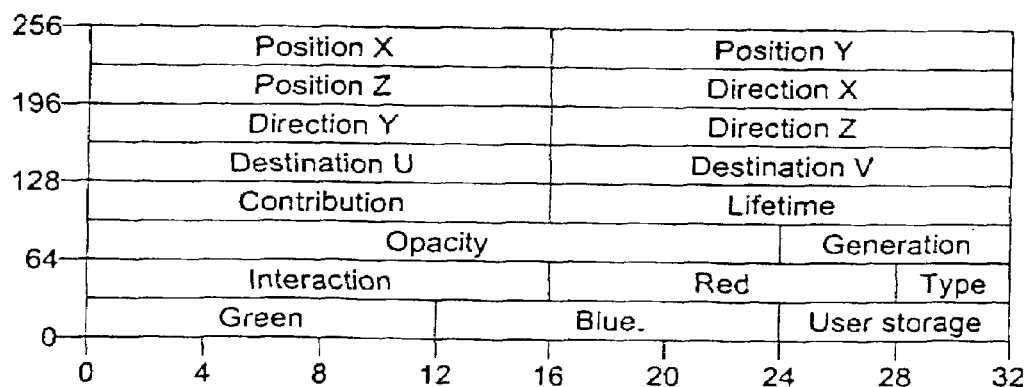
FIG. 60 shows bit widths in a typical 32 byte ray packet.

To render an image, a set of image rays is generated on the interface to the GI-Cube board (described below) and clipped with the volume extents. Each ray is a data structure containing some, all, or more of the following: the (u, v) image coordinate, contribution to the image, starting point, direction, color, opacity, lifetime, generation, interaction value, and type. A typical ray data structure is illustrated in FIG. 60, this one comprising 32 bytes, although other arrangements and sizes are possible. Preferably rays are created by treating the intersection coordinates as texture coordinates and utilizing an incremental texture mapping scan conversion approach. The volume intersection coordinates can be generated by scan converting the six faces of the volume. Cut planes are implemented using one additional polygon scan conversion per plane. Rays are then bucketed into queues representing the volume blocks. Some portion of the queues is loaded onto the fixed size hardware queues.

Each hardware processor (pipeline) 604 selects a queue which contributes most toward completion. Two options include:

1. Selecting the queue with the most rays; and
2. Selecting the queue with the most contribution to the image, which can be measured by summing the individual contribution of the rays in the queue.

Figure 61:
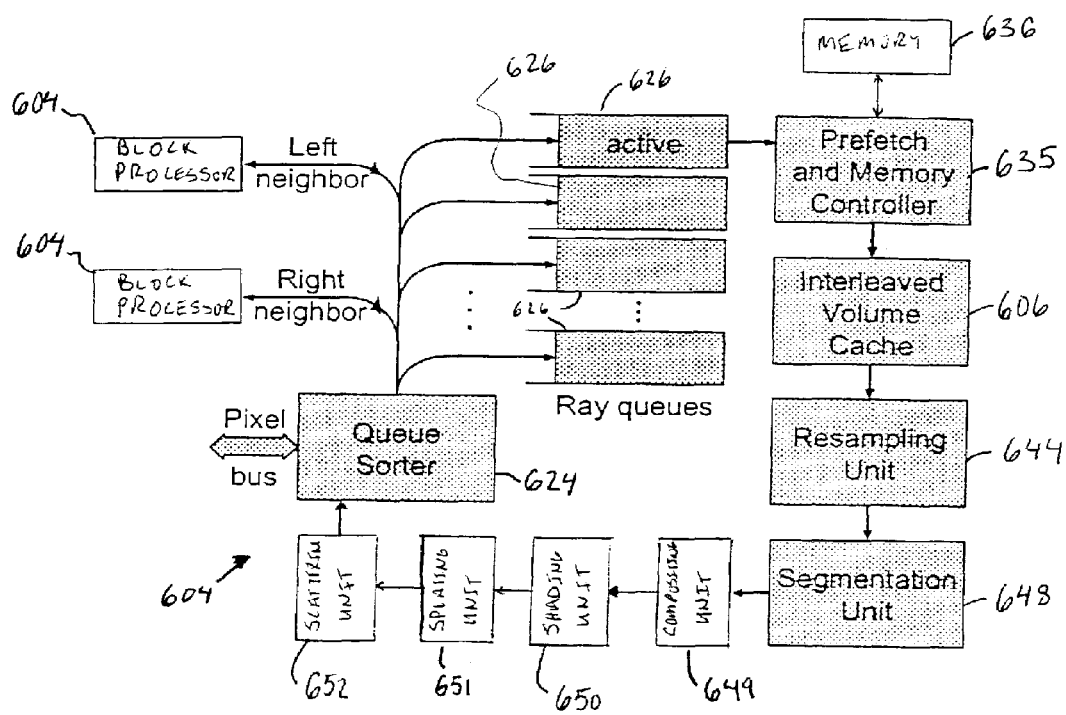
FIG. 61 shows an overview of a block processor showing a circular ray integration pipeline fed by multiple queues.

Each pipeline 604 processes all the rays in its active queue simultaneously in a round-robin fashion as shown in FIG. 61.

Preferably a volume cache 606 large enough to hold an entire block is used to capitalize on spatial coherence among rays. To trilinearly sample (i.e., perform a linear interpolation in three dimensions) the first ray, eight neighboring voxels need to be fetched into the cache. The direct mapped, eight-way interleaved volume cache 606 provides the ability to read out an entire trilinear neighborhood of voxels in each cycle. If the next ray is spatially coherent, it generally can share some (perhaps four) of the fetched voxels depending on the inter-ray spacing. Assuming a ray and sampling density of one ray sample per voxel, then processing the entire block generates only $(n+1)^3$ cache misses although the total bandwidth for trilinear interpolation is eight times that amount. The super-sampling along the ray increases coherence and the second ray sample in a trilinear neighborhood has a 100% hit ratio. While there are some stalls (i.e., pauses waiting for the cache to fill) at the start of processing a block, the number of voxels requested from the main volume memory never exceeds the block size. The volume cache 606 is configured to hold one extra slice of voxels in each dimension to account for the overlap of the trilinear neighborhood.

Figure 62:
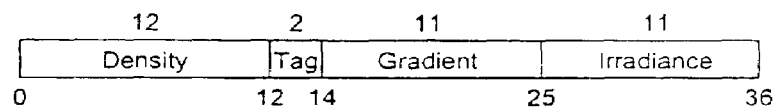
FIG. 62 shows a typical voxel format.

In addition to containing 12 bits of density, the voxels contain gradient information, a tag field for segmentation, and irradiance data which is unused for standard volume rendering as illustrated in FIG. 62. The gradient is pre-computed and quantized into discrete angular bins similar too the Vizard II PCI board described in *VIZARD II: A PCI Card for Real-Time Volume Rendering* by M. Meissner et al., *In Proceedings of the Siggraph/Eurographics Workshop on Graphics Hardware*, pages 61-67, August 1998. However, certain datasets could yield improved results with vector quantization. The eight neighboring voxels are read from the volume cache 606, decoded, and interpolated. The density, three gradient components, and possibly three color components are trilinearly interpolated, and the tag field is zero-order interpolated (i.e., nearest neighbor).

The final sample is passed down the pipeline 604 for shading and compositing. If no color information is supplied, a transfer function is used to convert the density into color and opacity. Otherwise the transfer function only supplies the opacity. The material tag is used to provide additional dimensionality (e.g., useful coexistence of sampled and scanned datasets often requires separate tailored opacity transfer functions). The inter-sample distance d is multiplied by a random number r selected between ½ and 1 to provide jittering as a compromise between noise and aliasing. The opacity is modulated accordingly: $\alpha'=1-(1-\alpha)^{dr}$.

Local shading is preferably performed by utilizing a reflectance map. While this technique is limited to distant light sources only, the results are adequate for most visualizations. The pipeline 604 next performs compositing using the over operator and stores the result back into the ray data structure which travels down the pipeline 604. All the while, new rays have been accepted into the top of the pipeline 604 resulting in the production of one new ray sample (on different rays) with each hardware cycle, neglecting any stalls due to cache misses.

The ray is next advanced by distance dr. The new start position determines the appropriate queue for the ray. First, the appropriate processor 604 is selected. If the ray now belongs to a neighboring processor 604 (see FIGS. 61 and 64), the ray data structure is queued for horizontal communication to the appropriate neighboring processor 604. If the ray has exited the volume or reached full opacity, it is queued for vertical communication with the board interface. If the ray remains in the same processor 604, it is further scrutinized to determine the appropriate block for subsequent queuing.

As rays are received by the board interlaced, they are assembled into a composite image. Sub-pixel sampling can be used to improve the quality of the image. In this case, sub-pixel coordinates are stored in the generated rays and the composite image is accumulated by appropriate filtering. Once complete, the final image is transferred to main memory for display on the frame buffer.

Space leaping and early ray termination accelerate rendering of most datasets. Early may termination is employed to halt processing when the ray reaches some opacity threshold. An empty flag is associated with each block because some blocks may contain no visible data. A special part of the pipeline 604 computes the nearest edge intersection of each ray. Based on the ray direction, axial distances to the pertinent three block faces are computed. The actual distance of the intersection is computed by dividing by the appropriate component of the ray direction. If the empty flag is set, the ray is advanced by the minimum of the three distances, but at least dr. Note that some blocks may be rendered invisible by the current transfer function although they contain nonzero data. The driver software monitors to detect this condition and set empty flags as necessary which can be done asynchronously after editing the transfer function.

A method of volume rendering with volumetric global illumination will now be described in accordance with the present invention. A number of changes are required to the above algorithm to implement volumetric global illumination. First, rays must be generalized to be either lighting rays or rendering rays. The primary difference between them is that lighting rays distribute energy along the ray while rendering rays accumulate energy. In the present invention, energy is distributed trilinearly (splatted) to the irradiance field of voxels along the ray. Second, a two-pass (bidirectional) methodology is adopted in which energy is distributed from the light sources in the first pass, and irradiance energy is gathered toward the eye point in the second pass. Third, scattering of rays are permitted within the volume (e.g., reflections, caustics).

In the first pass of global illumination, light energy is allocated among a number of rays and then traced through the scene. Instead of generating a ray from a point light source to each of the $N^3$ voxels, rays are only fired to the face voxels of the volume while allowing these rays to automatically sample the interior voxels. Up to 6 $kN^2$ rays sample the surface of the volume, where k is a super-sampling factor. A point-to-finite-area form factor based on the distance r to the light source is used to compute the energy of the light source $E_1$ distributed among the surface voxel rays:

$$E_v = \frac{E_1 \cos\theta}{k\pi r^2}$$

If the light source is outside the volume, rays are only generated when cos $\theta$>0, where $\theta$ is the angle between the inward volume surface normal and the light source direction at the finite area v corresponding to a voxel on the volume face. The k rays per voxel are distributed across the exterior voxel surface using a quasi-random scheme.

Area light sources are handled slightly differently. For each of the surface voxels, k random points on the area light source surface are selected. The energy is determined using the above equation multiplied by cos $\phi$, where $\phi$ is the angle between the inward volume surface normal direction and the light source normal at the random point on the light source. These lighting rays are queued on blocks and scheduled in the first pass just like rendering rays.

Figure 63:
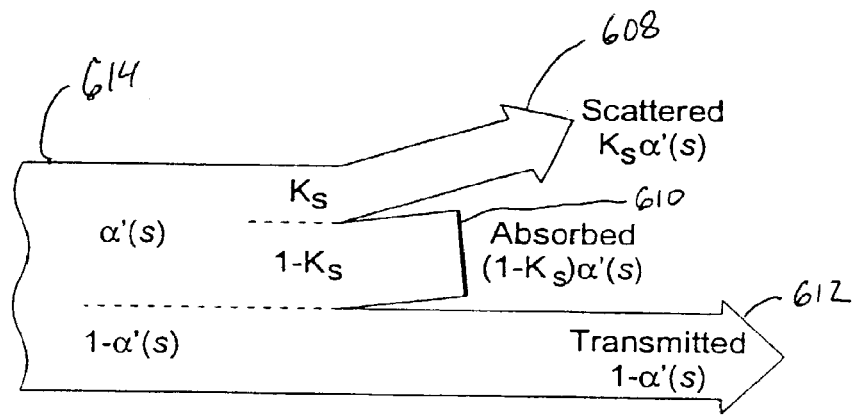
FIG. 63 shows the splitting of energy at a volume sample s.

As the lighting rays travel through the volume they deposit energy to voxels along the ray. The reduction in radiance along a differential distance dx is given by $\kappa_t(x)dx$ where $\kappa_t(x)$ is the coefficient of extinction at point x and $\kappa_t$ is the sum of the coefficients of absorption $\kappa_a$ and scattering $\kappa_s$. $\kappa_s(x)$ is determined by $K_s\alpha'(x)$, where $K_s$ is a constant defined per material tag, and therefore $\kappa_t(x)=(1-K_s)\alpha'(x)$. At each sample point along the ray, the energy $E_r$ stored 614 in the density field of the ray data structure is split into scattered energy $E_s=E_rK_s\alpha'(x)$ 608, absorbed energy $E_a=E_r(1-K_s)\alpha'(x)$ 610, and the transmitted final ray energy $E'_r=E_r(1-\alpha'(x))$ 612 as shown in FIG. 63. Part of the ray energy is eventually stored in the volume data as a view independent estimate of the irradiance.

Two modes of global illumination are available, low albedo and high albedo. In the low albedo mode, optically thin objects (e.g., light fog) are lighted with a small number of light rays (actually bundles of rays). In the high albedo mode many rays are used to stochastically sample the complex transport space of high albedo objects. In low albedo mode, light bundles distribute part of their energy at all samples with nonzero opacity, similar to the absorption suppression method of Pattanaik et al., which is described in *Computation of global illumination in a participating medium by Monte Carlo simulation*, by Pattanaik et al., *The Journal of Visualization and Computer Animation*, 4(3):133-152 July-September 1993. In this mode, the exiting bundle energy is $E_r'$ and the absorbed energy $E_a$ is trilinearly distributed (splatted) to the irradiance fields of the eight neighboring voxels. The ray direction is only scattered when the accumulated ray opacity computed incrementally with $\alpha_{r,i+1}=1-(1-\alpha_{r,i})(1-\alpha'(x))$ reaches some uniform random value which is constant per ray and is stored in the "interaction" field of the ray format. In this way, the light bundle energy is continuously distributed to the voxels along the way.

In high albedo mode, scattering is an important source of illumination so many light rays are necessary to sufficiently sample the illumination transport equations. In this mode, rays model photons which carry an indivisible amount of energy which may scatter (bounce) at many difference locations before finally being absorbed. As such, they only deliver their energy once during a photon capture event (absorption).

As in low albedo mode, rays interact with the medium when the accumulated opacity reaches the interaction value. However, rays either scatter or absorb depending on the scattering albedo $\kappa_s/\kappa_t$ and a uniform random value. If scattering is selected, the ray direction is modified based on the material's BRDF and the accumulated opacity is set to zero. The ray then continues in a new direction having gained a generation. Whenever the photon is absorbed, the full energy $E_r$ is splatted to the irradiance fields of the neighboring eight voxels. The two methods attempt to achieve the same distribution of energy in two different ways which are tuned to the characteristics of the medium. With a large number of photons, the law of large numbers succeeds in generating a continuous distribution of illumination. The high albedo mode can also be used for shooting a large number of rendering rays. In this case, color is not accumulated continuously along the ray, but only when the ray is absorbed.

Both lighting rays and rendering rays scatter according to the phase function or bidirectional scattering function (BSDF) of the material. The tag of each voxel determines the material type. Among other things, materials define the color, the scattering constant, and the BSDF. The specification of the BSDF is flexible. Certain BSDFs are easily specified in hardware (e.g., isotropic scattering) and others (e.g., Fresnel, refraction, point sampled automobile paint) are more suitable for software implementation. Complex BSDFs are trapped by the hardware and redirected to software for further processing. The hardware supports specular reflection, dull reflection, dull scattering, isotropic scattering, and ideal diffuse reflection. All other BSDFs intercept the ray processing in hardware and pass it to the software for processing. After the software scatters the ray, it re-queues the ray on the appropriate hardware queue for further processing. Note that both lighting and rendering rays can be scattered.

Rays no longer travel in coherent groups as in orthographic volume rendering because of the apparent randomness introduced by perspective projection, the global illumination lighting method, and scattering. The block reordering and scheduling algorithm automatically attempts to maximize coherence among computations.

Figure 64:
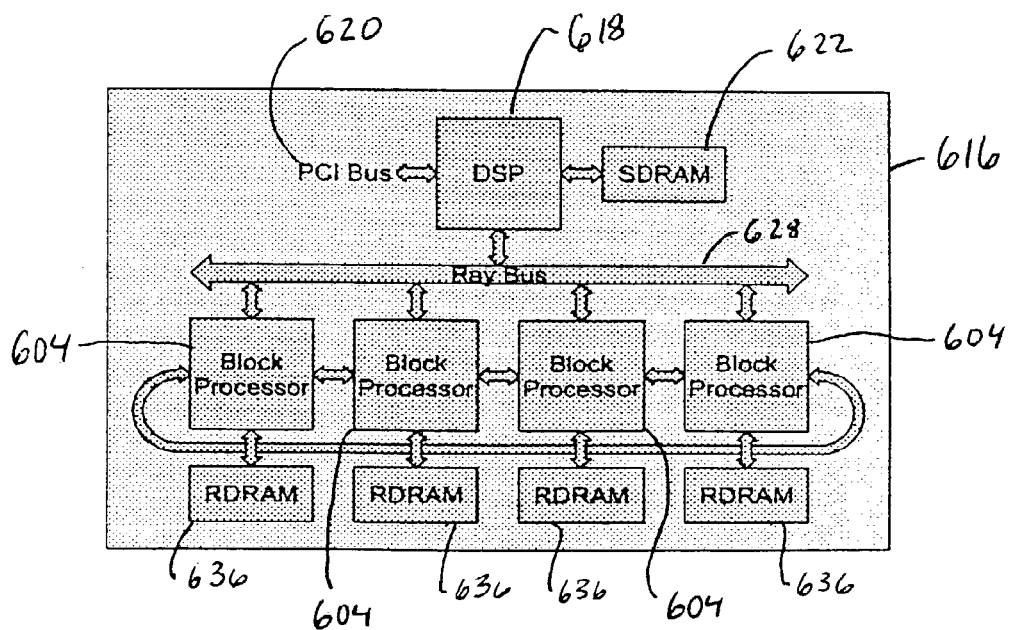
FIG. 64 shows an overview of the GI-Cube architecture.

Referring now to FIG. 64, the architecture of the GI-Cube will now be described. The architecture is designed to render $256^3$ volumes in real time (30 Hz) using a single PCI board 616. Global illumination and other algorithms are accelerated to interactive rates, depending on the desired quality of results. The flexibility of the generalized ray tracing approach and the pipelined hardware makes this all possible.

The board 616 is composed of three major components. The first component is a digital signal processor (DSP) 618 which acts as an interface to the board and a controller of the individual processors. It handles loading the dataset, generating lighting and viewing rays, controlling the operation and I/O of the processors, assembling the final image, and reporting the results back to the host over the PCI interface 620. It is directly connected to an SDRAM 622 for scratch memory storage and the frame buffer.

The second component is a set of hardware pipelines 604 called block processors as shown in FIG. 64. Each block processor 604 follows the general layout of FIG. 61. Each pipeline 604 is designed to take one sample along a ray in each hardware cycle, barring stalls due to cache misses.

The block processors 604 includes a queue sorter 624 to maintain and sort a group of fixed size hardware ray queues 626. As new rays are accepted from either the DSP 618 or neighbor processors 604, they must be bucketed into queues 626 depending on the starting point of the ray. Simple addition, shift, and modulo operations are sufficient to select the appropriate queue 626. Given a ray start position (x,y,z), block size of 32, volume size of 256, and the simple slab volume distribution scheme of FIG. 57, the internal queue number q is determined using C shift notation by:

$$x'=(x>>5) \bmod 2$$

$$y'=y>>5$$

$$z'=z>>5$$

$$q=(x'<<6)+(y'<<3)+z$$

Due to the simplicity of queue selection and the potential bottleneck, the bucketing operation is over-clocked by a factor of two.

Embedded DRAM (eDRAM) is used to maintain ray data in the queues 626 since the data access is highly regular, the amount of storage is large, and the required bandwidth is high. A fixed number and size of ray queues 626 simplifies the bookkeeping allowing constant time access to active and sorted queues 626 in every cycle. For our reference design with $256^3$ voxels, blocks of $32^3$, and four processors 604, each processor has 128 queues. With each queue 626 having a length of 256 rays and width of 32 bytes, the total eDRAM memory on a four processor ASIC is 4 MB. Because the sorting operation is over-clocked, up to two rays need to be written into queues 626 at the same time. For that reason, each queue 626 is implemented as a separate eDRAM so multiple queues 626 can be written simultaneously, unless of course both rays belong in the same queue 626. At the same time, the active ray queue supplies new rays to the pipeline 604 at the rate of one ray per cycle.

One issue which arises with fixed sized ray queues is exhausting available space. This can happen when rays converge at a point (near a light source, near the camera, or with focused caustics). When this occurs, overflow rays are returned to the DSP 618 over the ray bus 628. This does not generally hamper throughput since overflow occur when there is too much work in the ray queue 626. The only detriment is the consumption of resources on the DSP 618.

Figure 65:
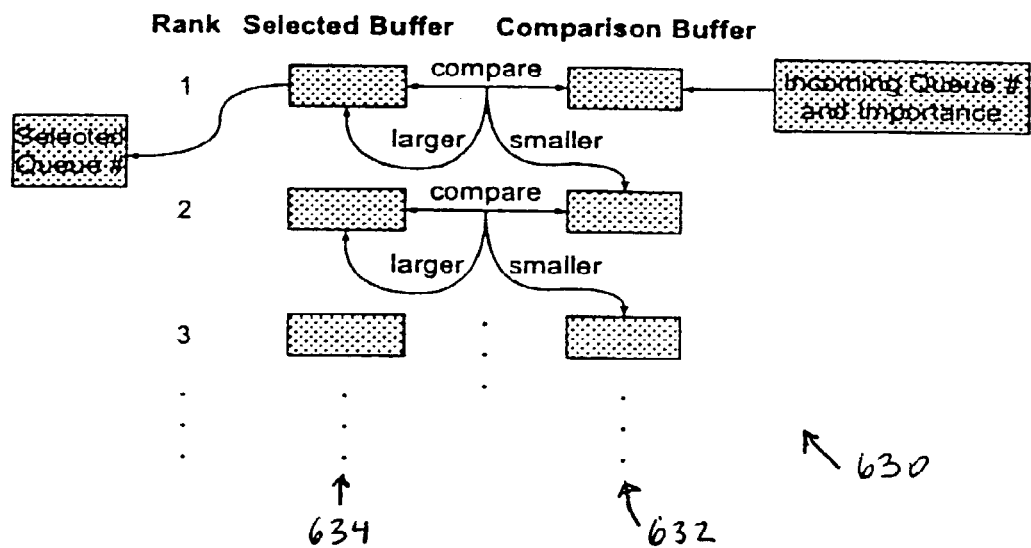
FIG. 65 shows a pipelined insertion sorter for selecting the most important queue.

Another responsibility of the processors is to determine the active ray queue. Each ray queue 626 is assigned a scalar importance based on one of the following criteria: 1. The queue with the most rays; and 2. The queue with the most contribution to the image. Each of these criteria can be incrementally maintained by simply adding any incoming ray importance and subtracting any outgoing ray importance. A pipelined insertion sorter 630 as shown in FIG. 65 is used to sort these importances in hardware. Alternatively a priority heap could also be used.

The pipelined insertion sorter 630 having a comparison buffer 632 and a selected buffer 634. Both buffers 632, 634 having linear storage arrangement for storing queue numbers and importance. The pipelined insertion sorter 630 inserts each modified importance at the top and allows it to filter down through the ranks incrementally. When a modified queue appears at the top, it immediately wipes out its old location in the ranks. That way, only one copy ever appears in the list. Each rank contains two items: the selected and the comparison. Items from above are always first placed in the comparison buffer 632. Then at each cycle, the two buffers 632, 634 are compared and the larger is moved to the selected buffer 634. The smaller is moved to the comparison buffer 632 of the next lower rank. The active queue is always processed until it is emptied, so it must remain at the top rank until it becomes zero. Therefore, the importance of the active queue is set higher than the scalar importance of the remaining ray queues. Preferably the importance of the active queue is set at infinity. When the active queue empties, all lower ranks are simultaneously moved up one rank. The queue number of the active queue is used to control a multiplexer which selects the active queue output.

Referring again to FIG. 64, the GI-Cube architecture preferably uses RAMBUS memory (RDRAM) 636. The memory is generally the key component of any volume rendering architecture since that is the usual bottleneck. The GI-Cube architecture generally requires parallel, distributed memory and high bandwidth memories. Parallel, distributed memory permits size and bandwidth scalability by the simple addition of identical components. The disadvantage of distributed memory is the difficulty of sharing data for dynamic load balancing, which is not attempted in this architecture. The RAMBUS memory (RDRAM) 636 is used because of its high sustained bandwidth for random accesses. Alternatively, the double data rate (DDR) DRAMs could also be used. At 800 MHz, one RDRAM can supply 1.6 GB/s bandwidth. In the GI-Cube architecture, standard volume rendering at the design point requires an average of 2.8 GB/s and global illumination 4.6 GB/s. The invention could also be implemented by sharing one RDRAM 636 between every two processors to reduce costs. The sharing would result in a noticeable degradation in performance because of the sharing increases the latency of cache misses.

Figure 66:
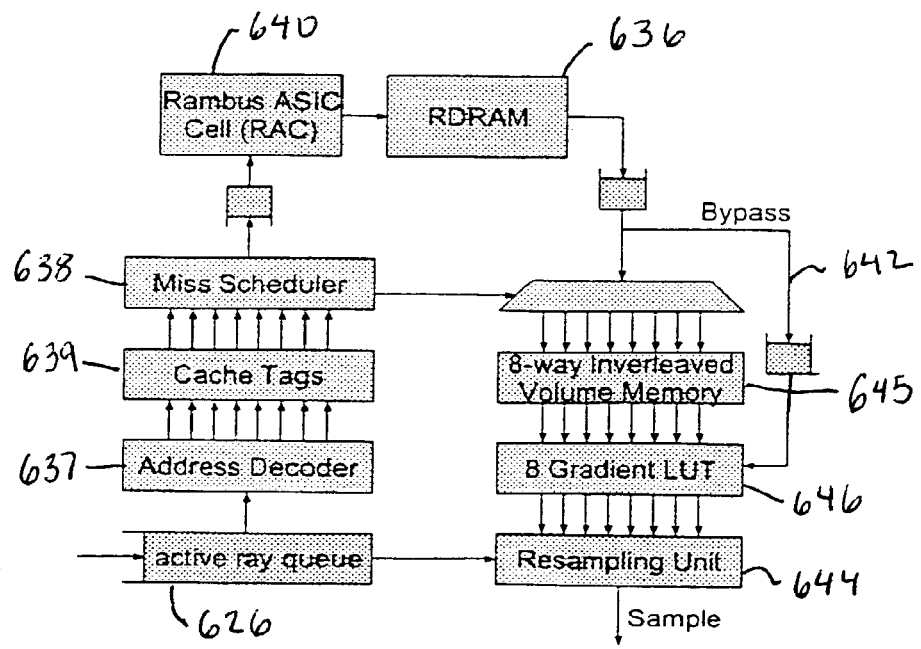
FIG. 66 shows the volume memory cache design including the prefetch architecture, RDRAM interface, and 8-way interleaved volume memory.

Referring now to FIG. 66, a portion of the processor (pipeline) 604 having a prefetch and memory controller 635 and the interleaved volume cache 606 is shown. The prefetch and memory controller 635 preferably include an address decoder 637, a cache tags 639 and a miss scheduler 638. The interleaved volume cache 606 preferably include an eight-way interleaved volume memory 645 and an eight gradient LUT 646. RDRAMs 636 can deliver four voxels to the pipeline 604, which runs at about 100 MHz because RDRAMs currently operate at 800 MHz and supply 18 bits (½ a voxel) every cycle. To hide latency, voxels are prefetched earlier in the pipeline 604 as shown in FIG. 66. After address decoding with an address decoder 637, the eight tags associated with the trilinear neighborhood are checked by a cache tags 639. Up to eight misses are queued by the miss scheduler 638 for serial RDRAM access. The Rambus ASIC cell (RAC) 640 streams voxel read/write operations to and from the RDRAM 636. Retrieved voxels are received into a queue which feeds the volume cache 606.

Each of the eight banks is able to read or write one voxel per clock cycle. Up to four voxels are retrieved each cycle from the over-clocked RDRAM 636. As long as there are no bank contentions, all are written to their respective banks during the cycle. Referring again to FIG. 66, the newly retrieved voxels are routed around the cache 606 through a bypass 642 that also writes them directly to the resampling unit 644 to perform the trilinear interpolation using the newly retrieved voxels. To ensure that all the voxels have reached the cache 606, a simple counter is used that stalls each ray until the specified number of voxels have been retrieved into the cache 606.

Before interpolation, the gradient index of each of the eight voxels must be decoded into three components. Preferably the 11-bit gradient index is cached and eight identical gradient look-up tables (LUTs) 646 are then used to decode the eight indices in parallel. It would cost over 50% more storage to cache the actual gradient components (3×10 bits per index).

The fourth major component of the processors 604 is the pipeline itself as shown in FIG. 61. The resampling unit 644 can be considered the top of the pipeline. The resampling unit 644 accepts one sample location along a ray and the eight nearest voxels. The resampling unit 644 trilinearly interpolates the density, gradient, and irradiance using seven linear interpolators per channel. The tag is nearest-neighbor sampled. The sample data is passed to the segmentation unit 648 which looks up the color, opacity, and shading coefficients (total of 36+16+32=84 bits) in a density+tag indexed SRAM LUT.

The segmented and classified sample is passed to the compositing unit 649 which randomly jitters the sample location along the ray. The sample location and image destination bits are mangled to select a random factor from an SRAM LUT representing uniformly random numbers between ½ and 1. The sample opacity is then modulated, using another LUT to assist in computing the power function. The opacity of the ray is then updated by using the compositing equation.

If the ray is a lighting ray, the amount of energy lost to the surrounding voxels is computed as described above. If any energy should be deposited, the amount is forwarded to the miss scheduler 638 of the volume cache 606 in order to be added to the nearest eight voxels using the weights interpolated in the resampling unit 644. This reduces the available bandwidth and can lead to stalls, especially in low albedo mode. When a sample borders other blocks, up to seven other blocks may contain copies of the voxels because the voxels on one edge are shared. To maintain consistency among different copies, the energy is packaged up and queued on the neighboring blocks.

A special flag in the ray is used to mark them as irradiance carriers. When the volume cache 606 detects an irradiance carrier, it retrieves the current irradiance for each voxel from the cache 606, adds to them the trilinearly interpolated energy, and writes them back to the cache 606 and memory. The main additions required to accommodate this read/modify/write behavior are a datapath from the pipeline to the volume cache 606, a datapath from the pipeline to the dispatcher, and a recirculation from the data cache to the miss scheduler 638 to write the voxels.

If the ray is a rendering ray and global illumination is turned off, a shading unit 650 shades the sample. Preferably the shading unit 650 includes a reflectance map for shading the sample. The resolution of the reflectance map is $128^2$ for each of the six faces, but discretization artifacts are minimized by using bilinear interpolation. For globally illuminated rendering rays, illumination is computed based on the BSDF. The diffuse component is estimated by using the sampled irradiance. The specular component is resolved only if the ray is scattered and happens to hit the light source, which is only feasible for area light sources. To evaluate the specular component of the Phong lighting model would require casting a ray to each light source, multiplying the number of rays and flooding the fixed length ray queues. Alternatively, the reflectance map can be loaded with the specular component of the point light sources (rather than the usual black) and the result summed into the sample color.

The shading unit 650 is followed by the spatting unit 651 and the scattering unit 652. The splatting unit 651 updates the voxel data and ray data associated with a sample location. The order of the spatting unit 651 and the scattering unit 652 on the pipeline between the queue sorter 624 and the shading unit 650 is not critical.

The final stage of the pipeline includes a scattering unit 652 that scatters the ray based on the BSDF. If the BSDF of the sample's material is too complex for the hardware to compute, a flag is set in the ray data structure and the ray is directed to the ray sorter to be forwarded to the DSP for further processing. In the DSP, a user-specified routine computes the new ray direction and the ray is sent back to the processors via the bus. Simple BSDF's are evaluated in hardware. For example, isotropic scattering is computed by selecting a direction δ from a random direction LUT. The random index is selected by again mangling the ray position and destination bits. Glossy scattering is performed using:

$$D' = \frac{D + \beta\delta}{|D + \beta\delta|}$$

where D is the original direction and β some fraction controlling the glossiness. Glossy reflections are simulated by reflecting the original ray direction about the sample normal followed by glossy scattering. Careful selection of β permits simulation of perfectly sharp to diffuse materials.

Referring now to FIG. 64, the layout of the board 616 is much simplified by grouping all the processors 604 into a single ASIC. The rest of the board is composed of a DSP 618, some SDRAM 622 for the frame buffer, and preferably at least two RDRAMs 636 for volume memory. With this chip count, a single PCI board implementation is entirely feasible. Of course, additional RDRAMs 636 can be easily daisy chained to meet increased memory needs. The host is freed by the board of most rendering responsibilities. Besides modeling, manipulation, and final display, the host is largely available for other processing. The exception is when other algorithms are performed which rely on the host for most of the algorithmic work, while the board acts as a coprocessor.

The DSP 618 carries the bulk of the rendering management responsibilities. Prior to rendering, the DSP 618 coordinates loading the volume data and LUT onto the ASIC. During rendering, the DSP 618 continually generates new rays according to the viewing parameters and assembles the processed rays into an image in the attached SDRAM 622. At the end of rendering a frame, it transmits the image back to the host's main memory for display. The processors 604 require minimal control coordination during the actual rendering as they autonomously process and return rays. Preferably the ASIC pipeline is implemented in silicon.

The bandwidth of the PCI interface (132 MB/s) to the board 616 can become a bottleneck in some cases. For usual volume rendering and global illumination at 30 Hz, it is possible to transmit $512^2$ images at 36 bits per pixel (8-8-8-12 rgbα) without saturating the bus. However, other algorithms such as volumetric texturing, which require the full participation of the host, may flood the interface. In particular, if all the rays are generated on the host, transferred over the PCI bus 620, and returned over the bus 620, flooding may occur. In this mode, the frame rate or resolution might be reduced, unless the AGP interface which provides four times the bandwidth is used instead.

The pipelines are controlled through simple logic connections. There is no need to coordinate shared activity among the processors 604 over the bus. Therefore, the ray bus 628 can be physically implemented as two unidirectional connections. The DSP 618 to the processors 604 is just a broadcast connection, while the processors 604 to the DSP 618 is a many-to-one connection. The latter can be implemented as a binary tree of merging nodes.

The size of a ray packet is 32 bytes. The width of the bus can accommodate this size since it is on-chip. The bus frequency matches the processor 604 frequency (100 MHz) so each processor 604 receives one new ray every p cycles. Asp grows beyond four, this can become a limitation, particularly during the start-up period when the queues 626 are first filled. To overcome this, ray differentials can be used to compress a sequence of rays into a smaller data structure. Just as the host instructs the DSP 618 to generate all the rays for a specific viewpoint, the DSP 618 can instruct the processors 604 to extrapolate a number of rays given the differential (e.g., in direction and destination).

The communication between processors 604 is also in the form of ray packets of 32 bytes. Since this communication is local and presumably on-chip, it is easily implemented. Testing with a software simulator has shown that processors 604 communicate with each other only 2 to 4 out of 100 cycles. Therefore, each ray packet can be broken into several smaller parts and transmitted over a narrower bus at the same speed. However, partitioning the volume with repeating slabs increases the communication to about 7% and block skewing about 20%. Block skewing resulted in a bisection bandwidth of about 12 MB/s, while simple slabs had about 1 MB/s or less. Tests show that the memory interface is used 37.5% of the time during rendering and 92% of the time during the lighting pass of global illumination. The increased utilization is due to the irradiance splatting operation which requires a read-modify-write cycle.

A method for performing efficient volumetric backprojection will now be described. The method is useful in global illumination where the method is used to transport illumination through the scene, starting from the light sources and propagating outward. In addition, the method is useful in reconstruction such as computed tomography. The method can be implemented on the Cube-5 architecture or on a modified Cube-4 architecture as described in *Volumetric Backprojection*, by Frank Dachille IX, Klaus Mueller, and Arie Kaufman, *Volume Visualization Symposium* 2000, pp. 109-117, October 2000, which is incorporated herein by reference. The method will be now described in connection with a new algorithm for volumetric global illumination based on a sequence of backprojection iterations, and computed tomography as a basis for reconstruction.

In local illumination, the global distribution of light energy is ignored and shading calculations are performed assuming full visibility of all light sources. While this is useful as a first approximation, the incorporation of global light visibility information (shadows, one instance of global illumination) adds a great deal of intuitive information to the image. This low albedo lighting simulation has the ability to cast soft shadows by volume density objects. Generous improvements in realism are achieved by incorporating a high albedo lighting simulation.

We wish to solve the illumination transport equation for the general case of global illumination needs to be solved. The incident illumination I (γ,ω) in direction ω at any voxel γ can be described as $$I(\gamma,\omega) = \int_V \int_\Gamma f(\omega,\omega') I(\gamma,\omega') d\omega' dv$$

where Γ is the set of all directions, V is the set of all voxels v, and f(ω,ω') is the phase function in directions ω and ω'. This means that the illumination at any voxel is dependent upon the illumination at every other voxel. Generally in practice, this integral-equation is solved by finite repeated projection of energy among voxels. This leads to a finite energy transport path, which is generally sufficient for visual fidelity.

To implement the method some of the same assumptions for standard radiosity are made. In particular, the voxels are generally assumed to behave as diffuse surfaces when a gradient exists. When there is no gradient (as in the case of homogeneous fog) then the voxel scatters light in all directions isotropically. The computation is organized not per pixel or per voxel, but per direction. Organizing per direction capitalizes on coherence by utilizing slice-by-slice computation.

The volumetric scene is first analyzed to determine the initial distribution of lighting energy. Preferably the direct illumination (typically the major contributor to overall intensity) is computed directly. For directional light sources a single sweep similar to *Ray tracing volume densities*, by J. Kajiya and B. Von Hwerzen, *Computer graphics (SIGGRAPH '84 Proceedings)*, volume 18, pages 165-174, July 1984, along one major axis is sufficient to propagate the light energy to all the voxels. For point light sources both inside and outside the volume, the light intensity is backprojected outward from the light source to every voxel using a slice-based approach. However, it has been determined that in practice it is far simpler to shoot one or more rays toward each of the $N^2$ exterior voxels of the volume and account for the inverse-square intensity falloff of each ray.

Besides the volume density array p(s), $s \in R^3$, a radiosity array $I_r(s)$ and an unshot radiosity array $I_u(s)$ is maintained. A transfer function converts each sample volume density $\rho_i$ into an opacity $\alpha_i$ and color $C_i$. For many datasets, a simple linear ramp from zero opacity at density $\rho_a$ to full opacity at $\rho_b$ is sufficient. For CT datasets, it has been determined that it is useful to set $\rho_a$ at about 20% density and $\rho_b$ to full density to eliminate noise. For voxelized datasets, the full dynamic range was used. In experimentation, only a single wavelength of light with objects of a constant intensity were used. In any case, a transfer function should be chosen for the illumination transport which elucidates the features of interest, the same as in direct volume rendering. As a matter of implementation, the single density value could be replaced with pre-classified RGBα values to support pre-segmented volumes (e.g., the visible human dataset).

In the initial sweep of direct illumination, light energy is transported in proportion to the optical path length to the light source. The radiosity deposited into each voxel along a path from the light source to s is $$I_r(s) = e^{-\int \kappa(t)dt}$$

where $\kappa(s)$ is the extinction coefficient at s. The extinction coefficient describes the reduction in intensity of a light beam as it passes through a differential volume element. The integral is computed incrementally along the path using standard compositing to accumulate opacity along the ray. As energy is depleted from each ray it is deposited into both the radiosity array $I_r$ and the unshot radiosity array $I_u$ modulated by the reflectivity λ of the volume sample. Reflectivity dictates the percentage of light that is reflected out of the reduced light ray intensity. The extinction coefficient and reflectivity are both determined by a transfer function based on the local volume density. Note that trilinear or better interpolation should be utilized for both sampling the density ρ and depositing the energy into the radiosity $I_r$ and unshot radiosity $I_u$ arrays.

A different approach is utilized for area light sources. The computation of the direct illumination contribution of an area light source requires integrating across the entire area for each visible voxel. The integration is postponed until the next step by summing the energy directly into the radiosity and unshot radiosity $I_u$ arrays because this is nearly as difficult as calculating the indirect illumination. If all light sources are area light sources, then the indirect passes are processed next as the initial pass can be avoided. However, the smaller the area light sources, the longer it will take to reach equilibrium. Therefore, smaller area light sources can sometimes be more efficiently computed as a small set of point lights.

In the second pass, the integration of the illumination contribution of all voxels to all other voxels is performed by a finite number of iterations. In each iteration, a random direction σ for the backprojection is selected. Note that the convergence could be improved by selecting directions using a quasi-random (e.g.,) sequence of directions rather than a uniform random sequence. An preferred method is to select points distributed on a sphere as directions.

In each iteration, slices perpendicular to the major axis nearest to the random direction σ are processed. Starting with the first slice, a ray front in the form of a 2D buffer is initialized. This buffer is used to transport energy along the rays defined by the elements and σ. At each slice, the rays simultaneously accumulate and deposit energy from the neighboring voxels. The differential equation describing the transfer of energy I in a ray in direction σ over a differential length ds is:

$$\frac{dI}{ds} = \begin{cases} I_u(s)\phi(s,\sigma) & \text{if } |\nabla\rho| \cdot \sigma < 0, \\ I_u(s) - \kappa(s)I(s) & \text{if } |\nabla\rho| \cdot \sigma = 0, \\ -\kappa(s)I(s)\phi(s,\sigma) & \text{if } |\nabla\rho| \cdot \sigma > 0, \end{cases}$$

where ø(s, σ) is a function describing the tendency of a volume sample to emit or receive energy in the given direction. Fortunately, this equation is easily solved by finite differences, although it could equally well be solved by a finite element method. The gradient-based energy transfer equation is described next.

In a very high resolution lighting simulation, it would be possible to purely absorb and emit light isotropically by each voxel. This is akin to using microgeometry to determine the reflectance behavior of surfaces. But it is much more efficient to compile statistics on surface reflectances and use a bidirectional reflectance distribution function (BRDF) instead to model the gross effects of the microgeometry. In the absence of surfaces (where there is a zero gradient), a simple isotropic absorption-emission model is used. But at surface boundaries, the energy transfer is allowed to only occur in one direction. The ray energy is only allowed to be deposited onto the surface if the ray is approaching the surface. Conversely, unshot radiosity is only allowed to augment the ray energy if the ray is leaving the surface. Additionally, surfaces are modeled as ideal diffuse reflectors, and therefore the angle of incidence is taken into account using the dot product. This distinction between isotropic and diffuse reflectors is automatic, in contrast to Sobierajski's method of explicitly storing two coefficients per voxel as described in *Global Illumination Models for Volume Rendering*, by L. Sobierajski, Ph.D. thesis, Stony Brook; NY, August 1994.

ζ is used to distribute energy over several iterations. By only emitting part of the voxel radiosity in each iteration, the energy is distributed to a larger variety of voxels, leading to faster convergence. The complete algorithm for a single backprojection is given in FIG. 67. In the implementation in accordance with the invention, the ray buffer contains a slice-sized array of rays which are resampled for interaction with each voxel. Because of the bidirectional transference of energy between the rays and the volume, at least one of the participants must be resampled so that the exchange can take place at a specific location in space. Preferably the ray buffer is resampled because it is 2D requiring only bilinear interpolation instead of trilinear interpolation of the volume, or both.

In the procedure, energy exchange is computed one slice at a time, then the ray array is shifted along the ray direction to the next slice as indicated in FIG. 68. Parts of the ray buffer which move outside the volume are wrapped around to the other side and re-initialized. A modulo operation efficiently computes the wrap-around.

Clearly, the final distribution of energy will be strongly correlated to the initial chosen direction. If a certain voxel density gradient happens to be in the same direction as the initial direction σ, then all of the unshot energy will be shot in the initial iteration. Two techniques are used together to reduce this effect. First, a small value of ζ helps to spread out the contribution over more voxels. Second, the process is repeated many times and the result is averaged. To repeat this without using additional buffers, the total amount of energy added to the system is retained and used to normalize the individual voxel radiosity during rendering. This permits incremental refinement of the solution to include in increasing variety of directional sampling over time.

If desired the solution can be terminated early to display intermediate results because the iterative approach provides a progressive refinement. In a progressive refinement, the intermediate stages are visualized by estimating the distribution of energy throughout the scene. In order to avoid placing radiosity in the interior of solid objects the unshot radiosity is preferably not simply split equally among all the voxels. Preferably this is accomplished by proportioning the energy according to the product of density and gradient. In this way, empty voxels, which conventionally have zero density, and solid interiors, which usually have no gradient, are avoided.

The iterations are continued until convergence. Convergence is defined by the voxel-wise root-mean-square (RMS) difference between radiosity estimates Δi iterations apart being below some threshold δ. The RMS difference is computed by the Pythagorean sum of squared differences between corresponding voxels, assuming the original volume is in the range [0,1]. Of course, termination can be accelerated by accepting a greater error tolerance and vice versa, leading to an adjustable time-quality tradeoff.

Figure 69:
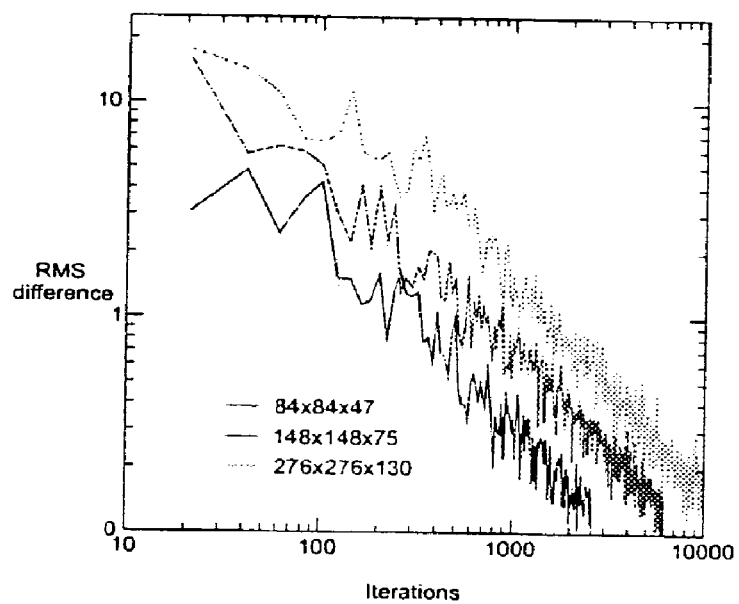
FIG. 69 shows convergence of radiosity in a scene.

Selecting Δi≧20 is used to avoid local minima in the search process. Referring now to FIG. 69, the logarithmic rate of convergence with t=20 and δ=0.1 is demonstrated. When convergence is achieved, there is usually unshot radiosity in the scene from the last several iterations. The radiosity added in each iteration has a half-life which is data dependent. The unshot radiosity can be (1) ignored and removed from the sum of unshot radiosities, (2) distributed among the other voxels of the scene, or (3) distributed more appropriately by iterating further until some proportion ε of the total energy is dissipated. The latter is the most appropriate technique, but this choice has little effect on the final distribution after convergence.

A modified version of direct volume rendering is used to render using the radiosity-density representation. Instead of shading each sample along the ray by summing the illumination by each of the light sources, the pre-computed radiosity is used which contains the influence of both the direct and indirect light sources. The image rendering equation from point $s_0$ in direction σ is then:

$$I(s_o, \sigma) = \int_{s_o}^{\infty} \rho(s) I_\star(s) e^{-\int_{s_o}^{s} \rho(t) dt} ds$$

It has been determined that the inclusion of cos(θ) factor in the integral similar too Lambert's law enhances the image contrast, emphasizes the gradient, and improves the overall appearance. θ is the angle between the viewing ray and the volume gradient. It is computed using the dot product ∇ρ(s)·σ clamped to the range [0,1]. In the absence of a volume gradient a value of 1 is used in place of the dot product, for this indicates a homogenous region that emits isotropically.

A number of methods have been proposed to reconstruct the 3D shape of objects from photographic images. Kutulakos and Seitz use a technique called space carving to generate a binary representation of the objects on a discrete volume grid, which is described in *A theory of shape by space carving*, by K. Kutulakos and S. Seitz, *Technical Report* 692, Computer Science Dept., University of Rochester, Rochester, N.Y., May 1998. It works by backprojecting the object's silhouette edges that can be detected in the images. Seitz proposed a method described in *Photorealistic scene reconstruction by voxel coloring*, by S. Seitz and C. Dyer, *International Journal of Computer Vision*, 25(3), November 1999, termed voxel coloring that works its way through the scene from front to back in layers and picks the probable color for each voxel based upon the acquired images. Both methods make a binary decision on what color and occupancy a voxel should have, which can lead to aliasing. A new approach to reconstructing a volumetric object from its backprojections is now described below.

The following observations are noted as being important criteria to reconstructing a volumetric object from its backprojections:

the degree of certainty about a voxel is preferably encoded into the opacity;

preferably the voxels are treated as point samples of a continuous field;

preferably only interior voxels should be labeled as fully occupied;

preferably the voxels on the surface should be partially occupied and indicated by partial opacity;

preferably the final voxel opacity should be a weighted average of the estimations given by the projections; and Due to the low-pass filtering inherent in image acquisition, all reconstructed objects will exhibit antialiasing.

Figure 70:
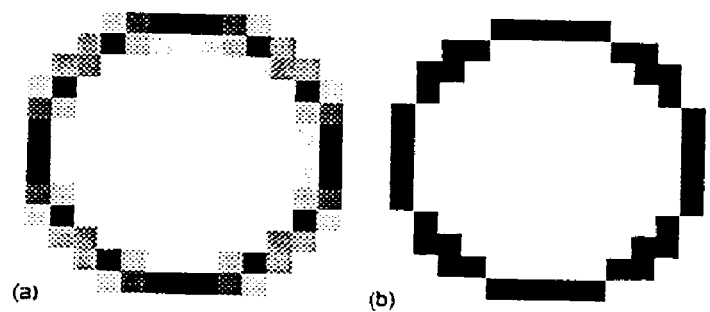
FIG. 70 shows a section from (a) continuous and (b) binary object reconstruction.

For example, FIG. 70 shows a section of reconstructed voxels from a hoop using continuous and binary occupancy decisions.

Reconstructing a volumetric object from its backprojections is a common procedure in the medical field. Computed tomography (CT) is routinely employed to recover a patient's interior from X-ray projections that were taken around a circular orbit around the patient. The most commonly used CT method is Filtered Backprojection (FBP), where the projections are first filtered with a high-pass filter, and then backprojected onto the volume. The high-pass filtering is necessary to avoid blurring of the reconstructed object, and the backprojection can be thought of as a simple spreading of the filtered projection image across the volume grid. The theory behind FBP requires the projection images to be spaced at equidistant orientations around the patient. The quality of the reconstruction suffers considerably when this prerequisite is not fulfilled, and also when the number of projections is small (that is why 500 and more projections are taken by medical scanners). In these scenarios, iterative techniques, such as the Simultaneous Algebraic Reconstruction Technique (SART), are more adequate. In SART, the volume is reconstructed by a sequence of projections and backprojections. The technique iteratively (1) projects an image from the volume currently being reconstructed, (2) compares it to the actual X-ray image acquired from the scanner, (3) corrects the reconstructed volume using backprojection, and (4) repeats the process until convergence.

To implement SART, a sequence of x-ray images is selected; convergence is faster if successive images are projected in approximately orthogonal directions. A relaxation factor $\lambda \in [0,1]$ is selected to mix each voxel with its correction. For each image in the sequence, the existing volume (initially empty) is projected from the same viewpoint as the x-ray image. The true image is subtracted from the approximate image and the result scaled by $\lambda$. This difference image corresponds to the correction which would fix the volume according to that viewpoint. Rays traverse the volume and deposit the correction value (either positive or negative) to the voxels along the ray. As the process is repeated, the volume converges to the original sampled volume.

CT can reconstruct three-dimensional object features of very little contrast (less than 0.5%) and with high resolution (less than 1 mm), but tomographic reconstruction is primarily used in the context of imaging with X-ray energies which are confined to hospitals and shielded industrial sites. Apart from the fact that X-rays are difficult to generate, health considerations prohibit the use of X-ray technology to scan real objects in the office, home, or laboratory, for subsequent incorporation on graphics scenes. The question is, can we use the high-fidelity properties of CT methods to reconstruct objects imaged with harmless visible light and so recover low-contrast and very detailed object features.

Since all CT methods including SART assume all objects can be perfectly penetrated by the X-ray beam, obscuration is not a problem. But, using visible wavelengths of light means that some parts of the scene may be obscured in some or all of the images. For that reason, the estimated volume usually never approaches the real volume because the interior is indeterminate. The same problem arises with reconstruction from saturated x-ray images. Furthermore, some parts of the scene may be indeterminate due to specular highlights (e.g., a mirror) or complete shadowing.

Figure 71:
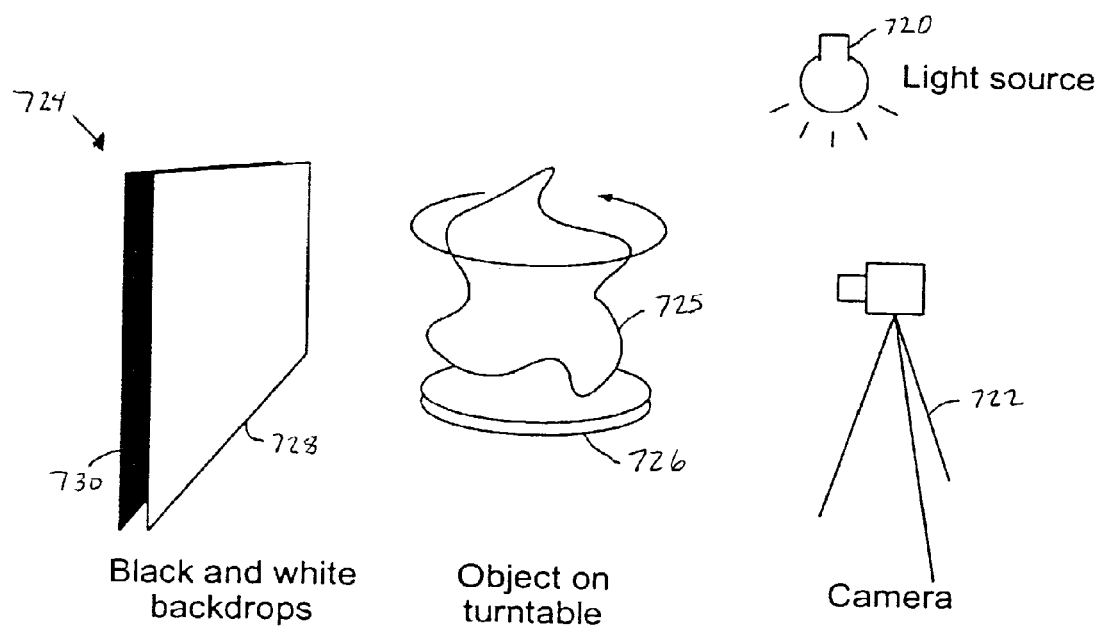
FIG. 71 shows a setup of the opaque reconstruction virtual test rig.

Referring now to FIG. 71, a virtual test setup is shown. A scene of random translucent triangles are voxelized into a reference volume. Then a virtual light source 720, camera 722, and backdrop 724 are positioned in the scene. The volume 725 is rotated on a virtual turntable 726 to acquire a non-uniform sequence of projections with both a white 728 and a black 730 backdrop and controllable ambient and diffuse shading. A reconstruction volume containing both color and opacity is initialized to empty. Then a number of iterations are used to converge the reconstruction volume.

In each iteration, a random source projection is selected and virally imaged. Although the opacity can be obtained with volume rendering, it is unavailable with standard image capture. Using two images, one with a white backdrop 728 and one with black 730, the opacity can be computed afterward with a straightforward derivation involving the compositing operator. Given a pixel of a photograph of the object over a white background $C_w$ and over a black background $C_b$, can be expressed in terms of the object color $C_o$, the object opacity $\alpha_o$, and the compositing equations $$C_w = C_o \alpha_o + 1(1-\alpha_o)$$

$$C_b = C_o \alpha_o + 0(1-\alpha_o)$$

and solving for object opacity $\alpha_o$ results in get $$C_o = \frac{C_b}{\alpha_o}$$

-continued $$C_w = \frac{C_b}{\alpha_o}\alpha_o + 1 - \alpha_o$$

$$\alpha_o = C_b + 1 - C_w$$

A corresponding projection is made from the reconstructed volume assuming some ambient and diffuse shading coefficients. The source opacity and color are compared to the reconstructed opacity and color and correction values are generated for each pixel, modulated by $\lambda$ as in SART. The correction opacity and color are backprojected through the volume and applied to the voxels along each ray. All processing was performed using a simple and efficient slice-based technique.

Advanced methods for volumetric global illustration that can be accelerated by a ray tracing architecture such as GI-Cube will now be described. These methods depart from previous techniques by processing more efficiently. Instead of iterative slice-based techniques for global illumination, the methods process a number of rays in direct proportion to the light intensity in every part of the scene A stochastic solution method for the transport equation will now be described. There is a well-known connection between visual importance and radiance. Bi-directional methods are the most promising tool for discovering the Markov chain transport paths that connect the light source(s) with the viewpoint. The first step in the new method, is to sample these transport paths in order to gain a statistical insight into the important modes of transport. Therefore, bi-directional methods are used to generate a sample list of complete paths from the light sources to the eye. Sufficient sampling is performed to collect information to make use of importance sampling techniques which is generally less than the amount required for generating an image. This is a stochastic method which can take advantage of anisotropic multiple scattering. The method can discover specular to diffuse transport paths efficiently since it is bi-directional.

The second step is to classify the list of transport paths. The voxels are aggregated into clusters of some manageable size. Preferably the transport paths are classified according to the location of interaction points. For example, a path that made two bounces at voxel clusters $V_3$ and $V_6$ between the light source and the eye would be classified under $LV_3V_6E$, using the notation described in *Adaptive radiosity textures for bidirectional ray tracing*, by P. Heckbert, *Computer Graphics (SIGGRAPH '90 Proceedings)*, Volume 24, pages 145-154, August 1990, which is incorporated herein by reference. The most significant transport paths are almost always the shortest which include those by direct illumination and single scattering. These transport paths will also generally occur with the greatest frequency. After all the paths are classified, they are sorted by frequency within the group.

The next step is to process each set of paths, from the most frequent to the least. Preferably an accounting is made for all the significant sources of illumination. Radiosity methods account for every possible diffuse transport path in a breadth-first manner. In the present invention, the illumination transport paths are processed in a depth-first manner. The most significant source is identified by starting with the most frequent. This is similar too the process of progressive refinement, except that we only concentrate on the most significant transport path. To process a set of paths, the amount of energy transported from the light to the eye over each image pixel is analytically determined. A variety of variance reduction techniques known in the art can be used. Suitable examples are described in *The rendering equation*, by J. Kajiya, *Computer Graphics (SIGGIAPH '86 Proceedings)*, Volume 20, pages 143-150, August 1986, and more recently in *Robust Monte Carlo Methods for Light Transport Simulation*, by E. Veach, Ph.D. thesis, Stanford Calif., December 1997, both of which are incorporated herein by reference. This technique can be compared to metropolis light transport ("MLT"), described in *Metropolis light transport*, by E. Veach and L. Guibas, *SIGGRAPH 97 Conference Proceedings, Annual Conference Series*, pages 65-76, August 1997, the method processes a transport path while sampling variations on the path by mutating the interaction points. In MLT, there is a great deal of variance over the image because the mutations are not continual over the image. In the present invention, this is changed by deterministically varying the interaction point over the image.

With a volumetric scene representation, a handful of elements, each of equal size and shape, are first constructed. Next bi-directional path tracing is performed to discover the statistically significant sources of light transport. Preferably the bi-directional path tracing is performed while taking into account possibly specular and diffuse BSDFs at every voxel. Note that a hardware accelerated and global illumination method is ideal for computing the random walks through the volumetric scene. The typical bi-directional path tracing method can be simplified since only important transport paths are being gathered. Random suffixes of light paths are connected to random prefixes of eye paths, as in standard bi-directional path tracing. However, light paths of equal weight and eye paths of equal weight are generated. That is, all light paths have approximately equal probability and the same for eye paths. In this way, paths can be randomly selected to join to form complete light transport paths. Direct illumination will be treated separately as a special case. Therefore, light paths of length two (2) or greater are randomly joined with eye paths of length two (2) or greater. That means that all eye paths have one vertex at the light source and at least one vertex of interaction with the medium. The same applies to the eye paths. Note that if either path has three vertices, the light source or the eye point can be chosen as a fourth vertex. This yields indirect illumination.

To generate the complete light transport paths, we select two random paths and attempt to connect them via a shadow ray. This shadow ray is the integration of opacity between the path endpoints. It can be easily computed by the processing engines of this invention. Hundreds of these shadow rays can be computed simultaneously using the intelligent ray scheduling of this invention.

The present invention uses the optical depth, which is a continuous measure of the visibility between two locations. This is the same computation that is used to connect paths in *Rendering participating media with bidirectional path tracing*, by E. Lafortune and Y. Willems, *Proceedings of the 7th Euorgraphics Workshop on Rendering*, pages 91-101, June 1996. Since the shadow direction is arbitrarily selected and not according to the BSDF, then the contribution of the transport path must be weighed by this weight. The paths are classified after a sufficient number of complete paths are generated.

The paths are classified by identifying each of the interaction points along the path according to the selected clusters. Therefore, each path can be classified as interacting with a short list of clusters. Paths that share the same list of clusters are grouped together into bins. The bins are then sorted by weight of contribution to the final image. In this way, the most full bin represents the general path along which most of the indirect illumination statistically occurs. By processing the bins in the order of most full to least full, a progressive method is provided that quickly converges to an approximate, importance sampled solution.

A k-d volume subdivision is used to process the complete transport path. For example, the element is first subdivided in half in one of the major axis directions (x, y, and z) and a sample is randomly taken in the unsampled half. The next time the element is subdivided, the two sub-elements are subdivided in a different major axis direction and two samples are randomly taken in the unsampled halves. The next time the element is subdivided, the four sub-elements are subdivided in the remaining major axis direction and four samples are randomly taken in the unsampled halves. The element nearest to the eye is always subdivided completely, i.e., each voxel is computed separately. The other elements are subdivided until there is no visible change in the final image. If there are two or more clusters before the final visible cluster, then the choice of which cluster to subdivide can be randomized in the same way as the randomized subdivision method presented in *The rendering equation*, by J. Kajiya, *Computer Graphics (SIGGRAPH '86 Proceedings)*, Volume 20, pages 143-150, August 1986.

After each subdivision step, the accumulated sub-image due to the current transport path is divided by two since the number of samples will double with the new subdivision. An optical depth is retained between each pair of sub-elements which corresponds to the percentage of energy that is transmitted between the two. The optical depth does not need to be recomputed when an element outside the pair is subdivided. The optical depth is actually never recomputed, but always re-used down one level in the subdivision, and one additional optical depth is computed for the newly subdivided element.

Further re-use can be accommodated at the expense of a little extra storage. After one transport path has been completely computed, a segment of another transport path may coincide with the path. The overlapping segment can be re-used, although this implies the re-used segment must be subdivided at the same level as the previous for the similar segment. This strategy amounts to a lazy evaluation of the complete set of $O(n^6)$ form factors in the context of radiosity. However, this method is view dependent and therefore not as restricted as radiosity due to the allowance for arbitrary BSDFs.

One problem so far is the computation of highly specular surfaces. A highly specular surface only contributes significantly in one single direction for any incident direction. Therefore, computing the contribution of one highly specular sub-element for all of the sub-elements further down in the transport path is prone to aliasing. One solution to this problem is to handle highly specular surfaces separately, creating a single transport path through a sub-element rather than the typical branching that occurs.

It is well known that path tracing is a more effective method than distribution ray tracing for the simple fact that more time is spent tracing important primary rays than an exponential number of secondary rays. For that reason, it is more efficient to sample the transport path by using path tracing rather than bushy ray tracing. Fortunately, the paths that determined the transport path originally can be re-used for the integration of the illumination on the last element.

Therefore, the modified algorithm is as follows:

1. Emit photons from the light source(s) into the volumetric scene according to the goiniometric distribution. All particle paths have an approximately equal probability of existence.

Compute the paths of the particles using the intelligent scheduling and processing of the proposed invention.

2. Emit importons (importance particles) from the viewpoint according to the visibility distribution. All importons have an equal probability of contributing to the image. Compute the paths of the particles using the intelligent scheduling and processing of the proposed invention.

3. Randomly connect photons paths with importon paths to generate complete light transport paths of length at lease 4 (including the light source and viewpoint). Weight the composite paths by the product of the optical depth, and the BSDFs of the two connected endpoints. Generate random connections between paths on the general purpose CPU. Each random connection of paths generates a new ray computation for the invention to process.

4. Subdivide the volume into a handful of volume clusters of equal size. Classify and group the paths according to the interactions within the clusters. For example if two paths both interact with clusters 7 and 15 before reaching the viewpoint, then group the two paths together into a bin.

5. Sort the bins from largest contribution to the smallest contribution and process the bins in that order. This leads to a progressive refinement solution to indirect illumination.

6. Process each bin by selecting some proportion of the transport paths and computing analytically the contribution to each voxel of the last cluster, and finally the contribution to the final image. The number of sub-paths computed for each transport path should be proportional to the statistical contribution of the transport path (as estimated in step 5).

7. Continue processing paths until there is no further change to the final image.

Step 6 can be expanded to explain the details further. At the interaction point just before the final cluster, the original transport sub-paths in the bin correspond to a photon hit within the cluster. These photon hits can be used to estimate the indirect illumination within the final cluster. Some proportion of these photon hits is selected to compute the indirect illumination. The proportion may be smaller than the original statistical evaluation or it may be larger (requiring additional photon paths to be traced). If additional paths are required, these could be generated by a rejection method—rejecting those paths that do not traverse the desired cluster path. However, this is slow. Another method is to select random voxels in each new cluster and compute the probability of transport along this path. This differs from the original method of generating equal weight (probability) particle paths. However, we already modified the probabilities during the matching procedure, so this is of no consequence.

When a set of photon hit points are identified, process each hit point using a three-point transport equation. First, convert the incoming energy at the hit point into an outgoing energy in the direction of the first voxel in the final cluster. Then compute the optical depth (using the invention to integrate the opacity along the ray) between the hit point and the first voxel and modify the weight by this quantity. Continue by using the BSDF at the first voxel to convert the energy into an energy in the direction of the viewpoint. Again, modify the weight by the optical depth with respect to the viewpoint. Finally, contribute the final weighted energy to the image.

This procedure can be improved a bit by reordering the computation. In a slightly more efficient way, some of the quantities can be computed incrementally. With a little more up-front cost in determining the proper set of rays, the final cluster can be ray casted ray-by-ray. For each ray, the optical depth is determined incrementally as in the usual ray casting method. Then, at each voxel, not all the hit points and determining the contribution from each, using the BSDFs at each interaction point and the optical depth between them.

A recursive blocking method and apparatus for storing and traversing a 3D volume data will now be described. To understand the advantages of the recursive blocking method, the traditional method of storing and traversing a 3D volume data will be briefly described.

Figure 72:
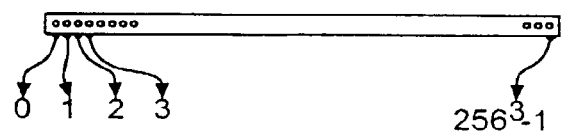
FIG. 72 illustrates a linear memory array that is used by both the traditional linear volume layout and recursive blocking volume layout.
Figure 73:
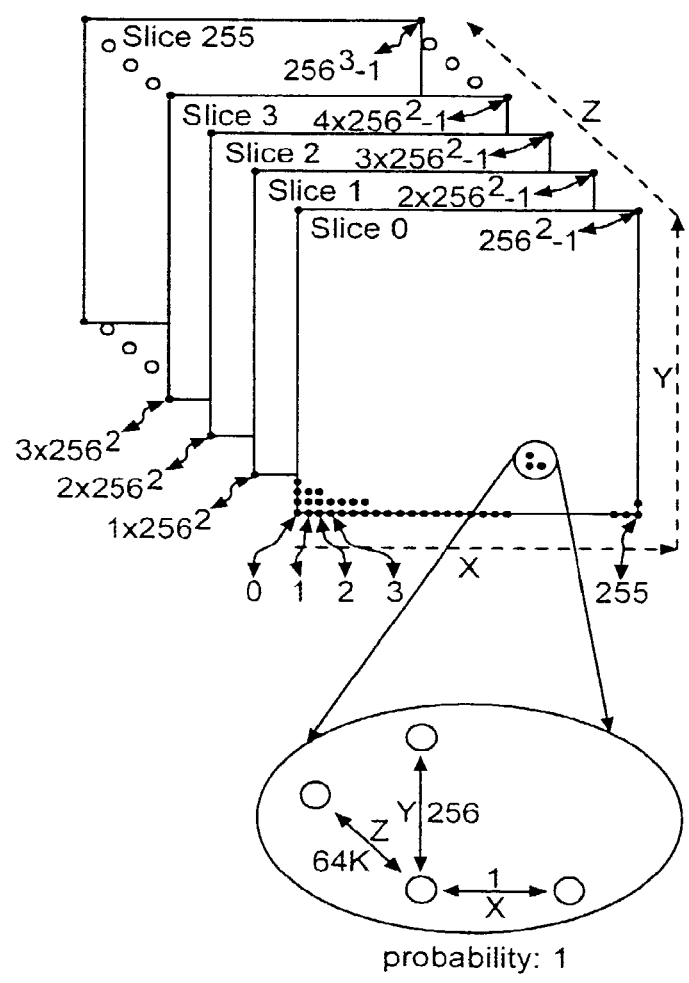
FIG. 73 illustrates a linear volume layout.

Volume rendering 3D scalar volumes are stored as linear arrays as shown in FIG. 72. Referring now to FIG. 73, in the traditional linear volume layout all the voxels of one x-axis-aligned scan-line are first stored. The data is then stored scan-line by scan-line until one slice (xy-plane) is filled. Finally the data is stored slice by slice along the z-axis. With this approach the preferred traversal order is in storage order-scan line by scan line. In order to apply a Gauβ filter with radius 2 voxels, the data has to be convolved with a $5^3$ filter. This forces scan lines from 5 consecutive slices to be brought up the memory hierarchy to the CPU. For a typical $256^3$ volume, each $256^2$ slice of 8 bit scalar data has a space requirement of $2^8 \cdot 2^8 B=64$ KB. Thus, for all data touched by the filter during processing of one slice 5·64 KB in the source and 64 KB in the destination volume are needed. These 384 KB are well beyond Level 1 cache sizes and even larger than many Level 2 caches on older PCs. Therefore, when the next slice is filtered the voxels which have been transferred to the cache for reading during processing of the previous slice are no longer there and need to be re-fetched. In addition, since cache sizes as well as volume sizes are usually powers of two (2), caches having a capacity less than or equal to one slice scan lines with the same offset from a slice beginning also map to the same cache line. Thus for a $5^3$ filter and the destination volume to reside in the cache collision-free, the cache would have to be six way associative. As Level 1 caches are mostly two-way associative, voxel data is constantly being replaced, even during processing of just one scan line.

Figure 74:
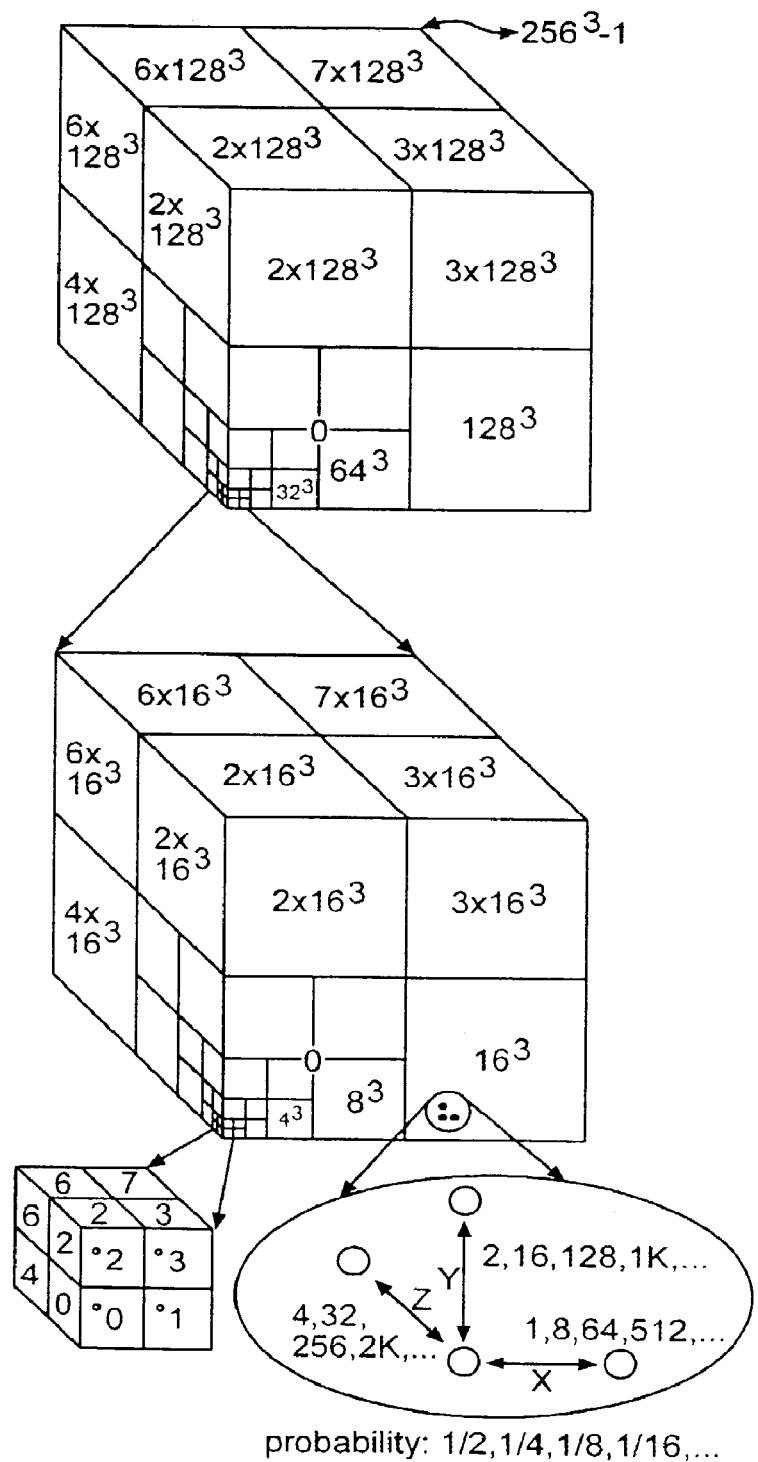
FIG. 74 illustrates a recursive blocking volume layout for a 256 cubed volume.

Referring now to FIG. 74 a recursive blocking volume layout is shown for a $256^3$ volume. The recursive blocking method stores and traverses the 3D volume data such that the cache access hit ratio is near optimal. Generally a voxel with 3D position $P_{xyz}$ is stored at array offset $O_{xyz}$. The 3D position $P_{xyz}=(x; y; z)$ is in integers and has the bit pattern ( . . . , $x_3$, $x_2$, $x_1$, $x_0$; . . . , $y_3$, $y_2$, $y_1$, $y_0$; . . . , $z_3$, $z_2$, $z_1$, $z_0$) while $O_{xyz}$ has the bit pattern ( . . . , $z_3$, $y_3$, $x_3$, $z_2$,$y_2$, $x_2$, $z_1$, $y_1$, $x_1$, $z_0$, $y_0$, $x_0$). The 3D volume data is stored in a flat array of generally the same size as that which is used for the traditional linear volume layout, but the order in which the voxels are stored is different. In the recursive blocking method, the 3D volume data is recursively subdivided into preferably eight (8) octant blocks until the second lowest level it reaches is $2^3$ voxel blocks and finally a single voxel. The memory array indices of each block have the index of the voxel as shown in the exploded view of the front lower left corner in FIG. 74. The conversion between offset $O_{xyz}$ to 3D position $P_{xyz}$ are preferably done through bit manipulations. Alternatively they can be achieved through the use of lookup tables. To go from position to offset one can add the independent (separable) x, y, and z offsets which can be stored in a lookup table of 256 entries when processing a $256^3$ volume. This table requires 4·256B=1 KB which is less than 10% of even the smallest (16 K) Level 1 caches. The reverse conversion through lookup tables breaks the bit representation of the offset in groups that tan become the indices into position lookup tables whose entries need to be added to yield the 3D position. The data traversal is preferably done in linear storage order. Although the data layout is logically recursive, bit manipulations and lookup table computations are preferred fast and direct methods. A complete example of the recursive blocking of a volume will now be explained with reference to a $4^3$ volume.

Referring now to FIG. 75, a recursive blocking volume layout is shown for a $256^3$ volume. The memory array indices of each block have the index of the voxel as shown on the faces of the volume in FIG. 75. The memory array indices of each interior block have the index of the voxel as shown for the respective slices as shown in FIG. 76. Using the above equation where $P_{xyz}$=(x; y; z)=(3,1,1) and x, y, and z are in integers, the bit pattern ( . . . , $x_3$, $x_2$, $x_1$, $x_0$; . . . , $y_3$, $y_2$, $y_1$, $y_0$; . . . , $z_3$, $z_2$, $z_1$, $z_0$)=( . . . 0011; . . . 0001; . . . 0001) while $O_{xyz}$ has the bit pattern ( . . . , $z_3$, $y_3$, $x_3$, $z_2$, $y_2$, $x_2$, $z_1$, $y_1$, $x_1$, $z_0$, $y_0$, $x_0$)=( . . . 000000001111) which equals 15 in integers. Referring now to FIG. 77, the lookup table for converting a 3D position to an offset is shown and includes separate offsets for each axis. The Index can be determined by the following equation:

$$Index = LUTx[x] + LUTy[y] + LUTz[z]$$

For $P_{xyz}$=(x; y; z)=(3,1,1), the Index=LUTx[3]+LUTy[1]+LUTz[1]=9+2+4=15. For converting from the offset to the 3D position, the lookup tables in FIG. 78 are used to perform bit manipulations. The Lookup table for the index to position conversion breaks the bits of the index into groups. For each group there is a table which has x, y, and z positions as entries. Given an index it is broken into its bit groups and each corresponding table entry is added to yield the final x, y, and z position. The $P_{xyz}$=(x; y; z) can be determined by the following equation:

$$P_{xyz} = (x; y; z) = LUT5\text{-}3[B] + LUT2\text{-}0[A]$$

where A equals the integer value of the first three (3) places of the Index bit group and B equals the integer value of the second three (3) places of the Index bit group. For example, where the Index=15 integer=001111 binary, A=111 binary=7 integer and B=001 binary=1 integer. For index=15, $P_{xyz}$=(x; y; z)=LUT5-3[1]+LUT2-0[7]=(2,0,0)+(1,1,1)=(3,1,1).

The apparatus of the invention is an addressing unit configured with the method of the invention. The addressing unit can be, for example, any suitable computer, processor (e.g., digital signal processor, microprocessor, etc.), microcontroller, or circuit designed to be incorporated into a volume rendering system.

The present invention is designed for the use of hierarchical memory. All data paths are built to optimize the latency/bandwidth/cost tradeoffs. With the recursive blocking data layout and traversal, the time spent in the memory hierarchy levels close to the processing units is maximized. In the example of the $5^3$ Gauβ filter, all 125 voxels covered by the filter and even a complete 3D neighborhood of $16^3$ voxels is laid out cache-line collision free and requires only 4 KB cache space. Multiples of these neighborhoods fit easily onto each processing element. Thus, while traversing the current neighborhood, we can page in the next neighborhood to be touched by the algorithm.

Figure 79:
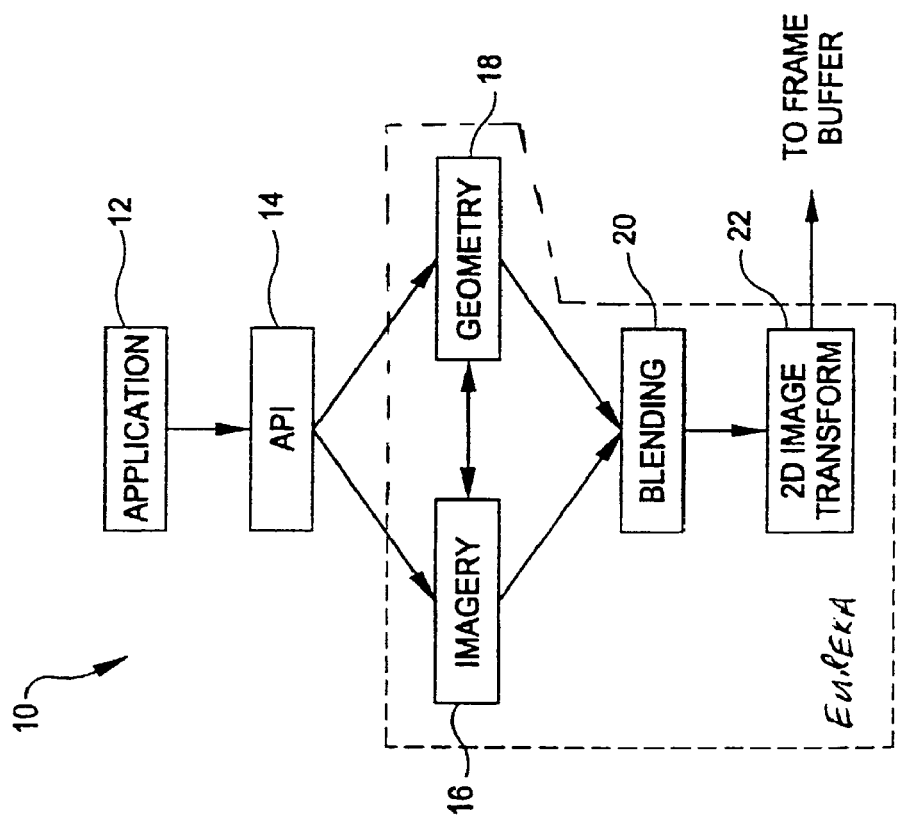
FIG. 79 is a conceptual block diagram illustrating a universal three-dimensional rendering and processing of high-resolution datasets formed in accordance with one embodiment of the present invention.

Referring now to FIG. 79, a volume processing architecture known as EUREKA which employs a conventional polygon geometry pipeline, tightly coupled to an imagery pipeline will be described. The EUREKA architecture is similar too the Cube-5 architecture shown in FIG. 2 but now includes a geometry unit 18 for processing additional objects other than volumes as described below. The EUREKA architecture uses a three-level dynamic memory hierarchy similar to the Cube 5 architecture described above and holds volumes, partial computation and rendering results, surface objects, 2D or 3D textures (possibly mip-mapped), and images for image-based rendering. The EUREKA architecture includes a programmable processing element with embedded Level 1 memory. When arranged in parallel, the EUREKA units read data from their dedicated Level 2 memory modules, possibly exchange some data with their neighbors, process them and write back the results. The final ray value is collected through a data bus, which forwards it to the blending and warping units. A key feature of EUREKA is its ability to scale up the addition of identical pipelines and memory. The only bus on the system provides image order bandwidth and simple control information. Global ray communication required for rendering is achieved through fixed, local communication within and between pipelines.

The memory hierarchy is a cascade of memories with increasing bandwidth and decreasing size toward the PEs. The data is organized in blocks (cuboid subvolumes) allowing transfers of blocks between levels. Blocks move through the hierarchy as needed and are aligned with the scheduling grid at Level 1. Connections between neighboring EUREKA units allow high-bandwidth communication of ray information between spatially coherent cells instead of the usual up-overdown communication.

Normal volume data is read-only and thus can be discarded upon replacement in the lower levels of the memory. However, some blocks (e.g., ray data, reconstructed volume data, and global illumination data) are read-write and thus are written back up the hierarchy. EUREKA also lends itself to rendering of real-time 4D data by using a set of parallel I/O ports connected to the Level 2 memories.

The EUREKA memory hierarchy enables efficient handling/rendering of large datasets including those which are much larger than Level 1. Often, the entire dataset does not contribute to the final image due to empty or opaque data regions. We take advantage of this by employing space leaping and early ray termination. These interfame coherence allow the working set of blocks to remain resident in lower hierarchy levels.

A preferred embodiment of the EUREKA architecture includes standard a DRAM (e.g., SDRAM, RDRAM) to implement Level 2 memory. For example, 50 GB of bandwidth can be supplied using Rambus devices operating at 800 MHz and wide 512 bit datapath on the board. We can expect 100% bandwidth utilization of these DRAM devices because block transfers will always be larger than minimal burst lengths. Level 1 memory includes on-chip memory adjacent to the PEs. The preferred embodiment of the EUREKA architecture preferably includes embedded DRAM (eDRAM) for providing very dense storage.

The preferred embodiment of the EUREKA architecture includes an application programming interface (API) for allowing applications to access and use of the EUREKA hardware. Preferably the programming interface will also include a software development kit (SDK). Both the API and SDK are be compatible with OpenGL and Direct3D. VolVis, a comprehensive volume visualization software that provides a solid foundation for the API. Besides the meta-objects discussed above (polygon, voxel, image, and point), other commonly-used graphical objects include free-form parametric curves/surfaces, curves/surfaces defined by algebraic functions, free-form sculptured solids, subdivision solids CSG-based shapes, and deformable models for time-varying phenomena. The EUREKA architecture can adaptively sample aforementioned objects in an effective way and accurately convert them at the programming interface level.

EUREKA processes a set of arbitrarily positioned and oriented generalized rays one sample at a time in a round-robin fashion. To achieve spatial coherence, a set of rays are grouped together based on a regular 3D spatial partitioning. The group of rays are then processed one grid cell at a time or in parallel on multiple processing elements (PEs) similar too ray tracing of large geometric scenes. The rays consist of a data structure containing a start point, a direction, a partially composited color and opacity, and a final image destination. That is, each ray contains all the information necessary to continue processing without auxiliary information which can support arbitrary projections (e.g., perspective, fish-eye). Image rays are cast into the scheduling grid and each is stored in a queue associated with the intersected grid cell. The cells are scheduled for processing in an order that minimizes the total processing time. Scheduling heuristics are defined based on the status of the rays and ray queues. Further, the scheduler considers the data distribution throughout the memory hierarchy as well as the contribution of each cell toward completion of the image.

For ray casting, the scheduling algorithm takes advantage of the fact that the viewing and lighting rays all travel outward from the originating point. Ray tracing a cell is performed with a deep pipeline for resampling, classification, shading, compositing, and ray scattering. Usually there are more rays in the ray queue than pipeline stages, thus enabling full pipeline utilization.

The EUREKA architecture uses ray-directed rendering to efficiently combine into a common framework the following major rendering and processing paradigms: volume rendering, volumetric ray tracing with global illumination, mixing volumes with translucent polygons, texture mapping, image-based rendering, point-based rendering, tomographic reconstruction, and volume processing.

In Volumetric Global Illumination the EUREKA architecture uses a two pass approach. In the first pass, we generate an irradiance volume, a discretized approximation of the received light energy at each point in the volume. Furthermore, we permit scattering at every sample with directions based on an indexed bidirectional scattering distribution function (BSDF). In the second pass, we visualize the volume by shooting view rays and integrating the pre-computed irradiance at each voxel. In both viewing and rendering passes, rays are possibly scattered at every sample leading to a bi-directional method that automatically generates soft shadows, caustics, sub-surface scattering, and radiosity through multiple scattering.

In mixing polygons with volumes, we place them in buckets for each scheduling grid cell rather than between volume slices. When a PE is scheduled to render a cell, it receives both the volume data and polygons. The rays which are processed for that cell are, first, intersected with the polygons. The closest intersection point is stored in the ray and the ray is cast through the volume data, stopping at the polygon intersection point. Scattering (transmission or reflection) is computed and the secondary rays are similarly processed. EUREKA rasterizes polygons in the geometry pipeline to allow large polygon datasets to be rendered at high frame rates. The projected RGBαZ image is used to initialize the ray endpoints. Subsequently, the volume is rendered terminating the rays at the proper depth. This leverages existing geometry hardware to correctly render, in real-time, opaque polygons in harmony with volume rendering. Translucent polygons must be rendered in sorted order to yield correct results. The recursive ray tracing algorithm automatically handles any number of multiple translucent polygons.

Texture mapping is a widely-used technique to simulate high-quality image effects, such as surface details, lighting and shadows. The polygon engines are supplied texture mapping functionality with the imagery pipeline of EUREKA. The geometry pipeline's only responsibility will be to rasterize triangles, while the imagery pipeline will perform the texture lookups. One advantage of the programmable PEs performing the texturing operations is that higher-quality anti-aliased texture methods such as EWA can be used when desired. Deferred texturing lowers the cost of utilizing such higher quality methods.

Image-based techniques use images as rendering primitives. Rendering then becomes a resampling process, which can be efficiently implemented using a general-purpose CPU possibly with the assistance of texture-mapping hardware. Preferably EUREKA supports image-based rendering techniques with programmable PEs, blending, and warping units.

Points are represented as a smooth, radially symmetric 3D basis kernel function that can be pre-integrated into a 2D table, also called the footprint. Points can be located at arbitrary positions and can be represented as a multi-resolution hierarchy. EUREKA's ray-directed rendering approach will render points using the ray-based point-array traversal scheme of Mueller and Yagel. In that approach, rays traverse the points in volume space, computing the footprint table indices by simple differencing equations. The needed coefficients can be stored with the ray.

Tomographic reconstruction is a technique used to recover 3D volumes from a set of 2D projection images. These images can originate from an X-ray scanner as well as a photographic camera. Tomographic reconstruction consists of a series of volumetric backprojections, possibly intermixed with a series of froward projections when an iterative reconstruction algorithm is chosen. Both forward and backward projection can be efficiently implemented in EUREKA. The ray-directed approach enables the modeling of ray scattering and attenuation, which is crucial for high-fidelity reconstruction of volumes from functional modalities, such as SPECT and PET. Especially the functional modalities will benefit greatly from the tremendous speed of EUREKA which can reduce these reconstruction times by two orders of magnitude.

Volume processing includes segmentation, feature extraction, manipulation (e.g., transformation, deformation, sculpting, multi-volume or multi-field registration through warping, volumetric CSG, physics based modeling, FEM) and other non-rendering tasks which are performed on volumes. Many volume processing applications produce a new volume dataset which must be subsequently rendered. EUREKA's PEs will enable interactive processing, with sub-second feedback for combined processing and rendering.

In summary EUREKA is the first programmable scalable architecture that supports real-time, high-quality volume rendering and processing of high-resolution datasets. Furthermore, EUREKA is not just a volume rendering machine, it supports other graphics operations efficiently, such as rendering of surfaces (e.g., polygons), texture mapping, image-based rendering, point-based rendering, mixed rendering, volumetric ray tracing, tomographic reconstruction, and segmentation. It combines the efficiency of polygonal rendering, the expressive power of volume visualization, the photorealism of image-based methods and the simplicity of point-based rendering, in a single framework.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the present invention.

What is claimed is:

1. A method for casting shadows of a volume dataset in relation to point light sources located both inside and outside, distant light sources located outside the volume dataset, and area light sources inside the volume dataset, the volume dataset comprising a plurality of discrete voxels stored in a distributed fashion in a plurality of three-dimensional (3D)) memory units, each of the voxels having a location lying on a gridpoint in the volume dataset and having voxel data associated therewith, the method comprising the steps of:
   (a) computing sum of the optical path length to all the point light sources for all of the voxels in the volume data set;
   (b) storing the sums of the optical path length values in both a radiosity array and an unshot radiosity array;
   (c) selecting a projection direction and a face of the volume dataset which is most perpendicular to the projection direction;
   (d) dividing the volume dataset along the projection direction into a plurality of slices which are parallel to the face, the plurality of slices having a first slice, the first slice having at least one voxel associated with the face;
   (e) initializing a two dimensional (2D) array of rays on the selected face with any distant light source energy, each of the rays having a path parallel to the projection direction and ray data associated therewith;
   (f) assigning the first slice as a current slice;
   (g) integrating and distributing light energy to voxels along each path of each ray within the current slice; and
   (h) repeating step (g) by sequentially sweeping along the projection direction through each subsequent slice until each of the plurality of slices is processed, each subsequent slice in turn becoming the current slice.

2. A method for casting shadows as defined in claim 1, wherein step (e) comprises the sub-steps of:
   (a) makings a copy of all the ray data and all voxel data on the current slice, the voxel data including the reflectivity, opacity, radiosity, and unshot radiosity, the ray data representing light energy;
   (h) selecting a current voxel;
   (c) determining an appropriate neighborhood of rays for the current voxel;
   (d) resampling the ray data at the current voxel;
   (e) modulating the ray data by a factor zeta to distribute the energy;
   (f) updating the current voxel data based on the resampled ray data;
   (g) updating the data of the neighboring rays based on the current voxel data;
   (h) repeating steps (b) through (g) for each voxel in the current slice;
   (i) storing the ray data back into the neighboring rays; and
   (j) storing the voxel data back into the volume dataset.

3. A method for performing global illumination of a volume dataset in relation to point light sources located both inside and outside, distant light sources located outside the volume dataset, and area light sources inside the volume dataset, the volume dataset comprising a plurality of discrete voxels stored in a distributed fashion in a plurality of three-dimensional (3D) memory units, each of the voxels having a location lying on a gridpoint in the volume dataset and having voxel data associated therewith, the method comprising the steps of:
   (a) computing sum of the optical path length to all the point light sources for all of the voxels in the volume data set;
   (b) storing the sums of the optical path length values in both a radiosity array and an unshot radiosity array;
   (c) selecting a projection direction and a face of the volume dataset which is most perpendicular to the projection direction;
   (d) dividing the volume dataset along the projection direction into a plurality of slices which are parallel to the face, the plurality of slices having a first slice, the first slice having at least one voxel associated with the face;
   (e) initializing a two dimensional (2D) array of rays on the selected face with any distant light source energy, each of the rays having a path parallel to the projection direction and ray data associated therewith;
   (f) assigning the first slice as a current slice
   (g) integrating and distributing light energy to voxels along each path of each ray within the current slice;
   (h) repeating step (g) by sequentially sweeping along the projection direction through each subsequent slice until each of the plurality of slices is processed, each subsequent slice in turn becoming the current slice; and
   (i) repeating steps (c) through (h) continuously during global illumination.

4. A method for performing global illumination as defined in claim 3, wherein step (e) comprises the sub-steps of:
   (a) making a copy of all the ray data and all voxel data on the current slice, the voxel data including the reflectivity, opacity, radiosity, and unshot radiosity, the ray data representing light energy;
   (b) selecting a current voxel,
   (c) determining an appropriate neighborhood of rays for the current voxel;
   (d) resampling the ray data at the current voxel;
   (e) modulating the ray data by a factor zeta to distribute the energy;
   (f) updating the current voxel data based on the resampled ray data;
   (g) updating the data of the neighboring rays based on the current voxel data;
   (h) repeating steps (b) through (g) for each voxel in the current slice;
   (i) storing the ray data back into the neighboring rays; and
   (j) storing the voxel data black into the volume dataset.

* * * * *

UNITED STATES PATENT AND TRADEMARK OFFICE
CERTIFICATE OF CORRECTION

PATENT NO. : 7,471,291 B2  Page 1 of 1
APPLICATION NO. : 11/556993
DATED : December 30, 2008
INVENTOR(S) : Kaufman et al.

It is certified that error appears in the above-identified patent and that said Letters Patent is hereby corrected as shown below:

ON THE TITLE PAGE ITEM 74:

now reads "Hoffman"
should read --Hoffmann--

IN THE SPECIFICATION:

In Column 1, Lines 18-21,  now reads "This invention was made with Government support under grant MP9527694 awarded by the National Science Foundation and under grant N000149710402 awarded by the Office of Naval Research."

should read --This invention was made with government support under grant MIP9527694 awarded by the National Science Foundation and under grant N00014-97-1-0402 awarded by the Office of Naval Research. The government has certain rights in the invention.--

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,471,291 B2
APPLICATION NO.  : 11/556993
DATED            : December 30, 2008
INVENTOR(S)      : Kaufman et al.

It is certified that error appears in the above-identified patent and that said Letters Patent is hereby corrected as shown below:

IN THE PATENT:

Column 2, line 20:       Now reads:    "quadlilinear"

Should read:  -- quadrilinear --

Column 15, line 32, 38:  Now reads:    "By passing"

Should read:  -- By bypassing --

Column 21, line 53:      Now reads:    "scanline 52"

Should read:  -- scanline S2 --

Column 24, line 12:      Now reads:    "[x(bf – ce) + b – hc]"

Should read:  -- [y(bf – ce) + b – hc] --

Column 27, lines 61-62:  Now reads:    "S(y, z, (e,f))"

Should read:  -- S(xy, z (e,f)) --

Column 30, line 35:      Now reads:    "S((x, (a, g)), (z, y, b)) S (y, sz, (I, f))):"

Should read:  -- S ((x, yz (a, g)), (z, y, b)) S (y, xz, (I, f))): --

Column 31, line 39:      Now reads:    " $SH_{3D_x} = S(yz, x, (c, d)) \bullet S(xz, y, (g, h))$ "

Should read:  -- $SH_{3D_z} = S(yz, x, (c, d)) \bullet S(xz, y, (g, h))$ --

UNITED STATES PATENT AND TRADEMARK OFFICE
CERTIFICATE OF CORRECTION

PATENT NO. : 7,471,291 B2
APPLICATION NO. : 11/556993
DATED : December 30, 2008
INVENTOR(S) : Kaufman et al.

It is certified that error appears in the above-identified patent and that said Letters Patent is hereby corrected as shown below:

Column 39, line 5:   Now reads:   " $\sum_{s=0}^{N}\left(\frac{N\_e_z}{e_z+s}\right)^2$ "

Should read:   -- $\sum_{s=0}^{N}\left(\frac{N \cdot e_z}{e_z+s}\right)^2$ --

Column 44, line 3:   Now reads:   "Porter-Duff a compositing rules"

Should read:   -- Porter-Duff α compositing rules --

Column 49, line 35:   Now reads:   "fine buffer chips"

Should read:   -- frame buffer chips --

Column 51, line 30:   Now reads:   "$C_c=(C_c+(C_p-C_c)\alpha_p)+[C_v-(C_c-C_c)\alpha_p)]\alpha_v$"

Should read:   -- $C_c=(C_c+(C_p-C_c)\alpha_p)+[C_v-(C_c+(C_p-C_c)\alpha_p)]\alpha_v$ --

Column 51, line 40:   Now reads:   "64 MB being read from the same buffer"

Should read:   -- 64 MB being read from the frame buffer --

Column 55, line 20:   Now reads:   "when the coefficients are ire-normalized"

Should read:   -- when the coefficients are pre-normalized --

UNITED STATES PATENT AND TRADEMARK OFFICE
CERTIFICATE OF CORRECTION

PATENT NO. : 7,471,291 B2
APPLICATION NO. : 11/556993
DATED : December 30, 2008
INVENTOR(S) : Kaufman et al.

It is certified that error appears in the above-identified patent and that said Letters Patent is hereby corrected as shown below:

Column 55, line 28:   Now reads:   "D'ist = $A(x - 1) + B_y + C_z + D$"

Should read:   -- Dist' = $A(x + 1) + B_y + C_z + D$ --

Column 55, line 42:   Now reads:   "with a single"

Should read:   -- with just a single --

Column 55, lines 43-44:   Now reads:   "for computing the distance from plane"

Should read:   -- for computing the distance from a plane --

Column 57, lines 8-10:   Now reads:   "re-uging most of the hardware from the system, in a similar manner as setup is performed on the host system for 2D rasterization."

Should read:   -- re-using most of the hardware from the volume rendering pipeline. The setup for each triangle preferably occurs on the host system in a similar manner as setup is performed on the host system for 2D rasterization. --

Column 57, line 17:   Now reads:   "computation nit"

Should read:   -- computation unit --

Column 57, line 24:   Now reads:   "teh X, Y or Z direction"

Should read:   -- the X, Y or Z direction --

UNITED STATES PATENT AND TRADEMARK OFFICE
CERTIFICATE OF CORRECTION

PATENT NO. : 7,471,291 B2
APPLICATION NO. : 11/556993
DATED : December 30, 2008
INVENTOR(S) : Kaufman et al.

It is certified that error appears in the above-identified patent and that said Letters Patent is hereby corrected as shown below:

Column 57, line 25:   Now reads:   "preforms an X-step 312,"

Should read:   -- performs an X-step 312, --

Column 57, line 27:   Now reads:   "The hardware of looping through"

Should read:   -- The hardware for looping through --

Column 57, line 31:   Now reads:   "As shown in Fig. 2"

Should read:   -- As shown in Fig. 42 --

Column 58, line 23:   Now reads:   "values-Skewing"

Should read:   -- values. Skewing --

Column 71, line 33:   Now reads:   "Early may termination"

Should read:   -- Early ray termination --

Column 75, line 31:   Now reads:   "amiss scheduler 638"

Should read:   -- a miss scheduler 638 --

Column 77, line 66:   Now reads:   "Asp"

Should read:   -- As p --

UNITED STATES PATENT AND TRADEMARK OFFICE
CERTIFICATE OF CORRECTION

PATENT NO. : 7,471,291 B2  Page 5 of 5
APPLICATION NO. : 11/556993
DATED : December 30, 2008
INVENTOR(S) : Kaufman et al.

It is certified that error appears in the above-identified patent and that said Letters Patent is hereby corrected as shown below:

Column 93, line 7:  Now reads: "(3D))"

Should read: -- (3D) --

Column 93, line 39:  Now reads: "(h) selecting a current voxel;"

Should read: -- (b) selecting a current voxel; --

Column 87, line 67 to Column 88, line 2:  Now reads: "Then, at each voxel, not all the hit points and determining the contribution from each, using the BSDFs at each interaction point and the optical depth between them."

Should read: -- Then, at each voxel, note all the hit points and determine the contribution from each, using the BSDFs at each interaction point and the optical depth between them. --

Signed and Sealed this

Eighth Day of September, 2009

David J. Kappos
*Director of the United States Patent and Trademark Office*